(12) United States Patent
Donoho et al.

(10) Patent No.: US 12,020,178 B2
(45) Date of Patent: Jun. 25, 2024

(54) METHOD AND APPARATUS FOR INFORMATION REPRESENTATION, EXCHANGE, VALIDATION, AND UTILIZATION THROUGH DIGITAL CONSOLIDATION

(71) Applicant: Digital Consolidation, Inc., San Jose, CA (US)

(72) Inventors: David Leigh Donoho, San Jose, CA (US); Matan Gavish, San Jose, CA (US)

(73) Assignee: Digital Consolidation, Inc., San Jose, CA (US)

( * ) Notice: Subject to any disclaimer, the term of this patent is extended or adjusted under 35 U.S.C. 154(b) by 0 days.

(21) Appl. No.: 18/152,102

(22) Filed: Jan. 9, 2023

(65) Prior Publication Data

US 2023/0237349 A1 Jul. 27, 2023

Related U.S. Application Data

(60) Continuation-in-part of application No. 17/541,046, filed on Dec. 2, 2021, now Pat. No. 11,893,509,
(Continued)

(51) Int. Cl.
*G06N 5/04* (2023.01)
*G06N 5/022* (2023.01)
(Continued)

(52) U.S. Cl.
CPC .............. *G06N 5/04* (2013.01); *G06N 5/022* (2013.01); *G06Q 10/101* (2013.01); *G06Q 40/02* (2013.01);
(Continued)

(58) Field of Classification Search
None
See application file for complete search history.

(56) References Cited

U.S. PATENT DOCUMENTS

| 5,638,446 A | 6/1997 | Rubin |
| 6,327,656 B2 | 12/2001 | Zabetian |

(Continued)

FOREIGN PATENT DOCUMENTS

| CA | 3094539 A1 * | 1/2022 | ............. G06F 16/27 |
| CN | 101213786 A | 7/2008 | |

(Continued)

OTHER PUBLICATIONS

Universally unique identifier, Wikipedia, 2023; https://en.wikipedia.org/wiki/Universally_unique_identifier (Year: 2023).*

(Continued)

*Primary Examiner* — Alan Chen
(74) *Attorney, Agent, or Firm* — Perkins Coie LLP; Michael Glenn

(57) ABSTRACT

The invention relates to information representation, exchange, validation, and utilization. Embodiments of the invention enable a fully digital shared information reality: an information fabric, in which unlimited numbers of participants can all permanently access (with access controls) information objects that all participants can trust and verify, according to a universal set of protocols that are logically complete, address all stages of information exchange, and enable convincing, persuasive user experience. We disclose foundational embodiments that include methods to properly record, store, communicate and display information in digital form; computational verification and validation of information; and foundational concepts in human-information interaction. The invention teaches that by using unique digital objects, numerous difficulties and inefficiencies in state-of-the-art information exchange are overcome, and the (Continued)

next stage of digital transformation is enabled. Embodiments discussed include Next-Generation Digital Documents, Universal User Interface and Application Programming Interface for physical objects and devices, and user-friendly digital signatures.

17 Claims, 104 Drawing Sheets

Related U.S. Application Data which is a continuation of application No. 16/908,351, filed on Jun. 22, 2020, now Pat. No. 11,481,651, which is a continuation of application No. 14/746,254, filed on Jun. 22, 2015, now Pat. No. 10,733,513, which is a division of application No. 13/411,263, filed on Mar. 2, 2012, now Pat. No. 9,064,238.

(60) Provisional application No. 61/449,496, filed on Mar. 4, 2011.

(51) Int. Cl.
    *G06Q 10/101* (2023.01)
    *G06Q 40/02* (2023.01)
    *G06Q 40/08* (2012.01)
    *G06Q 50/18* (2012.01)
    *G06Q 50/26* (2012.01)

(52) U.S. Cl.
    CPC ............ *G06Q 40/08* (2013.01); *G06Q 50/18* (2013.01); *G06Q 50/26* (2013.01)

(56) References Cited

U.S. PATENT DOCUMENTS

| | | | |
|---|---|---|---|
| 7,913,232 | B2 | 3/2011 | Erkkinen |
| 8,782,415 | B2 | 7/2014 | Tomkow |
| 8,949,706 | B2 | 2/2015 | Mccabe et al. |
| 10,425,230 | B1 * | 9/2019 | Tang .................. G06F 21/64 |
| 2004/0186852 | A1 | 9/2004 | Rosen |
| 2005/0086180 | A1 | 4/2005 | Wamsley et al. |
| 2005/0086472 | A1 | 4/2005 | Peha |
| 2006/0136330 | A1 | 6/2006 | Deroy et al. |
| 2006/0282807 | A1 | 12/2006 | Ivancic et al. |
| 2009/0063289 | A1 | 3/2009 | Byrd et al. |
| 2009/0077532 | A1 | 3/2009 | Denney et al. |
| 2010/0050233 | A1 | 2/2010 | Ross |
| 2010/0106558 | A1 | 4/2010 | Li et al. |
| 2010/0211907 | A1 | 8/2010 | Hughes |
| 2010/0287260 | A1 | 11/2010 | Peterson et al. |
| 2010/0313032 | A1 | 12/2010 | Oswalt |
| 2010/0325424 | A1 | 12/2010 | Etchegoyen |
| 2011/0287748 | A1 | 11/2011 | Angel et al. |
| 2012/0254827 | A1 | 10/2012 | Conrad et al. |
| 2019/0386833 | A1 * | 12/2019 | Alger .................. H04L 9/3247 |
| 2020/0366671 | A1 | 11/2020 | Larson et al. |
| 2023/0073859 | A1 * | 3/2023 | Matthews ............ G06Q 20/389 |
| 2023/0216658 | A1 * | 7/2023 | Barnes .................... G06V 10/82 |
| | | | 713/193 |
| 2023/0252591 | A1 * | 8/2023 | Brown .................. G06Q 50/184 |
| | | | 705/310 |
| 2023/0281604 | A1 * | 9/2023 | Robell ............... G06Q 20/3672 |
| | | | 705/66 |

FOREIGN PATENT DOCUMENTS

| | | |
|---|---|---|
| CN | 101459509 A | 6/2009 |
| EP | 0940945 A2 | 9/1999 |
| WO | WO 2001/013574 | 2/2001 |
| WO | WO-2018006072 A1 * | 1/2018 ........... G06F 21/645 |

OTHER PUBLICATIONS

"Audit Tracker—Driving Assurance to the Next Level", website-http-www-actionbase.com/solutions/audit-tracker; document date Mar. 2, 2012, pp. 1-2.

"Executable Paper Grand Challenge—Rules", http-www-executablepapers.com/contest-rules.html, downloaded Mar. 2, 2012, 1 page.

"Federal Information Processing Standards Publication 180-2, Secure Hash Standard, Institute of Standards and Technology", Aug. 1, 2002, 83 pages.

"Federal Information Processing Standards Publication 180-3, Secure Hash Standard, Institute of Standards and Technology", Oct. 2008, 32 pages.

"*State of Connecticut* vs *Alfred Swinton*", Supreme Court of Connecticut, 268 Conn. 781, Argued Sep. 26, 2003, Released May 11, 2004, 46 pages.

"The Executable Paper Grand Challenge—Meet the Winners", website-http-www-executablepapers.com, 2001, downloaded Mar. 3, 2012, pp. 1-3.

Donoho, David, et al., "A Universal Identifier for Computational Results", website-http-aaas.confex.com/aaas/2011/webprogram/Paper4128.html, Feb. 19, 2011, 1 page.

Folk, et al., "HDF5 Data Model, File Format and Library—HDF5 1.6; NASA Earth Science Data System Working Groups—RFC 007, 207", University of California; Jan. 2007.

Gavish, Matan, et al., "A Universal Identifier for Computational Results", Procedia Computer Science 4, proceedings of ICCS, pp. 637-647.

Kevles, Daniel J, "The Baltimore Case", W.W. Norton & Co., New York, ISBN 0-393-04103-4; see website_link_http://books.google.com/books?id=hBB7-vrk4fAC&printsec=frontcover#v=onepage&q&f=false; 1998, 1 page.

Reich, Eugenie Samuel, "Cancer Trial Errors Revealed", Macmillan Publishers Limited; Nature; vol. 469; Jan. 13, 2011, pp. 139-140.

Reich, Eugenie Samuel, "Missing Part Delays Space Mission", News in Focus; Nature; vol. 469; Jan. 20, 2011, p. 280.

Unknown: "Wireless Application Protocol Public Key Infrastructure Definition", Mar. 22, 2005 (Mar. 22, 2005) pp. 1-54, XP055856651, Retrieved from the Internet: URL:https://www.openmobilealliance.org/release/OBKG/VI0-20050322-C/OMA-WAP-WPKI-VI1-20050322-C, pp. 1-54.

Nakamoto, Satoshi "Bitcoin: A Peer-to-Peer Electronic Cash System", Nakamoto, Satoshi. (2009). Bitcoin: A Peer-to-Peer Electronic Cash System. Cryptography Mailing list at https://metzdowd.com, 2009.

* cited by examiner

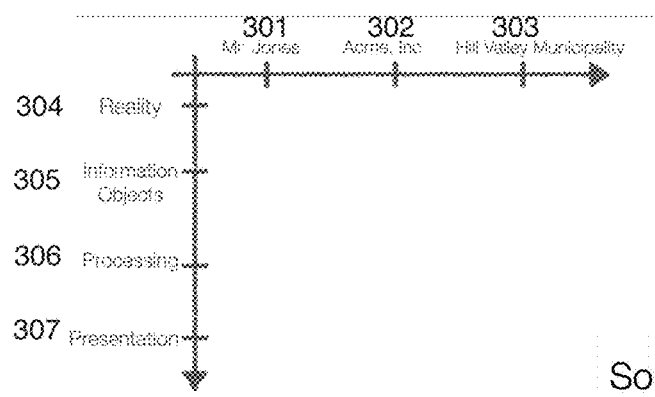
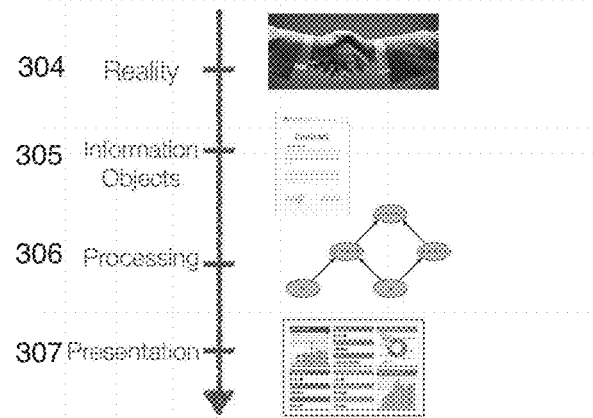
FIGURE 3

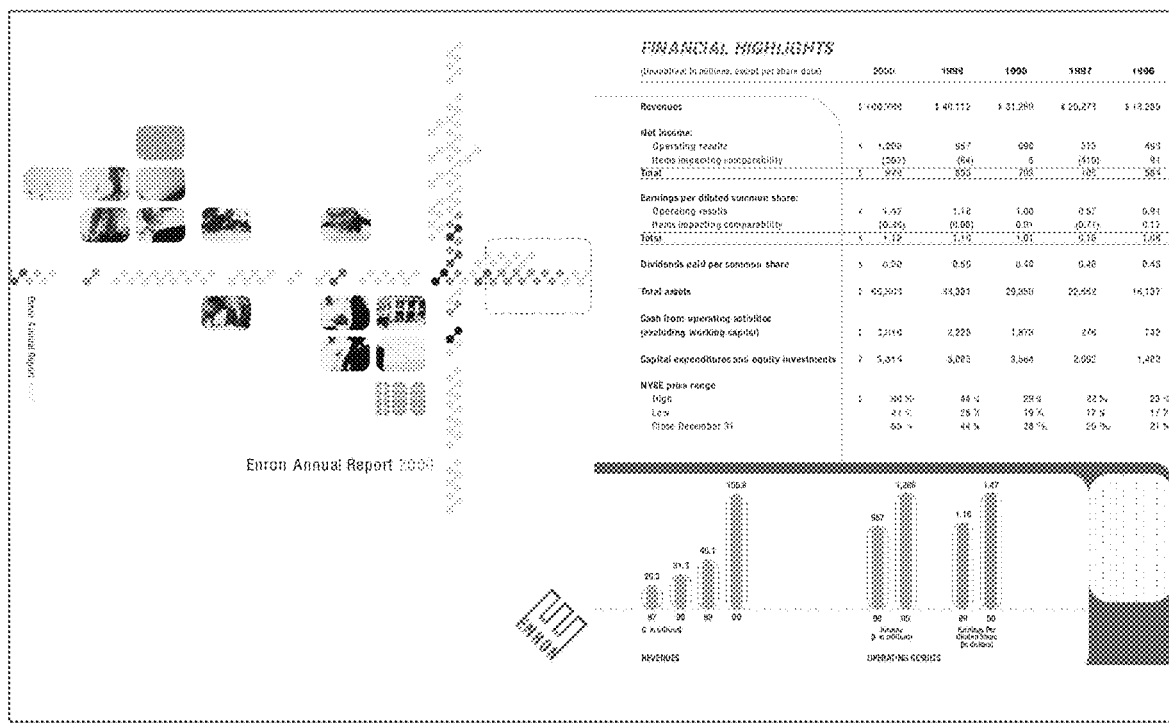
FIGURE 12 – PRIOR ART
FIGURE 13 – PRIOR ART

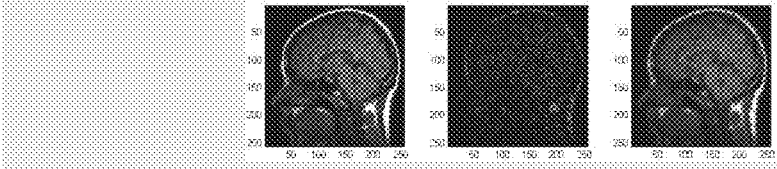
FIGURE 20 – PRIOR ART

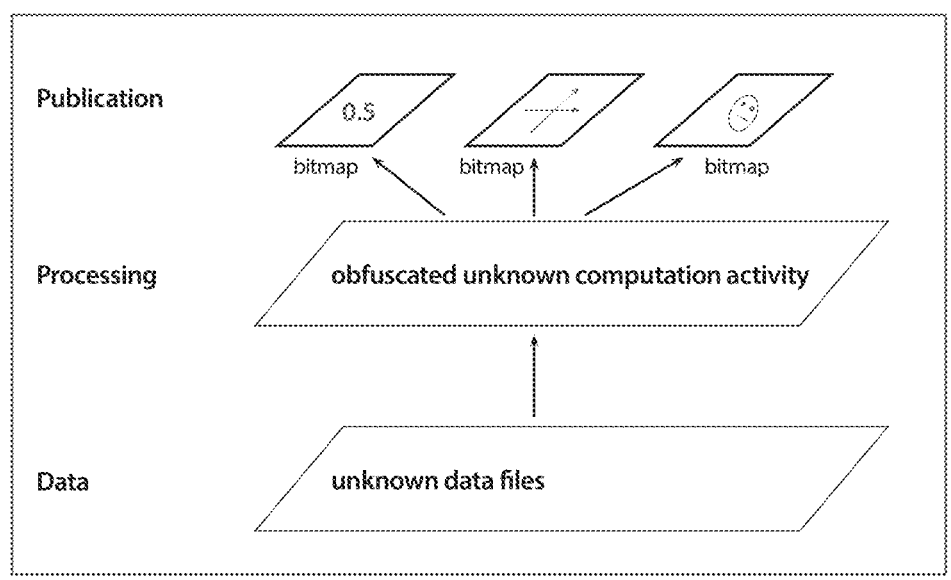
FIGURE 21 – PRIOR ART

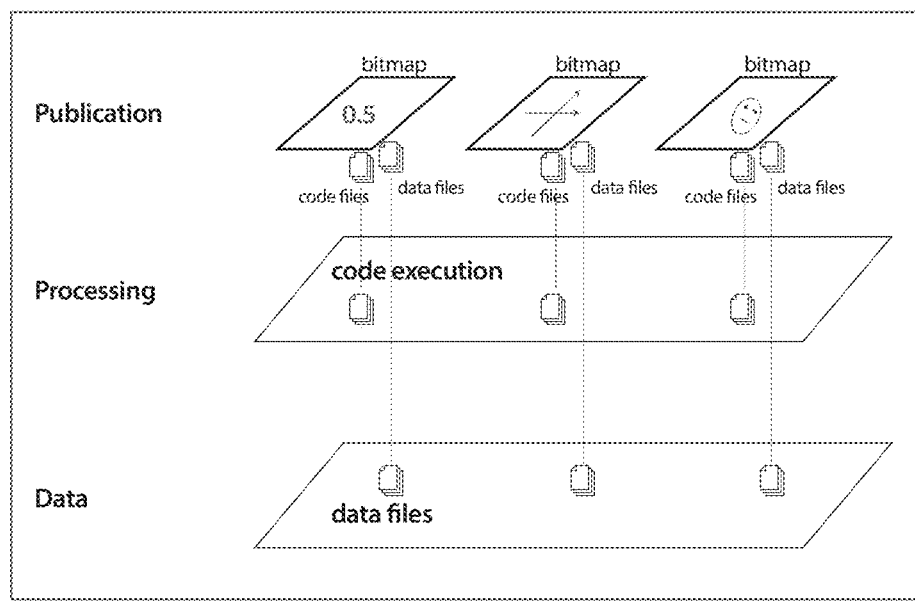
FIGURE 22 – PRIOR ART

How computational science *should* work

```
Program Code
function experiment repository('vcr.science.com')
    x = read_data('vcr.science.com/cd6a83d7-3929')
    verifiable figure1 = plot(x)
```

```
> experiment
> "vcr.science.com replied:"
> "URI of figure1 is ffaaffb1-48d7"
```

```
Document processor
    ...Our results are summarized in Figure 1.
\include_result{vcr.science.com/ffaaffb1-48d7}
```

Publication: Paper or slides
...Our results are summarized in Figure 1.

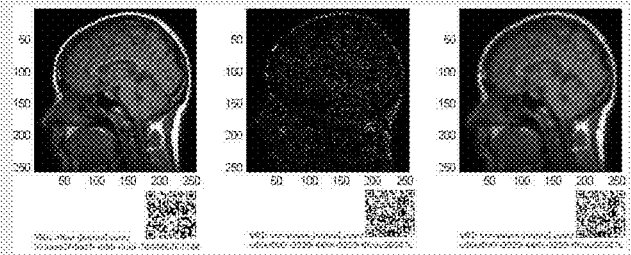

3900
Consent
1. Identification device prompts screen
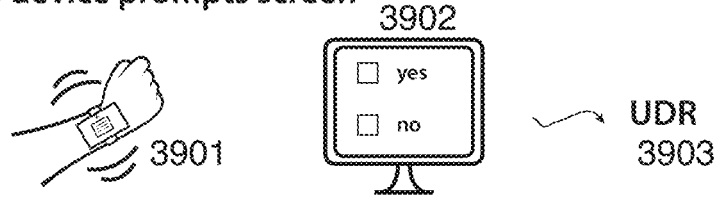
2. Identification device itself
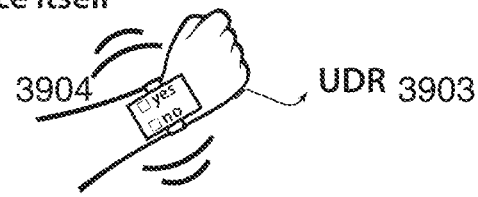
3. Identification device upon interaction with other device
4. Identification device upon interaction with paper or screen
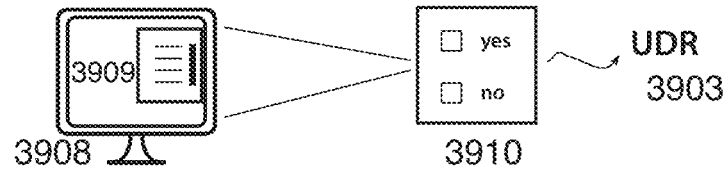
FIGURE 39

5200
Process before Digital transformation
Optimal Digitally transformed process
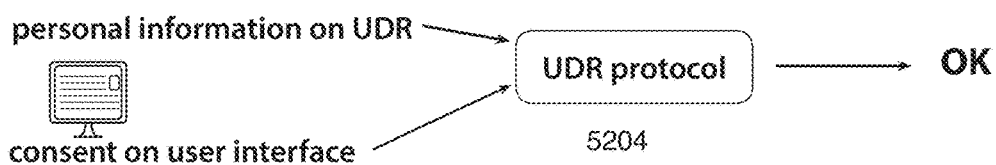
Digital transformed process with artificial friction
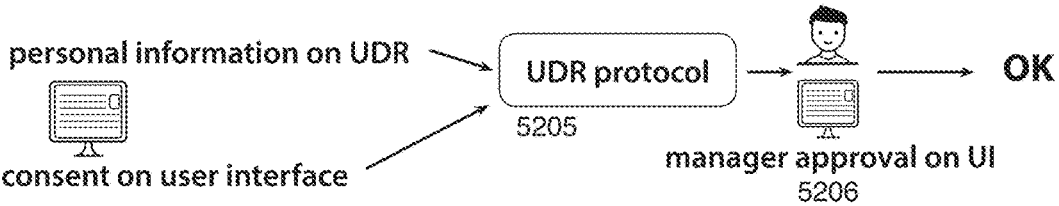
FIGURE 52

FIGURE 78

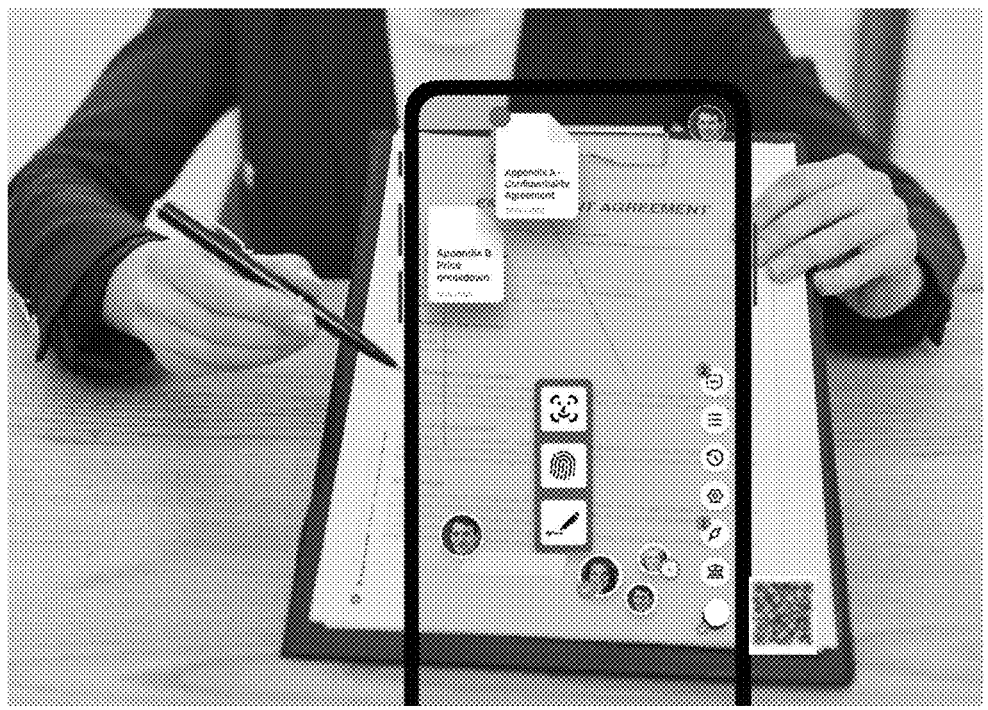
FIGURE 82

Contract for Services Rendered

This is a contract entered into by (hereinafter referred to as "the Provider") and(hereinafter referred to as "the Client") on this date, .

The Provider's place of business is and the Client's place of business is . 8 King Solomonst.

The Client hereby engages the Provider to provide services described herein under "Scope and Manner of Services." The Provider hereby agrees to provide the Client with such services in exchange for consideration described herein under "Payment for Services Rendered."

Scope and Manner of Services

Services To Be Rendered By Provider: enumerate here each particular task to be performed and its acceptable result, i. e., <1. Audit the Client's business accounting records in accordance with generally accepted accounting principles, and provide to the Client a written audit report conforming to the guidelines of the Institute of Internal Auditors.>
Payment for Services Rendered The Client shall pay the Provider for services rendered according to the Payment Schedule attached, within calendar days of the invoice's date submitted to the Client by the Provider.

Country

[ Cancel ]   [ Add ]

Should the Client fail to pay the Provider within calendar days of the invoice's date, a late fee and interest of percent per annum shall apply from the invoice's date.

Applicable Law

This contract shall be governed by the laws of the County of _____ in the State of _____ and any applicable Federal law.

Signatures

In witness of their agreement to the terms above, the parties or their authorized agents hereby affix their signatures:

_____   _____

(Printed Name of Client or agent) (Printed Name of Provider or agent)

_____   _____

(Signature of Client or agent) (Date) (Signature of Provider or agent) (Date)

Contract for Services Rendered

This is a contract entered into by (hereinafter referred to as "the Provider") and (hereinafter referred to as "the Client") on this date.

The Provider's place of business is and the Client's place of business is

The Client hereby engages the Provider to provide services described herein under "Scope and Manner of Services." The Provider hereby agrees to provide the Client with such services in exchange for consideration described herein under "Payment for Services Rendered."

Scope and Manner of Services

Services To Be Rendered By Provider: enumerate here each particular task to be performed and its acceptable result, i. e., <1. Audit the Client's business accounting records in accordance with generally accepted accounting principles, and provide to the Client a written audit report conforming to the guidelines of the Institute of Internal Auditors.>
Payment for Services Rendered The Client shall pay the Provider for services rendered according to the Payment Schedule attached, within calendar days of the date on any invoice for services rendered from the Provider.

Should the Client fail to pay the Provider the full amount specified in any invoice within calendar days of the invoice's date, a late fee at interest of percent per annum shall add Applicable Law This contract shall be governed by the and any applicable Federal law.

Secured and verified

Jane Bordex

Documents

- Security policy
- Data protection regulations
- Certified Ethical Hacker
- Data classification standards
- Certified Information System Auditor
- Terms and Conditions
- Certified Information Security Leader
- Certified Secure Computer User

- Digital Signature
- Documents
- Requirements
- Signatures

Contract for Services Rendered

This is a contract entered into by (hereinafter referred to as "the Provider") and(hereinafter referred to as "the Client") on this date, .

The Provider's place of business is and the Client's place of business is .

The Client hereby engages the Provider to provide services described herein under "Scope and Manner of Services." The Provider hereby agrees to provide the Client with such services in exchange for consideration described herein under "Payment for Services Rendered."

Scope and Manner of Services

Services To Be Rendered By Provider: enumerate here each particular task to be performed and its acceptable result, i. e..

<1. Audit the Client's business accounting records in accordance with generally accepted accounting principles, and provide to the Client a written audit report conforming to the guidelines of the Institute of Internal Auditors..>
Payment for Services Rendered The Client shall pay the Provider for services rendered according to the Payment Schedule attached, within calendar days of the date on any invoice for services rendered from the Provider.

Should the Client fail to pay the Provider the full amount specified in any invoice within calendar days of the invoice's date, a late fee equal to <$X> shall be added to the amount due and interest of percent per annum shall accrue from the  day following the invoice's date.

Applicable Law

This contract shall be governed by the laws of the County of _____ in the State of _____ and any applicable Federal law.

Signatures

In witness of their agreement to the terms above, the parties or their auth_____ affix their signatures:

 
_____
(Printed Name of Client or agent) (Printed Name of Provider or agent)

_____
(Signature of Client or agent) (Date) (Signature of Provider or agent) (

Robert

Schedule a call with Alex on Monday at 12:30

Okay, thank you for that

FIGURE 91

Contract for Services Rendered

This is a contract entered into by (hereinafter referred to as "the Provider") and(hereinafter referred to as "the Client") on this date, .

The Provider's place of business is and the Client's place of business is .

The Client hereby engages the Provider to provide services described herein under "Scope and Manner of Services." T~~~ ~~~~~~~~~~~~~~~~~~~~~~~~~ the Client with such services in exchange for consider~~~~~~~~~~~~~~~~~~~~~~~~~t for Services Rendered."

Scope and Manner of ~        service 13434
Services To Be Renda~~~~~~~~ service 3542        particular task to be performed
and its acceptable rest~       service 1255
                               service 67721
<1. Audit the Client's         service 45435       cordance with generally
accepted accounting                                t a written audit report
conforming to the gui          service 63575       \uditors.>
Payment for Services F The Client shall pay th~                           rding to the Payment Schedule
attached, within calend~                           services rendered from the
Provider.

Should the Client fail to pay the Provider the full amount specified in any invoice within calendar days of the invoice's date, a late fee equal to <$X> shall be added to the amount due and interest of percent per annum shall accrue from th  $350,000  day following the invoice's date.

Applicable Law

This contract shall be governed by the laws of the County of _____ in the State of _____ and any applicable Federal law.

Signatures

In witness of their agreement to the terms above, the parties or their authorized agents hereby affix their signatures:

(Printed Name of Client or agent) (Printed Name of Provider or agent)

(Signature of Client or agent) (Date) (Signature of Provider or agent) (Date)

FIGURE 92

Contract for Services Rendered

This is a contract entered into by (hereinafter referred to as "the Provider") and(hereinafter referred to as "the Client") on this date, .

The Provider's place of business is and the Client's place of business is .

The Client hereby engages the Provider to provide services described herein under "Scope and Manner of Services." The Provider hereby agrees to provide the Client with such services in exchange for consideration described herein under "Payment for Services Rendered."

Scope and Manner of Services

Services To Be Rendered By Provider: enumerate here each particular task to be performed and its acceptable result, i. e., <1. Audit the Client's business accounting records in accordance with generally accepted accounting principles, and provide to the Client a written audit report conforming to the guidelines of the Institute of Internal Auditors.>
Payment for Services Rendered The Client shall pay the Provider for services rendered according to the Payment Schedule attached, within calendar days of the date on any invoice for services rendered from the Provider.

Should the Client fail to pay the Provider the full amount specified in any invoice within calendar days of the invoice's date, a late fee equal to <$X> shall be added to the amount due and interest of percent per annum shall accrue from the ▓▓▓▓▓ day following the invoice's date.

Applicable Law

This contract shall be governed by the laws of the County of _____ in the State of __ and any applicable Federal law.

Signatures

In witness of their agreement to the terms above, the parties or their authorized agents affix their signatures:

    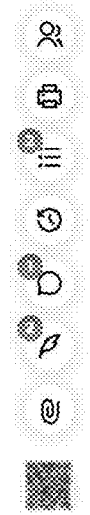

(Printed Name of Client or agent) (Printed Name of Provider or agent)

_____

(Signature of Client or agent) (Date) (Signature of Provider or agent) (Date)

FIGURE 93

METHOD AND APPARATUS FOR INFORMATION REPRESENTATION, EXCHANGE, VALIDATION, AND UTILIZATION THROUGH DIGITAL CONSOLIDATION

CROSS-REFERENCE TO RELATED APPLICATIONS

This application claims priority to U.S. Provisional Application No. 63/266,659, filed on Jan. 11, 2022, this application is also a continuation-in-part of U.S. application Ser. No. 17/541,046, filed Dec. 2, 2021, which is a continuation of U.S. application Ser. No. 16/908,351 filed Jun. 22, 2020, now U.S. Pat. No. 11,481,651, which is a continuation of U.S. application Ser. No. 14/746,254 filed Jun. 22, 2015, now U.S. Pat. No. 10,733,513, which is a divisional of U.S. application Ser. No. 13/411,263, filed Mar. 2, 2012, now U.S. Pat. No. 9,064,238, which claims the benefit of priority to U.S. Provisional Application No. 61/449,496, filed Mar. 4, 2011, each of which are incorporated herein in their entireties by reference herein.

FIELD

The invention concerns information representation, exchange, presentation, validation, and utilization. Various of the disclosed embodiments concern digital consolidation.

BACKGROUND

Digital transformation is the process of digitization of society, economy, and all aspects of the human interaction and human experience. There is a widespread sentiment that digital transformation of the global modern civilization to one based entirely on digital information exchange is both inevitable and well under way; for example, the blockchain "goldrush" was essentially fueled by this popular yet vague sentiment. Another recent example is the accelerated transition to life online and anywhere-work during the 2020 Covid-19 pandemic, which offered a vivid demonstration of the frantic pace of digital transformation. Still, the right abstractions that deliver human cooperation based on purely digital information exchange—the required technological abstractions, as well as notions pertaining to the human interaction with digital information technology—are largely missing.

The world is still groping for the right ideas that enable and deliver digital transformation. For example, a decade after the appearance of blockchain technology, all evidence shows that the blockchain and related shared ledger technologies make good brands—in that they palpably convey the promise of digitally transformed society and economy—but they are not so great as a technological enabler for widespread digital transformation. Digital transformation is still based on a vague narrative: its global, uncoordinated, rapid advance is still fueled by the definite feeling that something big—that can be perhaps described as the digitization of everything—is imminent or in fact already here. Yet a wide, compelling, coherent narrative for digital transformation—and the technology that enables it—have not so far emerged in the public arena.

SUMMARY

Embodiments of invention as taught herein teach a uniform, coherent vision that enables and delivers the full promise of digital transformation, including enduring human multiparty cooperation based on purely digital information exchange. Embodiments of the invention solve the key problem of creating a fully digital shared information reality, and offer the key elements needed to instantiate it. These include technological and conceptual components required for trustworthy, fully digital information exchange, which is broad enough to enable fully digitally transformed societal, economic, financial, and legal processes.

Embodiments of the invention teach that there is a way to create a shared information reality which is radically new, and radically different to any other in history. This way can be implemented using presently available information technology—computer networks, hardware, and software. It offers a wide array of advantages and improvements over current practice and provides very substantial value and benefits. This way is the inevitable next stage of the digital revolution; In fact, all around us are subtle signs that we are already well on our way towards this next stage.

Embodiments of the invention address the problem of reliable and trustworthy information exchange, which can enable enduring multiparty cooperation, from first principles. This problem is complicated, in part due to its distinct but partially overlapping aspects:

(i) an algorithms and software aspect—how to properly record, store and communicate information properly in digital form;

(ii) a formal/mathematical aspect—as verification and validation of information and facts, for example in an accounting process or in a bureaucratic process, follow formal structures; and (iii) a human-interface/human-computer interaction aspect—since, when all formal and information-technology aspects are said and done, trust in information is still a human decision, and the primary factors determining the value of information exchange are still based on human-machine and human-information interactions.

The foundational embodiments of the invention that are taught herein respectively address each of these issues, while additional embodiments of the invention teach how the foundational embodiments of the invention come together create an information fabric, where unlimited numbers of participants can all permanently access (with access controls) information that all participants can trust and verify, according to a universal set of protocols that are logically complete and convincing, humanly persuasive and compelling. This fabric enables radically efficient cooperation and radically deeper extraction of insight from the world's near-infinite store of digitized information.

BRIEF DESCRIPTION OF THE DRAWINGS

FIG. 3 shows the two axes of information flow: a cross-stakeholder ("horizontal") information flow and a source-to-user ("vertical") information flow.

FIG. 12 shows information from the annual report of Enron, Inc for the year 2000.

FIG. 13 shows an account statement from Madoff Securities International.

FIG. 20 is an illustration of computational science workflow under current state of the art, where data is loaded from a local file and result is exported to a local file.

FIG. 21 shows a schematic representation of the stages of vertical information flow in the field of scientific research and publication in the state of the art.

FIG. 22 shows a schematic representation of the stages of vertical information flow in the field of scientific research and publication under the discipline of file-based reproducibility, in which the data files and code files are preserved for published results.

FIG. 23 is an illustration of computational science workflow using verifiable computational results.

FIG. 39 shows various possible ways to establish verifiable consent using user Interfaces and/or personal identification devices

FIG. 52 describes an example of injection of artificial friction into a process that has been digitally transformed and automated using UDR.

FIG. 69 shows a typical document exchange using current state-of-the-art: PDF documents, e-mail, instant messaging, cloud sharing services, e-signing services, and so on.

FIG. 78 shows a possible design for access control of a Next Generation Document from within its user interface.

FIG. 82 shows a possible design for Augmented Reality (AR) user interface of a Next Generation Document.

FIG. 84A shows a user interface design for a Next Generation Document form, which guides a form user, authorized to fill the form, through specific fields the user is asked to fill.

FIG. 84B shows an alterative user interface design for a Next Generation Document form, which presents a form user, authorized to fill the form, with a questionnaire collecting the necessary information required in the form.

FIG. 84C shows a user interface design for Next Generation Document, which summarizes the validity and trustworthiness status of the document in a single symbol (lower left corner); and itemizes the various high-level (or overall) notions of validity, verifiability and trustworthiness implemented by the Next Generation Document.

FIG. 84D shows a user interface design for Next Generation Document, which offers a detailed, itemized visual status of a specific notion of validity, verifiability or trustworthiness implemented by the Next Generation Document.

FIG. 86 shows a possible interface design for setup and monitoring of a simple automated document workflow, from within the Next Generation Document user interface.

FIG. 91 shows a possible user interface design for Next Generation Document that refers to a voice recording unique digital object.

FIG. 92 shows a possible user interface design for Next Generation Document that refers to a spreadsheet unique digital object, and specifically, cites a cell from the spreadsheet in the document.

FIG. 93 shows a possible user interface for signature interaction, when signing a Next Generation Document on any medium, including desktop document reader, smartphone application, Augmented Reality interface overlayed on a hardcopy document, and so on.

DETAILED DESCRIPTION

Overview of Core Concepts

Figure 1:
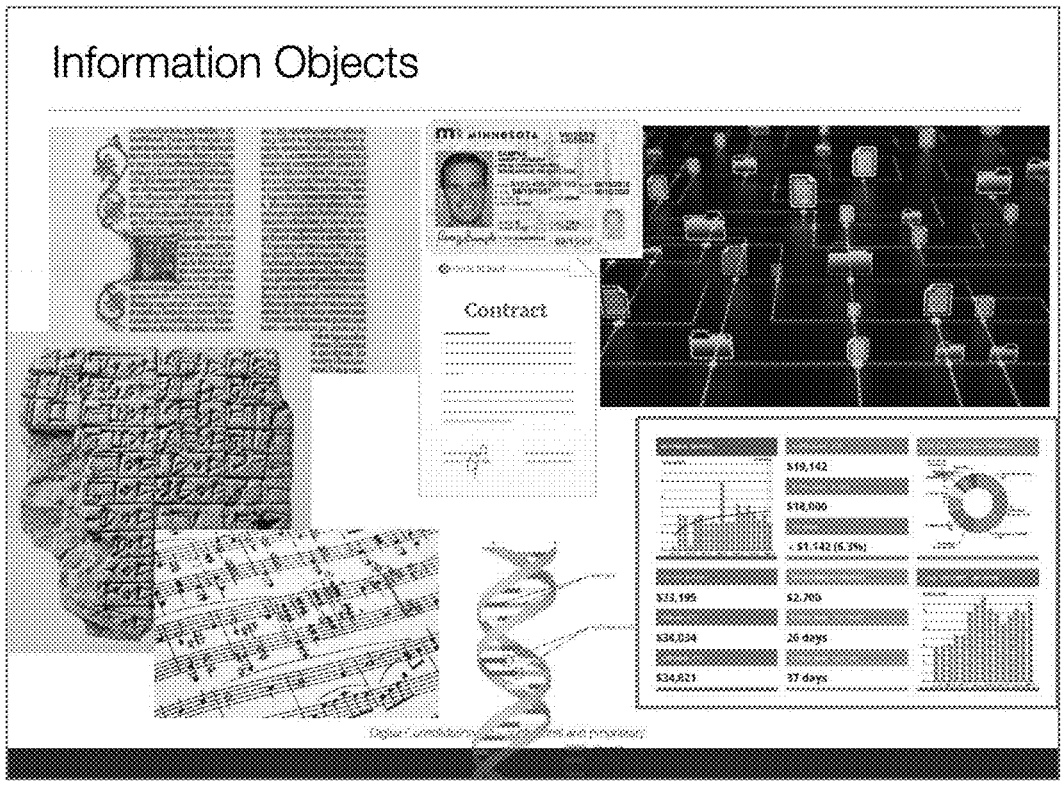
FIG. 1 shows examples for various information objects.

We are witnessing Digital Transformation, the historical process of the total digitization of all human information exchange. In our collective imagination, already know the endgame of digital transformation: it's the information technology of Star Trek or any other similar cinematic imagination of the deep future, an information technology as smooth as silk—where there are no files, formats, folders, pens, pockets, or identity cards. In that vision of the future, information flows between computer systems like electricity on the grid, verification is as automated as Internet routing, and the trustworthiness level of information is obvious.

The timeline of Digital Transformation, up to the present day, essentially consists of only three major milestones:
   The invention of digital information storage and digital information processing;
   The invention of the Internet and World Wide Web (WWW); and
   The invention of mobile Internet, smartphones, and cloud computing.

Where is the money being made in Digital Transformation? Revenue of Internet companies has dwarfed revenue of personal computing and enterprise software companies. Even as, unlike physical products, the marginal cost of software is near-zero, enterprise software may still be considered old-school business by today's standard. Non-orthodox astronomical valuations for losing companies (e.g. WhatsApp and other social media startups) are the hallmark of Internet companies, not information technology companies in general. One could argue that digital information technology became a disruptive force in the global economy only when the Internet arrived: Information Technology (IT) for the corporation makes things more efficient, while the Internet enabled the largest economic revolution since the industrial revolution.

Digital Consolidation. Most of the value in Digital Transformation has been generated, and will continue to be generated, only when a uniform way to exchange digital information emerges. This has happened twice so far since the onset of digital transformation: once with the Internet and WWW, and once with mobile Internet, smartphones, and smartphone apps. We call the process of moving toward uniform interface and expression in digital information exchange Digital Consolidation. This is a gradual process—a part of digital transformation.

The next 20-30 years will see a definitive breakthrough in Digital Consolidation, which will propel the process of digital transformation toward its endgame.

Shared Information Reality. Why is most of the money being made only through a breakthrough in digital consolidation, and not with the general advance of information technology? Uniformity of interface and expression in digital information exchange creates a digital shared information reality—a state of widespread information availability on the one hand, and consensus on the other hand, which is based on digital information exchange, makes possible completely new products and services. Only through shared information reality can software continue to "eat the world". Indeed, consider the markets, products and services enabled by the Internet, WWW, mobile Internet, and smartphone apps.

Horizontal and Vertical information flow. To understand what digital consolidation is, to identify its current position along the evolution of digital transformation, and to identify the opportunities that are open now, it is useful to study information exchange from first principles. The goal of information exchange is cooperation and insight. We define Horizontal information flow to be the flow of information between different stakeholders. The horizontal flow enables insight. We also define Vertical information flow to be the flow from objects, states, and events (including physical, financial, legal, and IT reality), to information objects representing these objects, states, and events, to processing of these information objects into results, into presentation of results in human-readable form. The vertical flow enables cooperation, because by tracking the vertical flow certain information objects can (potentially) be verified and achieve the status of facts, placing the objects, states, and events they refer to, or the results of processing they refer to, in consensus. In most societal process, the flow happens in both these axes at once—for example, processing is applied to information objects that originate from different stakeholders.

Mirroring reality in Shared Information Reality. The first link along the vertical information flow chain is between objects, states, and events to their representation in information objects. To achieve cooperation, symbols in information objects (parchments, paper documents, PDFs, or unique digital objects) encode meaning that represents—mirrors—objects, states, and events. This includes physical reality but also legal reality, e.g. contracts and property titles, and financial reality, e.g. fund balances and transfers. Relations between information objects, e.g. a contract citing a property title, mirror relations between the objects, states, and events they mirror. The more objects, states, and events information objects can mirror, the more they can be used to achieve cooperation.

Information Processing: Computation vs Information Consistency and Compliance (ICC): The second link along vertical information flow is processing of information objects into results. There are two kinds of processing:

Computation takes inputs (represented in information objects) and computes outputs; this is the kind of processing done in spreadsheets, statistical analysis, machine learning, even the simple arithmetic involved in getting to bottom-line numbers in financial reports and tax returns. A scientific report, for example, contains bottom-line numbers which are results of computations (typically statistical analysis) applied to measurements recorded in information objects.

Information Consistency and Compliance (ICC) apply a predefined list of requirements to information objects. In a real estate transaction, for example, the attorney overseeing the transaction must verify that a collection of documents upholds a long list of consistency and compliance requirements.

While both computation and ICC are algorithmic tasks, computation has been digitized; ICC has not, and remains a human task—analogous to the human computers who performed numerical and arithmetic computation before the digital age. Computation, while digitized, has not advanced to equal footing of data, and is not represented by information objects: for example, the event of code execution is still a vague notion rather than a formal object that can be addressed and exchanged. ICC is even further behind. This is the reason that the prophesized demise of accounting, for example, has not yet occurred.

Vertical Digital Consolidation leads to a fully digital shared information reality where the vertical flow—the links between observed information objects to the information objects deduced from them and to the processes that were used to deduce from them, and from deduced information objects to their human-readable visual presentations—are explicitly exposed in digital format.

Vertical Digital Consolidation revolutionizes consensus, cooperation and trust that are enabled by digital information exchange. Indeed, cooperation and consensus are achieved by traversing the vertical flow to verify results that are presented for human eyes. Consolidation of the steps along the vertical information flow—from capturing an event and representing it as a digital information object; to processing a collection of information objects; to presenting it on a user interface—enables efficient and comprehensive verification of information exchanged by human users. Certainly medical billing, tax and corporate accounting, auditing and many aspects of legal practice will be eaten by software when this happens.

Horizontal digital consolidation leads to a fully digital shared information reality, in which information objects (both observed and deduced) are permanently accessible to arm's-length stakeholders (with access privileges) through a uniform interface.

Horizontal Digital Consolidation will revolutionize artificial intelligence, Business Intelligence (BI) processes, data mining, and data science. Indeed, insight is achieved by traversing the horizontal layers across the boundaries between stakeholders and information sources. Consolidation of the horizontal layers—even just the horizontal layer of information objects—will unlock value of astronomical proportions for training AI models and obtaining insight from digital information.

Simultaneous Horizontal+Vertical Digital Consolidation. Digital Consolidation across both axes of information exchange ushers in a world where measurements, user interface interactions, digital representation of objects, states and events, computations used to process digital information, the results of these computations, and information presentations on user interfaces—across arm's length stakeholders—are all unified under a single, coherent discipline of information technology. Digital Consolidation across both axes of information exchange thus creates and enables markets, products and services which defy the current limits of imagination. This last statement is factual rather than melodramatic—indeed, the Google search engine, and more generally the full impact of the "Internet+WWW digital consolidation", is today's everyday ordinary reality, but lie well beyond the 1980's limits of everyday imagination.

Horizontal consolidation enables mining all the world's digital information for insight; vertical consolidation enables automatic verification and radically efficient cooperation. The mathematical product of horizontal and vertical consolidation means the following: there is a systematic, software-accessible digital footprint to all capturing of objects, states, and events into digital information objects; to all processing applied to digital information objects and their inter-dependencies and interconnection; to all presentation of information objects on user interfaces.

This enables services such as searching for all publications that used, directly or indirectly, a certain dataset; and getting answers to questions such as:

What would happen if I applied my algorithm to their data?

What would happen if I applied their algorithm to my data?

How would results presented in a scientific paper change if I change tuning parameters?

What would be the result if I apply the method reported in paper A to the data used in paper B?

What are bootstrap confidence intervals for the results presented in this report?

The next breakthrough in Digital Consolidation. Further breakthroughs in digital consolidation are inevitable—the only question is when and how. There is reason to believe a third breakthrough in digital consolidation is imminent; this is signaled by the considerable, yet unreasonable popularity of the blockchain.

The blockchain and digital shared information reality. The blockchain and shared ledger technologies cannot support large-scale digital consolidation—including, for instance, all financial transactions, all continuous geo locations, all server queries, all code executions. Arguably, it is ridiculous to have all stakeholders in an information-exchange community (for example, every Internet-connected individual) store a local copy of everyone's information since the dawn of time, and maintain permanent consensus over everyone's information. The blockchain was simply not designed for this. Crucially, the blockchain's popularity cannot be explained by the decentralization meme centralization has worked fine, both throughout history in general and for digital transformation. The real reason behind the blockchain frenzy, and the popular meme, whereby the blockchain is a revolution, is that Bitcoin is the first-ever widespread fully digital shared information reality. The blockchain allows stakeholders to maintain consensus over facts using purely digital means, for the first time giving us a glimpse of the world beyond document-based consensus. While WWW offered uniformity of interface, it did not provide a purely digital way to agree on facts. The blockchain can support small-scale horizontal digital consolidation, e.g. between a small group of stakeholders transacting limited amounts of information, but not large-scale digital consolidation. Importantly, the blockchain does not have anything to do with vertical consolidation or any notion of integration of the information flow from reality to presentation; it is focused on the horizontal information objects slice.

One evidence that the blockchain frenzy is riding on a vague feeling that "something big is coming" and that this vague feeling indeed points to digital shared information reality (and not to, decentralization) is the recent hype around Nonfungible Tokens (NFTs). An NFT can be assigned definite ownership and be exchanged and sold. Indeed an NFT can be auctioned, like a painting or the original declaration of independence. This status—namely, the status of a tangible thing—for digital objects has never been widely accepted before; no wonder that the first uses of NFTs was to associate them (using sheer imagination) with artwork, which are hallmarks of tangible, unique physical objects. You could also associate an NFT to days of the week and auction Wednesday this way for the same matter. In other words, fascination with NFTs comes from the fact that they are first widely accepted examples of objects that exist in a digital shared information reality, however limited and rudimentary.

Unique Digital Objects. Several embodiments of the invention taught herein are based on the concept of Unique Digital Objects, which is disclosed in detail below. The next breakthrough of digital consolidation, hinted at by the blockchain, but certainly not realized by it, is a uniform standard for digital information exchange that revolves around the notion of unique digital object, rather than around the notion of the digital file. The digital file—an elementary concept in all operating systems, Web protocols and user interfaces, and a fundamental concept in design of computer information systems since the dawn of the digital age—is in fact a historical relic from our ancestral paper legacy and underlies all digital fragmentation (see below). The digital file is the "original sin" of the information revolution, making information fragmented, siloed, obfuscated, and impossible to own. The file is inherently a local creature, which can be copied at zero cost or deleted and hence exists everywhere and nowhere, detached from any possible identity and alien to any notion of ownership, usage tracking, audit trail or provenance trail. In contrast, the unique digital object is a universally unique, permanently accessible, immutable, committed, universally uniquely addressable, and machine-readable digital object. A key observation is that unique digital objects enable both horizontal and vertical digital consolidation. It is a key enabler of digital transformation. As an information object, the unique digital object offers uniformity of interface and expression as well as access control and definite ownership over digital objects, necessary for horizontal consolidation; It offer uniformity of interface and expression in digital representation of processing (computation and ICC) and explicit, full provenance trails from observation through processing to presentation, necessary for vertical digital consolidation.

Unique Digital Reality (UDR) is a system for uniform interface and expression of unique digital objects. Several embodiments of the invention taught herein are based on the concept of UDR, which is disclosed in detail below. As we show in great detail, unique digital reality enables digital consolidation and indeed the endgame of digital transformation; it unlocks the full value of digital information and create a huge number of new markets, products, and services, such as those mentioned above. For example, with unique digital reality, individuals can rent out their entire digital history; corporate accounting becomes a software problem; the physical world merges with its digital footprint; the act of software execution becomes a tangible object that can be sold; and much more. Unique digital reality is uniformly software accessible, enabling the effortless flow of digital information, automatic validation and verification, and software-provided obvious trustworthiness, as well as new levels of insight mining and artificial intelligence.

UDR Implementation using Enduring Network Interfaces. As mentioned, shared-ledger technology cannot possibly support large-scale unique digital reality (think all the digital information created by everyone). There is however one mature technology that can support it at scale, indeed the same technology that supports all internet traffic today: the Internet server. Below, we teach how to implement unique digital reality using server interactions and mostly presently available information technology. In our implementation, a unique digital object is implemented as an enduring network interface, namely, an internet service that is permanently available over the network using universally unique identifier and offering an API. We show how these objects can be created, committed, verified, graphically rendered, and used at scale—using server interactions alone.

The mirroring power of UDR. Unique digital reality can effectively mirror complicated processes across legal, financial, and information technology (IT) reality. For example, software execution—an event in IT reality that despite its huge importance has been out of reach of mirroring—can be mirrored as a collection of unique digital objects. As a result, it becomes possible to own and trade software execution events and prove, e.g. for the purpose of IP ownership, scientific reporting, regulatory compliance, or liability protection, that a certain software test has been executed at a given time. Using ancillary embodiments taught, important events in physical reality, such as door access or granting consent on a user interface, are digitized into unique digital objects.

Verifiable Code Execution. Code execution events are crucially important events in information technology reality. Under the existing state of the art, they cannot be mirrored in information objects, and as a result, the vertical flow of information exchange could never be consolidated—as results of computations (code executions) could not be connected to the information objects they were applied to (on the one hand) or to their results as displayed and presented to human users (on the other hand). UDR enables Verifiable Code Execution—the mirroring of code execution events as collections of unique digital objects in UDR. To achieve this, unique information objects recording the progression of computation—including code executed; input and output data structures; interim variables; and key results intended for human users—are created by the same machine, virtual machine or interpreter executing the code. With verifiable code executions, the vertical flow from information objects, to processing in code, to presentation of results remains intact.

Standard Information Consistency and Compliance Language (SICCL). As mentioned above, the processing stage of the vertical information flow consists of one of (or a combination of) computation or ICC. Verifiable execution mirrors computation in UDR and thus enables consolidation of a vertical information flow including computation; however vertical information flows that include ICC are currently not even digitized in the state-of-the-art, and instead carried out by manual human effort. We disclose Standard Information Consistency and Compliance Language (SICCL), a machine-readable language that allows ICC requirements to be digitized in machine-readable instructions, and consequently verified automatically using a computer program. As a result, verifiable execution of SICCL scripts mirrors in UDR the event of verification of ICC requirements, turning the process of requirement verification (presently only performed by humans examining documents) to be mirrored in UDR. This enables consolidation of vertical information flows that include ICC.

Human-readable representation of unique digital objects. To complete the consolidation of vertical information flows, it is necessary to connect results of processing to the user interfaces upon which these results are presented and communicated to human users; and connect results presented to the computational flows that created them. When all elements in the vertical flow from objects, states, and events to processing events and results are mirrored as UDR objects, it is possible to connect visual rendering of results to the underlying elements of the information flow systematically. This is achieved by creating a discipline for presentation of results on user interfaces that only allows presentation of information that exists as unique digital objects in UDR; presentation of information without its UDR context is simply not possible.

Horizontal Digital Fragmentation. To better evoke the merits of UDR and its suggested implementation, it is useful to consider the current state-of-the-art. Digital transformation also includes a process in the opposing direction, which we call Digital Fragmentation. Horizontal Fragmentation is the process of dividing the digital world into an ever-increasing number of disjoint (fragmented) information systems, each using idiosyncratic storage formats and protocols, each user-facing and not designed for software interoperability across time and space, and each isolated from the rest of the world. Horizontal fragmentation lines lie between organizations and corporations and between different information systems of an individual organization. Digital information kept separate from the rest of the world—in the private databases and idiosyncratic storage formats of corporations, banks, healthcare providers, insurance companies, and governments—cannot be not part of any shared reality and cannot be form the basis of any new products or services.

Friction; Documents. Shared reality is essential for any societal process—such as business, legal, and financial processes. When two entities, which use sophisticated information technology internally, but are digitally fragmented away from each other, need to exchange information, e.g. in a legal or financial transaction, they fall back to pre-digital means: documents, or PDFs, or emails, which are direct emulations of paper-based information exchange using envelopes, mail and physical paper. Due to horizontal digital fragmentation, they cannot establish consensus with purely digital means, and, to this day, documents are the only objects used to establish consensus and a shared reality. This means that highly sophisticated stakeholders, each with an impressive IT stack, communicate using paper (we call this the phenomenon of "flesh and bone messengers"). Fallback from digital information to documents and emails creates huge friction in the economy.

Vertical Friction is friction along the flow of information processing from observations all the way to human-readable results. It manifests in trillion-dollar industries such as corporate back office, receipt processing, insurance claims processing, medical billing, corporate accounting and audits, and tax accounting. The function performed by human employees in these industries is ICC—linear and algorithmic in nature and could have easily been automated in software—if it wasn't for the fact that, due to digital fragmentation, all information must be exchanged in paper or the digital equivalent of paper and remains strictly human-accessible. Occasionally, the system breaks down to the sound of devastating financial and accounting scandals, most notably the 2008 housing market crush. Furthermore, the mirroring power of documents and PDFs is quite limited—for example, they cannot explicitly cite other documents, and cannot mirror IT reality, i.e. objects states and events in so-called virtual space or cyberspace, such as logins, server interactions, and data transactions. Vertical friction also manifests in failures of important institutions, such as scientific reporting, where peer-review is no longer a viable institution: complete lack of computational provenance creates uncertainty regarding the validity of published reports.

Horizontal Friction and "Dark Information". With Moore's law, the price of computation dropped exponentially and hence the value of data increased exponentially—creating local incentives for each entity to hoard its own data, rapidly increasing digital fragmentation. Currently, as digital transformation progresses and the world goes digital, most of the digital information being created is fragmented and invisible—a kind of dark digital information (in analogy to cosmological dark matter). The amount of dark digital information locked away is tremendous compared with the amount of digital information available through consolidated interfaces such as the World Wide Web (WWW). Correspondingly, the economic value that remains locked away dwarfs the many trillions of dollars made by Internet and mobile app companies. Consider the value that, e.g. Google and Amazon currently extract from information available on the Web and from their users using computational means, and now imagine the markets, products, and services—indeed the insight that would be possible—with software access to all the world's digital information, e.g. all medical, scientific, financial, geo/traffic, and sales data, through uniform, digitally-consolidated interfaces.

Files. As with PDF documents, the use of digital files as digital information objects is a historical relic that represents imitation of the old medium (paper). Files are instrumental in encouraging horizontal friction, as each stakeholder must protect their files from copying and is encouraged to hoard them, as information in files cannot have a definite owner. Files are also instrumental in vertical friction because files are inherently incompatible with computational provenance and digital audit-trails: when a computation creates a file, its provenance is immediately lost.

The Trajectory of Digital Transformation. Increased digital fragmentation is not consistent with the endgame of digital transformation, as the latter requires complete consolidation of all digital information exchange. In fact, full Digital Consolidation is the endgame of Digital Transformation. We conclude that further breakthroughs in digital consolidation are inevitable—the only question is when and how. There is reason to believe a third breakthrough in digital consolidation is immanent; this is signaled by the huge (and largely unreasonable) popularity of the blockchain.

The road to the endgame of digital transformation: Information Flows. Information exchange based on unique digital reality is fundamentally different to information exchange based on documents, PDFs, or files. Stripping the decentralization meme off the blockchain, we find that some of the benefits are already discussed in the context of the blockchain applications. With unique digital reality, all digital information is software-accessible, has definite ownership, and enjoys cross-platform uniformity of interface and expression, whose potential benefits dwarf those of WWW.

Embodiments of the invention enable the endgame of Digital Transformation: Verification happens, trustworthiness is obvious, knowledge emerges. We teach that, based on this implementation of unique digital reality (or any other implementation that may arise in the future) full digital transformation is possible. With the entire network of information objects, needed to verify complicated facts, accessible in digital form with their inter-citations, fact verification and compliance becomes a software automation problem. Application plugins ensure that audit trails are preserved in unique digital reality as relations between objects. Visual presentation of facts and computation results relate visual rendering of unique information objects, presented on user interfaces, to their sources in unique digital reality. Knowledge mining systems can traverse unique digital reality and discover new insights or train artificial intelligence systems—on legally owned datasets not available under digital fragmentation. As described below, these are in fact the key elements of the endgame of digital transformation.

Detailed Background on Digital Transformation

All human cooperation is predicated on exchange of information. The human capacity to maintain a consistent shared world view via exchange of information, as is the human capacity to draw new understanding and insight from information collected over time and space, are fundamental enablers of all aspects of civilization—such as society, politics, economy, and culture. Any revolution in the ways in which we exchange information, in the use of information to maintain a consistent shared world view, and in the way, information is processed to achieve insight, necessarily implies a revolution in society, politics, and economy. Indeed, the emergence of language has made humans the dominant species on the planet; the invention of writing has led to the establishment of large-scale economies, trade, monetary systems, religions, and empires; the invention of print and mass media has led to the rapid spread of education and ideologies culminating in the major economic developments, global armed conflicts and political events of the $20^{th}$ century; the invention of digital computers, computer networks, and the Internet led to rapid globalization and emergence of a unified global society, as well as numerous rapid transformations in politics, finance, business, commerce, and social interactions. We are presently in the middle of another transformative revolution, one which is once again changing the way we exchange and use information. Those living in the late $20^{th}$ century and early $21^{st}$ century are witnesses to, and propagators of, the gradual and irreversible transfer of all human affairs, communications, transactions, interactions, and memories to digital systems based on software and modern information technology.

Across the world, human affairs are going digital. From social interactions to healthcare; from finance to science; from news and journalism to children's games; from agriculture to art; from advertising to driving; from education to entertainment. In some areas in the third world, societies who have not gone through an industrial stage seem to leapfrog from an agricultural society to a digital-agricultural society. Digital Transformation has major consequences on all aspects of Western Civilization and first world societies. Digitization is affecting jobs, privacy, bureaucracy, personal autonomy, democracy, finance, healthcare, law, economy, community, childhood, relationships—in short, every aspect of society as a whole and of an individual's everyday life. This is a process of vast historic significance. Evidence as to how far along the process of digitization has advanced came when the 2020 Covid-19 pandemic hit: using information technology (notably websites, smartphone apps, and voice-over-IP teleconferencing technology) the economy of western world continued to function even when most of the world was in lockdown—a situation that would be considered utterly impossible even a decade or two ago.

Digital Transformation is the ongoing process of moving all human affairs, memories, communications, transactions, societal processes and business processes to software and computer-based processes, computer interactions and digital media. Not a single aspect of human existence in the digitized world—societies and countries that have seen significant adoption of Internet-connected personal computing devices—has remained unaffected by Digital Transformation. Indeed, this is a major transformative revolution in western civilization, surpassing the Industrial Revolution in its dramatic impact on every aspect of human society, economy, government, as well as many aspects of community, family, and personal life.

The process of Digital Transformation includes new ways to exchange information and new societal agreements for human processes and interactions based on information exchanged in these new ways. Let us briefly elaborate on the key term's information and information exchange. A thorough discussion of these terms appears below.

By information exchange we mean the methods and protocols (agreed upon explicitly or universally adopted implicitly), using which we create, store, communicate, copy, distribute, access, exchange, present, inspect, verify, cite, own, and archive information of all kinds—from contracts to medical test results, from geo-location of individuals to Internet server logs, from salary slips to entertainment content. More importantly, we mean the underlying mindset and core concepts that shape how we think about information, how we use it, and the key roles it plays in society, business, economy, and the human condition.

In this text, we use the term information broadly to include, for example, all kinds of physical and digital documents, photographs, contracts, books, videos, Virtual Reality (VR) entities, and digital files; a more comprehensive list of example appears below. Importantly, among other kinds of information, we deal with the information that governs our lives and our society: who owns what, who agreed to what, who has been where, who has which identity, who did what, who paid who and how much and for what, who owes who and how much, who received which medical treatment, which are trustworthy financial reports, which are trustworthy scientific results, and so forth.

Detailed Background on Shared Information Realities

Why is most of the money being made only through a breakthrough in digital consolidation, and not with the general advance of information technology? The answer is that uniformity of interface and expression in digital information exchange creates a digital shared information reality—a state of widespread information availability on the one hand, and consensus on the other hand, which is based on digital information exchange, makes possible completely new products and services, and ultimately new markets and industries. Only though shared information reality can software continue to eat the world. Indeed, consider the markets, products and services enabled by the Internet, WWW, mobile Internet, and smartphone apps.

The goals of information exchange. Information exchange is the beating heart of any civilization: society, economy, government, politics, finance, law, business, tax—are all fundamentally predicated on exchange and processing of information. The function of information is cooperation and insight. Cooperation is achieved by exchange and inspection of information as it flowed from source to user; insight is achieved by amalgamation and processing of information collected across time and space.

Symbols. Information is represented by systems of symbols. Knots on a rope, coal inscriptions on cave walls, letters etched in clay or stone, sounds spoken by vocal cords, rhythmic drumbeats, films stored on a roll of super-8 celluloid, Morse signals over RF radio signals, strings of binary bits stored on magnetic digital media, binary light flickers over fiber-optic cables—are all examples of symbols. As these various examples show, different symbol systems make available different modes of information storage and exchange. Some symbols systems (spoken words) cannot be stored, while others (letters on clay or knots on a rope) can be stored. Some (drumbeats) can only communicate over a relatively short distance while others (Morse codes over radio frequency signals) can be communicated over very long distances. Some (strings of binary bits) are readily available processing and manipulation by for software instructions on a digital computer, while others are not. And so on.

Information objects. To enable cooperation between individuals and societal institutions separated by both space and time, and to ensure persistent use of information across time, individuals must agree on meaning and interpretation given to information symbols and share protocols for creation, storage, exchange, and interpretation of these symbols. These shared protocols are fundamental enablers of human communities and societies. To begin with, these protocols define information objects—objects that contain or carry information symbols—and their meaning. For example, a paper page printed with certain language is taken to mean a contract transferring ownership over a house; a plastic card with a binary string coded in a magnetic stripe—a credit card—is taken to mean identity that could authorize payment; a collection of bits in Portable Document Format is taken to mean a health questionnaire form; and so on. The protocols then define the meaning of certain actions associated with information objects. As an example, take the act of consent by an individual. A protocol may specify, for instance, that to consent to a contract printed on a page the individual must sign with a blue pen; to authorize payment the individual must hand her credit card to the merchant to be swiped; to declare good health the individual must click certain boxes in the Portable Document Format (PDF) shown in a PDF viewer and save it; and so on.

To better evoke what we mean by information objects, consider the following list of information objects exchanged in our society. Individuals, companies and government offices exchange formal letters, financial statements (including bank account and credit card statements), contracts, purchase orders, agreements, forms, bonds, diplomas, licenses, identity documents, membership cards, permits, checks, insurance policies, invoices, receipts, reports (including financial reports), academic research papers, accounting, tax reports, government forms, visas, tickets, passes, notes, medical and health records, medical billing records, charts, certificates, deeds, technical specifications, public disclosures, transcripts, manuals, photographs, videos, fact sheets, Virtual Reality entities and objects, digital and virtual coins, and so on. FIG. 1 shows examples of information objects.

Systems of information objects. To understand the use of information, it is necessary to look a complete system of information, including the symbols used, the ways symbols are collected in information objects, the protocols that give meaning to objects and actions based on these objects. As a first step, observe that any system of information exchange specifies how certain action are taken on information objects. We call these actions verbs:

Create and edit
Store
Communicate/exchange
Access
Copy
Distribute
Own/assert copyright
Sign
Cite
Verify The system of symbols used, namely, the medium in which the information is coded, determines physical limitations for these verbs. For example—compare the verbs "create" and "copy"—namely, creation of a new information object—using clay-inscribed letters as symbols, with creation using computer software. In some symbol systems, implementing certain verbs is a demanding task while in others it is very easy. As another example, consider the verb "access"—namely, accessing and inspecting an existing information object. When the information object is a deed of sale stored in the city hall of some municipality, an individual may need to travel great distances to access it; however, when the deed is a digital document served by a web server, it may be accessed and inspected instantly over an Internet connection.

Shared Realities. One of the two reasons we exchange information is to maintain a consistent world view, which is shared between people across space and time. For example, my bank may share a bank statement with me, so that we will have a consistent view of the activities in my account. Years later, I may share that same bank statement with the government so that both me and the government will have a consistent view on the same matter.

A consistent, shared view about the world—consisting of what we may call facts—is the fundamental basis for cooperation in society. All institutions in modern society crucially depend on it. To have a functioning society with its political system, government, economy, legal system, property ownership, monetary and financial system, healthcare system, education system, and so on, stakeholders must be able agree on the state of the world. They must agree, to a large extent, on what has happened, on who owns what, on identities of people and organizations, on the existence and content of the law, and so on. For example, when I receive a medical treatment at a hospital, both myself, the hospital and my medical insurance company must agree on many things. We must agree on the specifics of the treatments I received, on the identity and formal certification of the persons from which I received it, on the medical tests and examinations that I underwent and on the results of these tests, and on the medical diagnosis underlying the treatment I received. As another example, when I enter a contract with another person, it's crucial that we both have a consistent, shared view on what was agreed, when and by whom.

To say this differently, exchange of facts is a fundamental enabler of transactions and interactions in any human society. Most societal processes, and all government processes, are based on exchange of facts, and specifically on creation, presentation, communication, verification and archiving of facts, as well as creation of a new compound fact based on several existing facts.

Let us call this situation, in which everyone agrees (or strives to agree) on a consistent world view, a shared reality. The term "reality" is used here in a broad sense beyond the sense of the physical reality. Human societies are based on shared realities. From religious myths to nation states to government systems to corporations to money to human rights, the fact that everyone in a society collectively imagines—collectively believes—that something is real, makes it real. According to this notion, known in the literature as intersubjective reality, our capacity to imagine something into existence collectively is the main reason humans were able to form large-scale cooperation between individuals across space, time, and personal differences, and consequently, the main reason why the human species has been so successful.

It is useful to separate all the shared reality that we collectively imagine into layers—the layer of political shared reality, the layer of monetary and financial shared reality, the layer of legal shared reality, and so on. None of these layers has any physical existence—they are all in our heads, namely, are imagined intersubjective realities. The key is that they are in all our heads, namely, that most individuals in the society agree, to a large extent, on the elements of the reality layer, on their inter-connections, and on their meaning.

Physical reality. Exchange of information pertains to objects, states, and events in different layers of reality. We live in physical reality. There are objects, e.g. people, devices, vehicles. These objects can have states and properties ("this person is in that location," "this vehicle is red"). Events that occur in physical reality can change the state of an object ("this person entered that room," "this vehicle parked").

Shared intersubjective realities. Abstractly we can say that reality is a collection of objects, with their states and events that affect those states. The defining characteristic of reality is that it is shared between individuals—everyone present at the same place at the same time will agree on the objects, states, and events they witness.

In addition to physical reality (objects, states and events in physical space) we all live in other layers of shared reality, notably: legal reality with objects such as corporations, states such as solvency, and events such as asset sale that exist in the legal system, financial reality with objects such as bank accounts, states such as account balance and events such as a transfer between accounts, and Information Technology (IT) reality with objects such as a login account, states such as server availability, and events such as code execution, login or server query. Let us give a few examples of each.

Physical reality. Objects: individuals, real estate property, locations, items, machines, doors, instruments, cars. States: e.g. an open door, a parked car, an unplugged instrument. Events: e.g. an individual pressing a button, a car entering a garage, a light turns on, a turnstile turns.

Legal reality. Human beings also share realities that have no tangible existence: Notably, financial reality and legal reality. These are imagined realities ("intersubjective realities") in that they have no tangible existence and exist in the imagination of all individuals who partake in it based on consensus.

Objects are laws, rulings, and legal entities (organizations, governments, corporations) as well as the legal representation of physical objects (a person's legal identity, a registered real estate parcel, etc.). States in legal reality are contracts, agreements, legal status of an entity, etc. Events in legal reality are legislations, court decisions, consent, ownership transfer, execution of a contract or a contract clause, tax events, etc. In legal reality we find Objects: corporations, companies, nonprofits, government entities, contracts, law; States: ownership, going concern, contract in effect; Events: granting of consent, bankruptcy, acquisition, ruling.

Financial reality. Objects: securities, bonds, bank accounts, investment accounts. States: account active. Events: bond default, security transaction.

Information Technology (IT) reality. Objects in IT reality are pieces of digital data stored on digital storage devices. Events in computational reality are computations (code executions) and network communications. Both code executions and network communication create digital data and change digital data. While IT reality is not physical, it is certainly a reality with tangible existence—all individuals with access to a certain storage device agree on its content. In IT reality we find Objects: servers, user accounts, databases, files; States: server online, account active; Events: user login, server boot, code execution, network interaction.

Mirroring. The fundamental function of systems of information objects—along with the protocols that specify their usage and meaning—is to represent, namely to mirror, objects, states and events in various reality layers, such as physical, legal, financial and IT reality.

A given system of information objects—writing on clay bricks, for example—has the capacity to mirror certain objects, states, and events, in various layers of reality, and not others. The specifics of the information system—including the symbols, the information objects, and the protocols—defines the limits of what is possible in terms of exchange (the limits of possible implementation of verbs) and the limits of what is possible in terms of mirroring. Some information systems have a much wider range of expression—namely, can mirror a wider range of things, states and events in a wider range or reality—than others. Importantly, the information system determines the cost (in terms of time, effort, resources) required for information exchange and for achieving consensus, and the fundamental limits of trust, consensus and cooperation that are made possible by a certain information system.

For example, an information system consisting of documents can mirror a person's identity (using an ID card) and the event of purchasing an item at a store (using a receipt). It is not able to mirror events in Information Technology reality, such as logging into a server. Because our legal system still relies entirely on documents, prosecuting cybercrimes—where the criminal activity in fact involves digital events such as login events—is extremely cumbersome. Many other states and events cannot be mirrored using documents—for example, the event of a person using an ID card to open an electronically locked door; the event of code execution; or the state of a tax report being in perfect compliance with current state tax law.

Mirroring relations. Connections between symbols refer to connections between the underlying objects. Often, it is the connections that are most important. For example, the fact that two payments are two parts of the same transaction. Or that one payment is a refund of another payment. Connections are where we start crossing between different realities. For example, a VAT tax liability (a legal object) regarding a payment (a financial object) for sale of a tomato (a physical object). Three objects in three different realities, all part of the same interaction or cycle.

Figure 2:
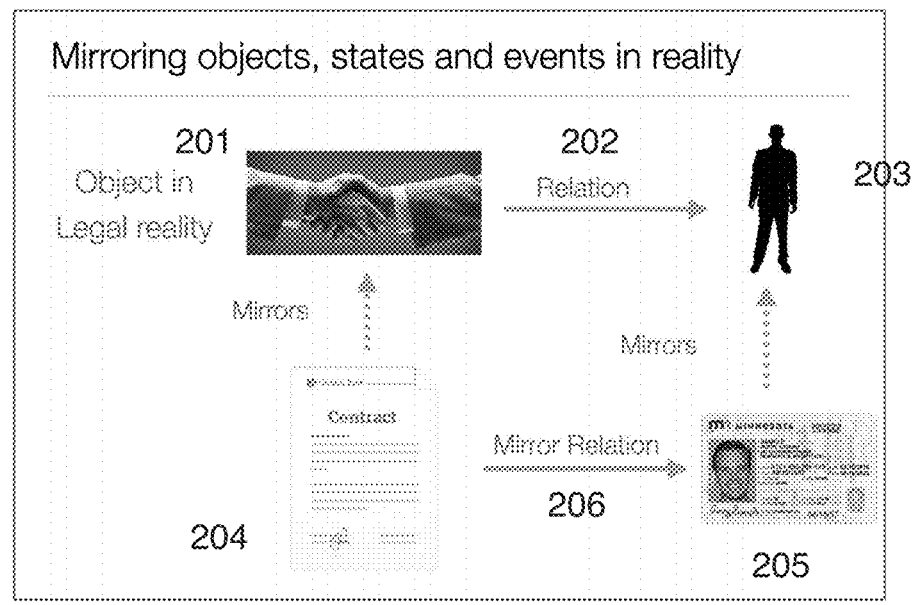
FIG. 2 shows objects, states and events in reality, and their relations, being mirrored by information objects and their relations in information reality.

Like any language, Information Realities have certain expressive power. They can be able (or unable) to express—to mirror—objects in the underlying reality, and connections between these objects. FIG. 2 shows schematically objects, states and events in reality, and their relations, being mirrored in information reality: An object 201 in reality (for example, an agreement between parties) is mirrored by an information object 204—a contract document. A person 203 in reality is mirrored by an identity document 203—for example, a driver's license. A relation 202 between the agreement 201 and the person 203—for example, the fact that the agreement 201 involves the person 203—is mirrored by a relation 206 in information reality; for example, the contract document 204 may mention the person 203 using his or her legal name, address and driver's license number as shown in license 205.

It is interesting to note how different information systems deal with cross-reference, namely, describe connections between information objects. Consider citations of case law (e.g. United States v. Nixon, 418 U.S. 683 (1974)), academic papers (e.g. *Annals of Botanics* 17(8):67-90, 1965), legal code reference (e.g. 42 U.S.C. § 1983), Digital Object Identifier (DOI: 10.1016/j.procs.2011.04.067). These are systems of unambiguous notation for cross-reference. More commonly, in current state of the art, there is no good way for an information object to refer to another information object uniquely and unambiguously, and indeed most inter-relations between objects in various layers of reality are not mirrored at all (or very poorly mirrored) in the currently used shared information realities. Consider for example the relation between a product or service sold, and the payment for this product or service. Matching product with payment is a required step of corporate auditing, but present-day accounting must manually cross-reference and match product receipt, payment in the financial statements (bank transfer or credit card charge) and product identity. As another example, consider a contract appendix or schedule; the contract and the appendix are implicitly connected ("see Appendix A") but documents, as information objects, do not enable to cannot them explicitly—the connection is not captured in document reality.

In ["Codes of life: identification codes and the machine-readable world"], Dodge and Kitchin quote from [Solzhenitsyn A., 1968 Cancer Ward Part I]:

"As every man goes through life, he fills in several forms for the record, each containing a number of questions. A man's answer to one question on one form becomes a little thread, permanently connecting him to the local centre of personnel records administration. There are thus hundreds of little threads radiating from every man, millions of threads in all. If all these threads were suddenly to become visible, the whole sky would look like a spider's web . . . . They are not visible, they are not material, but every man is constantly aware of their existence . . . . Each man, permanently aware of his own invisible threads, naturally develops a respect for the people who manipulate the threads . . . . "

Indeed, these invisible threads are quite real, but are presently implicit in documents. As we will see, documents are very limited in expressing inter-connections, and consequently most of the work in reconstructing the network between the referred objects from the symbols needs to be done manually—humans need to infer that X is the receipt for Y, etc.

Back to Information Objects. Cooperation is predicated on consensus. For individuals to cooperate successfully, it is imperative that they share a common view of reality—both the physical reality and other shared (intersubjective) realities such as legal, financial, and computational realities; In fact, the very existence of shared realities depends on consensus via exchange of information. By exchanging information objects, each mirroring a thing, state, or event, individuals participating in the exchange attempt to reach consensus regarding the thing, state, or event mirrored; this consensus allows them to cooperate.

To better evoke this, notice that societal processes often involve objects, states, and events in multiple layers of reality. Consider the invoicing cycle, where an entity (a corporation, issues a purchase order, obtains a quote, pays, and places an order, receives the order goods using a delivery service, and obtains an invoice and receipt. Generally accepted accounting principles (GAAP) require the corporation to keep records of all stages in this complicated multi-stage process. It includes objects in legal reality (ordering corporation and goods-providing corporation), objects in financial reality (bank accounts), events in financial reality (funds transfer, issue of invoice), objects in physical reality (goods delivered) and events in physical reality (delivery). Notice that the GAAP requirements corporation to keep records of all stages in this process amounts to keeping records that represent—mirror—the different objects, states and events in all reality layers involved.

Shared information realities. It is useful to think of a system of information objects, for example the system of clay tablets, or the system of paper documents, or the system of PDF documents, as a layer of shared reality in its own right—one that is separate from the layers of shared reality it mirrors or represents. There are defined rules, social agreements, and customs that govern the use of information systems: these agreements define the meaning attached to an information object, the methods for proper creation, exchange and validation of information objects, and the requirements for an information object to be considered authentic. These "mirror realities" consist of information objects that mirror objects, states, and events in other realities. We call them Shared Information Realities. For example, a title document—an object in the Document Shared Information Reality to be discussed shortly—represents the legal state of ownership of an individual over some property. It is not the ownership itself, which is a state in legal reality.

Just like there are agreements and constructs related to any shared reality, there are agreements and constructs related to the exchange of information in a shared information reality. And just like multiple layers of shared reality exist concurrently and are useful concurrently, multiple concurrent layers of shared information reality are possible. While we use the term "information system" to describe the collection actual objects (clay tablets, paper documents, or digital PDF files, and the mechanics of their creation and communication, we use the term "shared information reality" to describe the totality of social norms, customs, meanings, and agreements that govern the use of information objects in each information system and the meaning given to them.

The Document Shared Information Reality. How do human societies share a consistent world view based on information exchange? In prehistoric societies, spoken language was the only means to share information. So it was necessary to use stories and gossip, and to believe them. Namely, "if it's spoken—then it's true." Not believing the spoken word meant that no cooperation was possible—so it was far more useful to believe.

We can trace were other symbolic systems for information exchange that did not use writing as we know it today. For example, the Inca empire, which did not have a written language, used a knot system known as Quipu to collect census data, keep official records, monitor tax obligations, and so on.

The invention of writing provided a completely new way to exchange information and reach a shared world view. The new idea was "if it's written—then it's true". When more and more people could write, signatures were added to ensure authenticity and identity—namely, "if it's written and signed—then it's true." We use this very old way to use information to this day: today, if I am presented with a letter that is signed, I am supposed to join the shared world view. By believing the contents of the letter, I join a reality that other people share and can cooperate with them. I am free to doubt and disbelieve every letter and contract I am shown—letters from banks, employers, and so on. But that makes me unable to cooperate with anyone. So it is much more useful for me to accept this system and agree that if "it's written and signed, then it's true." With the invention of the typewriter, the idea shifted a little and became—"if it's printed and signed—then it's true." The principle here is that the way we record information must have some inherent difficulty in it—some proof of work—so that it becomes more trustworthy. We will discuss this point in more depth later.

Let us call the system that uses physical documents to establish a shared information reality the "Document Shared Information Reality" (or simply the document shared reality). The Document Shared Reality revolves around the exchange of documents. For example: driver's license, insurance contract, business permit, entry visa, real estate rent contract, real estate purchase contract, real estate property title, car title, parking ticket, bank monthly statement, annual financial statement of a publicly traded corporation, tax form, sales receipt, purchase order, hospital bill, insurance claim, insurance contract, salary slip, employment authorization, employment contract, construction permit, phone bill, airline ticket, credit card, birth certificate, corporate balance sheet, articles of incorporation, power of attorney, will and testament, professional diploma, transcript, pharmacological prescription, certification of marital status, and a deed of assignment.

In most societies today, and certainly in the Western Civilization, from the invention of writing and until the appearance of household digital information technology in the late 1970's, the Document Shared Reality has served as the dominant system for reaching a consistent, shared world view and consensus. It has enabled people to cooperate across time and space. It enabled to establish the notion of property (real estate, intellectual), money, banking, modern economy, law, accounting; it enabled development of complex social structures (kingdom and empire, feudal structures, the modern state), science and technology, organized religion, and so on. As mentioned above, under the Document Shared Reality, if I present a signed piece of paper to someone, unless they have a specific reason for mistrust, they will accept the information displayed and join the shared world view—even if they were not parties to any original interaction described in the document.

Even today in the $21^{st}$ century, as the Covid pandemic broke out, a negative Covid test result was required to board international flights, cross international borders, etc. In the absence of any way to verify test result documents, documents were the only uniform way to exchange information—and were simply accepted at face value—if a test result was written in English, had a formal looking letterhead, and mentioned some credentials, it was internationally accepted. This has been a powerful demonstration that, digital age or not, we still fall back to Document Shared Reality when arm's length information exchange is needed across international borders.

The Original Document. A notable and interesting characteristic of the Document Shared Reality system is that not all documents are created equal. Sometimes, original documents have a privileged status. The original signed contracts—the copy that was signed by the hands of the parties to the agreement; the original license; the original diploma; the original grade transcript; the original sales receipt; the original passport—all have a unique value, and for most purposes cannot be replaced by any copies.

Crucially, the notion of an Original Document, implies that a certain object carrying information is "A Thing"—a tangible, universally unique, uniquely addressable, uniquely locatable Thing. A court can subpoena an original document; the holder of an original title has proof of ownership; etc. This notion has a profound impact on the way we think about facts and information. As an information object, the original document enjoys a privileged status for being tangible and universally unique.

Notaries: Copying in Document Shared Reality. How do we then create a copy of the original, with the same privileged status as the original? Or how do we represent that we own the original document, without presenting it? This problem does not have a direct solution within the Document Shared Reality system. To solve this problem, the system has been amended, so to speak, by the Notary or Apostille functions. When a notary, who stands to lose his license, swears on his honor that they have seen the original, or when they affix a wax seal to a copy, this is accepted as proof.

The Hybrid Document-Digital Shared Information Reality. Having discussed the Document Shared Reality system, which has been in use from the invention of writing to the onset of the digital age, we arrive at the shared information reality system in use today. Looking around us, we notice that the system for exchanging facts is a hybrid. It certainly contains many elements of the Document Shared Reality system—we still completely rely on documents—yet these elements are implemented using a mixture of physical paper and digital means. Indeed, the digital document, such as the Portable Document Format (PDF) file, the word processor file, and the e-mail, are strange creatures. In many ways they are like paper (physical) documents: they are intended for human access (as opposed to machine access) and have ad-hoc formats; they are however much easier to copy and communicate. While they are copied instantly and communicated instantly—the hallmark of digital information—they are treated and used exactly like the ancient physical documents. The point that will be made here is that this is a strange hybrid—in effect, an attempt to transfer the familiar and millennia-old Document Shared Reality System, as verbatim as possible, to the digital arena. This is a digital imitation of the old system.

Indeed, it is striking to understand that very little has changed in the information system following the digital revolution. The word processor has replaced the typewriter; e-mail has replaced envelopes, and, conceptually, that's basically it. The default medium for information exchange has so far remained written material intended for human consumption—rather than for not machine processing. With few exceptions, fact verification is a human activity.

The way in which our society uses documents has not fundamentally changed with the transition from paper documents to digital documents. In most domains, the physical document is still the root of trust, and digital facsimiles are considered inferior copies. As a result, the document presenter is still required to store the original physically and is at risk that the original may be destroyed. One notion of a digital document is the PDF, a facsimile of the original physical document. Digital signatures are not widely used and here again, losing the original signed file means losing the document. The standards for verification of documents have become lax and unclear; verification of both the contents of a document and the validity of the document itself is harder than ever. The result is that we exist in a data fog. Several recent large-scale financial fraud scandals, e.g. the Enron, Madoff, MF Global scandal and Wirecard scandals—to name just a few, make it clear that verification of document authenticity is a very challenging task even for highly skilled, sophisticated, professional accountants.

The economic value of activities revolving around fact creation, representation, exchange, and verification is in the trillions of dollars a year. Consider the verification activities required by insurance companies, legal firms, financial firms, and accounting firms. Also consider the multitude of bureaucratic activities related to regulatory and tax compliance, VAT and sales tax collection, HIPAA compliance, receipt processing, sale and purchase of travel or show tickets, corporate due diligence, medical billing and insurance, real estate transactions, tax reports, identity theft, and so on.

The hybrid digital-document information exchange system is an imitation of paper—on computers. Paraphrasing Marshal McLuhan, "the first version of a new medium imitates the medium it replaces". Indeed, most of the standards in information technology today, which underlie so many societal processes, imitate the old medium—the only medium we have known for centuries—paper documents. For example, hand scribbling of signatures on a digital tablet; PDF digital documents; e-mail; files and folders in operating systems and websites; digital editions of newspapers—all imitate the old medium of paper documents, ink signatures, filing drawer cabinets full of paper files grouped into folders. Think about email—basically just digital implementation of mail—and the little paper clip icon for attaching documents to an email. The notions are all from the $17^{th}$ century. One can argue that a hand scribble, signing a digital tablet pad at a cashier, is quite silly. Why should this be standard of authentication and consent at the dawn of the $21^{st}$ century?

These digital imitations are just the first versions of the new medium. In the fully digitally transformed world, exchange of information has advanced beyond digital paper and imitations of paper documents—the medium replaced by digital information technology. In other words, we are doing things on computers while trying desperately to imitate pen and paper. This creates confusion and inefficiency. It is time to let that go and use computers and presently available information technology in a radically different way that's congruent to their potential.

Discussion Let us discuss properties of facts in the Document Shared Reality. First, crucially, the Document Shared Reality is human-accessible and only human-accessible. The information objects in the document shared information reality—namely, documents are produced by humans for humans. Humans write and sign; humans read, verify, and understand. Second, it is consolidated and universal. Written and signed information produced anywhere at any time present or past, by anyone who can read the document language, can be presented to anyone. For example, a contract document from two hundred years ago may be produced and found legally binding today.

We all know how to read written information, and we all implicitly understand and subscribe to the Document Shared Reality system. Any two people can interact in this way (absent language barriers) and reach a shared world view. For example, a French prospective student can present to a university in the United States bank statements from France, and the university accepts that she has financial backing sufficient to complete my studies and endorses my visa request. This is a miraculous interaction—the French banker and the American admissions officer have entered a shared world view regarding the financial status of the prospective student, even though all three have never met and do not even live in the same country or under the same legal system. See Table 1.

TABLE 1

Comparison of the document and hybrid shared information realities

| verb | Document shared information reality | Digital-Document hybrid shared information reality |
| --- | --- | --- |
| Create and edit | Use pen, typewriter, or printer. Cannot edit after document creation | Can edit after document creation |
| Store | Store a physical copy of the original document | Store a copy of the digital document- all copies are equivalent |
| Communicate/ exchange | Exchange a physical copy | Exchange a digital copy |
| Access | Gain access to physical copy (e.g. in office, archive, library) | Gain access to digital copy, e.g. by email, cloud storage, network |
| Copy | Copy of the original must be notarized to gain "original copy" status. Other copies (namely facsimile copies) are inferior. | Every time a digital document is sent, it is copied-the act of exchanging a digital document is synonymous to the act of copying it |
| Distribute | Physical distribution | Distribution over the network, e.g. email, WWW |
| Own/assert copyright | A physical document can be owned by owning all original copies. Publications can be | A digital document cannot be owned. There is no way to own a digital document (see |

TABLE 1-continued

Comparison of the document and hybrid shared information realities

| verb | Document shared information reality | Digital-Document hybrid shared information reality |
|---|---|---|
| | owned by owning a copy (e.g. at a library) | for example the case of Sci-Hub which makes accessible publisher-owned scientific papers |
| Sign | Hand signature | Scribble of hand signature; digital signature |
| Cite | Except for journal-published papers or case law, a physical document cannot be explicitly cited. | Can be cited only through a Document Object Identifier (DOI) or permanent Web address; HTTP does not support using a URL as a permanent citation for a document. |
| Verify | Must be verified manually. | Must be verified manually. |

Is there a shared information reality based on the digital file? It is interesting to note that there is no shared information reality based on the digital file (in machine-readable format) as its core information object. The reasons will be discussed below. Briefly, for an information object to serve as a basis for shared information reality, it must be permanently accessible, immutable, and signed. Imagine a contract, for example, stored on an information objects that becomes inaccessible, can be easily edited, and changed, or cannot be signed. Digital files are not permanently accessible—they can disappear from all storage and their format may become obsolete; and they are easily changed and edited. As for signatures, digital signatures are a very effective way to sign a digital file, binding an identity to the file and ensuring its immutability, however their user interface angle has not been worked out to a degree that allows them to be widely adopted.

Can we imagine a shared information reality that truly transcends documents? It is hard to believe that documents (physical or digital) will be around forever in the digital world. Indeed, as discussed above, when we reach the endgame of digital transformation, documents will be found only in museums alongside spears and typewriters.

So, how will the next stage in evolution of information objects look like?

What is the next shared information reality?

Can there be a widely adopted fully digital shared information reality, which truly transcends the notions of the document and the file?

Consider for the example the receipt. A receipt is a document (physical or PDF—no matter) representing an exchange of goods or services for payment. The exchange includes several simultaneous events: a physical exchange (in the case of physical goods) or digital exchange (in the case of digital goods); a financial exchange; a tax event; and a legal consent event (customer agrees to pay, vendor agrees to sell, with legal implications according to local law regarding sales, etc.). The receipt has many different uses. It is a proof of purchase that may be relevant in the event the customer would later like to exercise some buyer's rights (such as return of goods); it is a tax record relevant in the event the purchased item is accounted for in a tax return; it is a financial record in the event of dispute regarding payment; if a company is paying, the receipt must be kept for and accounted for in the company's financial records; it can be used to prove tax residency because, if purchase implied physical presence somewhere, then the receipt implies being on a certain time at a certain place; it can be used in an insurance claim if the purchase was part of recovery of insured property.

The information displayed on the receipt includes identity of seller (name, address, phone, and possibly tax ID), date-time of payment, description of goods or services purchased, amount paid, payment method (including payment information, such as credit card number or bank account), tax collected, and possibly references to other relevant documents, such as invoice, purchase order, credit card slip, etc. A receipt is implicitly related to other documents such as financial records where payment was recorded (bank statements or credit card transactions), invoices, purchase order and goods delivery confirmations.

So, essentially, a receipt could have been a JSON string like this one:

```
Receipt = {
    Seller_name = ' ..'
    Seller_address = '..'
    Purchase amount = 88
    Purchase current = 'USD'
    ...
    etc.
}
```

There are definite advantages to using a JavaScript Object Notation (JSON) receipt:
(i) As stated above, the receipt is involved in numerous legal and financial processes, which require verification of information compliance such as a tax return, corporate financial statements, or insurance claim. Using a digital format makes the receipt software-accessible, giving up hope to automate these tasks.
(ii) A machine-readable receipt can be part of dataset used to discover new patterns, train machine learning algorithms, and draw conclusions and insights from the data by computational means.

So why are we still using paper receipts? Surely this is not because we can't agree on the digital format; to name one example, Hypertext Markup Language (HTML) is a digital data format that has become universally accepted.

How to create digital information technology that Bridges Time? Following Harold Innis, communication theorists distinguish between media that bridges space to media that bridges time. From this perspective, the invention of writing gave the human species memory that transcended an individual or even a civilization: writing bridged time. Getting written messages across space was difficult or impossible: writing did not bridge space. In contrast, the telegraph, the telephone, the radio, and the television broadcast were communicated instantly at the speed of light (bridging space) but were not recorded: they did not bridge time. After the invention of computer networks, digital information technology became a medium that can bridge both time and space: digital information can be stored long-term and communicated instantly. The fact that the modern civilization still today relies on paper documents (or their digital imitation) and not on purely digital information exchange is evocative of the fact that the first use patterns of the Internet focused on bridging space and not on bridging time—online shopping and e-commerce, online newspapers, social media, instant messaging, sharing economy, for example, all capitalized on the ability of information technology to communicate instantly. Long-term memory, of the kind that information objects that convey facts must have, stayed with documents as it has since the invention of writing—the only change was that documents could be communicated instantly in digital form, so again, the use pattern of digital information technology was in bridging space first and foremost.

The question of how to use digital information technology to bridge time—in other words, how to create permanent digital objects, which are permanently accessible and can be agreed upon, finally sending the document to retirement, is mostly unanswered today.

For digital objects to be permanent, there needs to be trusted record keepers. Who will they be?

The blockchain phenomenon, discussed in more detail below, did not arise because the blockchain is decentralized—as the popular perspective seems to suggest. Arguably, decentralization is not an important or even desirable property. The blockchain phenomenon is because Bitcoin was the first example of purely-digital object that bridged time—the Bitcoin the blockchain is perceived to be a permanent, permanently accessible record, based on purely digital information. The fact that the Bitcoin the blockchain stores financial records of all things (not medical records, for example) is an important contributor to the blockchain phenomenon: as of the end of 2021 the Bitcoin market cap is hundreds of billions US dollars; that speaks to the trust that many people feel dealing with purely digital information.

According to the blockchain, the answer to the question "in order to use digital information technology to bridge time, who should the trusted record keepers be?" is "everyone." Everyone's records are stored by everyone. This is, of course, a preposterous answer, and one reason why the blockchain did not take over the world in the decade since the blockchain meme has become wildly popular.

So, who should the trusted record keeper be?

Recap. There are strange phenomena in the ways we use information today. For example, print-sign-scan. For example, printing digital information from a Standard Query Language (SQL) database and sending it by mail or email (same thing almost) to another party who will then type in into their SQL database. For example, collecting huge amounts of small paper receipts to move information from the payment terminal to the computers of the company's controller; keeping the original paper receipts for seven years; etc. Looks like we are not using information very effectively, and worse, in a manner that induces error and allows fraud. So we can ask: Why things are the way they are, and what's going to happen in the future?

Let us consider the ways in which we use information. Like language, information is, by definition, a collection of symbols. A system of information—language, for example—has syntactic rules (form) and semantic rules (meaning) so that we can use it to pour meaning into well-defined forms. Like language, information contains symbols about reality. And, like language, the objects and events to which information symbols refer can exist in physical reality—but also in imagined (intersubjective) reality. [Benjamin, Jessica. "Creating an intersubjective reality: Commentary on paper by Arnold Rothstein." Psychoanalytic Dialogues 15.3 (2005)].

As we've seen, information refers to

Physical reality

IT reality (what happened in computers—what is stored, what has been accessed, which programs have been executed)

Legal reality (criminal law, civil law—contracts, tax law, corporate law)

Financial reality (money, financial instruments, financial markets, lending, credit, payments)

What is information used for? Like language, we use it to communicate. Information consists of elaborate structures, built using language and other information representation systems, with their own rules. Its most important use is to reach consensus and cooperation regarding what is and what has happened—to reach a shared view of reality. In fact, for imagined (intersubjective) realities, information is the only means to reach consensus and cooperation—the existence of intersubjective realities depends on information.

Examples. Consent and agreement are terms in legal reality. A signed original document is a symbol of an event—consent and agreement. This object can be stored, presented, exchanged, inspected, verified—to reach consensus and cooperation regarding the event in legal reality to which it refers. The document is a symbol. Similarly, the receipt is a symbol for an event in financial reality—payment, and the tax invoice is a symbol for an event in legal (tax law) reality—tax obligation due to payment.

In the different layers of reality, importantly there are connections between objects. A payment (object in financial reality) is made from one entity, e.g. an object in legal reality if a company, and both legal and physical reality if person, to another entity, in exchange for something, an object in physical or legal or financial reality. All these entities are connected to the payment object.

So information is a language, a system of symbols, used to describe—to refer to—objects in different layers of reality. Sometimes, the identification between the object and the symbol is so complete that we don't distinguish between them—for example, someone may say that the document (the symbol) is the contract. But it isn't. It's just the symbol. The contract is the thing that is written on the document, the thing that has been agreed upon.

A Shared Information Reality is a self-contained system of symbols and a collection of symbolic objects. Yes, shared information reality also contains objects—such as documents, computer files, printed pictures, videos, etc. These objects are symbols and they are separate from the objects in realities to which they refer.

Like language, a Shared Information Reality has expressive power. It may or may not be rich enough, have enough symbols, to represent everything—everything that happened and everything that is—in the underlying realities.

An ideal Shared Information Reality will have enough expressive power to represent—to capture—everything that is and everything that happens in physical, legal, financial computational, political realities. For example, to express that a computation has happened; to express identities of physical people; to express that a specific person has opened a cabinet; etc.

Importantly, a shared information reality also represents—or fails to represent—the connections the relations between the objects it refers to. It may have symbolic representation for them, or it may not be rich enough to represent them.

An ideal Shared Information Reality will have enough expressive power to also represent all connections between underlying objects. So the graph of facts in the Shared Information Reality is mirroring the graph in the underlying reality. The graph in the underlying reality can be events in order as they happened; flow of information from user interface into UDR and back; structural connection between facts in a bundle; etc.

The mechanics of a shared information reality. The information reality enables us to store, exchange, present, verify information to reach consensus and cooperation. The different information reality systems differ in how they implement these. To present to someone in the document system I must send them the document—even the original document. So every information reality needs to be looked at and examined step by step in how it supports the different activities.

Verification. As a representation system, a language, any Shared Information Reality comes with syntactic and semantic rules. These are used when we exchange and inspect objects and collections of objects in the information reality. When we accept an object (a document we have rules regarding what it means for the document to be acceptable, correct, valid, authentic, etc. An object that does not follow the rules does not make sense, has no meaning—just like in language.

Someone must follow those rules and make sure they are followed, and to reach a conclusion, and to sign and attest to the fact that the rules—the verification process—has been followed, with a specified result (for example, the result was "valid"). The verifier must have capabilities for the following:

Access the object being verified
Know, understand and be able to execute the steps and rules for verification
Be able to figure out connections between the object being verified to underlying and related objects
Be able to locate and access the related objects In the Document Shared Information Reality, only people can read documents, so only people can verify. Moreover, connections and relations are often implicit, and it takes human intelligence to infer them from context.

In the Hybrid Document-Digital Information Reality, software could have been able to verify, but:

(i) The steps to execute are not specified in a formal language,
(ii) Some documents are only human-accessible,
(iii) Connections are not explicit, and
(iv) Due to fragmentation, it is not possible to access related objects.

Intelligence. Intelligence and knowledge come from having access to well-formed well-connected information. A rich Shared Information Reality—full representation of everything that is and everything that happens—enables higher intelligence, a detection of patterns, concepts, and abstract structures. An example of higher intelligence is counter-factual execution—the ability to ask, "what if." Or amalgamation—the ability to combine facts into a new fact.

The need for a consolidated, software accessible fully digital shared information reality. The above shows the need for each word in this sentence. This allows software verification and formation of intelligence. Exchange presentation and verification of information becomes easy, natural, automatic.

Information just flows from the represented realities into the information reality and is exchanged effortlessly.

Flow of information. Specifically for Digital Shared Information reality, let's discuss the way information flows into the shared information reality and out of it. There are inputs—measurements—this is where we create new symbols, new objects in the information reality to represent things that happened in the underlying realities. There are outputs—where we show information from the shared reality to remain in consensus. It's senseless to put information in if we don't use it, don't show it. The way we show information from the shared reality is the way we stay in consensus.

Seamless information flow means seamless input, output, verification.

Input: information from the different realities is entered and represented automatically into UDR—it just happens. When people agree, when a door is opened, when payment is made—the appropriate symbols appear in UDR.

Output: information is automatically presented in a way that ties it into UDR, demonstrates the that necessary verification has happened, etc. and verification-verification just happens.

Flow from legacy systems—embodiments of the invention concern connecting UDR to the real world of hybrid digital-document shared information system. Inputs and outputs to UDR to/from other systems.

Detailed Background on the Two Axes of Information Flow

To better evoke the principles underlying embodiments of the invention taught herein, as well as its merits and possible applications, we now briefly develop a theory of information exchange. All information exchange occurs along two distinct directions, which we may imagine as two orthogonal axes. Digital Transformation and the opposing processes of Digital Consolidation and Digital Fragmentation are best understood when considered along these axes.

Cross-stakeholder ("Horizontal") Information Flow. The first axis is information exchange that occurs between different stakeholders. This axis traverses the global social, economic, financial, and political ecosystems; we call it "cross-stakeholder" or "horizontal." Information that flows along this axis is exchanged at arm's length between individuals or legal entities. Roughly speaking, the overarching goal of horizontal information exchange is insight that can be extracted by combining information from different sources.

Source-to-user ("Vertical") Information Flow. The second axis is information exchange that occurs as information is captured, recorded, processed, and presented. This axis points from objects, states, and events in various shared realities, to the information objects that represent them in shared information realities, to the processing of information objects, to the presentation of processing results on a user interface. Information that flows along this axis moves through different stages of representation, processing, presentation, and verification. Roughly speaking, the overarching goal of vertical information exchange is cooperation in society and between individuals. FIG. 3 shows the two axes of information flow: a cross-stakeholder ("horizontal") flow of information between different stakeholders 301, 302 and 303, and a source-to-user ("vertical" flow through different stages of information processing: objects, states and events in reality 304, being mirrored in information objects 305, being processed by computation or ICC 306, and being presented 307.

Source-to-user ("Vertical") Information Flow. The vertical information flow consists of several stages:

Vertical Flow, Stage 1: Objects, States and Events in Reality

Objects, states, and events in different shared realities, e.g. physical, financial, legal and IT realities, are not yet mirrored in, or represented by, information objects.

Vertical Flow, Stage 2: Mirroring in Information Objects

In the second stage, information objects are used to mirror, or represent, objects states and events in shared reality. Information objects carry symbols with shared meaning. There are three kinds of possible meaning in information objects: observed, deduced by computation, and deduced by information consistency and compliance. In the second stage, observed information objects are created which mirror objects, states, and events.

Observed information objects. An information object which represents an observation about reality; specifically, that an object exists, a state has been observed, or an event happened in shared reality (such as physical, legal, financial or IT reality).

Examples (with document information objects):
A property title document mirrors a state of ownership in legal reality.
A property sales contract mirrors an event in financial reality.
A water meter reading mirrors a state in physical reality.
A hand signature mirrors legal consent—an event in legal reality.
A concert entry ticket mirrors a legal state—right of entry; a receipt mirrors a financial event—payment received.
An account statement mirrors a financial state—account balance.

Vertical Flow, Stage 3: Processing

In the third stage, information objects created in the second stage undergo processing to create new information objects.

Deduced information objects. An information object which represents the result of a deductive reasoning process, which has been applied to symbols in existing underlying information objects. Such information objects reference (explicitly or implicitly) the underlying information objects, to which the deductive reasoning process has been applied; and describe (implicitly or explicitly) the deductive reasoning process itself. A deduced information object stipulates that processing has been applied to specified existing information objects and produced the stated result. There two different purposes for processing information.

1. Computation processing. One is to perform computations based on data to summarize it, transform it, and arrive at conclusions. This has become mainstream. Consider numerical data processed using arithmetic operations, all of data analysis, spreadsheets, accounting software, statistical analysis software, image processing, natural language processing. Numerous computational platforms, including machine readable languages (such as C, Python, Java, R, Ruby, etc.) has been developed to implement this. A computationally deduced information object stipulates that the specified arithmetic steps have been applied to the specified existing information objects and produced the specified result.

Examples for information objects deduced by computation:

A corporate income statement reports the total (yearly, income. This is the result of an application of an arithmetic computation to underlying documents, e.g. invoices and receipts for income and expense.

A US federal tax return reports the total tax owed—result of the application of a complicated computation applied to underlying documents, including salary slips, corporate dividend notices, expense invoices, and previous year's tax return forms.

An investment portfolio valuation reports the total portfolio value as of a given point in time—the result of a simple arithmetic calculation applied to underlying information objects which include assets owned in the portfolio mirroring states in financial and legal reality and, the present valuation of each asset.

A scientific report may report the result of a complicated deductive reasoning process, namely, statistical analysis performed by executing computer code, which has been applied to experimentally observed data.

2. Information Consistency and Compliance (ICC) processing. The other purpose of processing is to verify information consistency and compliance. Information regarding financial transactions, tax, legal processes, property and goods ownership and transactions, service transactions, etc. is required to uphold various rules and regulations. Corporate accounting records and financial reports are required to be complete, accurate and uphold certain reporting standards; all bureaucratic processes are based on compliance of information exchanged; financial documents are required to uphold certain standards, etc. Some of these standards, rules and regulations are explicitly set forth in government regulations, law, corporate bylaws, or GAAP; some are implicit social norms that are standard practice an exchange of information that underlies a given societal process. While the process of verification of tax report is linear and algorithmic in nature, computers have rarely been used to implement these computations and they are performed by humans—much the same way that calculations were performed by humans prior to the invention of the digital computer.

Examples for information objects deduced by ICC:

A mortgage loan application summarizes information regarding the requested loan, including the real-estate property to be bought; current property ownership; current owner identity; tentative sales agreement; property valuation; property insurance; applicant financial situation, credit rating and income; loan agreement; and so on.

A passport application summarizes information regarding an individual, including proof of identity, past passports issued, and so on.

A property insurance claim summarizes information regarding the insured individual identity, insured property, insurance policy, damage event, property inspection, and repair appraisal.

Document package for corporate M&A, including corporate cap table; employment, IP and options agreements with founders, board, officers, employees; IP; financial reports.

Figure 65:
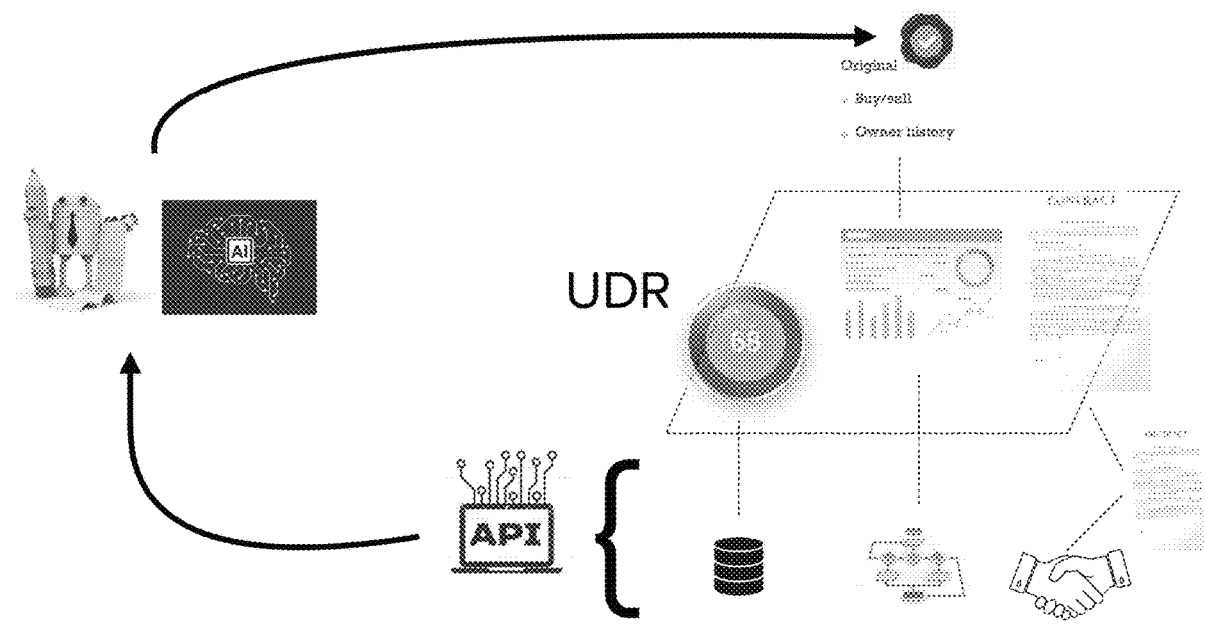
FIG. 65 shows a schematic representation of bulk processing and data mining of all measurements and user interactions related to mirroring unique digital objects.

The same information object may include results both of both computation and ICC processes—for example, financial reports contain both calculation and GAAP audit ICC results. FIG. 65 shows the processing stage.

Process execution as a stand-alone entity. The processing stage of the vertical flow consists of execution of well-defined processes and algorithms—either computations which have defined inputs, computations steps and outputs or ICC verifications which have defined inputs and requirements.

It is a key observation in the invention disclosed herein that the execution of a process—whether by a machine (a numerical computation or data analysis), or by a human (verification of ICC requirements), is a stand-alone entity. It is executed by a specified machine, or set of machines, or by a human, or set of humans, at a certain time and produced certain results such as new information objects. Numerous societal institutions exist to produce what is essentially an affidavit that a process has been executed on given inputs and produced certain results. For example, an auditing firm represents that they have performed an audit process (a specified ICC process); a bank employee represents that she has verified a loan application (a specified ICC process); a scientist in a scientific report represents that he has performed data analysis and received certain results. All these are affidavits given in documents. As we will discuss, the existing shared information realities—document and digital-document hybrid shared information realities are unable to mirror process execution, which is why we have instead documents with affidavits. However, one can certainly imagine a shared information reality with the mirroring power to mirror the events of software-based process execution.

Mirroring of Computation and ICC processes and results. While both computation and ICC are algorithmic tasks, computation has been digitized; ICC has not, and remains a human task—analogous to the human computers who performed numerical and arithmetic computation before the digital age. Computation, while digitized, has not advanced to equal footing of data, and is not represented by information objects: for example, the event of code execution is still a vague notion rather than a formal object that can be addressed and exchanged. ICC is even further behind as execution of ICC processes has not even been digitized and is performed by humans—not software. The reason will be discussed below—essentially, the document shared information reality is not machine-accessible, and connections between information objects in the document shared reality is implicit, hence only humans can currently execute an ICC process. This is the reason that the prophesized demise of accounting, for example, has not yet occurred.

Vertical Flow, Stage 4: Presentation in Human-Readable Form

Figure 4:
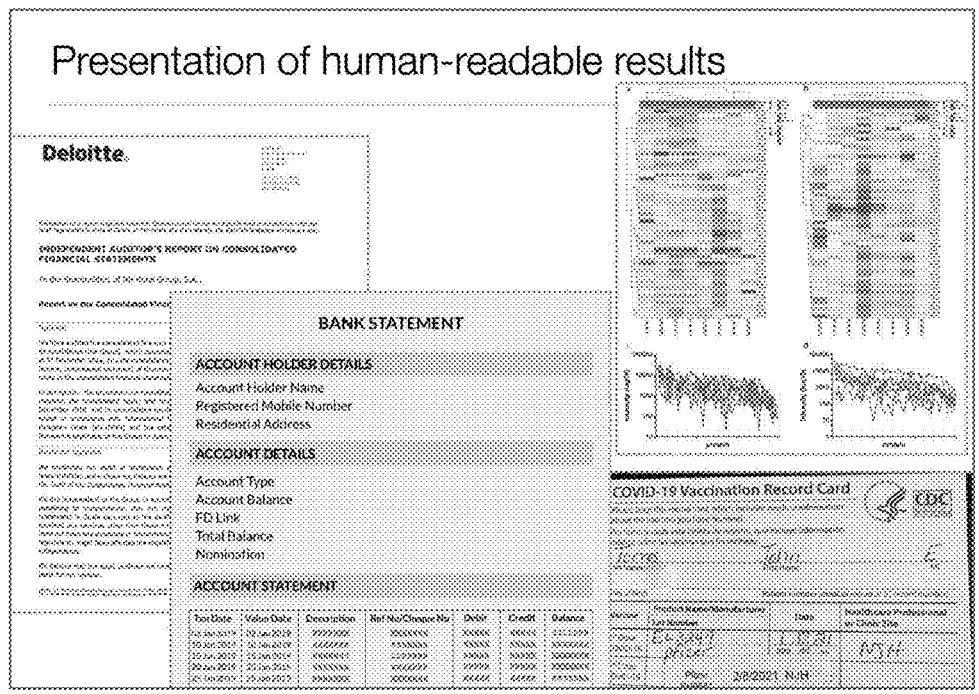
FIG. 4 shows examples for human-readable results.

The final stage of the vertical flow involves presentation and visualization of process results in a human-readable form. An account statement; a financial report; an insurance policy summary; a scientific report—all those are results of processing presented in human-readable forms. The overarching purpose of the vertical flow is cooperation, and cooperation is achieved when there is consensus regarding results of processes as presented to those individuals with whom consensus is necessary. FIG. 4 shows examples for human-readable results.

Facts. One of the goals of information exchange is to achieve consensus, which enables cooperation. An information object in consensus is a fact. A fact is an object, state, or event or the result of a deductive reasoning process, which is in consensus. We often identify a fact with an information object representing it; In other words, facts are those information objects in a shared information reality, regarding which there is consensus.

Characterization of the Fact status. The fact status of an information object enables cooperation, as the information represented by the object enters shared reality. How can we characterize this exalted status in terms of the information object representing it?

1. Permanent: A fact an information object that can be stored indefinitely if needed in case it needs to be presented to some interested third party at an unknown moment in the future.
2. Communicable: A is an information object that can be presented to for inspection by any interested third party.
3. Verifiable: The validity and authenticity of the fact, as defined within the context of the shared information reality, can be verified by a third party who inspects the information object that represents it.
4. Immutable: A fact is an immutable information object—in other words, the contents of the fact, and hence the symbols on the information object that represents it, do not change after it has been created.
5. Authentic and signed: The identity of the entity which produced the information object is known. It can be verified that the information object remains unchanged since created by the entity.
6. Citable: A fact can be dependent on other underlying facts for validity, and in turn can be depended upon for validity by other facts. The information object representing a fact cites, in some way defined by the shared information reality, the information objects representing the underlying facts.

We call verified observed information objects "Observed Facts." Verification of an observed information object means using the symbols on the information object to achieve consensus regarding the object, state, or event it represents.

EXAMPLES

A property title document mirrors a state of ownership in legal reality. Verification of the document enables consensus regarding the state of ownership.

A property sales contract mirrors an event in financial reality. Verification of the contract enables consensus regarding the event, e.g. sale, transaction and change of ownership.

A water meter reading mirrors a state in physical reality. Verification of the reading means consensus regarding the reading.

A hand signature mirrors legal consent—an event in legal reality. Verification of the signature means consensus regarding the event of consent by a person.

We call verified deduced information objects "Deduced Facts." Verification of a deduced information object depends on the mode of processing used to deduce it.

Verification of information objects deduced by computation means achieving consensus regarding:
(i) The validity of the underlying information objects;
(ii) The validity of the deductive reasoning process itself; and
(iii) The correct application of the reasoning process to the underlying information objects.

Examples for verification of information objects deduced by computation:

A corporate income statement reports the total (yearly, income. This is the result of an application of an arithmetic computation to underlying documents, e.g. invoices and receipts for income and expense.

Verification of an income statement means:
(i) achieving consensus that the underlying invoices and receipts are valid, namely as above—achieving consensus that they faithfully represent all income and expense financial events for the company;
(ii) achieving consensus that the deductive reasoning process—an arithmetic calculation which includes accounting judgement and considerations—upholds the generally accepted accounting practice (GAAP); and (iii) achieving consensus that the deductive reasoning has been correctly applied, namely, that the arithmetic has been done right. Other financial reports, such as balance sheets, are of a similar nature.

A US federal tax return reports the total tax owed—result of the application of a complicated computation applied to underlying documents, including salary slips, corporate dividend notices, expense invoices and previous year's tax return forms.

Verification of the tax return means:
(i) achieving consensus that all underlying documents are valid; some of them represent observed facts (such as invoices and dividend notices) so that verifying them means achieving consensus regarding the mirrored objects, states, or events, such as expense payment sent or dividend payment received; and some of represent deduced facts, such as previous year's tax returns, so that verifying them means recursive application of the process described here;
(ii) achieving consensus that the deductive reasoning process (tax calculation)—an arithmetic calculation which includes accounting judgement (such as which expenses are tax-deductible) and tax brackets in effect—upholds the tax code and its accepted interpretations and rulings; and
(iii) achieving consensus that the deductive reasoning process has been correctly applied, namely that the tax calculation including arithmetic and location of tax brackets has been done correctly.

A scientific report may report the result of a complicated deductive reasoning process, namely, statistical analysis performed by executing computer code, which has been applied to experimentally observed data.

Verification of the paper conclusions often boils down to verification of the deduced fact at its crux—which means:
(i) achieving consensus regarding the underlying observations;
(ii) achieving consensus regarding the statistical methodology applied and its correct implementation in computer code; and
(iii) achieving consensus that the computer code has been correctly executed and applied to the underlying data.

Verification of information objects deduced by ICC: An ICC-deduced information object summarizes, or repeats, information on other information objects which are referred to. It is a package containing references to existing information objects.

Verification of such an information object means:
(i) verifying all information objects referred to;
(ii) verifying the correctness of the consistency and compliance requirements applied; and
(iii) verifying that the requirements are indeed fulfilled. Most bureaucratic forms are of this kind.

Many important institutions, at the foundation of modern civilization, were developed out of a need to verify ICC information objects before they are accepted facts and enter shared reality. Bureaucracy posits that we need people whose job is to review documents and collections of documents for consistency and compliance with certain rules. Accounting audits posit that we need people whose job is to review financial documents for consistency and compliance.

Examples

A mortgage loan application summarizes information regarding the requested loan, including the real-estate property to be bought; current property ownership; current owner identity; tentative sales agreement; property valuation; property insurance; applicant financial situation, credit rating and income; loan agreement; and so on. Consistency and compliance requirements include consistency between identities of persons and properties on the different documents; compliant value-to-loan ratio; compliant income-to-payment ratio; etc.

A passport application summarizes information regarding an individual, including proof of identity, past passports issued, and so on. Consistency and compliance requirements include, for example, passport eligibility.

A property insurance claim summarizes information regarding the insured individual identity, insured property, insurance policy, damage event, property inspection and repair appraisal. Consistency and compliance requirements include consistency of person and property identities on the various documents, etc.

Document package for corporate M&A, including corporate cap table; employment, IP and options agreements with founders, board, officers, employees; IP; financial reports. Consistency and compliance requirements include, for example, best practices for contracts signed with employees, customers, and service providers; compliance of cap table and stock issue board decisions; etc.

Facts in Document Shared Reality. As an example, let us evaluate whether, and how, the Document Shared Reality system meets the five criteria for facts mentioned above. Recall the abstract characterization of facts in a shared information reality, mentioned above.

1. Permanence.

Information on documents survive if all copies survive physically.

2. Communication.

Communicating information, exchanging, and presenting facts, is achieved by physically exchanging documents—for example by sending paper over the mail or by couriers.

3. Verification.

To verify information in a document, a person must read the document and assess the reasoning. If the facts rely on other documents, those documents must be physically acquired and verified as well.

4. Immutability.

Facts on documents are immutable.

5. Signature and Authenticity.

As mentioned briefly earlier, there have been versions of the Document Shared Reality in history. When just a few people could read and write (scribes using scrolls, a written scroll was true. Writing was hard and expensive, so that written documents were considered authentic. When more people could write, the mere fact that something was written was no longer enough. Signatures were added to affix identity and provide authenticity—so that "written and signed" was true. With the invention of print and typewriters, "printed and signed" was true. The principle here is that a document is considered authentic if forging it is reasonably hard. There's a proof of work implicit in the document, and if it's reasonably hard to make it, including for example printing and signing it, then it is considered authentic and true.

6. Citation.

Crucially, there is no unified way to cite documents and facts in documents. Some conventions exist were possible—books and articles, for example, are cited by the publisher, publication name and year. But most documents, for example contracts, diplomas, licenses, prescriptions, etc., simply cannot be cited uniquely and unambiguously.

How do we verify information in the Document Shared Reality system? Crucially, because information in the Document Shared Reality system is only accessible to human, verification is necessarily a human task—even though, as we have seen, it is an inherently formal, algorithmic process.

Facts in the Document-Digital Hybrid Shared Reality. Let's compare this with characteristics of facts in Document-Digital Hybrid Shared Reality.

1. Permanence.

Information on documents will survive if all digital copies survive on some digital storage.

2. Communication.

Communicating a digital document is achieved only by copying the digital document over a computer network or digital storage media. All copies are equally original and there is no privileged original copy. Presenting a digital document occurs on a user interface.

3. Verification.

To verify information in a document, a person must read the document and assess the reasoning. If the facts rely on other documents, those documents must be digitally acquired and verified as well.

4. Immutability.

Digital documents are almost trivial to change and edit—they are much easier edited and forged, using household information technology, than paper documents.

5. Signature and Authenticity.

Digital documents can be digitally signed, to ensure authenticity of their content and identity of their producer, however this has not become mainstream in the social norms surrounding the digital document shared information reality. Instead, digital document as used today are much easier to forge than physical documents and are signed by graphics which is the equivalent of the hand signatures—for example by "print-sign-scan" or scribbles on a graphics pad, e.g. in cash registers using credit cards.

6. Citation.

Crucially, there is no unified way to cite digital documents. Some digital documents are assigned a Digital Object Identifier (DOI); however the typical digital document cannot be explicitly and unambiguously cited any more than physical documents.

Discussion: The Two-Axes Space Under the Current State of the Art

The two axes of information exchange provide a unified framework for description and analysis of all information exchange in society, and explain many institutions and processes in society, government, and business.

A "Horizontal section" along the vertical level of information objects. As we move along the horizontal axis at the vertical level of information objects, we find different stakeholders, each storing information objects. They need to exchange these information objects at arm's length to achieve cooperation (as part of fact exchange cycles) and to extract insight from combination of information objects owned by different stakeholders. It is interesting to inspect the mechanism for horizontal information exchange at this level including exchange of physical documents, digital documents, digital files, emails, and WWW interactions. Most arm's length exchange occurs using documents—even if each stakeholder privately stores the information in a digital file; a file is exported to a document; the documents are exchanged; and the receiving party imports the document into their digital file system. See "digital fragmentation" below.

A "Horizontal section" along the vertical level of processing. As we move along the horizontal axis at the vertical level of processing we find—under the current state of the art—no direct information exchange between arm's length stakeholders at the level of processing itself. Indeed, using the present shared information realities, stakeholders cannot directly exchange information regarding execution events of processing procedures (computation or ICC). Instead, the stakeholder who performed the processing creates an affidavit, typically in the form of a document, and the affidavit is exchanged. Canonical examples for this are scientific reports and external auditor-signed financial reports.

A "Horizontal section" along the vertical level of presented results. As we move along the horizontal axis at the vertical level of presentation of results we find—under the current state of the art—little direct exchange of processing results; instead, we find a description of the result in a document, which is in turn exchanged at arm's length. For example, the result of a statistical analysis is exchanged by communicating a verbal description of the procedure performed, and a verbal description of the result obtained. The result itself (for example in the form of digital files) is not exchanged. A notable exception is spreadsheets—when a spreadsheet (and not verbal description of the spreadsheet) is exchanged, we see an exchange of the actual arithmetic processing performed, as well as the actual results obtained.

Traversing information flow along the two axes to achieve consensus and cooperation The Fact Exchange Cycle. To achieve consensus, and enable cooperation, different arm's length stakeholders engage in a procedure we can call the fact exchange cycle. As different stakeholders are involved, the fact exchange cycle traverses the horizontal (cross-stakeholder) information flow; and as fact verification involves inspection of the different vertical flow stages, it also traverses the vertical information flow.

In the first stage of the fact exchange cycle, a stakeholder creates an information object. This object can be an observed information object—mirroring an object, state, or event in some reality, or can be a deduced information object—containing result of processing applied to other information objects. We call the creator of the information object "fact presenter."

In the second stage of the fact exchange cycle, the fact presenter communicates the information object in question to another stakeholder, which we call "fact receiver." The two parties are interested in achieving consensus regarding the information object, namely, in establishing that this information object represents a fact. They thus engage—either the fact receiver attempts to verify the information object, or the fact presenter attempts to prove its validity.

A key constraint that shapes the fact exchange cycle is that the identity of an eventual fact receiver is not known a priori, and typically not known at the time of creation of the information object. The customs shaping the use of shared information realities are meant to solve this problem exactly: for example, a court of law receiving a signed contract document can evaluate its validity even if the contract was not disclosed to the court at the time of its creation and execution; a potential landlord wishing to inspect a proof-of-income from a potential tenant can inspect historic salary slips printed by a past employer, even when (obviously) the slips were not presented to her upon salary payment.

As discussed above ("observed information objects" and "deduced information objects") verification of information objects is a formal procedure. For deduced information objects Inherently involves traversing the vertical flow, identifying underlying information objects, gaining access to them from the stakeholders owning or storing them and verifying them.

Detailed Background on Digital Consolidation Along the Two Axes of Information Flow We suggested the term Digital Consolidation for one of the fundamental processes underlying digital transformation—the process gradually increasing uniformity of interface, format, digital accessibility, citability, and inter-connectivity of digital information across all stakeholders of information is society and across all stages of information gathering, processing and presentation. Digital Consolidation can be better understood along the two axes of information exchange.

Cross-stakeholder ("Horizontal") Digital Consolidation means a fully digital shared information reality, in which information objects (both observed and deduced) have a permanent existence and definite ownership and are permanently accessible to arm's-length stakeholders (with access privileges) through a uniform interface.

An early example of cross-stakeholder digital consolidation (at the vertical level of information objects) was provided by WWW. Information (in digital file form) from many different stakeholders suddenly became available over the uniform interface of HTTP, and in a uniform format collection of digital formats (HTML and MIME types). HTML and the invention of stable web addresses—the URL—enabled explicit citation across the horizontal axis—an information object (Web page) owned by one stakeholder explicitly cites another information object owned by a different stakeholder at arm's length. The result was the modern search engine, which provided insight of an unprecedented level. This could only occur when information from many stakeholders became consolidated and available for software processing.

Horizontal digital consolidation has not yet occurred along the vertical level of processing. Such consolidation, once achieved, will enable access over a uniform interface to processes (computation events and ICC verification events) that are performed by different stakeholders.

Horizontal digital consolidation has also not yet occurred along the vertical level of presented results. For comparison, results on documents can be exchanged between arm's length counterparties; indeed the document, as a user interface, is a uniform user interface. In contrast, there is currently no uniform interface for exchange of human-readable results in digital form. For this reason, for example, annual financial reports are still presented using documents, not anything more resembling a website. Such consolidation, once achieved, will enable access over a uniform interface to results presented in human-readable by many different stakeholders.

Artificial Intelligence (AI). Horizontal digital consolidation along the three vertical levels will unlock value of astronomical proportions for training AI models and obtaining insight from digital information. AI and machine learning models require large amounts of high-quality training information. Horizontal digital consolidation will make it possible to create cross-stakeholder datasets for training of broad AI.

Source-to-user ("Vertical") Digital Consolidation means a fully digital shared information reality, where the vertical flow—the links between observed information objects to the information objects deduced from them and to the processes that were used to deduce from them, and from deduced information objects to their human-readable visual presentations—are explicitly exposed in digital format.

Consolidation of the steps along the vertical information flow—from capturing objects, states, and events, and representing them as a digital information object; to processing a collection of information objects; to presenting processing results on a user interface—will make all stages of the vertical flow, and the inter-connections between them, available over a uniform interface. For example, it will make available over a uniform interface a computation process executed; explicitly identify the information objects to which the process has been applied; explicitly identify the result of the computation process; and explicitly link the result to any of its presentations on a user interface.

This kind of consolidation will enable efficient and comprehensive verification of information exchanged by human users. Certainly medical billing, tax, and corporate accounting, auditing and many aspects of legal practice will be eaten by software when this happens.

Elements to be consolidated along the vertical flow. Digital consolidation requires consolidation of various elements along the vertical flow of information exchange. The current state of the art rarely, if ever, considers these elements as part of a single whole. Yet this holistic perspective is essential for vertical consolidation:

1. An Identity is the unique identity of a person, a legal entity, an organization, or physical object. For vertical consolidation, every identity (an object in physical or legal reality) must correspond to a unique digital object. For people, legal entitles and organizations, the identity object contains encrypted information which allows unique unambiguous identification of the individual/organization, such as secret passwords, cryptographic keys and/or biometric information. For physical objects, the identity object contains—when possible—unique information corresponding to the physical object, such as a serial number, a MAC address, etc.

2. A User Interface is any means for a computing system to interact with a human user in physical reality. This includes devices able to authenticate users, namely, to obtain identification credentials from human users, and devices able to make biometric measurements. This also includes devices able to display and present information to human users and/or to get measure their input. This includes screens, mobile devices, mobile phones, credit cards, fixed or mobile biometric scanners, tiny biometric scanners, biometric scanners embedded in other systems, touch screens, keyboards, gesture pads, smart watches, etc. In some embodiments, a user interface can have a unique corresponding unique identity digital object containing means to identity it uniquely. For our purpose, a user interface is not necessarily a computing device—for example, a piece of paper can be considered a user interface (even have its own unique identifier) as it is a physical object able to display information. It is important to distinguish the representation of information on an information object from the information itself; for example, certain representations may show combined information from several different information objects; or may show selected partial information from an information object.

3. A Physical Interface is any means for a computing system to interact with physical reality. This includes sensors, measurement devices, cameras, and all other analog and digital input devices; This also includes controllers, digital or analog switches, and any other output device. In some embodiments, a physical interface can have a corresponding unique Identity digital object, containing means to uniquely identify it.

4. An Interaction is a specific exchange of information, in close-range physical space, between two interfaces. The exchange of information can occur based on physical touch (such as touching a screen), exchange of close-range radio signals (such as Bluetooth handshake), exchange of acoustic signals, exchange of visual signals (such as scanning a QR code), or any other means for close-range physical information exchange. This can be an exchange between two user interfaces when two persons meet and exchange information, or an exchange between two user interfaces when a person interacts, through a personal identification device, with a fact through a fact representation appearing on a user interface. This can also be an exchange between A user interface and a physical interface, such as passing identity credentials from a personal identification device (a user interface) to a door lock (a physical interface). Every interaction corresponds to a unique digital object documenting, among other things, the identities of the interfaces involved in the interaction.

5. A code execution is the unique act of running a specific computer program or compute code, on a specific computer, computing platform, computing device or distributed computing system, using specific inputs, producing specific outputs and/or commands to user interfaces and/or commands to physical interfaces. An execution is represented by a collection of unique digital objects. Every different execution of a program corresponds to a different execution digital object: for example, if the same computer program is executed twice against the exact same inputs, producing the exact same outputs, there will be two distinct execution unique digital objects.

6. Machine-readable information consistency and compliance requirements are computer programs and/or machine-readable code specifying conditions for consistency, compliance or acceptability of a process or a piece of information. For example, the conditions under which a legal contract or is correctly signed and correctly legally executed can be specified as a protocol; the conditions under which a loan application includes, or references, the required list of supporting information such as proof of income, proof of identity, etc.; the conditions under which a corporate annual financial report is valid according to GAAP and includes, or references, the required list of supporting information such as financial statements, issued and collected invoices, bank statements.

Figure 5:
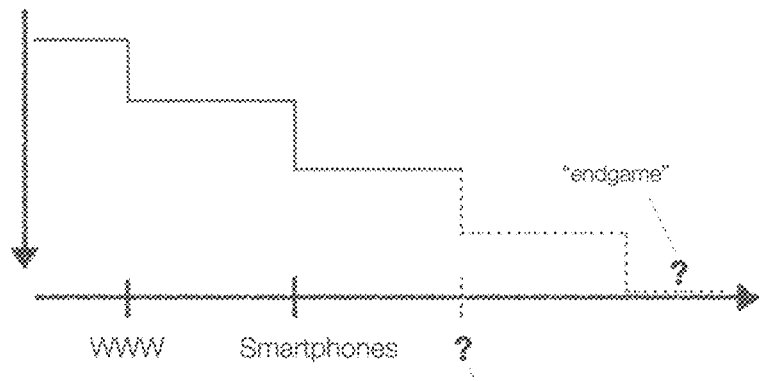
FIG. 5 shows the irreversible trajectory of digital consolidation.

The Promise of full ("two-axes") Digital Consolidation. We have characterized the endgame of digital transformation and observed that the road to this endgame is a series of digital consolidation events. What can we say about road to the endgame of digital transformation, namely, about the next major digital consolidation events. FIG. 5 shows the irreversible trajectory of digital consolidation.

Digital consolidation across both axes of information exchange ushers in a world where measurements, user interface interactions, digital representation of objects, states and events, computations used to process digital information; results of these computations; and information presentations on user interface are all unified under a single, coherent discipline of information technology. This will create and enable markets, products, and services which defy the current limits of everyday imagination. This is not a melodramatic statement—indeed, the Google search engine, and more generally the full impact of the Internet+ WWW consolidation, is today's everyday reality, but lie well beyond the limits of everyday imagination of 1980. Horizontal consolidation enables mining all the world's digital information for insight; vertical consolidation enables automatic verification and radically efficient cooperation. The product of horizontal and vertical consolidation means the following: there is a systematic, software-accessible digital footprint to all capturing of objects, states, and events into digital information objects; to all processing applied to digital information objects and their inter-dependencies and interconnection; to all presentation of information objects on user interfaces.

Figure 6:
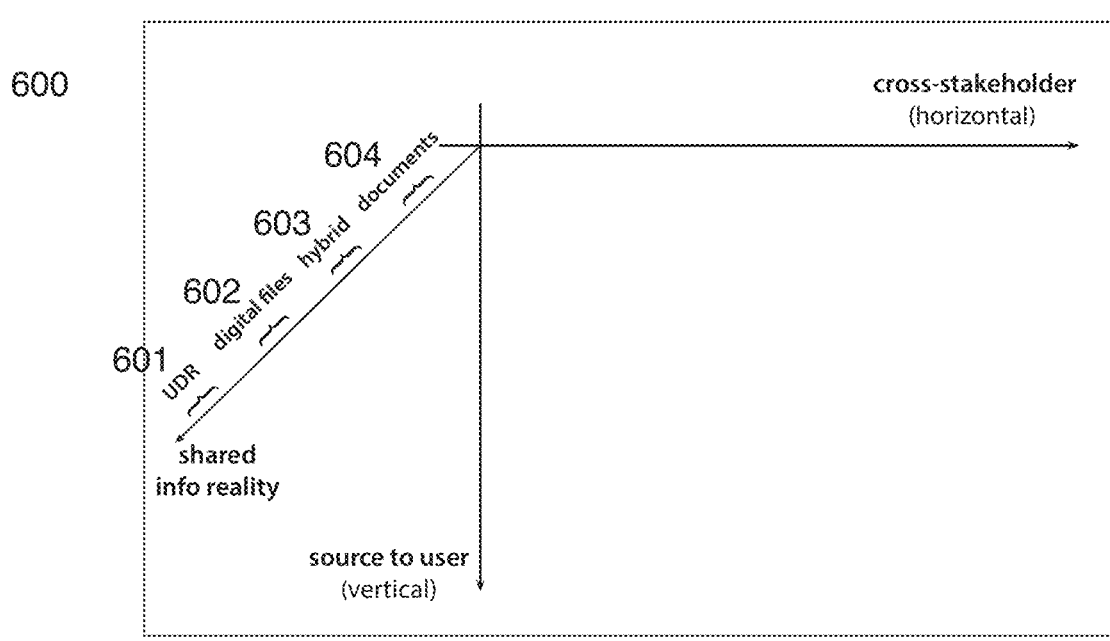
FIG. 6 shows horizontal and vertical information flows using different shared information realities.

FIG. 6 shows horizontal and vertical information flows using different shared information realities: information flow between stakeholders (horizontal) and from source to user (vertical) may occur using various shared information realities, including document shared information reality 604, hybrid shared information reality 603, digital (file based) shared information reality 602, or Unique Digital Reality (UDR) 601, to be discussed below.

Software and Artificial Intelligence (AI). Here are some products, services and capabilities that will become possible in the field of AI and machine learning because of horizontal and joint two-axes digital consolidation:

"Data blame"—which training data points are responsible for a model test malfunction?

Proof of reasonable precaution—proving to the regulator or to a court that certain AI model or software tests were performed, and that certain results have been observed in these tests.

Proof of knowhow—proving for the purpose of IP law that a certain code executed and passed tests at a given time in the past Regulation of software systems and AI model training and testing—proving to the regulator that certain regulator-mandated tests have been performed and passed.

Counterfactual testing—what if the model that produced these results would have been trained on a different training set?

The experience of having data—allowing a stakeholder to train their AI model on a dataset, and obtain guarantees that this in fact happened, without ever seeing that dataset or gaining access to it Computation markets—a market for certified trained AI models Data refineries—a market for certified high-quality datasets, which underwent certain specified preprocessing steps, and passed certain specified tests.

The Fundamental Challenges in Digital Consolidation

What will enable digital consolidation? Here are some examples of the hard questions we must contend with on the way to the endgame of digital transformation, i.e. the situation where information flows, verification happens, trustworthiness is obvious, and knowledge emerges:

1. How to create a digital thing—a permanently lasting digital object whose contents and ownership is in consensus?

2. How to capture an interaction, a physical interaction between two persons or between a person and a user interface; a legal interaction; an interaction in information technology reality, in a permanent fact?

3. How to automate information verification?

4. How to represent in digital form an interaction, an identity, an event of code execution, or an event of verification of information compliance and consistency?

5. How to merge a digital information object with the user interface presenting it?

6. How to automatically extract knowledge from a collection of human-readable reports?

All these questions do not have any good answers within the current state of the art; most do not currently have any answers whatsoever.

Detailed Background on Digital Fragmentation in the State-of-the-Art

Fragmentation vs. Consolidation. The trajectory of digital transformation sees two processes running in opposite directions—digital consolidation and digital fragmentation. Broadly speaking, digital fragmentation is the process by which digital assets become more siloed, more obfuscated, less accessible, and less uniform; user interfaces, software interface, and formats become more idiosyncratic; it is harder for stakeholders to communicate using digital information exchange; there is more friction in the flow of information; communication is less clear; information is less software accessible—especially between parties at arm's length; there is more obfuscation regarding the audit trails and sources of information, and it is harder to cite them clearly; the digital universe is divided into walled gardens that cannot communicate with each other; there is less provenance and less clarity regarding data sources; audit trail recovery is resembles a forensic activity; there is more fallback to documents as primary means to establish cooperation, to manual work as primary means to perform information verification and to manual work as the primary means to extract insight from information.

Through the notion of digital fragmentation, we can better evoke the merits of Unique Digital Reality, to be described below, as an enabler of digital consolidation and, ultimately, endgame digital transformation.

Digital Fragmentation. The picture of a fully digitally transformed world is far from being the reality in 2021. In truth, today, exchange of information is a daily struggle. Information is exchanged using a mixture of physical media (paper documents, photo albums, certificates, and books) and assorted digital media. From an individual standpoint, individuals do not own their digital information and can never be sure who does. While the value of data has been proven beyond dispute, the notions and abstractions that will allow a serious public debate on data civil rights have not been invented yet. For Internet and personal computing consumers, personal digital information is fragmented across a huge number of services, identities, applications, platforms, social networks, healthcare service providers, government agencies, cloud storage services, machines, and digital formats.

The totality of personal information in the world, from old personal photos to medical records to credit card transactions is vast, growing by the second, and utterly unmanageable. An image uploaded to a seemingly closed group in a social network, once uploaded, is everywhere and nowhere, can never be erased, is out of our control, and can potentially come back to haunt us twenty years later. How do we keep our digital information safe and secure? Who owns it? Where is it? Who is using it, and how? What are they allowed to do with it, and what can they do with it even if not allowed? Can the government access it? What happens in case of a failure or a hack? Do I know where all my data backups are, who has access to them, and how secure they are? How much is at stake? Will I able to access to all my digital information in two decades, when the existing file formats become obsolete, or the online storage service company goes out of business, or simply discontinues its service, or if the healthcare provider changes its website? I don't know.

Individuals and organizations in our society spend very meaningful amounts of time moving information around in email attachments, print-sign-scan exchange of document signatures, filing tax reports, managing, and overlooking finances, engaging bureaucratic processes, filling, and sending forms. We carry information from one place to the other on our shoulders, so to speak. Some of us, for example lawyers, accountants, and bureaucrats, literally carry information every day all day. Quite often we carry it from one computer system to another computer system, in the form of hardcopy printed matter or PDFs, simply because the two computer systems at each end of the process cannot communicate digitally with each other. Information does not flow on its own like electricity in the grid; it does not pour from one system to the next the way electricity pours seamlessly through sockets. Information needs constant maintenance, care taking, carrying, shuffling, handling, and worrying.

Figure 7:
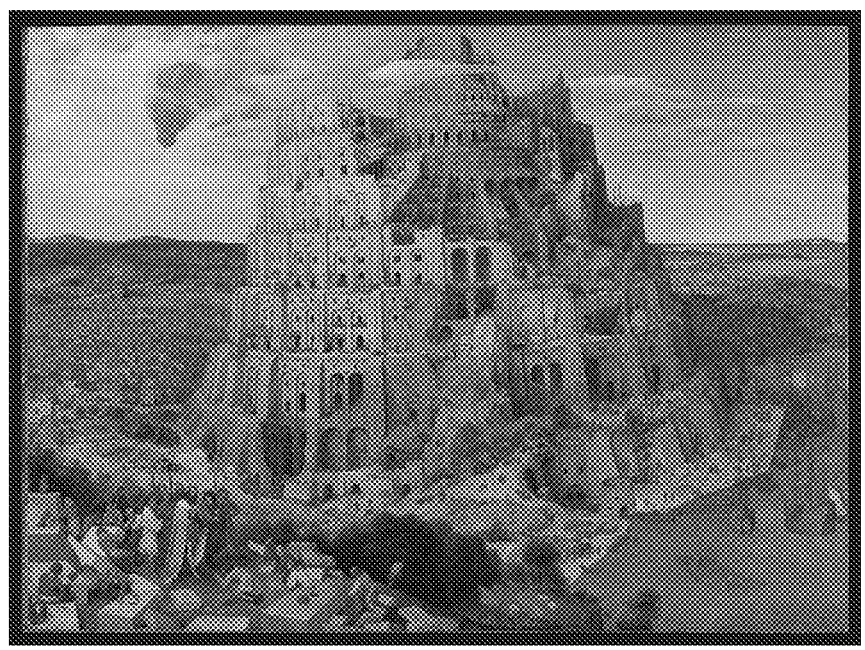
FIG. 7 shows the Tower of Babel by Pieter Bruegel the Elder.

From the perspective of the individual, the information situation is constantly getting out of hand. And from the corporate or government standpoint things are no better. Corporations and governments are entities predicated on exchange of information. Huge amounts of human labor go toward shuffling information, verifying information, presenting information, cross-validating information, moving information between formats, protecting information, and so on. Consumers of information—from news readers to tax authorities must constantly worry about the validity of information presented to them. It is hard to tell apart unverified or false information from verified and properly validated information. It is sometimes utterly impossible to tell apart credible and meticulously verified information from utter fabrications. And even when information is validated and verified, the exact procedure by which it has been verified often remains partially unspecified or sometimes completely obscure. The tremendous value of data as a resource is universally recognized at this point, and yet unlike other resources (oil, there are no standards for data quality control, data cleaning procedures, and data ownership. Machine learning and artificial intelligence systems, whose performance depends crucially on the quality of the data they are trained on are not explicitly linked to these training data. And finally, the potential of artificial intelligence (AI) systems remains largely untapped. AI systems are software systems that draw conclusions and generalizations from large collections of information: for example, they learn how to recognize human face by processing large collections of face images. The highly fragmented nature of information today implies that most AI systems—other than those developed by the huge multinational Internet corporations—are trained narrowly for highly specific tasks on mostly privately collected datasets. The promise of broad AI, namely, systems that draw broad conclusions from a large variety of interlinked information sources, remains largely unfulfilled. FIG. 7 shows the Tower of Babel by Pieter Bruegel the Elder.

We call this situation Digital Fragmentation. The processes of digital consolidation and digital fragmentation are the two fundamental opposing processes that together make up digital transformation. Digital fragmentation is a natural first stage of the Digital Transformation process, a natural consequence of the fact that the digital information revolution is in fact quite recent and has been advancing at an explosive pace. Few pockets within the greater fabric of society-economy-government-business have advanced quite far along the process of Digital Transformation. One example of such a pocket is trading of exchange-traded financial instruments (stocks, commodities, and futures). Most other areas are undergoing digital transformation that is ad hoc, idiosyncratic and, therefore, preliminary, and tentative.

This prevailing process of digital fragmentation—as an early stage in within the larger trajectory of Digital Transformation—is characterized by a specific dominating paradigm of digital information collection and usage. This paradigm emphasizes idiosyncratic storage systems, software systems that are only human-facing and not machine-facing, information technology concepts that prioritize user interfaces to software-accessible interfaces, idiosyncratic identity and access control systems, and idiosyncratic formats, and idiosyncratic user interfaces. Each organization determines idiosyncratic standards for storage, identity management, access control, digital formats, and user interfaces; each application stores its digital information siloed away in idiosyncratic formats and inaccessible storage; each entity hoards its own data and obfuscates it from the rest of the world. The economic value of data is extracted by mostly by separate entities, each guarding and hoarding their own private databases; except for WWW and some scientific databases, by and large, insight is not extracted from information across platforms and across systems of arm's-length stakeholders.

A defining property of digital information under the digital fragmentation paradigm is that it can be replicated instantly and at zero cost. As a result, data exists everywhere and nowhere; once leaked into a public network (by a hack, it is replicated instantly throughout cyberspace and can never be erased, owned, or controlled. Under digital fragmentation, digital information is not a thing. It is not a thing; it has no concrete existence anywhere, and at the same time can never be completely erased; it cannot be conclusively owned, sold, or rented; it can be hoarded by entities other than its original creator or rightful owner and used (or misused) against the interest or wishes of its original creator or rightful owner.

A major consequence of the current dominating paradigm in information technology is that reliable exchange of digital information between arm's length parties is a difficult, error-prone, fraud-prone manual process: the design principles for information technology represent information digitally in such a way that simply prevents seamless flow of authenticated information and automatic, software-based verification.

A crucial consequence of digital fragmentation is that explicit, unambiguous cross-reference and cross-citation between document and Information pieces that are hosted by different, separate entities is impossible. As we will see, this is a major cause for both horizontal and vertical digital fragmentation. As a result, as any audit accountant knows, verification of a piece of Information, whose validity depends on other pieces of information that are unavailable or located on a separate platform, is impossible or requires manual, forensic-like effort to reconstruct audit trails; data is legally and practically owned and controlled by the platform and not by its creator, originator, or rightful owner. Audit trails and digital provenance trails that trail across platform boundaries are impossible to follow computationally or automatically, because each platform has its own identity management, addressing system, API—and because that information can become unavailable on a moment's whim of the platform owner, for example it the platform goes out of business, or if it is compromised in a cyberattack.

The result can be only described as "digital paralysis". The quantum leaps in information technology, which were the hallmark of the last three decades, are not reflected in ease of information handling and verification; on the contrary—the more platforms, providers, formats, and identity systems, the worse the situation seems to be getting in this regard. Due to digital fragmentation, some of the great promises of the information age—for example, drastically simplified bureaucracy, legal interactions, financial reporting, audits and so on—remain unfulfilled.

Example. Consider filing tax filing. The taxpayer's purpose is to exchange information with the government tax authority regarding their income and expenses; there is then a mathematical calculation and proof of tax payment. Many documents are involved: salary slips, invoices, proof of tax deduction at the source, etc. To exchange information with the government, the taxpayer collects all the necessary documents; fills forms; does calculations; send everything. This is just one side of the exchange. On the other side of the exchange, a government employee checks the collection of documents and the forms; and verifies that you paid the right amount of tax owed. What does creating this information object ("tax filing") look like? What does it entail, require, how much does it cost to prepare? What does presenting/sending the information look like? What does verifying the information on taxpayer side and on the government, side look like? What happens when an error is detected? We are so used to these daily routines around information exchange that we hardly think about them.

To create the information object, I gather documents. I should hope that I didn't lose them, I should keep track of them, be able to find them—either physical documents or digital document scans. I then extract information from the documents, e.g. monthly income from my salary slips. To send/exchange the information I mail the document package—either physically or electronically to the correct government address. I hope that I have the correct address; I hope that the delivery makes it; I hope it is not lost somewhere, and so on. I then make the necessary calculation, fill in information in the forms. I must make sure that I enter the information correctly—namely that there is consistency between the names and numbers on the form and those on the attached documents. On the other side, verification, the government employee checks for this consistency. And so on.

How much does this exchange cost? It takes me a long time, and it may be so complicated that I hire an accountant for this task. It takes the government employee a long time. So the exchange of this cost is significant in resources/time/money for both sides.

The curious thing is that the whole exchange is purely algorithmic. I follow a simple, fully specified algorithm when I collect the documents, fill the forms, run the calculation, etc. Also on the verification side, the government employee follows a fully specified algorithm. So one must wonder—why has this exchange not been automated? Why does it continue to be so expensive and difficult to the degree that I often hire a professional to do it for me? Understanding the reasons that prevented automation of this task leads to fundamental insights on information exchange in our civilization.

The first barrier to automation is our existing notion of a document—both physical and digital—which leads to the lack of software accessibility and lack of unambiguous digital citability.

The second barrier to automation is the lack of machine-readable instructions for verification and validation.

The third barrier to automation is ad hoc social protocols that specify how information is presented to stakeholders.

Digital Fragmentation is a failure of imagination. We cannot escape the conclusion that the current situation of radical digital fragmentation represents a massive failure of imagination on behalf of all of us who design and build digital information systems. Indeed, digital fragmentation is caused by a failure of imagination, not by any technological hurdle: there is basically nothing in the core design principles of current information technology systems—including networking, cryptography, storage, and end-user devices and interfaces-which mandates digital fragmentation. As a collective, we are simply not using information technology in the most efficient way possible. Digital fragmentation is a result of the frantic, explosive pace of the advance of early-stage digital transformation, and market incentives that keep digital transformation stuck in a local minimum: once a consolidation event such as appearance of the WWW occurs, it is irreversible, but before it occurs, market incentives can cause us to spend years in a fragmented limbo. Business models developed on top of digital fragmentation and market incentives led the whole information technology industry to be stuck in a local minimum, so to speak.

As the next stage of digital transformation, digital consolidation requires a re-imagining of the ways in which we use presently available information technology and the ways in which societal processes building on information exchange are using computers, computer networks, and human-computer interfaces.

Some of digital fragmentation is due to inability to mirror relations between objects explicitly, states and events in various layer of reality. We use documents to carry information between fragments—across the chasms that exist between different fragments. So in the hybrid digital-document reality we can only have shared reality using fallback to documents. And documents do not capture relations/connections between objects very well, and these relations cannot be represented digitally.

Consider for example the copy-paste operation. Copy-paste between digital documents is a major source of, and symptom of, digital fragmentation. In copy-paste we lose the connection between the source information object (where "copy" occurs) and the target information object (where "paste" occurs). As another example, consider that every time we print information that is available in some rich digital format into a physical or digital document, we lose the connection between the information in digital form and the user interface (paper) used to present it in human-readable form. Every time we print-sign-scan a document we reduced the quality of the information substantially: we started off with information in rich a digital format and reduced it to a bitmap (the scanned signed document), where the neither the information content or the signer identity or the event of signature are machine accessible.

In a consolidated digital reality everything has a unique identifier, so that everything (any symbol referring to any object of any reality) can be uniquely referenced from anywhere, so that connections and relations can be easily expressed. This means that consolidated digital reality is revolutionary in the ability to explicitly represent—in symbols—relations between referred objects, which were not represented so far.

Examples of Digital Fragmentation.

Fragmentation of identity. In the current state of digital fragmentation of identity, each person uses several user/password to prove identity to multiple service providers; and each person carries several identity cards, such as a driver's license; employee identity card; membership cards, multiple customer club, identity cards, access cards etc.

The same is true from the perspective of the entities: Each entity holds a separate digital representation of identity for its users/customers/citizens: the user database of each entity and identification mechanisms are all separate.

When identity theft occurs, recovery is a complicated process—fragmentation of identity also means that there is no simple, clear protocol in event of identity theft.

Fragmentation of payment methods. Presently, each person carries several credit cards to prove financial identity to vendors and uses multiple other payment methods, such as PayPal accounts, Apple Pay, Google Pay, etc.

Fragmentation of financial information. An individual's financial information is fragmented across a potentially large number of entities: every bank where the individual has (or had) a bank account; investment firms; pension funds; mutual funds; stockbrokers, federal and state tax agencies, and so on. Each of these entities has an account for the same individual on its private information universe; the individual has no simple way to build a complete personal financial profile, must keep track of different accounts simultaneously, and cannot communicate financial information directly between institutions where accounts are held. While information is stored in digital format in each of the institutions, it must be communicated using paper documents or their digital equivalent (PDFs)—in the form of account statements, balance sheets, etc.

Fragmentation of medical information. Presently, personal medical information, including medical files, test results, medical imaging scan results, medical opinions, visit history, procedure and hospitalization history, prescription given and administered, etc., is fragmented across many computing systems in various hospitals, clinics, HMOs, physician offices, and medical insurance companies. The individual does not control—nor owns—their medical information. The individual cannot directly present their personal medical information from being used for research purposes, nor can they volunteer their entire medical information for any purpose. Personal medical information is not an asset that can be given by bequest, monetized, sold, rented, etc.

Fragmentation of personal digital information. Storage of information, both personal information and enterprise information, is fragmented between multiple providers. Here is a partial list of entities and platforms that store the personal information of an individual or an organization: Google docs, Microsoft 365, Apple iCloud, Dropbox, Box, local files in multiple computers, multiple smartphones and other mobile devices, document e-rooms, Facebook, SAP, Amazon, bank accounts, PayPal, Apple Pay, and multiple other payment systems, credit card companies, WhatsApp, Slack, messenger, investment management accounts, HMO accounts, multiple calendar accounts, multiple email accounts with Google, Apple, Yahoo, etc. Each of these locations uses its own identity management system, has its own user interface and its own API (if any).

Fragmentation of Artificial Intelligence. Modern artificial intelligence (AI) systems are trained on vast datasets to perform a specific task, for example—face recognition; speech recognition; speech generation; natural language translation; etc. These systems are fragmented in the sense that they are trained on datasets stored separately on fragmented systems and privately owned by separate entities; similarly, the trained AI systems are fragmented.

Fragmentation of software services. We are seeing a proliferation of software services which perform essentially identical functions. For example, Ride sharing (Uber, Lyft), Videoconferencing (Zoom, Skype, Webex, WhatsApp, Google hangout, Amazon chime). Use patterns of information under Digital Fragmentation An attempt to analyze and understand the state of the art, namely, the present stage along the trajectory of digital transformation, must consider both the technological aspect, e.g. the current state of information technology, and the human use-pattern aspect, e.g. the social agreements and use patterns that govern how information technology is used to exchange information and achieve cooperation.

On the technological aspect, the fundamental characteristics of digital files—inherently easy to replicate, not unique, impossible to own, easy to alter, and cannot be uniquely and universally addressed—place severe constrains on the use patterns and social norms for human cooperation through exchange of digital files.

On the use-pattern aspect, it is crucial to observe that while use-patterns and social agreements for information exchange based on physical documents, pen signatures, and wax seals have developed over millennia, the existing corresponding use—patterns based on exchange of digital information have developed over just three to decades. More specifically, the existing use-patterns and social agreements have developed a wildly accelerated, frantic, ad hoc response to the extremely rapid advance of digital information technology, as it replaced, almost overnight, on a historic timescale, other means of communication and information exchange.

It may seem that we have come a long way technologically in 40 years from the 1980's IBM personal computer with its 5.25" floppy disk drive and no network interface to the 2020's 5G mobile broadband Internet connecting mega-industrial-scale cloud computing facilities to billions of hand-held powerful multicore computing devices which for some nostalgic reason we still call telephones. However, the human use-patterns and social agreements that determine how all this technology is used for information exchange cannot possibly develop and adapt so quickly. A plethora of ad hoc responses resulted in the current prevailing use patterns and social agreements, which can be described as best as a disorganized mixture of different use patterns and social agreements, resulting in an information mayhem of unparalleled historical proportions. And the information exchange processes that conform to these agreements are rife with confusion, inefficiency, and mistrust. For example, during the Covid-19 global pandemic, it was interesting to observe the adhoc modes of communication used to prove covid test results and proof of immunization—a wild array of hand-signed paper slips, printed documents, smartphone apps, website screenshots, and signed digital documents. In the absence of clear social norms regarding exchange of trustworthy digital information, everything goes. What we are witnessing is the biblical Tower of Babylon myth, coming to life on a global scale. As everything is going digital on a frantic, indeed exponentially accelerating pace, the social norms for exchange and reliability of new forms of digital information, and for the societal processes they enable, are not keeping track. Individuals, communities, and governments are scrambling to understand what is happening as new information technology, and on top of it, new use patterns and social agreements, are appearing faster than we blink.

Inefficiencies under Digital Fragmentation. Digital fragmentation leads to inefficiency and mistrust. It also prevents data ownership and data privacy and blocks us from even imagining the next stage of digital transformation, namely, one based on shared digital information reality. Here are a few of the inefficiencies we are experiencing because of the prevailing digital fragmentation:

Inefficiency: Facts cannot be exchanged by software, are not software-accessible, and cannot be verified automatically by software. Digital fragmentation also prevents information re-use: data gathered by one service is not available to another service and must be gathered again and again and stored again and again.

Mistrust: Digital fragmentation leads to lack of transparency and mistrust as the provenance chain of any fact is practically impossible to obtain.

No notion of data ownership: As personal information gathered from an individual is stored on multiple, isolated, and often private databases which cannot be queried from the outside. As numerous private parties hold personal information about in individual, true data privacy is impossible.

Impossibility of a shared digital reality: Crucially, under the current state of the art, namely under the digital fragmentation paradigm, pieces of digital information are not things. Namely, they do not have a universal identity and cannot be unique referenced, cited, exchanged, etc.

Let us use the terms "Data" and "Digital Information" interchangeably. We note that, under the current state of the art—

Data are ephemeral—there is no guarantee they will be stored eternally and immutably.

Data are inaccessible—due fragmented storage, there is no way to access a piece of information that only exists on a private storage system of some entity.

Data do not have a unique identity.

Data are not citable.

Data do not support ownership. As a result, private companies and governments can accumulate personal information without universal attribution to its owner.

Data cannot be tracked or monetized by the rightful owner/producer.

Data do not have intrinsic validity—they require effort, and often manual effort, to establish validity and authenticity of a piece of information.

Figure 8:
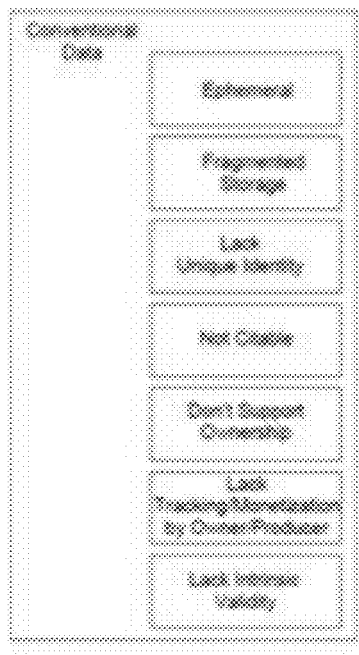
FIG. 8 shows properties of data under the current state of the art.

FIG. 8 shows properties of data under the current state of the art. Under the current state of the art, our society struggles with questions such as:

Why don't I own my data? And who does?

Who has access to my personal/private information or data about me?

Which news on social media is fake?

Because almost everyone has access to professional-level photo editing software, how can we trust the contents of any image or PDF document presented to me?

Horizontal Digital Fragmentation. Just like digital consolidation, the opposite process of digital fragmentation is best understood along the two axes of information exchange—the horizontal cross-stakeholder axis, and the vertical source-to-user axis.

Figure 9:
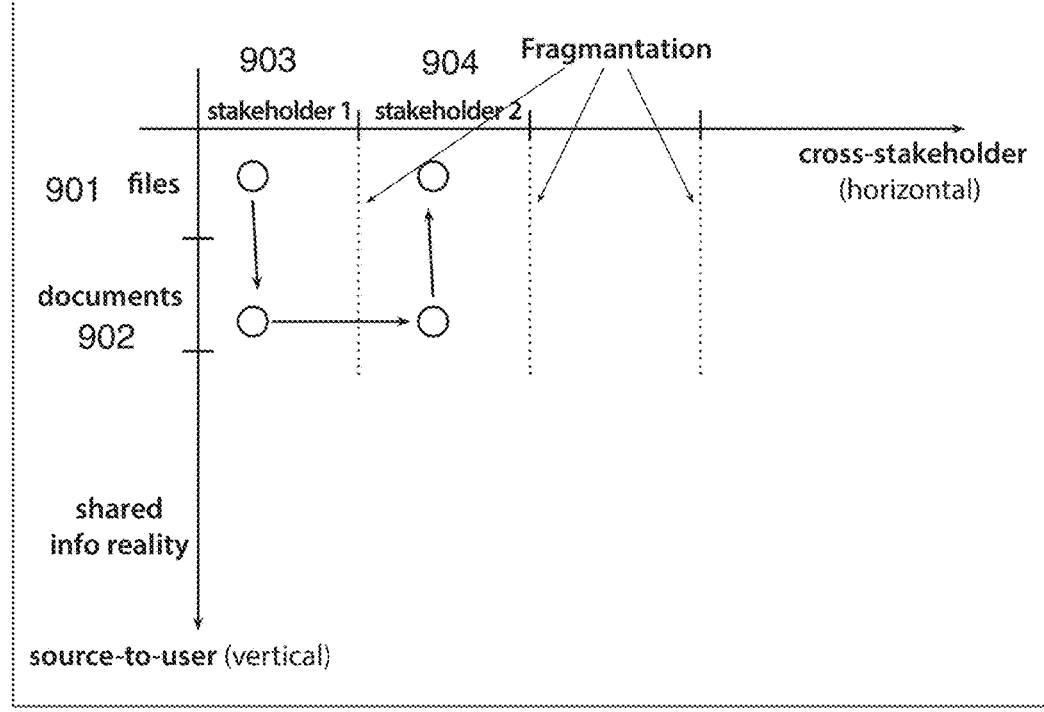
FIG. 9 illustrates horizontal digital fragmentation on the two-axes diagram.

Horizontal digital fragmentation is a process curtailing the possibility of digital information exchange between different (internal) software systems belonging to an individual stakeholder and between arm's length stakeholders. Under complete horizontal digital fragmentation, information cannot be exchanged in machine-readable format: it must be downgraded to human-readable format, e.g. a document, to be exchanged. In this case we can say that humans, who read the documents created by one system and manually type it into the user interface of another system, carry the digital information on their shoulders from one system to the other instead of letting it flow in digital format from one system to the other. We can draw an analogy to the invention of water pipes and water channels: before channels and pipes, human had to carry water on their backs rather than let it flow to where they wanted the water to go. This is the current state of horizontal digital fragmentation. FIG. 9 illustrates horizontal digital fragmentation on the two-axes diagram: a stakeholder 903 in possession of digital information 901 is interested in sending information to another stakeholder 904. Under horizontal digital fragmentation this is impossible as digital systems of stakeholder 903 are siloed away from those of stakeholder 904. Stakeholder 903 must therefore convert (and downgrade) the information to be transferred to physical documents or PDF documents 902, which can be reliably exchanged between the stakeholders. Stakeholder 904 receives the documents and must then convert the information back to digital form in its own systems, converting the human-readable information in the documents back to machine-readable format.

Inefficiency of communication—horizontal digital fragmentation: As storage systems are separate and idiosyncratic and as storage formats are also idiosyncratic, often, information cannot be exchanged digitally between entities—even though each entity is using digital information storage exclusively. As a result, information must be communicated by first downgrading the information from digital format to paper (or PDF) format-which is human readable but much less machine readable then the original digital storage format, then communicating the paper (or PDF) document—then loading the information from paper format into the digital format used by the receiving entity. The latter is notoriously difficult to automate in software—as paper/PDF documents do not adhere to any standardized information formatting rules—and typically requires human labor, which is costly, fraud-prone, and error-prone.

Example: Fragmentation of Corporate Information

Consider the complete information assets of a modern corporation. Where are they stored, and who owns them? The information is fragmented across enterprise applications, cloud service providers and other providers. Corporations which can organize and own their data sometimes hold huge economic value. Others are at the mercy of out-of-control horizontal digital fragmentation.

Under horizontal digital fragmentation, information cannot be owned, sold, shared Data Ownership (and lack thereof). Another major implication of horizontal digital fragmentation is the complete lack of a notion of data ownership and information ownership. When information is stored in ad hoc formats on fragmented privately-owned storage systems, a notion of information ownership cannot exist. This has very far-reaching implications today: information corporations hoard private information collected by various tracking strategies (such as tracking cookies) or given to them by individuals in exchange for free digital services. An individual cannot have access to—not to mention ownership over—the totality of his personal information, from financial information to shopping history to medical history to geographic location to musical taste and so on. An individual cannot monetize, search, or train an artificial intelligence on the totality of their personal information, and instead, corporations that hoard vast amounts of personal information reach high valuations due to the immense value of information they accumulated. Digital civil rights are impossible to enforce—and in fact impossible to define even—under digital fragmentation.

Dark Information. In modern cosmology, dark matter refers an enormous mass of matter assumed to exist unseen in the universe. There is evidence that in fact most of the matter in the universe is dark. Borrowing from this notion, we suggest the term dark information to describe information that is briefly digitized but then disappears forever or remains perpetually locked and inaccessible.

Tremendous amounts of digital information are created every day. Due to digital fragmentation, most of the digital information in existence is dark information—not accessible outside of the organization owning it, and often, inaccessible even within that organization. Information can be described as dark information due to format, too. PDF and scanned documents are dark information. A document is conveying information that is not amenable to digital processing.

In a digitally transformed world, there is no dark information. All information is accessible from anywhere, given access privileges. As described above, a digitally transformed society has no papers, no PDFs, no documents, no folders, no signatures. This axiom implies a whole new universe that needs to be mapped and laid out. In this universe, the information is no longer dark. The object carrying information is no longer a 17th century object, rather a fact object, a digital object. The revolution is shifting from a document-oriented society to a fact-object-oriented society.

Under digital fragmentation, Data is not a Thing. As we will see, under the current regime of information exchange, digital documents are considered been treated as inferior to original hard copies. A document scan, for example, is inferior to a printed version of the original document. The reason lies in digital fragmentation. A digital file is easily copied, therefore not unique. It is relatively easily forged.

The fact that digital information is not a thing, not real has numerous far-reaching implications. Because it's not real, we cannot own it; we cannot address it and reference it definitely; we cannot know who used it and for what purpose. And, crucially, we cannot organize it and cannot extract value from it. The global heap of data is a huge mess, both in terms of where it is stored and how we conceptualize it, and yet it is the single most valuable resource on earth.

Data is not perceived as a thing at this time. It is not tangible. We don't think about giving it away, like giving away something precious that belongs to us, or giving it to someone whose stated interests is to exploit us, manipulate us, control us. We don't think about passing it to the next generation, stewarding it. How can we? It's on a thousand different computers in a thousand different formats, under a thousand different copyright agreements. It's on my old laptop and the one before that and on various backup disks, and who knows where! I have a state-of-the-art digital camera, but I have no idea where all the photos I have taken are. The only way to store them is to pay a lot of money or to give them away. We, as a society, are not organized about the notion of data as a thing, as an asset, as a reality. It does not qualify as real yet. Indeed, when I email a photo, suddenly there are two. But where are they? And where will they be tomorrow? My photo albums are tangible, concrete. They are family heirlooms. But what about the thousands of hours of videos on my various computers and social media accounts? They are everywhere, yet they are nowhere. I don't yet think of pieces of data that belong to me, that I generate, as atomic units with an independent existence, as units of value, as things that can be collected and stored forever.

Horizontal Fragmentation Prevents Digital Representations of Inter-Connections.

Interestingly, today, in many cases information on documents (such as receipts) was digital information at some point but downgraded to paper form and its inter-connections to other information objects was never. Fragmented information cannot be used to represent connections and relations between objects. Hence the need for manual verification when dealing with fragmented information realties. Again—if payment(X)=Y and X,Y are in different fragmented parts of information reality then the "=" sign cannot be represented, and the connection is lost. This is a strong argument in favor of consolidated information reality—where the symbols for everything are in the same system. The method we teach below exposes Solzhenitsyn's invisible threads (mentioned above) explicitly—in software-accessible digital form.

Friction

The current state of the art—the state of digital fragmentation—implies that human activities involving presentation, exchange and verification of digital information are often incredibly complicated, manual, and difficult. We refer to these complications and difficulties as friction.

In the context of information exchange, we define friction as the cost in terms of resources, time, manual labor, effort of information exchange or information processing, which are not inherent, but rather mandated by the medium used for information exchange and by the use patterns and agreements surrounding the system of information objects.

For example, parties communicating information regarding bank accounts and investment portfolios must today exchange documents and PDF files, which are not machine-accessible, and whose verification is often a tedious manual process—even though the parties on both ends use sophisticated digital systems to store the information locally—each in their own corner of the fragmented digital reality. Interestingly, we are so accustomed to friction that we hardly notice it. We find it hard to imagine a state-of-affairs where exchange and verification of information between different legal entities, is typically smooth and effortless.

Fragmentation causes Friction. As described above, routines of information exchange specify explicit or implicit protocols ways to create, store, present, inspect, copy, and verify information objects. There are two information systems in use—physical and digital documents. Examining in close detail the costs of these elements of exchange we discover that there are significant inefficiencies and limitations to both systems—in terms of mirroring (expressive power), possible trust and consensus, and costs required to achieve whatever degree of consensus that is possible.

The limitations revolve around, and stem from, the fact that information objects are fragmented; not software accessible; not unique; not citable; not permanent. Circumnavigating these characteristics requires significant resources and some limitations placed by them cannot be circumnavigated. We discover friction along both axes of information exchange; let's start with horizontal friction—friction that affects cross-stakeholder information exchange.

Horizontal friction. Consider two parties need to exchange and verify digital information. For example, consider corporate tax returns, where certain summaries from the company's accounting software must be presented before the government, and find their way to the government's software. Digital fragmentation implies that the company's system and the government's system cannot communicate directly; and moreover, that the company has no way to establish, or prove, to the government, that digital information stored in its system is authentic and valid.

As a result, the accepted mode of communication between the company and the government is as follows. The company's employees fill forms attesting to the required information. They attach other forms as proof and validation. The stack of forms is sent to the government, where government employees read and inspect the forms, and punch the numbers into the company's system. The goal has been achieved, with costly human labor on both sides. If instead the two systems have access to a shared layer of reality containing the company's financial records, verification of records can be achieved by software.

In many current systems, any two entities that wish to start exchanging information digitally must set up a bridge that is idiosyncratic to the two of them and cannot be easily re-used with other counterparties. Verification of the exchanged information remains a constant challenge, again demanding idiosyncratic, ad-hoc solutions that often involve manual labor.

More generally, digital fragmentation causes friction in any transaction of digital information. Arguably, friction is unnecessary, and is only caused by the fact that the parties do not share a digital reality, but rather maintain, each to their own, an encapsulated digital world that was never designed to communicate digital information with the outside world, let alone prove the validity of facts, maintained in this encapsulated world, to an outside counter party.

A measure of Information quality. If we decouple the information from the way it is rendered/presented visually/textually, we can consider the notion of quality of information from a software-access perspective. In this scale, the more software-accessible and software-readable information is, the higher its quality.

Digital information can be stored in various formats. Highly structured formats, such as relational databases, are annotated and carry machine-accessible semantic information that allow software to operate on the information easily. Less-structured formats, such as scanned documents (bitmaps) or Portable Documents Files (PDFs) carry significantly less machine-accessible semantic information, are intended for human readers, and are much more challenging for software processing.

Fragmentation causes communication of low-quality information: Flesh and bone messengers. When two information systems are fragmented-away from each other, digital fragmentation implies that information in one system cannot be explicitly cited by information in another system; and that to communicate information from one system to the other, for example medical information from hospital A to hospital B, information must be degraded in quality—for example, from a database entry (highly structured and machine-readable) to PDF (of idiosyncratic structure and only human-readable).

The very existence of invoices and receipts as paper documents or as PDFs is an example of the current need for flesh and bone messengers. Information that needs to exist in digital form on both sides must be transferred by a human messenger carrying a piece of paper or, lately, emailing a PDF.

When fragmented systems communicate, they often do so by exchanging information of inferior quality. Even though digital information is stored in high quality, structured form, in a relational database), to be communicated across fragmented systems, it must be converted to PDFs, delivered to the counter party, and then converted back into a high-quality format in the counter-party's system. This makes for an incredibly inefficient process.

Documents Today, it is often embarrassingly hard to verify a document. Someone shows you their medical diploma, their driver's license, their rent contract, their insurance policy. What do you do? Frank Abagnale (protagonist of 'Catch Me If You Can'—a true story) managed to pull off a wide variety of fraud acts using forged documents in the 1960's. Interestingly, many of those are still possible today, in the Internet age. Are the facts we are looking at now valid? Are the documents authentic? Were they ever valid? Who signed them? Does their validity depend on external facts? Decades after the invention and implementation of cryptographic digital signatures, we are unable to assert easily and conclusively—that a car insurance is valid—it depends on the validity of the driver's license, car registration, premium payments paid in time, etc.

Figure 10:
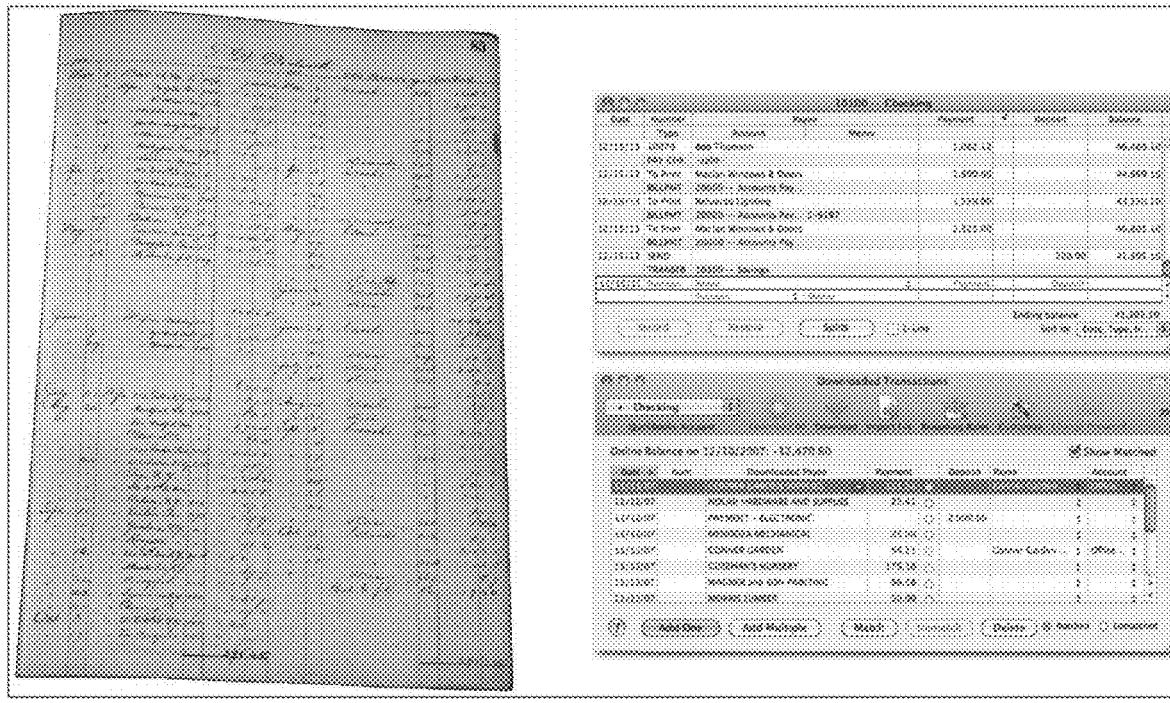
FIG. 10 shows an accounting ledger from the early days of double-entry bookkeeping, side-by-side with a modern accounting software user interfaces

Even today, with digital transformation well under way, the economic value of activities revolving around document creation, representation, exchange, and verification is in the trillions of dollars a year. Consider the verification activities required by insurance companies, legal firms, financial markets and in the multitude of bureaucratic activities related to receipt cycles, sale and purchase of travel or show tickets, real estate transactions, tax reports, identity theft and data protection. FIG. 10 shows an accounting ledger from the early days of double-entry bookkeeping, side-by-side with a modern accounting software user interfaces. Not much has changed: the new digital medium imitates the old paper one and makes software verification of financial reports—though feasible using current information technology—practically impossible.

Vertical Digital Fragmentation. A key characteristic of the current state of the art in use of information is that trustworthy information is only available for human access and human inspection. Consider a collection of documents, such as a collection of contracts, receipts, purchase orders, financial reports, tax filings, salary slips, etc. Regardless of whether the documents are physical or digital, only humans can inspect the collection; only humans can draw conclusions; only humans can verify and validate the information and facts represented there. Importantly and crucially, when a document references another document, for example when a financial report references a receipt or a different financial report, only humans can follow the reference and inspect the referenced document. The entire activity of inspecting, verifying, or validating the collection, or of drawing conclusions from the collection, is by design restricted to humans and, by design, unavailable to software.

Figure 11:
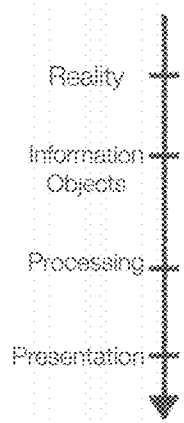
FIG. 11 shows industries along the vertical information flow, where the purpose of many services is to reconstruct vertical information flows lost due to digital fragmentation.

It is hard to estimate the number of jobs dedicated to inspection, validation, and cross-examination of documents in the Western economy. Verification of receipts, financial reports, tax filings (both from the side of the individual/company and from the side of the government tax agency), forms and applications is an algorithmic activity. Verification and validation follow very precise and explicitly spelled out rules. In a shared information reality that would make the facts accessible to software, rather than denying software access by design, the entire world of fact verification and validation would become a software activity. Humans would specify—in a computer program or any machine-readable language—the conditions for validity; the validation itself would be a software activity. The implications of this on efficiency and trust are overwhelming; we will discuss this point extensively below. FIG. 11 shows industries along the vertical information flow, where the purpose of many services is to reconstruct vertical information flows lost due to digital fragmentation.

Inefficiency of verification under digital fragmentation. One of the most crucial inefficiencies under digital fragmentation is related to verification. To verify a piece of information it is necessary to obtain access to its underlying facts or pieces of information. For example, to verify a corporate financial report, it is necessary to obtain the incoming and outgoing invoices and receipts underlying the financial report. Under digital fragmentation most of the underlying information is either difficult to obtain—cannot be obtained by an automated process—and difficult to process. This implied that verification, under digital fragmentation—is necessarily a human-manual process that is often time-consuming, costly, fraud-prone, and error-prone.

The Data Fog. As a result of digital fragmentation, and the resulting lack of ability to verify information, it is an accepted state-of-affairs that information presented (financial information, for example) can never be fully trusted. Major fraud scandals in finance and accounting (for example, the Enron, Madoff, MF Global, Wirecard and FTX financial scandals)—not to mention the 2008 financial mortgage-based securities crisis itself—all appeared out of the blue when financial information presented in documents—believed to be solid even by experienced professionals—turned out to be utterly false. We term this situation the data fog—an accepted perception that no financial report—even one audited by licensed professionals—can be fully trusted.

Vertical fragmentation: verification of results is forensic work, as the digital audit trails are lost. A non-negligible part of the economy goes toward inspection of documents for example, in healthcare, insurance, government, banking, and corporate financial management. Given the fact that data is digitized in a fragmented form, this represents a huge inefficiency, caused by the fact that there is no single shared reality that documents are part of, and there is no single interface for software to access the fragments.

Example: Financial fraud scandals. Large-scale accounting scandals, which occur regularly, provide a striking demonstration of the opaqueness of documents as information objects, which both is a cause of, and a symptom of, vertical digital fragmentation. Consider the two following documents. Nothing in them correct; however it was very hard for many people over a long period of time to even suspect that something is wrong.

FIG. 12 shows information from the annual report of Enron, Inc for the year 2000.

FIG. 13 shows a securities account statement from Madoff Securities International. It was later discovered that the numbers in both documents were complete fabrications; however, to learn this thorough investigations was needed. These are glaring examples of the dangers of vertical fragmentation.

These auditing failures occur because the network of information objects, underlying the information presented, remains completely implicit. Documents refer to other documents implicitly; arithmetic calculations are performed and then discarded, leaving only their bottom-line result; nothing in the provenance chain is machine verifiable. Similar failures have been observed in the scientific literature, where both scientific fraud and/or material error are extremely difficult to discover using manual reconstruction of the published results from underlying data, which resembles painstaking forensic work.

Files. From the perspective of digital fragmentation and the progress of digital transformation, digital files are the "root of all evil". The digital file, folder and directory structure follows a mental model fundamentally predicated on the old world of physical documents. The digital file is mutable, is not permanently accessible, cannot be owned, can be copied, and replicated at zero cost, does not have a definite owner, does not have a unique address, is not citable, and is therefore not a thing. The fact that the file is the primary vehicle for storage and exchange of digital fragmentation is behind much of horizontal digital fragmentation and related to vertical digital fragmentation. Files cannot cite each other explicitly across parties at arm's length—causing horizontal fragmentation; they cannot permanently cite each other on the same system—causing vertical fragmentation. They can only implicitly refer to each other. Because they can be copied at zero cost, they cannot be owned, creating incentives for competing parties to each hoard and silo its own data in files; in a security breach, files can be copied en masse and irretrievably stolen.

The following are drivers of increased horizontal digital fragmentation:

1. Data Hoarding. Development of AI implies that the economic value of data is proportional to the available compute power; the latter has been increasing exponentially according to Moore's law. This pushes each stakeholder to hoard as much data to build AI that will win the arms race. The digital arena became a turf war each player attempting to win as many users, namely as much data, as possible. There is little or no incentive for a platform to develop horizontal interfaces, namely uniform software interfaces that will allow data flow from and to arm's length counterparties.

2. Power checks and balances. An entity with access to all digital data is all-powerful in term of AI but is also all-powerful politically. The possibility that a back door on UDR will make all data available (to a government, can be a powerful incentive for fragmentation.

The following are drivers of increased vertical digital fragmentation:

1. Desire for Friction—Humans want to be in the loop. There are social and political incentives to keep the flow of information dependent on exchange of documents, which are exclusively human-readable. Vertical automation, for example automatic verification of computations and ICC, will push humans and, with them, human judgement out of the loop. There is a natural human tendency to keep veto power and manual oversight over automated processes, even those that can be fully automated.

2. Need for obfuscation. Many vertical information flows depend on vertical fragmentation. For example, in a modern government it can be next to impossible to track where government money ended up. There are intentional obfuscations that all spending far from the public eye essential for political negotiations or national-security related spending. Similarly in the tax arena there is a constant tension between the tax authorities and individuals or entities that have deliberately complicated tax structures and tax reports. Such processes benefit from the opaque nature of fragmented, machine-inaccessible, document-based vertical flows.

Prior Art: Blockchain

As we will see, increased digital fragmentation is not consistent with the endgame of digital transformation, as the latter requires complete consolidation of all digital information exchange. Further breakthroughs in digital consolidation are inevitable—the only question is when and how. There is reason to believe a third breakthrough in digital consolidation is immanent; this is signaled by the huge, and unreasonable, popularity of the blockchain.

The blockchain is with a doubt the most well-known (and possibly most influential) technological development that points in the direction of a digital shared information reality. It has brought much excitement, and as much confusion, to the public arena. The conceptual framework laid out in this text can shed light on the blockchain mania, explain its advantages and disadvantages, and offer a clear picture of what it is capable of—and incapable of. the blockchain has been heralded as the dawn of a new age in information technology. Let us place it in the wider context of a shared information reality and explain the deeper reasons for the blockchain mania. As we will see, the intense interest in the blockchain is in fact an intense interest in the prospect of a fully digital shared information reality. The blockchain mania is especially interesting considering the obvious fact that the blockchain, as a technology, is not able to support or enable a fully digital shared information reality and has indeed found very few real-world applications, especially when compared to the interest and resources invested. We will argue that the primary contribution of the blockchain is a preliminary sign that something bigger is coming—that it is possible to rethink and reimagine the prevailing shared information reality system. We will argue that something bigger is in fact UDR, a technology that can indeed deliver a fully digital shared information reality on a global scale.

A the blockchain is a decentralized, shared, distributed database, and a protocol that allows a community of stakeholders to maintain a state of consensus regarding the contents and change history of the shared database, a full copy of which all stakeholders must store. The stakeholders participate in a peer-to-peer network. Each participant maintains a local copy of the entire database. Updates to the database are collected in blocks, and stakeholders provide proof-of-work to validate blocks and publish them, whereby adding them to the chain. A consensus mechanism ensures that, unless more than half the stakeholders in the network collaborate maliciously, all stakeholders can agree on the current state of the database, as well as on the entire change history.

The original use of the blockchain was as a ledger to support and enable cryptocurrency. So far this is the only viable wide-spread application of this technology. Starting at 2016, numerous applications have been proposed for the blockchain—in finance, healthcare, law, property ownership registration, supply chain management, and so on.

"It's on the blockchain" is an expression that became synonymous with this fact is in a state of enduring consensus by purely digital means. Through this meme "the blockchain technology" holds great promise for the future—indeed what can be a better test case for consensus more than financial accounts, and bitcoin runs on the blockchain? But this thinking is wrong: large-scale digital transformation is fundamentally different to a cryptocurrency; there is more to digital transformation than peer-to-peer transactions. You just can't run the digital transformation of everything based on a shared ledger, let alone a shared ledger with low transaction commitment volume. The blockchain answer to the question "How can we use digital information technology to bridge time?" is:

(i) Commitment is by proof-of-work; and
(ii) Everyone keep all the records of everyone else, hence no need for a designated trusted record-keeper.

The blockchain hasn't taken over the world (i) because this paradigm doesn't scale; (ii) because the protocol is inherently designed to support peer-to-peer transactions, not more general permanent digital information objects; and (iii) because the user-interface angle has received very little attention in the blockchain arena.

A blockchain is small-scale, low-volume digital shared information reality. Stakeholders participating in a certain the blockchain agree on the contents of their shared database. In other words, they share a world view consisting of database entries. For example, if the database contains ownership information over a set of assets, such as allocation of a cryptocurrency, then all stakeholders share a world view of who-owns-what, as well as all history of transactions that lead to the current ownership state. If the database contains information regarding events, then all stakeholders share a world view of what-happened. And so on.

While the most celebrated property of the blockchain networks is that they are decentralized—namely that no single node in the peer-to-peer network holds any special power over the shared database—a closer look at the intense interest by industry shows that this is not in fact such a crucial property for most applications.

We claim that the deeper reason for intense interest in the blockchain is simply that it was the first fully functioning example of a digital shared information reality. Up until that point the world has not seen a widely known, fully digital way to maintain a shared information reality. All other systems for shared information reality were based on documents—even if those documents were digital. Using the blockchain, stakeholders do not need documents to share a world view and maintain a shared world view by sharing digital information exclusively.

the blockchain is not suitable for large-scale, high-volume digital shared information reality. As a technology, the blockchain alone does not deliver Digital Transformation:

The amount of data stored in digital reality is huge, potentially consisting of all the world's digital information. It is infeasible to expect that each participant or stakeholder everyone, for example—maintains a full copy of all the data.

The number of new facts committed to digital reality is huge, potentially consisting of everything that has happened—physically or digitally—in the world at a given moment. the blockchain cannot support such a rate of new fact commitments—in fact it cannot support even a fraction of the commitment rate required to support full digital transformation.

A the blockchain can support a fragment of a shared reality, with new facts added at a slow pace, such as certain real-estate transactions only; or certain medical activities only; and so on. As a result, one will need a very large collection of the blockchain networks to support a broad shared information reality; in other words, a reality fragmented across different the blockchain databases. As shown above, this sort of fragmentation will prohibit the main benefits of Digital Transformation.

The blockchain and digital shared information reality. the blockchain and shared ledger technologies cannot support large-scale digital consolidation, including, for instance, all financial transactions, all continuous geo locations, all server queries, all code executions—it is ridiculous to have all stakeholders store everyone's information since the dawn of time and maintain permanent consensus over everyone's information. the blockchain was simply not designed for this. Crucially, the blockchain's popularity cannot be explained by the decentralization meme—centralization has worked fine, both throughout history in general and for digital transformation. The real reason behind the blockchain frenzy, and the "the blockchain=revolution" meme is that Bitcoin is the first-ever widespread fully digital shared information reality. the blockchain allows stakeholders to maintain consensus over facts using purely digital means, for the first time giving us a glimpse of the world beyond document-based consensus. While WWW offered uniformity of interface, it did not provide a purely digital way to agree on facts. the blockchain can support small-scale horizontal digital consolidation between a small group of stakeholders transacting limited amounts of information, but not large-scale digital consolidation. Importantly, the blockchain does not have anything to do with vertical consolidation or any notion of integration of the information flow from reality to presentation; it is focused on the horizontal information objects slice.

Evidence that the blockchain frenzy is riding on a vague feeling that something big is coming, and that this vague feeling indeed points to digital shared information reality (and not to, decentralization) is the recent hype around Ethereum contracts known as nonfungible tokens (NFTs). An NFT can be assigned definite ownership and be exchanged and sold. Indeed an NFT can be auctioned, like a painting or the original declaration of independence. This status—namely, the status of a tangible thing—for digital objects has never been widely accepted before; no wonder that the first uses of NFTs was to associate them (using sheer imagination) with artworks, which are hallmarks of tangible, unique physical objects. You could also associate an NFT to days of the week and auction Wednesday this way for the same matter. In other words, fascination with NFTs comes from the fact that they are first widely accepted examples of objects that exist in a digital shared information reality, however limited and rudimentary.

The blockchain is a curious phenomenon: it has been resilient to the fact that huge amount of capital produced zero substantial impact on digital transformation. What's the source obsession? Why is capital rushing in?

Decentralization is not the real reason behind the popularity of the "blockchain meme". At first glance the answer is decentralization—the prospect of doing away with governments and centers of power, and instead basing payments, products, and services on a purely peer-to-peer exchange. But the de-centralization meme will die out— governments won't let it (see China crackdown on Bitcoin). The decentralization meme is an appealing sentiment but not a market force. The constant rise in Bitcoin exchange rate that was interpreted to herald the era of decentralized economy when instead it was driven by massive money laundering. At the end of the day there's nothing wrong with a government regulator and centralized authorities if everything's working.

Bitcoin is a popular harbinger of the next stage of digital transformation. The deeper reason for the blockchain phenomenon has to do with the deeper public sentiment: a vague knowing that Digital Transformation is inevitable, that we will not be using documents or their computational emulations for much longer. There are pockets of what we might call endgame digital transformation such as exchange-traded securities and operations within large corporations such as Amazon; but outside these pockets, digital transformation is still at very early stages. When using computers to facilitate exchange of products and services, and for information exchange underlying and enabling societal processes, we mostly use the new medium as an imitation for the old, an imitation of paper interactions. As described above, in endgame digital transformation, computers are used in a fundamentally new way—not as an imitation to human-shuffling paper on a computer screen instead of A4 but using purely software digital interactions for all information exchange and verification. Endgame digital transformation means that arm's length counterparties can use purely digital information for reliable information exchange that does not depend on paper or paper-like digital applications. Necessarily, this requires universally available layer of digital information that transcends the idiosyncrasies of digital systems—a fully digital new medium of information exchange. With this in mind, we argue that the deeper reason for the blockchain phenomenon and inflow of venture capital to this field is that the following: Bitcoin is the first-ever widely adopted fully digital shared information reality. It is indeed the first sign of what's to come—but not in the sense decentralization but in the sense of digital transformation. Bitcoin (and other popular cryptocurrencies) is a shared information reality anyone can partake in, and it's completely digital. That has never happened before on such a scale. By proxy, the blockchain is interesting because it talks to the vague knowing that something like this is coming on a massive scale. It is a first proof of concept for the possibility of such a new medium for information exchange. If the blockchain is trusted by many people with roughly a trillion USD, and as the blockchain is a purely digital medium of information exchange, it means that something new is happening. the blockchain is a hint of the future of digital transformation which we all instinctively feel is around the corner.

Nonfungible Tokens (NFTs) and the notion of permanent unique digital object. We have discussed above the original document notion from document shared reality—a unique document which is a thing. One can go to the National Archives to see the original document of the US Constitution and Declaration of Independence. One can purchase in an auction the original $1^{st}$ edition print of some famous book, or handwritten notes scribbled by Einstein. These notions do not exist for digital documents.

Enter NFTs. It seems that many people are fascinated with the possibility of owning a permanent unique digital object—one that is associated with a digital file or with a real-world object. Of course, the association is imagined—there is nothing in the NFT tied to an image file, that guarantees actual ownership over files—as there can be no ownership over files.

The blockchain is a brand for, not a technological enabler for, digital transformation. However, while serving as a harbinger for the long-anticipated future of human societies, and thus as a good brand, it will never actually deliver endgame digital transformation. Moving all (or even a nontrivial fraction of) human affairs to digital information exchange requires a scalable system—which can support adequate transaction volume and adequate (and adequately growing) number of permanently stored digital information objects. the blockchain offers neither: not the transaction volume (limited by proof of work) and not permanent storage because all stakeholders store all information objects ever recorded—a ludicrous notion if you think about large-scale digital transformation. Compare this with traffic of technologies such as Web servers, cellular networks, or digital payments networks. Endgame digital transformation means that everything that happens in all the world in any interaction—financial, physical, medical, etc.—has a footprint. This is a lot of information.

Where do the limitations of the blockchain come from? the blockchain was designed specifically for crypto-currency and thus its design revolves around the notion of a transaction, and the requirement for full consensus—all stakeholders in the network agree of the entire world view at any given moment. In digital transformation, as discussed above, a tiny number of the stakeholders will ever be interested in any fact published to the network: having everyone store everything simply makes no sense. The fact that each stakeholder holds a copy of the ledger makes it fundamentally incompatible with endgame digital transformation: it's as if every person in the country held a copy of every company accounting book since the year 1600. The requirements for decentralization and full consensus mandates proof of work or proof of stake—and is thus hard to impossible to scale. In proof of work the computation is made intentionally hard—not a scalable design choice. Indeed, all attempts to upscale the blockchain essentially move most activity off-chain.

Introduction to the Concept of Unique Digital Objects and Unique Digital Reality (UDR)

As we have seen, blockchain and related shared ledger consensus protocols cannot enable the endgame of digital transformation. What is needed to deliver endgame digital transformation? The first ingredient is, as stated above, a universally available layer of digital information that transcends the idiosyncrasies of digital systems—a fully digital new medium of information exchange. The blockchain solution for this is to put all information on a ledger and give a copy to every stakeholder. That cannot carry even a fraction of the traffic needed for large-scale digital transformation. Which technology might handle the enormous traffic volume required?

Embodiments of the present invention posit that there is a way to exchange information—a system of information objects—which is radically new, and radically different to any other in history. This way can be implemented using presently available information technology—computer networks, hardware, and software. It offers a wide array of advantages and improvements over current practice and provides very substantial value and benefits. This way is the inevitable next stage of the digital revolution. In fact, all around us are subtle signs that we are already well on our way towards this next stage.

Unique Digital Reality (UDR). Currently available information technology makes available a radically more advanced system of information objects than the ones presently used; this advanced system of information objects enables radically wider mirroring, radically more trust and cooperation, with radically reduced costs in terms of time, effort, and resources. In terms of the other function of information—insight—this system is radically more advanced and allows radically new ways of extracting insight from information.

We now offer an abstract characterization of the next shared information reality—a fully digital shared information reality which truly transcends documents and files, enables horizontal and vertical digital consolidation, and supports the endgame of digital transformation.

Unique Digital Objects are information objects that are universally unique, permanent, immutable, tamper-proof, signed, and committed. They are permanently and securely software accessible at a universally unique network address over a cross-platform, uniform, stable software interface. By design, the existence, properties, ownership, time of origin, and contents of unique digital objects, as well as their inter-connections, are indisputable within a specified community of stakeholders. A unique digital object may contain the machine-readable code that validates it, consistent with the digital transformation principle verification happens.

Unique digital objects are things. For example, they can be named, owned, transferred, rented, cited, and exchanged. They are as real and as unique as a physical original document. can be owned, referenced, organized, and used. Data stops being a nebulous entity and becomes a concrete, named resource. Optionally, software processes that process unique digital objects produce results that are themselves unique digital objects. In this sense, software acting on unique digital objects, resources are a transformative power in human history: First, finance, auditing, law, insurance, and healthcare all become software endeavors. Second, we can process data in a systematic way that transforms human life.

Let us review the key properties of unique digital objects:

Unique digital objects are permanent—they are permanently stored and never expire.

Unique digital objects are permanently accessible (pending access privileges) at a universally unique, permanent network address and through a uniform network interface.

Unique digital objects are made immutable using digital signatures and commitment schemes.

Unique digital objects are created, signed, and owned by entities with defined digital identities.

Unique digital objects are explicitly citable.

Unique digital objects are unique—they cannot be copied. To communicate them one communicates their network address, instead of copying them.

Unique digital objects are secure and respect privacy.

Unique Digital Reality (UDR) is a fully digital, fully software accessible shared information reality, based on unique digital objects as its system of information objects.

As a shared information reality, UDR is a collection of information objects, along with the use patterns and protocols that govern creation, exchange, and verification of these objects, namely turning them into facts.

As we will see, UDR allows wide expressive power for mirroring and verb implementation that is much more advanced than anything presently available. As such, UDR enables digital consolidation and the full benefits of endgame digital transformation, as discussed above Recall that any shared information reality implements what we called verbs. Let us examine the verbs of Unique Digital Reality—see Table 2.

TABLE 2

The Verbs of Unique Digital Reality

| verb | Unique digital object in Unique Digital Reality (UDR) |
|---|---|
| Create and edit | Created using a software interface; cannot be edited after creation - committed to a community of stakeholders at creation to ensure immutability. |
| Store | Permanently stored in digital format |
| Communicate/ exchange | Exchanged by communicating its universal network address, not by copying it |
| Access | Accessed at a permanent unique network address through a stable software interface |
| Copy | Cannot be copied |
| Distribute | Distributed over a computer network by making its address available and allowing access privileges; its content may be visualized and amalgamated for distribution with that of other unique digital objects |
| Own/assert copyright | Has definite ownership set at time object creation. Can be rented/ sold/transacted. Access is controlled so that usage is monitored for copyright/royalty's purposes. Any use of its content requires interface access - content is never copied locally. |

TABLE 2-continued

The Verbs of Unique Digital Reality

| verb | Unique digital object in Unique Digital Reality (UDR) |
|---|---|
| Sign | Digitally signed at creation by owner to endure ownership and integrity of content |
| Cite | Explicitly citable using its unique identifier or unique network address |
| Verify | Time of creation, identity of owner and integrity of content can be verified using the unique digital object's interface. Verification of content may be performed automatically by software. |

As a result, UDR allows information to flow easily and be created, stored, exchanged, and inspected by software at dramatically lower costs than presently used shared information realities; it also supports and enables radically new ways to extract insight from information.

Commitment is the only way to create immutable digital objects. As we have seen, the digital world still uses documents (some of them digital documents) as information objects for arm's-length information exchange, and not machine-readable files or Web pages. We noted that the reason is that digital files and Web pages can be altered at no cost, hence cannot form the basis for a shared information reality. A fundamental enabler for any digital shared information reality is thus the ability to create and exchange immutable digital information objects. This in turn is enabled by the act of committing new digital objects before all potential stakeholders—so that any interested stakeholder (a fact receiver in the fact exchange cycle) can compare the information object presenter to it with the committed version and verify that the object has not been altered—essentially making the object immutable.

Commitment schemes. The main design choice that must be made is: How does the fact receiver know that the object has been committed at the purported time with the purported digest? This choice affects the entire architecture of the digital shared reality based on the choice of commitment scheme. Essentially, either the fact receiver receives all available digests ever created by all other stakeholders, so that they can verify themselves by checking when they received it, or else the fact receiver must ask someone they trust and who has received it. the blockchain follows the first choice—all stakeholders hold a copy of the shared ledger, which contains all digests ever created by any stakeholders since inception of the blockchain. In U.S. Pat. Nos. 9,064, 238, 9,852,376, and 10,733,513, 11,170,308 and 11,481,651 we teach a second option, which is that digests propagate through an SSL-style network of trusted witnesses, and where a fact receiver asks a witness whether they have seen the digest at the purposed time.

Digests of digests and two-layer commitments. A third possibility is to not circulate all digests—either on a the blockchain or through a trusted witness network—but rather for fact presenter (the stakeholder who created the information object) to store the digests locally, and only circulate a digest of digests. This reduces the number of digests stored on the ledger (in the blockchain case) and reduces network traffic (in the trusted witness network case). In this case, to verify a digest, the fact receiver should ask the fact presenter and receive both the digest of digests, which can be trusted, either by seeing it on her ledger or by asking a trusted witness, and the block of digests for which the digest of digest has been calculated. This is essentially the idea behind $2^{nd}$-layer the blockchains, e.g. Ethereum rollups—where only a digest of digests is stored on the public the blockchain; verification of a digest requires a verification server that can respond to a request and provide the full digest block.

Privacy-preserving commitments—separating the digest storage from payload storage. Note that publishing, or circulating a digest of an information object, for the purpose of committing it and making it immutable, respects the privacy of the information object and does not disclose its content. It is possible to commit an information object without disclosing its actual content. Zero-knowledge proof methods can later be used to verify that the fact presenter owns the payload of the information objects committed.

The mirroring power of UDR. The expressive power of UDR is overwhelmingly larger than that of the document or the digital-document hybrid shared information realities. UDR enables mirroring of many types of objects, states, and events in legal, financial and, crucially, information technology reality. Through other ancillary inventions involving digital devices and interfaces, UDR can mirror states and events in physical reality as well. As a few examples—events such as door access, server login, execution of software process, consent to a contract, taking a picture on a camera, auditing a document portfolio for information compliance—can all be mirrored on UDR.

Examples

Objects in physical reality are represented by unique digital objects that contain a unique object identifier (such as a serial number). The object in physical reality may display a machine-readable code (such as a barcode) that contains a universal identifier, unambiguously connecting it to the corresponding unique digital object. As unique digital objects are software accessible, software processes can be used to track an inventory of physical objects. (See description of the Omnicodes embodiment below.)

Events in physical reality are represented by unique digital objects created by UDR-enabled measurement devices or sensors. Such devices may make measurements, e.g. camera or alarm motion sensor, or may sense other measurement devices, e.g. door access card reader, handshake device. These devices may have biometric capabilities to identify a human user. These devices may have operating system-level UDR access and are able to generate a stream of unique digital objects, each signed by the device and containing other details such as identity of human identified; interaction details with other measurement device; GPS coordinates; etc.

Objects in legal reality. Legal entities, contracts, and other objects in legal reality are represented by unique digital objects. The inter-citation of these objects mirrors the connections in legal reality, e.g. a contract unique digital objects cites the unique digital objects corresponding to individuals and entities who signed the contract, unique digital objects representing e.g. real estate property mentioned in the contract, etc.

Events in legal reality almost always involve consent and require confirmation of a human involved. The unique digital objects representing these events cite the unique digital objects mirroring consent granted by an individual using a user interface.

Objects in IT reality may simply be unique digital objects. Objects in cyberspace such as user accounts, profiles, information files are best stored as—rather than be represented by—unique digital objects. This allows access control, access tracking and endures their persistence.

Events in IT reality such as server logins and code executions are recorded as unique digital objects, or collections of unique digital objects, which cite the resources involved in the event.

A fully implemented UDR is a fully digital Shared Information Reality. It is a collection of inter-connected objects that are accepted as real by the community of stakeholders. In an important embodiment, the community of stakeholders is the entire Internet, and in this case, UDR becomes a new layer of reality accepted universally and globally. This new layer is similar in nature to more familiar artificially constructed realities such as the legal reality where the objects are laws, rulings, corporations, contracts, and so on, and the financial reality where the objects are monetary sums, accounts, financial transactions, debt notes, and so on. Notably, the legal and financial realities, and in particular the universal recognition of artificial objects in these realities, have enabled growth and creation of wealth of unimaginable proportions. Similarly, the disclosure herein teaches how a Unique Digital Reality enables creation of significant growth and wealth, including new products, new services, new occupations, and dramatically more efficient implementations of societal and business processes.

Under UDR, we can address, access, cite, verify, own, transfer, sell, track, and verify every piece of digital information—all using software. We can connect it to other facts that depend on it to validity and to other facts upon which it depends. The mountain of fragmented bits of information in storage devices across the globe, as they presently exist under digital fragmentation, would be consolidated into a single, cohesive reality layer. Arguably, the hybrid document-digital system did not revolutionize the way we use information and did not bring a leap in efficiency and trust. If anything, trust has deteriorated, and we are now drowning in information; fake news; fraud and mistrust; etc. See "digital fragmentation" below.

UDR poses a concrete, systematic and standardized alternative to the current state of the art in handling all aspects of digital information in our society. Moreover, UDR specifies standardized interfaces for accessing digital information and operating on digital information. UDR specifies standardized protocols and meta-protocols—based on a novel, comprehensive conceptual framework—for creation, storage, indexing, access control, exchange, inspection, version control, updating, verification, validation, reconciliation, citation, amalgamation, ownership assertion, and inter-connecting of digital information. It also specifies protocols for executing deductive reasoning and learning processes that draw conclusions from digital information, in a manner which unambiguously cites unique digital objects that contain:

(i) the reasoning process;
(ii) the underlying information subjected to the process;
(iii) the fact that the process has been executed correctly; and
(iv) the results of the process.

UDR and user interfaces. Unique digital reality includes use patterns that govern presentation of information on user interfaces. Crucially, any presentation or rendering of information contained in a unique digital object on a user interface is visualized with the universal address or universal identifier of that unique digital object. Information is never presented or visualized out of context or without citation.

Guiding Principles for UDR

Consolidation of Data: Data is consolidated—there is a single communication protocol for digital reality.

Cross-platform interoperability: all computing systems have an interface to Digital Reality. This allows seamless information flow and seamless digital access to information across time and across systems, jurisdictions, and organizations.

Uniqueness: Each fact/data piece/digital object is universally unique.

Permanence: Data in digital reality is permanent and immutable

Ownership: Each fact/data piece/digital object is owned by an Identity.

Commitment: When data is deposited into Digital Reality, it is committed facing the entire community of stakeholders using a commitment scheme. Data thus becomes permanent and ownership is asserted.

Accessibility: Data is accessible via a unique identifier with access permissions.

Software access: Data is software accessible. Data format follows standards and declares the standards so that the data is machine-readable.

Citation and citabiiity: Facts in digital reality, whose validity depends on validity of other facts, cite their underlying facts, and are cited by the facts they support.

Provenance: Each Fact in Unique Digital Reality has a universal fact identifier, which enables a permanent, unambiguous citation and reference. A fact in Digital Reality cites related facts, underlying facts, ancillary facts, facts required for verification, etc.—using their universal identifiers. When a fact in Digital Reality depends on other facts for correctness it always cites all of them. Under the existing shared information reality, there is no unified notion of a universal identifier for facts. For example, there is no way to address a specific individual's driver's license uniquely and universally, or 2013 federal tax return, or a specific lease contract, or a specific photograph published on social media.

Advantages of UDR over current state-of-the-art. Compared with the current state of the art, usage of UDR by a network of stakeholders offers an incredibly wide array of concrete improvements in most domains, processes, products, or services involving exchange of digital information:

1. Efficiency. With UDR, handling of digital information is significantly more efficient.

Uniformity of expression and form of digital information

Consolidation. Under UDR, all digital information is consolidated in a single collection accessible with access privilege control to a community of stakeholders. Pieces of digital information turn from isolated entities, which exist on separate platforms and therefore have no shared existence, into universally accessible shared entities with universally accepted properties. In this regard, the transition from the existing state of the art into UDR is like connecting the world's computers using the Internet, whereby advancing from isolated entities into a universal network of interconnected, universally accessible entities. Under UDR it is possible to cite, reference, inspect, and reconcile any piece of information, or fact, previously deposited to UDR, regardless of when the fact was created and regardless of the system on which it was created.

Standard software interface. With UDR, each piece of digital information exhibits a standard interface, through which it can be accessed, manipulated, and verified. In a preferred embodiment, this interface is an API—a software interface. As a result, crucially, digital information on UDR becomes amenable to automatic processing by software. As discussed above, this implies that UDR makes possible a new era of information mining, discovery, verification, reconciliation, automatic deductive reasoning, and broad artificial intelligence.

No between-party gaps, hence no friction. In the current state of the art, when a piece of digital information, created by a certain entity and stored in that entity's system, needs to be presented to a different entity, all manners of difficulties arise. There are security issues, legal issues, and format issues involved; moreover the information authenticity must often be verified manually by manual inspection of certain proofs of authenticity. Under UDR, the world of digital information becomes flat and free of gaps. Specifically, as all pieces of digital information in UDR are accessible under the same interface, regardless of their system/entity of origin and regardless of their time of creation, and as digital information in UDR exhibits its own proof of authenticity, the tremendous friction caused by between-party gaps is eliminated.

Simplicity. Under UDR, design and implementation of systems and processes which operate on digital information, especially those which operate on digital information from different sources, agents, and legal entities, becomes simple and straightforward.

Automatic verification. Verification of correctness and accuracy of information is a usually implemented in software and carried out automatically, eliminating most of the need for human auditing and bureaucracy.

2. Trust. With UDR, handling of digital information is significantly less prone to error or fraud. As a result, trust by all stakeholders in the validity of information is significantly increased.

Trust by design. Under UDR, a complete provenance trail of a fact is often available, including both underlying facts and underlying deductive reasoning processes, which is amenable to automatic verification. In other words, a fact in UDR exposes the means to verify it automatically.

Error prevention. Facts in UDR cite each other using a universally unique identifier. New facts are often created from previous facts by software rather than manually. This reduces the probability of human error and makes it possible to verify, often automatically, that an error did not occur.

Fraud prevention. Basically all forms of fraud, for example in banking, insurance, healthcare, and finance, are possible due to lack of sufficient scrutiny and verification. Facts in UDR cite their underlying facts and their underlying deductive reasoning processes, which are also available in UDR, the whole network of facts underlying a given fact is exposed and can be verified computationally. As taught below, this makes fraud significantly more difficult.

3. Digital civil rights. UDR turns digital civil rights from an abstract debate into a concrete reality, which can be readily implemented in software.

Data ownership. A fundamental property of information in UDR is ownership. In the existing state of the art, data ownership is vague at best; and large internet companies hoard and trade personal information given to them for free by the population of users. Under UDR, each piece of digital information is attributed to the individual or person who created it.

Free data markets. As a result, UDR makes it possible for an individual to rent or sell their data on the free data markets that will be formed. This implements a basic civil right that is being discussed but cannot be enforced under the current state of the art—the individual's right to control and monetize information. It can be argued that data locked away in the systems of a few large companies and organizations has become the world's largest untapped resource, holding untold economic value; UDR specifically addresses this point and enables the society to tap into this resource.

Data access tracking. Due to UDR access control, a data access event in UDR is itself documented on UDR. As a result, the owner of a piece of digital information has complete knowledge of the piece's access history.

4. A new frontier of technological possibilities. UDR enables a wide array of completely new products, services, markets, business models, occupations, and social interactions, none of which is possible (or even conceivable) under the current state of the art.

Inter-operability of the entire digital ecosystem. Under UDR, it is possible to design and implement systems which operate on the entire digital ecosystem, namely, process information and draw conclusions from a wide array of information sources, across legal entities. This allows completely new ways of discovery, verification, reconciliation, and automatic deductive reasoning based on digital information from diverse sources.

Software execution as a fact. UDR makes it possible to address the very act of software execution as a fact or a new piece of digital information. For example, to document properly the fact that a certain piece of software has been executed against a certain piece of input data and has produced a certain piece of output data, it is necessary to address the inputs and outputs uniquely. UDR makes this possible. As a result, the digital ecosystem includes, in addition to raw pieces of information, facts pertaining to execution of code against these pieces of information.

Smart contracts.

Broad Artificial Intelligence. A key property of present-day artificial intelligence systems is that they are trained for a very specific task. A fundamental bottleneck in development of these systems lies in the need to obtain large amounts of training data; for the typical individual, research organization or company this is usually impossible. Under UDR, access to the entire digital ecosystem—including a huge variety of forms and sources of digital information—along with data markets where individual can rent or sell their digital information—will enable a quantum leap in development of artificial intelligence, beyond narrow tasks into what is typically known as broad AI.

5. A new conceptual framework. In a very real sense, UDR changes how we think about digital information. UDR marks a graduation of core notions about information handling from those rooted in previous-century paper-based thinking, into radically more advanced digital notions. An advance in conceptual framework enables formation of new abstractions, leading in turn to new inventions that will rely on the present invention.

UDR makes it possible to develop systems, which specifically address and alleviate certain obvious high-profile shortcomings of the current state of the art in information handling, such as fake news; data citation and ownership; financial fraud; credible citation of scientific data and scientific research; election reporting; validity of postings on social networks; validity of corporate public disclosures; data privacy and acceptable use of personal information; and much more.

Figure 14:
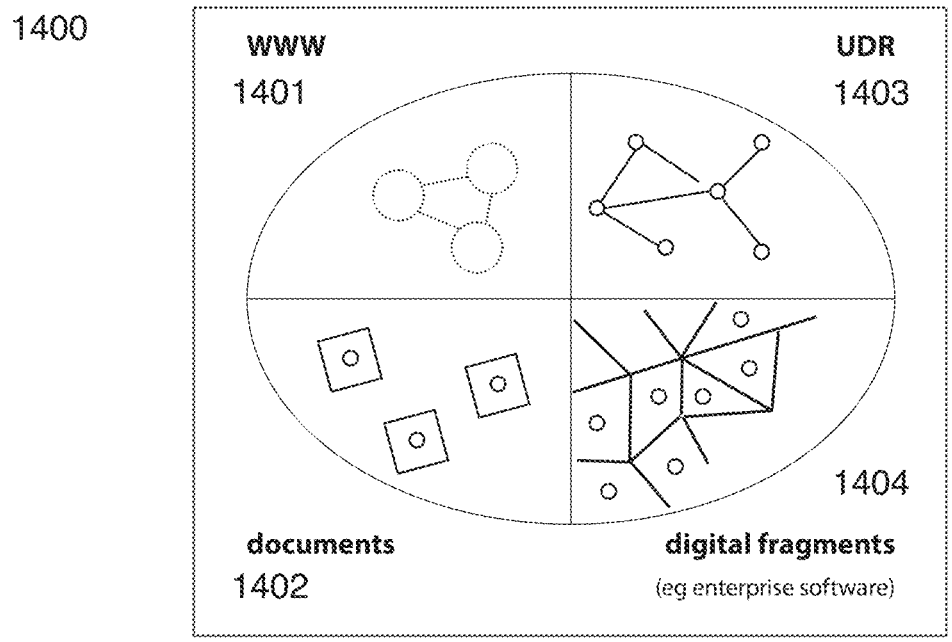
FIG. 14 compares the World Wide Web, document shared reality, digital fragments and unique digital reality.

UDR versus state-of-the-art systems of information objects. UDR is a consolidated system of uniformly software-accessible and permanent information objects. All three attributes (consolidated system, uniformly software-accessible objects, permanent objects) are crucial for vertical digital consolidation. FIG. 14 compares the World Wide Web (WWW), document shared reality, digital fragments and UDR: objects in WWW 1401 are uniformly software accessible—but not permanent; documents (both physical and digital) 1402 are permanent—but not software accessible; and fragmented software systems 1404, e.g. enterprise software systems, are locally software-accessible, but not uniformly so. In contrast, UDR 1403 is consolidated system that consists of uniformly software-accessible and permanent objects.

Examples

Here are a few examples of how UDR is used in various contexts.

Physical sensors record measurements directly on UDR through an embedded module. This makes measurement trustworthy as they are signed and committed now of measurement. Measurements in UDR can then be accessed for analysis or verification by any third party with access credentials, at any later point in time.

Financial transactions (bank transfers, security transactions, etc.) are recorded directly on UDR through a software module in the transaction system. This makes transactions trustworthy as they are signed and committed now of transaction. Transactions in UDR can then be accessed for analysis or verification by any third party with access credentials, at any later point in time.

Legal information such as contracts, property titles and so on are recorded in UDR through a module in the word processing (or equivalent) system. They include machine-readable annotations that allow machine access to certain properties of the contract, for automatic contract verification.

Real estate. Real estate property ownership is managed by objects in UDR. Real estate transactions are recorded in UDR.

Regulations and laws regarding information flow. When information exchange occurs by exchanging addresses of objects in UDR—not by copying information objects—access and usage of information objects can be monitored. Regulations regarding data civil rights and acceptable use of information make sense and can be enforced.

Payments. Point of sale payments and online payments clearing systems record payments on UDR. This information can later be incorporated into tax documents, financial reports, accounting summaries and so on.

Scientific research. Scientific data analysis computing platforms record computations and important results directly into UDR through a module in the computing platform. Scientific publications are basically a wrapper around the collections of data objects and computation objects in UDR, which become a layer of monetizable content. This content in UDR enables completely new modes of scientific research that extract insight from data and computations performed by previously published studies.

Health information. Medical systems record information directly into UDR. It is owned by the patient with access privileges to the medical staff. This information can be used during care for automatic verification of care protocols, and later for medical billing, medical insurance claim processing, auditing, and retrospective medical studies.

Social networks. All personal information is recorded on UDR under the ownership of the person owning it, not under the ownership of a social network service. This includes personal content such as personal photos, videos, location check-ins, etc. The service provided by a social network Internet company is a user interface makes accessible some personal information recorded on UDR to other social network users.

Enduring Network Interfaces. A presently preferred implementation of UDR is based on server interactions—a technology that is basically running the digital world today. It is scalable enough to support large-scale digital transformation. A permanent unique information object—the elementary information object of UDR—is implemented as an enduring network interface, rather than as a shared ledger entry. A fully enabling description of this implementation appears below.

Figure 15:
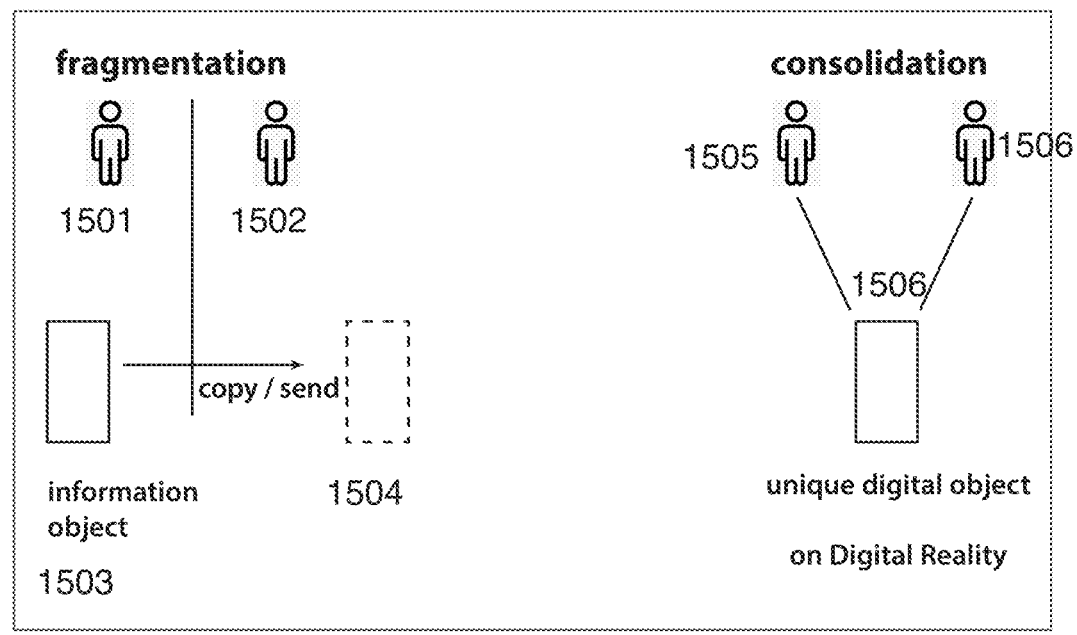
FIG. 15 compares digital information transfer under digital fragmentation with digital information transfer with UDR, the latter being an enabler of digital consolidation.

UDR enables "horizontal" digital consolidation. As stated above, horizontal digital consolidation requires that digital information objects (both observed and deduced) would be permanently accessible to arm's-length stakeholders (with access privileges) through a uniform interface. UDR enables horizontal digital consolidation as it mirrors all vertical sections, including observed information objects, deduced information objects and their deduction processes; furthermore different stakeholders can grant and gain access to each other's unique information objects, and access them through a cross-platform stable software interface. This is consistent with the information flows principle of endgame digital transformation. FIG. 15 compares digital information transfer under digital fragmentation with digital information transfer with UDR, the latter being an enabler of digital consolidation: entity 1501 wishes to communicate digital information to entity 1502. Under digital fragmentation, and using e.g. digital files, the information object 1503 to be sent must be copied during transfer. A new copy 1504 is created during transfer, and the process results in two independent copies (e.g. of digital files) 1503 and 1504. In contrast, when an entity 1505 communicates to a different entity 1506 a unique digital object 1506, the object is not copied, and remains unchanged. Instead, entity 1505 grants entity 1506 access to the unique digital object 1506 on UDR.

Figure 16:
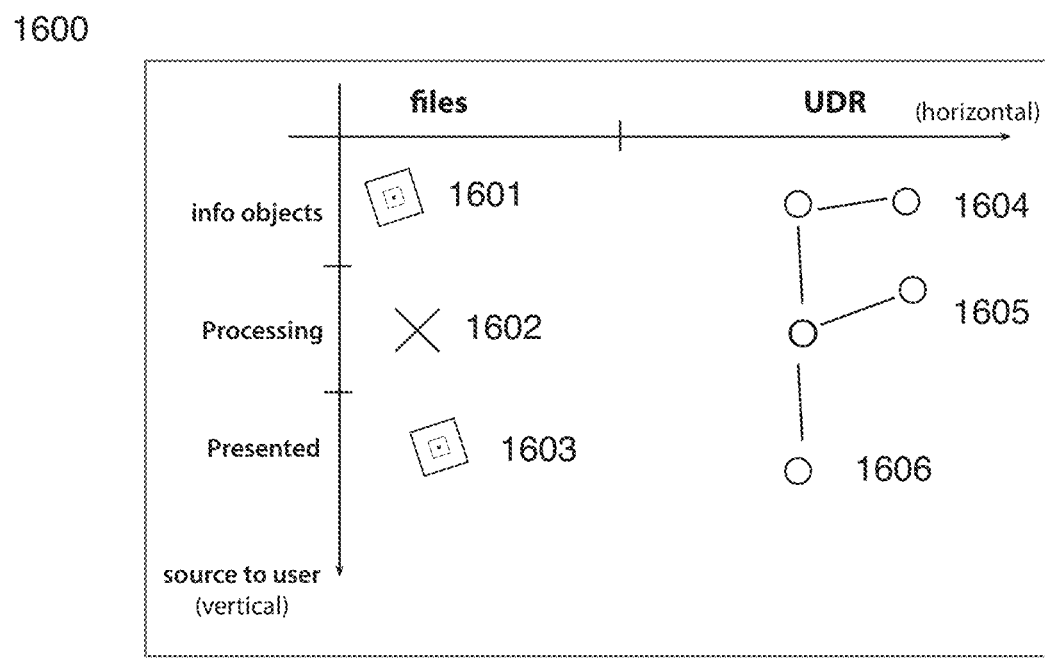
FIG. 16 compares vertical (source-to-user) information flow using digital files to the vertical information flow using UDR.

UDR Enables "Vertical" Digital Consolidation. As stated above, vertical digital consolidation requires the vertical information flow—the links between observed information objects to the information objects deduced from them and to the processes that were used to deduce from them, and from deduced information objects to their human-readable visual presentations—will be explicitly exposed in digital format. UDR enables vertical digital consolidation because it allows explicit, stable citations that mirror the links along the vertical flow in unique digital objects and mirrors all elements of the vertical flow from observed information objects that mirror objects, states, and events in physical, legal, financial and IT realities to processes, deduced information objects and their presentation on human-readable user interface. FIG. 16 compares vertical (source-to-user) information flow using digital files to the vertical information flow using UDR: with digital files, information objects 1601 do not have unique identifiers and cannot be unambiguously connected with other information objects; the processing stage 1602 (whether computation or ICC processing) cannot be recorded in digital form; the presentation of results 1603 is siloed away from any other digital information, namely, presented results cannot be connected with the processes and information object that created them. In contrast, with UDR, information objects 1604 (represented as unique digital objects) are interconnected; processing stage 1605 can be recorded in digital form (e.g. as a sequence of unique digital objects) using verifiable execution or SICCL scripts; and presented results 1606 are connected digitally and unambiguously to their digital flow, including underlying information objects and processing stage—which can all be represented as unique digital objects.

The following are core embodiments of the inventions that enable vertical digital consolidation:
 Certification and Verification of Unique Identity,
 Verifiable Interactions,
 Verifiable Code Execution (V/X)
 Standard Information Consistency and Compliance Language
 Human-readable presentation of unique digital objects.
We now introduce each.

Verifiable Code Execution (V/X). Verifiable code execution is a method for mirroring the event of code execution in information objects, and in unique information objects. To this end, the environment executing machine readable instructions, a virtual machine, an interpreter or even the operating system itself, includes a V/X module that is active and performs operations in parallel to the code execution process. These operations include capturing the source code executed, the input data structures, the output data structures, the course of execution (including any subroutine calls and library calls), and intermediate data structures such as inputs and outputs to certain subroutine calls. The code itself may include specific instructions to the V/X module. These instructions do not alter the execution of the code—rather they can be used to regulate the operation of the V/X module. For example, instructions to the V/X module may flag an important subroutine call so that its own inputs and outputs will be recorded at runtime; or may flag a certain variable as a variable of special importance that can later be presented as a result on a user interface. The V/X module gathers information at runtime, effectively recording the course of the computation, and then creates a collection of interconnected information objects. In a preferred implementation, these information objects are unique digital objects on UDR: variables and data structures, as well as source code, are each contained in unique digital objects; the inter-connections and inter-citation of these unique digital objects spells out the course of the entire computation.

There are numerous use-cases for computations recorded using a V/X module as a collection of unique digital objects in UDR:
 V/X enables vertical digital consolidation of flows whose processing stage includes a computation. Without V/X there is no way to mirror a computation in shared information reality; and without mirroring there is a crucial disconnect between the results of computations, as they are advertised in human-readable form, and between the process which created those results and the underlying information upon which the process was based. This disconnect has some highly visible consequences today: for example, the 2008 housing crisis was essentially caused by an inability to connect numerical results (results of risk models, to underlying information—auditing these numerical results required recovering the underlying computation and data which was a near-impossible computational forensics task.

V/X enables data refineries, standard-grade data markets and standard preprocessing procedures. When code execution is not mirrored in information objects, and the results of code execution are fragmented away from the computational process that produced them, there is no way to know for certain the details of preprocessing steps that were applied to data at hand. Conversely, V/X allows to connect data to the preprocessing steps that were applied to it; this enables exchange of data that has verifiably passed certain quality tests, verifiably upholds some quality standards. This in turn enables data refineries as services that produce UDR objects that contain data of a known quality grade, and markets to trade such objects.

V/X enables computation markets. A computation can be a costly thing: for example a computation that required 10,000 hours and applied specified code to specified inputs to produce its outputs, is a valuable resource. When computation is not mirrored in shared information reality, it is not an object itself, and the only way to trade in computation results is by trusting that a given output was indeed produced using a purported computational process. In contrast, V/X effectively caches computations on UDR and turns code execution into an object that can be traded—the object specifying in full detail the inputs used, the process applied these inputs, and the results obtained.

V/X enables counter-factual execution and other kinds of re-use of computational results. A counter-factual execution asks how would results of a computation change if we changed some of the computation parameters, some of the methods implemented, or some of the computation inputs. In some cases, a collection of unique information objects created by V/X can be used to re-execute the computation. In this case, counter-factually executing a computation that produced a given result is possible.

V/X enables dataset amalgamation. Amalgamation of data gleaned from different sources is a difficult and important problem in data science. There are various choices made during dataset amalgamation, and when the computation performing the amalgamation is not recorded, there is effectively no way to know how it was performed. With V/X recording the amalgamation process and explicitly connecting the amalgamated dataset to the original datasets, and to the amalgamation code executed, it is possible to inspect the amalgamation process and the original dataset before using the amalgamated dataset.

V/X makes it possible to extract massive amounts of new insight and knowledge from the scientific literature and from financial reports. It is customary to summarize results of complex numerical computations with a few numbers, figures, or charts that appear in human-readable form. A scientific publication, for example, often summarizes results on incredibly complicated computations and data analyses in human readable form accompanies by some descriptive text. However it is the underlying data and the computational process that holds the real value that can be extracted from the scientific research reported in a publication; the language of the publication itself is of little value. V/X makes it possible to explicitly connect published results to their underlying computation and data, such enabling to harvest using software processes underlying data.

V/X enables regulation of the software industry and in particular testing mandates and testing standards for mission-critical software systems and AI systems. Regulation of software systems has been a long time coming; it boils down to mandating software tests that assert quality assurance, safety, fairness, etc. of software that is put forth for public use. If computations are intangible things, this is not possible; however with V/X recorded code execution, it is possible to represent to a regulator, conclusively, that certain tests have been performed.

V/X enables reverse citation of data sources that underly results on human-readable user interfaces (such as scientific and financial results). See above.

V/X enables "the experience of having data." In the field of machine learning and AI, large datasets are required to train high-quality machine learning models. Entities compete as data hoarders because the owner of a large data set is in a better position to train better machine learning and AI models. The owner of a dataset can, however, train a machine learning model for another entity for a fee; it is privacy concerns that often prohibit the owner of a dataset (a medical organization, from transferring it to a party that would be interested in these data for the purpose of training a machine learning model. V/X and UDR make it possible for the data owner to train a model on a third party's behalf on their own data, then proving to the third party that the model has been indeed properly trained.

V/X enables markets for trained AI models. A trained AI model may be small in terms of information storage; it represents the value of the training data, including the cost required to collect the training data and/or label it, and the value of the computation required to train the model, which may be substantial. GPT3 and similar trained models are well-known examples of trained models delivered for us without access to the training data used for their training. For the same reason as above, V/X makes possible markets for trained AI models; for example, the trained AI model can be a unique digital object, V/X can be used to prove that training did indeed take place, and zero-knowledge proof methods can be used to prove that it was indeed trained on the claimed training dataset—without disclosing the dataset itself.

V/X enables "data blame." The reliability of traditional (procedural) software systems depends only on the quality of the code. AI models are different—their reliability depends on the quality of the training code but also on the quality of the training data. A model trained by noisy data may produce unreasonably wrong predictions even when the training code itself is perfect. For this reason, debugging AI models requires access to the training data that was used to train them. If computations are disconnected from their results, the connection between the trained model and the training data it was trained on is implicit and in fact the training data may be lost or deleted. However with V/X this connection is explicit—for example, the unique digital object that contains the final trained model is connected to the objects that represent the training computation, which are in turn connected to the object(s) that contain the training data. As a result, if there is a prediction problem it is always possible to locate training data (that exists permanently on UDR) and inspect it.

Standard Information Consistency and Compliance Language (SICCL). SICCL is a characterization of machine-readable form to express consistency and compliance requirements in an array of information objects. It can take the form of a machine-readable language or may be defined using existing computer languages, e.g. Python. Entities in SICCL are unique information objects, they various data fields and inter-citations. It makes it enables definition of allowable values and semantic types given fields in an information object can take; relation requirements to be satisfied by two given fields of two information can have; and so on. In some embodiments, a SICCL script can be executed on a SICCL interpreter or an interpreter/virtual machine of the host language in which it is implemented. The primary goal of SICCL is to cast information consistency and compliance requirements—such as those that make up a bureaucratic process—so far only understood by humans and not cast in machine-readable format. We argue that ICC verification is an inherently linear, algorithmic task, which is a perfect candidate for automation in software, and explain how limitations in the present information systems prevent such automation. In short, with SICCL, verification of information consistency and compliance becomes a software problem and is readily automated in software. In some embodiments, SICCL is both machine- and human—readable, so that requirements written in SICCL can be understood by non-technical users as well.

Human-readable representation of unique digital objects. Embodiments of the invention concern the protocols on the human side that govern how verification and reliability are communicated to the individuals involved in information exchange. They concern the way in which contents of information objects in UDR, e.g. of enduring network interface, are rendered, presented, and visualized to the human user.

The information system itself can be perfect but useless. Why? One of the two functions of information exchange, and the one under consideration here, is cooperation through consensus enabled by information exchange. This means that an information exchange system has a crucial human behavior aspect to it—people must be able to understand the information shown to them, understand its trustworthiness, and develop social norms based on its exchange. Accordingly, a third embodiment of the invention teaches how to present information objects, taught by a first embodiment of the invention, and verified automatically by a second, it such a way that their correctness, trustworthiness, verification status, etc. is immediately obvious to the human stakeholder; and that any underlying information that may be required now or in the future to inspect, examine, or independently verify information presented.

Verifiable Interactions. Interactions—including user-user interactions, device-device interactions, and user-information object interactions—are events in various layers of reality, which form the basis for most legal, societal, and business processes. Verification of many types of ICC requirements includes verification that an individual has signed a document or, more generally, consented to certain terms presented before them. Mirroring these events in information objects is a significant challenge; indeed, how does one create a digital verifiable record of an exchange between of two devices? Or of legal consent by an individual to a document? Embodiments of the invention teach how to create unique information objects on UDR, which make it possible to verify that an interaction has taken place, and to embed these key observed facts into digitally consolidated vertical information flow.

UDR enables groundbreaking Artificial Intelligence (AI). The future is much more than just about efficiency and cutting costs. The future is something the possibility of completely new products, services, markets, and occupations. The mature digital age is about creating new kinds of knowledge, which is based on digital records of everything that happens. Such a mature digital age will be enabled by shared digital information reality representing, in software-accessible digital form, everything we have learned, everything we have experienced, and everything we have known, and will usher in a new level of artificial intelligence. Indeed, when computers can draw on all human experience everywhere, AI systems can be trained in ways that are not even raised as a possibility today. AI systems today are simplistic, in part because of the limited access to information—each AI system is trained for a very specific task, on a very specific and narrow dataset. AI with access to a complete UDR could be much more sophisticated. The computer age is developing toward our ability to excavate knowledge, to learn and to sense and to experiment against reality in a multi-modal way. With all layers of reality significantly mirrored in UDR, radically more advanced AI can be developed, and radically more advanced science that can be done.

Detailed Description: Enduring Network Interfaces

The fundamental notion of Unique Digital Objects and Unique Digital Reality, taught herein, may be implemented via numerous methods. As a possible detailed embodiment, we now teach an implementation of Unique Digital Reality using existing computer network server technology. In this embodiment, a unique digital object is implemented using an Enduring Network Interface, and an entire UDR is implemented using a collection of enduring server interfaces.

An enduring network interface is a network service that consists of:
   (i) permanent unique universal identifier;
   (ii) permanently available application programming interface (API);
   (iii) immutable, digitally signed, and committed information payload;
   (iv) owner identity;
   (v) time-of-origin;
   (vi) access privileges;
   (v) optional mutable metadata.

The API enables network stakeholders with appropriate access credentials to issue queries regarding the payload and any metadata of the object. Specifically, an enduring interface responds to API queries sent, over the network, to a network address that is associated with its universal identifier. The network can be the Internet or any other digital communication network, where addresses can be allocated and two-way communication is possible using a network address.

An enduring network interface serves as a permanent (write once read many) information object. It is a possible implementation of the abstract notion of a unique digital object, and as such, can replace existing information objects, such as the paper document, the digital document (PDF) and the digital file as the primary medium of information exchange in the digital age.

Introduction and overview. Herein disclosed is a system of information objects based on digital objects that are permanent, immutable, uniquely, and universally addressable and citable, and permanently software accessible. Each object, once created, is stored permanently on a server or a network of servers. Embodiments of the invention teach various possible protocols for creation, addressing, and permanent storage of these objects. For example, a universal addressing system may be like Universal Resource Locators (URLs) or even consist of URLs; or it may be based on the blockchain shared ledger entries. Storage may be implemented as a single system of servers (HTTP or others), where a single central entity is responsible for storage and content serving; or it may consist of a network of competing serviced providers all following a single protocol that is like HTTP website storage. Servers respect an API for access privilege control to information objects. Each object exposes an API with various methods and properties, particular to its type, for example an image information object exposes methods for displaying it in various formats, while a contract information object exposes methods for retrieving contract party identities, etc. Importantly, information objects are digital objects and are decoupled from any visual or graphical representation—they may be displayed, visualized, or embedded in different contexts or formats.

To begin with, when replacing the file (digital document) or physical document with the enduring network interface, access is changed. Digital and physical documents/files must be sent—indeed the notion of e-mail is just an extension of physical mail, which assumes that the information object must be sent from sender to receiver. In contrast, an enduring network interface is universally accessible pending access privileges—so to exchange it I just need to grant access. I can never lose it—as it is immutable and permanent. This in turn implies nothing short of a revolution in information exchange because it means that digital information objects become things. Each has a unique, permanent existence and a name. Files are by nature local objects—they cannot support a collective imagined reality. And because digital files cost nothing to copy and on one hand can be deleted instantly and on the other hand can never be deleted (once propagating through the Internet,—digital files are not things. They cannot be owned, because how do we specify what is owned, exactly? They cannot support a shared intersubjective reality because a file cannot be the basis for consensus.

On the other hand, an enduring network interface—which is committed and then stays immutable and permanently accessible through a universal address—is a thing. It can be owned. It can serve as basis for consensus. It can be cited (using its address) and we know that the citation remains good because the object is immutable and permanently accessible. Because an enduring network interface is software accessible—meaning that it exposes an API that is accessible through its universal address—enduring network interfaces, as information objects, in stark contrast with digital files, can be accessed, processed, analyzed, and agglomerated using software. No one can write code to verify my tax return because the code requires an API access to all underlying documents (salary slips, and who is to guarantee that when the code is executed ten years from now the files will be around, not to mention the fact that salary slip documents—whether physical or digital—do not expose an API and are by design not software accessible. When all salary slips and any other document related to my tax return filing are all enduring network interfaces, verification code can access this underlying information, verify it, assert its consistency and its compliance with the tax law, etc.—and can be re-executed ten years from now because all underlying information is still available and software accessible. So enduring network interfaces can be owned, are things, and support software access, verification, analysis, and so on. Indeed they unlock an array of possibilities for information exchange and processing so wide that cannot presently be imagined, from our limited perspective forged by millennia of just documents as they only information objects around. Furthermore, enduring network interfaces can be collected in collections that in turn form new information objects, which leads us to the subject of verification.

Verification. Let us examine in detail how information objects are verified. Once an information object, such as a license, a loan application, a contract, etc., is presented for verification/validation, the verifier implicitly follows what is in fact a simple recursive algorithm. Information objects as assertions are either observed meaning that they make an asserting regarding a thing, state, or event, in reality (physical or other), or else they are deduced, meaning that they assert that a certain deductive reasoning process has been applied to previous information objects and obtained the asserted result. For example, the water meter reading on Jan. 1, 2000 in so-and-so's apartment is an observation, as is the assertion that $100 was transferred from account X to account Y on time Z. Yet the assertion that the government owes me $1000 tax return for the tax year 2020 is a deduced fact—it was deduced by a specified reasoning process (a calculation based on tax law) applied to previous information objects (my income, my tax payments, etc.). Verification of deduced facts is such a ubiquitous activity that it probably accounts for a double-digit percentage the world's GDP. Government employees, bank employees, accountants, lawyers, back-office associates, bureaucrats in all levels of local and national government, tax authorities, insurance companies, health insurance companies, health billing personnel—all these are occupied with little other than information exchange and with creation and verification of deduced facts.

One of the radical improvements made possible by enduring network interfaces is that verification by software becomes possible; and the fact of verification itself becomes a new information object. Why? An enduring network interface enables a wider range of expressive power for mirroring. One of the realities that cannot be mirrored by documents and files is the computational reality—which has become a very important reality in the last few decades. Indeed, ownership of certain illegal files lands one in jail. Certain server access events, e.g. hacking, lands one in jail. Certain server access events, such as a cyber-attach on national critical infrastructure, are now *Casus belli*. Consensus regarding IT reality—the reality of digital information storage and access has become crucial, and yet our present information system (files and documents) is completely unable to mirror this reality—indeed evidence shown in court in cybercrime cases is just a printout of server logs.

Here are a few examples where mirroring—using information exchange to achieve consensus—regarding computational reality is now crucial or will become crucial in the imminent future:

Malpractice lawsuits for AI systems—the defendant must prove reasonable caution, which comes down to proving that certain software tests and QA procedures were followed.

Government regulation of AI systems—the government requires providers of mission critical AI systems to prove that reasonable testing has been performed and passes.

Fairness and anti-discrimination—government (or public opinion or shareholders) requires proof that AI system has been tested for fairness.

Insurance related to AI systems require guarantees that the insured system has been tested.

Enduring network interfaces enable mirroring of computational reality. For example, ownership of enduring network interfaces is indisputable and there is no question of who owns which digital asset. Server access events automatically create enduring network interfaces. Importantly, enduring network interfaces enables verifiable execution—mirroring of the event of code execution—an event that is impossible to mirror in documents (details below).

Back to verification, because execution of code is a mirrored event in the sense that there is an enduring network interface asserting the code execution event, the event of executing verification code against a collection of enduring network interfaces and obtaining a result itself becomes an enduring network interface. So the act of successful verification itself becomes a fact. In contrast, today, when a human employee verifies a loan application, all we have is the implicit affidavit from the employee that they have followed the required verification procedure. We don't know if they did it, or if they did it correctly, and maybe they skipped some steps; and to re-verify we must do it all over again. This explains in part the tremendous number of people employed in what we can call the information exchange and verification industry.

Let's compare fact creation, exchange, verification, usage in:
  (i) currently popular document-digital hybrid system; and
  (ii) the above embodiment of the three inventions taught.

Mortgage Loan application verification: The task is to verify consistency and compliance of identity of seller, buyer, property, etc.
  (i) We are holding a pile of documents (printed or PDFs in a folder). The documents are title to the property; sale agreement; identity proof for buyer and seller; proof of income by buyer as evidence for ability to repay in agreed schedule); loan agreement; and appraisal report to support property sale price.
  (ii) We are in possession of a URL which is a universal identifier to the loan application. Stakeholders all have access privileges. The references enduring network interface is citing other enduring network interface for the required information objects. Each is syntactically and semantically labeled, e.g. the identity object is marked as identity. The loan application is not a PDF or a sheet of paper, rather it is structured information, such as:

```
Buyer: a.com/123
Seller: a.com/456
Property title: a.com/789
Sale contract: a.com/999
Appraisal report: a.com/111
Loan sum: 600
Loan sum currency: USD
```

Above, the URLs such as a.com/123 are all permanent URLs that act as universal identifiers and access addresses to enduring network interfaces.

Verification:
  (i) Manual verification—consistency, e.g. the party on the loan contract is the same identity as party on the sale contract; the property on the sale contract is the same property on the appraisal report; etc. Compliance: e.g. the monthly return agrees with proof of income; the sale price agrees with appraisal report; etc.
  (ii) Software verification by SICCL: the following code is in specific field of the loan application enduring network interface, e.g.:

```
% consistency
Require Self.property.id ==
  self.appraisal_report.property.id
Require self.seller.id == self.property.owner.id
% compliance
Require self.loan_price < 0.4 *
  self.appraisal_report.appraised_price   % regulatory
  requirement
Require self.monthly_payment < 0.25 *
  self.proof_of_income.monthly_income
```

Human Interaction—how do we Know that this is Verified:
  (i) Bank employee puts a verified stamp or clicks a verified button—affidavit that she has performed the required tasks and everything checks out.
  (ii) SICCL code executed; a new enduring network interface documenting this execution is created; the universal identifier for this object is the proof of verification. It can be re-executed, etc.

Server interactions enable large-scale unique digital reality. Enduring network interfaces are unique digital objects based on server interactions. This is a novel approach compared with previous attempts to create persistent digital objects. Server interactions are used to create, commit, access, validate, verify, present, and use the information in an enduring interface.

The Rationale

1. Digital shared information reality. As discussed, even today, with the process digital transformation is full swing, many types of information exchange are still use paper documents or their digital imitations—PDFs and emails. Most legal and financial arm's length transactions are based on exchange of documents—not on any kind of purely digital communication. According to the detailed analysis included elsewhere herein, the reason is that for information objects to support consensus—namely to support creation of facts—the information objects must be permanent and universally accessible. A website, which may be different tomorrow, cannot be the basis for a contract; as is a digital file, whose format may be inaccessible in the future and its content may be changed with no effort. Paper documents are still used today since they are permanent, immutable, and permanently accessible: any anyone can read them and access their content. Enduring network interfaces are information objects of a new kind. First, they are purely digital, not digital imitations of documents, which makes them software accessible—a crucial property that documents lack. Second, they are permanent, immutable, digitally signed, and committed. Their information payload is signed and committed, and hence cannot be changed after creation. As information objects, are permanently accessible. As a result, they can replace documents as information objects underlying all information exchange. As discussed, their mirroring power is significantly greater than any other information object.

2. Digital consolidation. As discussed above, the digital file—still a key design concept in modern information technology—underlies all digital fragmentation. In contrast, a system using enduring network interfaces as a design primitive—instead of the digital file—increases digital consolidation. Currently, the way to control access to a digital file is to keep it fragmented away from the rest of the world, for example once a digital file is shared, it is impossible to establish ownership or prevent copying. In contrast, enduring network services have definite ownership and are unique—they exist in a consolidated digital universe much like WWW. Systems, products, and services can use information in enduring network interfaces across boundaries of organizations, governments, and individuals—given appropriate access permissions.

Universe of stakeholders. Enduring network interfaces serve a collection of stakeholders. They may be implemented on a local corporate network in which case they only serve local stakeholders; or they may serve arbitrary stakeholders such as anyone with an Internet access.

A possible embodiment—running example. In an embodiment, which will be used as a running example throughout this detailed description of enduring network interfaces, the network is the Internet. The universe of stakeholders is anyone with an Internet access. An enduring network interface is implemented as a RESTful Web interface. Server interactions are HTTP client-server interactions. The permanent unique identifier is in the format of a SHA256 output, e.g.:

"e3b0c44298fc1c149afbf4c8996fb92427ae41e4649b934ca495991b7852b85 5".

Note: below in the running example we use four-character identifiers for brevity, e.g. "ae3c."

Interface authority. An enduring network interface exists indefinitely, namely, responds to queries at an address associated with its unique identifier indefinitely. The entity responsible for the continued service availability of an enduring network interface is called the interface authority responsible for it. In a universe of stakeholders, there may be one or more interface authority.

Running example—continued. The interface authority operates an HTTP Web server serving all the Web interfaces that exist under the responsibility of the authority. In the running example below, the authority operates through the fictitious DNS domain facts.com. Suppose that other authorities exist; a central interface registry, running from a root domain (for example, the fictitious domain "registry.com") may hold a table connecting a universal identifier of an enduring interface to the authority responsible for this interface. For example, it associates the enduring interface with identifier "ae3c" with the domain of the authority responsible for this interface.

A second possible embodiment. In another embodiment, different interface authorities may use different server technologies to serve the enduring interfaces under the responsibilities. For example, one authority may use an HTTP server (as above), while another authority may implement a parallel system using FTP and do on—all implementing the same protocol for creation and use of enduring interfaces.

In some embodiments, the notion of an interface authority is analogous to that of a bank in the financial system, and a digital object that is served by an authority is analogous to a bank account. There are potentially several interface authorities; each maintains a piece of the whole shared unique digital reality. Collectively, the interface authorities bear responsibility for the shared digital reality, just like the banks collectively bear responsibility to the financial system. Banks are custodians of information and are responsible for its perpetual availability, just like an interface authority. Enduring interfaces can be migrated between authorities, just like accounts between banks.

Identity management. To create enduring interfaces, and/or access existing interfaces, a stakeholder must have an identity registered in advance with the interface authority. Each registered stakeholder is allocated a universally unique identity identifier. In a preferred embodiment, the identity credentials themselves are stored as enduring network interfaces, whose payload is the authentication credentials—so that the identity identifier is in fact the unique identifier of an enduring network interface. However this is not essential—see below. The interface authority provides an authentication service wherein a stakeholder can authenticate, that enables authenticated server interactions. In a preferred embodiment, following an authentication process, the authenticating interface authority issues an access token to the authenticated stakeholder, which is then used in server interactions with that authority. Identities can be assigned to natural persons—people—or to legal entities. An identity assigned to a natural entity can be related to identities of people—e.g. officers of a company.

Running example—continued. The interface authority enables stakeholder registration using either an API or a www page. A new registered stakeholder is issued a universal identity identifier and a password. An enduring network interface is created for each identity, whose payload contained the hashed password; the universal identifier of the interface is the identity identifier for this stakeholder. The interface authority enables login through a secure API, where universal identity identifier is submitted and an access token is returned. The token is then attached to any further server interaction with the authority. The access token is implicit in the running example below—see Table 3.

Alternative embodiment. The interface authority enables registration which includes collection of biometric identification. The biometric identification information is stored on the payload of the enduring network interface created for the new identity. The interface authority enables login through a secure interaction with a biometric device, where universal identity identifier and biometric scan are submitted, and an access token is returned. The token is then attached to any further server interaction with the authority.

TABLE 3

| Server interactions in authentication | |
| --- | --- |
| Server (authority) | Client (payload owner) |
| <- | Present identity identifier, Request access token |
| Present challenge | -> |
| <- | Respond to challenge |
| Authenticate | |
| Send access token | -> |

In all server interactions described below, the stakeholder is assumed to have an access token prior to the described interaction.

Universality of identity. The universe of stakeholders—all possible stakeholders in the network—is a single pool. In the case of multiple responsible network authorities, all authorities must share a single identity system. This allows any stakeholder to potentially access enduring network interfaces that fall under the responsibility any of the different interface authorities; it also allows to change migrate an enduring interface between authorities (see below) without interfering with its access control. Thus, in the case of multiple authorities, in a preferred embodiment an identity is itself represented by an enduring interface. This ensures that the identity identifier, which is the universal identifier of the enduring interface corresponding to the identity is universally unique, across authorities. In another embodiment, all authorities share an authentication system, so that an access token issued following successful authentication (in embodiments where access tokens are used) is honored by all interface authorities. In other embodiments, each interface authority maintains its own authentication and while the identity identifier for a stakeholder is unique and recognized by all authorities, a stakeholder must authenticate with each authority separately.

Network address. Each interface is accessible through a network address associated with its unique identifier. In some implementations the address itself is hard-coded upon creation of the interface and becomes permanent; in other implementations an address resolution system (analogous to domain name server—DNS) can be used to dynamically resolve the network address based on the universal identifier. For example, in implementations when more than one authority exists, a global resolution system may keep a database of all allocated identifiers of all existing interfaces and resolve the network address of each interface at its own responsible authority. This design allows change of authority or multiple authorities (see below).

Stable network address. In some cases, it would be required to provide a stable network address for an enduring interface, namely, as address that will remain unchanged even if the interface migrates between interface authorities. If a central registry is used, the network address of the central registry can serve as a stable address prefix for all enduring interfaces, redirecting to the address of the authority as shown in the central registrar table.

Running example—continued. The network address associated with a permanent network interface is the authority domain, followed by '/' and the universal identifier, e.g. if the authority domain is "facts.com" and the universal identifier for a fact under the responsibility is "ae3c" then the network address is "facts.com/ae3c." The RESTful API HTTP commands are available at this address, e.g. "GET https://facts.com/ae3c/get_payload." Suppose there are multiple interface authorities and a central registry, as per the embodiment above. The central registry associates the interface with identifier "ae3c" with the domain of the authority responsible for this interface. The central registry also runs an HTTP Web server; it will redirect all requests to "registry.com/ae3c" (a request stating the universal identifier "ae3c" without specifying the responsible interface authority) to the address at the correct authority, namely, "facts.com/a3ec." If the interface "a3ec" migrates from the authority "facts.com" to another authority, the request to "facts.com/a3ec" can return a "HTTP permanent redirect" response pointing to, "registry.com/ae3c."

The payload. The payload of an enduring interface is the core immutable data made permanently available through the enduring interface. Payload can consist of arbitrary binary data; or may be one of pre-specified data types and formats. In the latter case, the authority maintains a defined list of possible payload types, which may be extended from time to time, and for each payload type, a list of possible formats.

Primary format. In a formatted payload, one of the available formats is defined by the interface authority as the primary format. In an embodiment, the payload is stored by the storage authority in the primary format.

Running example—continued. In the interface authority "facts.com" the payload type "image" allows the possible formats "jpeg," "png," "gif." Suppose the primary format for "image" is defined as "jpeg." When a new enduring network interface is created specifying payload type "image," the uploaded payload is converted to format "jpeg" and stored by the authority in this format.

Another embodiment. In another embodiment, the primary format is the format in which the payload has been originally uploaded—namely, the payload is stored in the same format in which it was created and uploaded.

Access privileges. An interface authority is potentially responsible for serving a very large number of enduring network interfaces; the number of enduring interfaces can only increase with time. Crucially, not all stakeholders have access privileges to all objects. An enduring interface includes specification of access control, specifying by universal identity identifiers those stakeholders that are allowed access. In some embodiments, different access levels are possible, for example read access can allow access to all API including payload access, while header access can only allow access to parts of API that respect payload privacy, for example allowing access to time-of-origin, owner identity, payload digest, etc.—but denying access to the payload itself. Access control specifications are considered a mutable part of the enduring interface—rather than properties of the interface authority. In some embodiments, access privileges may be changed by owner using API calls. If the enduring interface migrates to a different responsible authority (see below), the access control specification migrates with it.

Another embodiment. In another embodiment, there are restrictions regarding the possibility of withdrawal of access privileges after interface creation. For example, consider a case where an enduring privilege is made available to a tax authority upon creation, as it represents part of a financial process which the tax authority might be interested in verifying it later. In this case withdrawal of access privileges for the tax authority results in a limbo—the information exists but is not available for verification. In another embodiment, some access privileges are defined permanent upon creation, so that the owner cannot withdraw them later.

Metadata—mutable meta-information. The payload of an enduring network interface is committed upon interface creation and may not consecutively be changed. However, optionally, an enduring network interface may store mutable meta-information attached to the interface, such as machine-readable code for verification of the information contain in the payload, encryption keys, etc. The enduring interface may enable API commands to update, inspect metadata, such as comment to inspect or execute verification code.

Ensuring uniqueness of new universal identifiers. Suppose there are possibly multiple interface authorities. To allow migration of authority (see below), interface authorities are responsible for coordinating namespaces or address spaces to prevent collision of universal interface identifiers.

Another embodiment. Each authority has a hard-coded predefined prefix for identifiers. Each authority allocates a new, unused identifier with its own prefix, so that identifier collisions are prevented.

Another embodiment. Collisions are prevented using a central identifier registry. Prior to allocating a new universal identifier for a new interface, each authority verifies with the central registry that the desired identifier is free, registers the new identifier with the central registry, where it is also associated with the authority that created it. See Table 4.

TABLE 4

Server interactions: ensuring uniqueness of a new universal identifier (in another embodiment)

| creating authority | Central registry |
|---|---|
| Send query with candidate new universal identifier | -> |
| <- | Verify that candidate identifier is free Authorize allocation of candidate identifier |
| Claim new identifier | -> |
| | Register new identifier with creating authority |

Allocation of a new universal identifier. In another embodiment, the identifier allocated to a new interface is the hash (for example, SHA256) of its payload in its primary format. If this address is taken, namely if an interface with the same payload, an alternative identifier is used.

Digital Signatures. In a preferred embodiment, the payload of a new enduring interface is digitally signed upon interface creation by the stakeholder creating the interface (the owner). To sign, the stakeholder first creates a public key enduring interface associated with his identify identifier, which publishes a public key. During creation of a new enduring interface, the signature created with the public key, and the identifier of the public key interface are attached to the payload and included in the immutable component of the enduring interface.

Creating interfaces on behalf of a different stakeholder. In many possible embodiments, an enduring interface is created by a stakeholder (a hospital, but is owned by another stakeholder (the patient). A preferred embodiment enables a stakeholder A (patient) to grant permission to stakeholder B (hospital) to create enduring interfaces on their behalf. In this case, the payload is signed by stakeholder B (hospital), the interface owner is stakeholder A (patient) with access privileges (possibly permanent and irrevocable) to stakeholder B (hospital).

Linked imports. The payload of an enduring interface often includes citations of existing enduring interfaces. For example, a payload consisting of HTML, word processor, or spreadsheet content may include numbers, images, and tables which are cited from a payload, or parts of a payload, of an existing enduring interface. Crucially to the notion of digital consolidation, including (importing) such information pieces (such as numbers or images) is never done by copying them, but by citing the identifier of the enduring network interface where they appear. In a preferred embodiment, for each importing environment (HTML, word processor application, etc.) there is an import convention or a plugin used to implement linked import from an existing enduring network interface.

Citing an enduring interface. Enduring network interfaces cite each other, and enduring network interfaces may be cited by other resources. There are at least three ways to cite/include/import an enduring network interface:

Using its universal identifier
Using its network address
Using its network address and API command.

An enduring interface can be imported in many ways—in some cases (such as when the payload is an image) the entire payload can be imported in a natural way. In these cases, the API can implement a default response to an empty or default API command (a command that specifies the interface identifier and nothing more). However, typically the import uses an API command to specify which specific information from the interface payload is being imported. The commands can specify a format, other parameters, such as image requested width and height in pixels, or fields identified through the object's API.

Example—An enduring interface citing another using network address: The payload of some enduring interface may contain a list of linked imports to other enduring interfaces. Consider for example an enduring interface representing a tax form, whose payload consists of (or contains) JSON formatted data. The JSON can be, e.g.:

```
{
"taxpayer identity" = "facts.com/bh7a"
"salary slips" = ["facts.com/bh71","facts.com/bh72"]
}
```

Namely, citing an identity enduring interface, and other enduring interface corresponding to other documents.

Running example (continued)—importing the content of an enduring interface. As stated above, the central registrar "registry.com" forwards any HTTP requests to "registrar.com/a8qs" of an enduring interface whose identifier is "a8qs," to the correct domain of its responsible authority "facts.com/a8qs." Suppose the payload of the interface "a8qs" is an image; an HTML page can use:

<a href='registrar.com/a8qs'>

(the stable URL that remains unchanged even if the interface "a8qs" migrates to a different interface authority) or a specialized tag for importing content from enduring interfaces:

<UDR_import href='registrar.com/a8qs'>.

The import can specify an API command that requests the content in a specific format, e.g.:

<a href='registrar.com/a8qs/embed?format=JPEG&width=200px'>

Amalgamation enduring interfaces. In another embodiment, the enduring interface protocol supports a special kind of interface, with are amalgams of existing enduring interfaces. The payload of the amalgamation interface contains universal identifiers and possibly also digital digests of contained existing enduring interfaces. The amalgamation may be simple, in which case the amalgamation is just a list of existing enduring interfaces packaged together, or may involve code execution, in which case the amalgamation interface may cite an enduring interface mirroring the code execution that created the amalgam.

Example. Consider two enduring interfaces, where the payload of each consists of a list of identifiers. We are interested in creating a union of the list, removing duplicates. An amalgamation enduring interface may contain in its payload the union of the list (removing duplicates); a citation of the two underlying interfaces; and a citation of an enduring interface created with verifiable execution, which recorded the code execution merging the two lists.

Running example (continued): in this previous example, suppose that the payload of one existing enduring interface, whose universal identifier is 'a2bb' is the JSON:

```
{
"identifiers":    "[17,89,101,200]"
}
```

And the payload of a second, whose universal identifier is 'a2bc' is the JSON:

```
{
  "identifiers":    "[5,89,92,200]"
}
```

Then the payload of an amalgamation interface created from them using unique merge (removing duplicates) may be:

```
{
  "identifiers": "[5, 17, 89, 92, 101, 200]",
  "amalgamation_source_ identifiers": [ 'a2bb' , ' a2bc' ] ,
  "amalgamation_source_digests": [ 'a2bb' , ' a2bc' ] ,
  "amalgamation_execution": 'd7qm'
}
```

Even if the two underlying interfaces were not committed, committing the payload of the amalgamation interface, which contains digests of the underlying interfaces, effectively commits the underlying interfaces.

Lifecycle of an enduring network interface. We next cover the steps in the lifecycle of an enduring network interface:
1. Creation
2. Commitment
3. Time-of-origin and payload validation
4. Verification
5. API access Let us review each stage in the lifecycle in turn.

1. Creation.

An enduring network interface is created once using a server interaction with an interface authority. That authority becomes the authority responsible for the newly created interface. The payload is uploaded as part of the interaction. Upon interface creation the authority allocates a unique permanent address and commits the object's payload (see below). From that moment, the payload is committed and can no longer be changed. See Table 5.

TABLE 5

Server interactions in creation of an enduring network interface (including stakeholder authentication)

| Server (authority) | Client (payload owner) |
|---|---|
| <- | Send payload and access token |
| Verify access token | |
| Verify pay load compliance | |
| Allocate universal identifier | |
| Send universal identifier | -> |
| Update local and/or universal network address table | |

Running Example (Continued)

The stakeholder creates a new enduring network interface using the HTTP request with header and content:

```
POST /create HTTP/1.1
Host: facts.com: 8080/create
Content-Type: application/json
Content-Length: 69
'{"owner_id":"z8q3" ,
  "access_token":"abc",
  "payload_type":"image",
  "payload":"<object payload>",
  "payload_format":"jpeg"}'
```

The authority's HTTP server at domain "facts.com" verifies that "abc" is a valid access token for identity identifier "z8q3;" allocates a new universal identifier "ae3c") by calculating the SHA256 hash of the uploaded payload; verifiers that this universal identifier is unique (see above); registered the new universal identifier with the central registry (see above); and commits the new interface (see below). If all these operations are successful, the authority HTTP server response is:

```
HTTP/1.1 200 OK
Date: Mon, 27 Jul 2021 12:28:53 GMT
Server: Apache/2.2.14
Content-Length: 88
Content-Type: text/html
Connection: Closed
'{"identifier":"facts.com/ae3c"}'
```

The request may optionally specify initial access privileges. These may be changed by the owner at any time, however. For example:

```
POST /create HTTP/1.1
Host: facts.com:8080/create
Content-Type: application/json
Content-Length: 69
'{"owner_id":"z8q3",
  "access_token":"abc",
  "payload_type":"image",
  "payload":"<object payload>",
  "payload_format":"jpeg",
  "access":"{
    {"w8x0":"read"}
  }"}'
```

In this case the interface authority will verify that stakeholder "w8x0" exists before responding "OK," and grant this stakeholder read access to the newly created interface.

2. Commitment of a New Enduring Network Interface.

Digital information is by nature mutable; creating permanent, immutable digital objects is not a trivial task. Commitment is a crucial stage in the process of creating a new enduring interface. Commitment—the act of publishing the object or a cryptographically secure digest of the digital object—is essentially the only way to create immutable digital objects. A third party, which is later interested in verifying that a given digital object has remained unchanged since its purported creation time in the past—must have access to a trusted record from the purported object creation time, containing the fact or its digital digest. It follows that choosing a commitment scheme boils down to choosing a system for trusted record management.

In the context of enduring network interfaces, commitment allows an interested third party to validate the owner identity, integrity, and time-of-origin of the interface, and to verify that the payload as retrieved is identical to the payload as committed at the stated time-of-origin—a crucial part of information verification.

In the commitment stage, as part of the creation process of an enduring interface, a cryptographically secure one-way digest of the payload (in its primary format) is calculated and published with the universal identifier of the newly created interface, and possibly with the identity identifier of the owner—the stakeholder who submitted it so that it is available to all stakeholders in the network. The authority creating a new enduring interface is responsible for committing it successfully before returning the newly allocated universal identifier to the stakeholder who created it.

Another embodiment: In another embodiment, the universal identifier is the SHA256 digest of the payload in the primary format, meaning that the universal identifier is identical to the secure one-way digest published for commitment. The digest used for commitment is the SHA256 of the payload in the primary format, possibly with an added digital signature element.

Stakeholders who note the publication can themselves record the universal identifier of the new interface, the published hash, the time at which they received the publication, and, if published, the owner identity. They can late use this information to validate the integrity, time-of-origin, and owner identity of the interface (see below). Stakeholders who do not record all commitments published must rely on a trusted record of published commitments.

There are different embodiments for the system of trusted commitment records: An embodiment: In an embodiment, the commitment, e.g. digital digest, such as a hash, and new universal identifier are published on a blockchain or other shared ledger and are available to all network stakeholders. Any stakeholder with access to the shared ledger, and who trusts the records on the shared ledger, can use it to verify a past commitment.

An embodiment—see Table 6: In another embodiment, based in part on the disclosure of U.S. Pat. No. 9,064,238 (the '239 patent, which patent is incorporated herein in its entirety by this reference thereto) the commitment is achieved using a server interaction. This embodiment is based on server interactions to establish trusted records of commitments, and specifically uses witness servers. These are record-keeping servers (such as HTTP servers) on the network able to register new commitments (new digests) and look up existing commitments (existing digests). Witness servers can exist in a network of trust, whereby when a one server is notified of a commitment—whether directly upon object creation or indirectly through a trusted witness server on the network—it notes the commitment in its records and notifies any witness servers that trust it. The witness server can be operated by an interface authority (and in fact be the same server used to serve the enduring interfaces) or can be independent of any authority; any stakeholder in the network can operate a witness server. A witness server accepts two kinds of requests:

- a request to register a new interface (consisting of the universal identifier, the payload digest, and possibly the owner identity); upon receiving such a request the witness records the received information along with the timestamp at which it was received
- a request to validate an existing interface (consisting of the universal identifier and the payload digest). Upon receiving such a request the witness performs a lookup for the universal identifier and digest; if found, it returns the time as recorded; if not found, it returns a "not found" response.

Listeners, or secondary witnesses. Witness servers can register as listeners with other witness servers; when a witness server records a new interface, it propagates the new record to all witness listening to it. In this embodiment, witnesses form a trust network analogous to the cascade of trust in SSL certificates. A witness listens to any other witnesses it trusts; so that record of any new interface propagates through the trust network. During validation stage (see below), if the interested third party trusts a witness, and the witness has a record of the enduring interface in question, then the interface is validated (see below).

TABLE 6

Server interactions

| Server (authority) | Any trusted witness | Any registered listener |
|---|---|---|
| Calculate payload digest Send universal identifier and payload digest | -> | |
| | Record in storage: universal identifier, payload digest and precise interaction date/time Send universal identifier and payload digest | -> |
| | | Record in storage: universal identifier, payload digest and precise interaction date/time |

Another embodiment—batch commitments: In another embodiment, enduring network interfaces are committed in batches. This may occur when an end device that accumulates observed information objects is not network connected or has limited network connectivity; in this case the device only goes online periodically to commit a batch of new observed information objects. This is also a way to decrease network traffic required for reporting new commitments to a witness sever or decrease storage on a shared ledger. In batch commitment, a storage device (the end device, stores the commitment, e.g. the digests, of multiple enduring interfaces, and only published to the network or to the trusted record system a single digital digest of the record of all digital digests of these interfaces. To verify the commitment of any single object in the batch, the verifier will have to obtain, e.g. from a witness server, the record of all digital digests in the batch; they can they verify that the digest of the record of digests has been committed at the purported time, and that the digest of the object of interest is indeed included in the record of all batch digests.

Batch commitments. In another embodiment, to reduce network load in communication between creator of an enduring interface and the responsible authority, or between the authority and witnesses, or among the witnesses, an authority can create an amalgamation interface for a collection of new enduring interfaces and commit the amalgamation interface without committing each of the new interfaces separately. Because the payload of the amalgamation interface contains the digital digests of the each of the new interfaces, a committed amalgamation interface effectively commits of the interfaces it contains, as a verifier can first verify the committed amalgamation interface, and then proceed to verify each of the interfaces it contains using their digests, found in the amalgamation interface's payload.

Clock synchronization between stakeholders. Determination of time-of-origin for an enduring interface is key. Servers of interface authorities, witnesses (in the above-mentioned embodiment for commitment) and stakeholders must keep synchronized time, for example by synchronizing with an Internet time server.

3. Time-of-Origin and Payload Validation.

One of the key principles of information exchange using enduring network interfaces is that interested third parties (sometimes called "fact receivers" elsewhere here), who are interested in verifying a certain existing enduring interface, are not known at the time of creation of the enduring interface. The commitment scheme must enable a third party, which examines an enduring interface of interest, to validate its payload integrity and time-of-origin. The validation method depends on the commitment scheme.

An embodiment: In the above-mentioned embodiment, where commitment is achieved using a the blockchain, the validating party will:
  (i) use the interface API to retrieve the time-of-origin and payload in original format;
  (ii) calculate the payload digest;
  (iii) locating the universal identifier of the interface of interest on the blockchain; and
  (iv) compare the time-of-origin retrieved from the interface API and the calculated digest to those noted in the blockchain entry.

Another embodiment: See the '238 patent for background, the above-mentioned embodiment, where commitment is achieved using witness servers, the validating party:
  (i) uses the interface API to retrieve the time-of-origin and payload in original format;
  (ii) calculates the payload digest;
  (iii) locates a trusted witness server and query it with the universal identifier of the interface of interest, and the calculated digest; and
  (iv) compares the time-of-origin retrieved from the interface API to that noted by the witness.

Here is pseudo-code implementing the above. Suppose that a third party is interested in validating payload integrity and time-of-origin for enduring interface with identifier "ae3c." Using a central registry the responsible interface authority for this interface is found to be "facts.com." Suppose that the trusted witness is implemented as an HTTP server in the domain "witness.com". The third party will execute this Python-like code:

```
payload =
  http.get ("https://facts.com/ae3c/payload?format=primary")
stated_origin_time =
  http.get ("https://facts.com/ae3c/origin_time")
witness_origin_time =
  http.get ("https://witness.com/validate/ae3c?digest="+sha256(payload) )
if (not witness_time) or (abs (witness_origin_time -
  stated_origin_time ) >threshold) :
    return NOT_VALIDATED
else
    return VALIDATED
```

4. Verification.

A crucial stage in exchange of information is verification. We now unpack the meaning of information verification: what does it mean when we say that a contract document, for example, is authentic; or a news report is true; or a corporate financial report is valid; or a tax return is correct; or an insurance claim is verified, or a financial account statement is accurate, or a scientific paper is trustworthy?

Validation, as discussed above, concerns payload integrity and time-of-origin: it's about making sure that the payload of an enduring interface, as retrieved, is identical to the payload of that interface as originally created, and that the time as retrieved as the time at which the interface was indeed created.

Verification, in contrast, is concerned with the payload. By verification here we mean making sure that the information contained in the payload is correct, valid, and accurate. This is of course context-dependent and usage-dependent. Optionally, an enduring interface may store in its mutable meta-information machine-readable instructions that implements verification for that interface. These instructions may be updated, inspected, audited, and executed without any change to the (immutable) payload. We elaborate on software verification of information represented by enduring network interfaces in an embodiment of the invention disclosed below.

5. API Access

The most common way to use an enduring interface is to invoke its API. The API allows an authorized stakeholder to retrieve interface properties such as time-of-origin, identity of the interface owner, and most importantly, elements of its payload in various formats. Running example (continued): As an enduring network interface is implemented as a RESTful service. A stakeholder with access privileges can invoke HTTP requests such as:

GET https://facts.com/ae3c/list_API_commands
  (return a JSON with all available API commands in the default API version)
GET https://facts.com/ae3c/owner_id
  (get the universal identifier of the enduring interface for the identity of the current owner)
GET https://facts.com/ae3c/original_owner_id
  (get the universal identifier of the enduring interface for the identity of the original owner)
GET https://facts.com/ae3c/creation_time
  (get the purported time of creation of this enduring interface)
GET https://facts.com/ae3c/digital_signature
  (get the digital signature attached to the enduring interface at creation time)
GET https://facts.com/ae3c/list_all_owners
  (get a JSON with list of all owners, with time where ownership was established, where owners are specified using the universal identifier of the enduring interface for their identity)
GET https://facts.com/ae3c/list_available_payload_formats
  (get a JSON with all available formats in which payload can be inspected)
GET https://facts.com/ae3c/primary_format_desciption
  (get a text description of the primary payload format)
HEAD https://facts.com/ae3c
  (check whether an enduring interface exists)
POST https://facts.com/ae3c/update_verification_code
  <<verification code follows>>
  (update verification code in the interface's metadata)

These are generic API commands that, in an embodiment, any enduring interface implements. Specific enduring interfaces implement API commands to access specific content elements of the payload.

API versioning. An enduring interface is designed to be available indefinitely. This poses a significant design challenge in terms of API versioning, version updates, and version deprecation. On the one hand, an enduring interface must allow updates and changes to the API, while on the other hand it must maintaining full backward compatibility of all previous API versions: any version of the API released must remain available indefinitely and never become unavailable.

An embodiment. Any enduring interface includes fixed API commands to list available API version numbers; list commands for a given version; invoke commands in any specified version; and a default to invoke commands in the default (current) version.

Running example (continued): The following are examples of possible version-related API commands. When no API version is specified, the request is assumed to invoke the default (current) version.

GET https://facts.com/ae3c/get_default_API_version
(get number of default API version)
GET https://facts.com/ae3c/list_available_API_versions
(get list of all API versions—past and current)
GET https://facts.com/ae3c/past_API/v0.1/list_available_formats
(invoke the command "list_available_formats" in past API version 0.1)

Access key-value fields through API. A key use-case of an enduring interface's API is to obtain information from the payload that is available in machine-readable format, such as key-value. A preferred embodiment allows any enduring network interface to include in its payload, possible in addition to other kinds of information, a key-value struct or dictionary that is available through its API.

Running example (continued): Any payload includes a JSON with key-value content; The standard enduring interface API offers methods to list available fields and get the value of a specified field, e.g.:

GET https://facts.com/ae3c/list_fields
GET https://facts.com/ae3c/get_field/seller_id Interface Access Control. The API of an enduring interface includes commands to query, grant, and revoke access privileges.

Running example (continued): The following RESTful API calls are used to query, grant, and revoke access to an enduring interface. They can only be issued by the owner, namely must provide a valid access token issued to the interface owner. In a preferred embodiment, for the purpose of access control, users are specified using the universal identifier of the enduring interface of their identity.

GET https://facts.com/ae3c/access_list
(return a JSON list of access rights)
PUT https://facts.com/ae3c/revoke_access?id=w8x0
(revoke access to stakeholder with universal identifier w8x0)
PUT https://facts.com/ae3c/grant_access?id=w8x0&type=read
(grant read access to stakeholder with identifier w8x0)

Perpetual/irrevocable access. In some embodiments, it is possible to create an enduring interface with access rights that cannot be revoked by the owner. For example, consider a perpetual IP assignment that grants a certain entity access rights to some digital object in perpetuity, or digital objects that must be accessible to the government by law. In these cases the owner can specify access rights in a perpetual rights field, and these access rights cannot be denied later.

Automated access policies. A stakeholder may create automatically by software a large stream of new enduring interfaces. Access privileges cannot be configured manually to such a large of interfaces; this must be implemented in policies responsive to the creation context of the interface. In some embodiments, the software generating enduring interfaces includes policies for grant access upon interface creation to certain groups of stakeholders; all enduring interfaces collected at a hospital, for example, may define the patient as owner but automatically grant full access to the primary care physician, HMO, and medical insurance provider. In other embodiments the responsible storage authority may provide a service allowing definition of policies, such that interfaces are created with appropriate access privileges. Similarly, automated change of access privileges according to policies can be implemented by external software or the interface authority.

Change of ownership; special ownership scenarios. One of the key characteristics of enduring network interfaces is that they are unique permanent information objects, with a definite ownership status. The original owner of an interface is the stakeholder who authenticated upon interface creation. The makes it possible for the owner of an enduring interface can be the legal owner of its payload—within the meaning of ownership in copyright law, intellectual property law, etc.

However, during the indefinitely long life of an enduring interface, it can be sold, rented, bequeathed, or undergo temporary or permanent change of ownership.

In embodiments, enduring interfaces can have ownership definitions which are more elaborate than a single owner. For example, in an embodiment, an enduring interface can be owned by several stakeholders such that any one of them enjoys full owner permissions; or such that only all of them together can authorize certain operations such as ownership change. In other embodiments, a primary-secondary ownership structure is possible—for example when an enduring interface is the property of a legal entity (a corporation, but a secondary owner is a natural person (an employee with effective control.

In some embodiments, an enduring interface does not maintain a record of its ownership trail—change of ownership just changes the owner identity, with no record of the change. In other embodiments, an enduring interface maintains full record of ownership change—including the time of ownership change, the stakeholder who authorized the ownership change, and the new owner. In some embodiments, temporary change of ownership is allowed, such that the identity of the primary owner is maintained, while noting a temporary owner, e.g. to enable rent/lease. In some embodiments, an owner can create a will specifying conditions under which the interface is bequeathed, namely, change ownership to a specified heir. In some embodiments, a guardian or custodian can obtain effective ownership over an enduring interface even though such change of ownership is authorized by some legal function and not by the interface owners themselves.

Running example (continued): In our running example, the standard interface API allows to assign a temporary owner, query as to the identity of the permanent owner, and set a beneficiary for the enduring interface in case of court-executed last will:

PUT https://facts.com/ae3c/set_temporary_owner/temp_owner_id=waa7&term=3 months
(set a temporary owner for example in case of rentalof the enduring interface)
GET https://facts.com/ae3c/permanent_owner
(get identity of permanent owner in case a temporary owner has been set)
PUT https://facts.com/ae3c/apply_last_will?will_id=2q91
(set the last will applicable to this object to be a certain enduring interface, which contains the required legal process and cryptographic keys to allow transfer of ownership to all enduring interface that have this will object in effect, to specified beneficiaries.)

Sub-addresses and hooks. The payload of enduring interfaces can be a complex and composite object, which consists of multiple values of data. When some of these values can be specifically names with a key identifier, it is possible to access specific components of the payload of an enduring interface instead of inspecting the entire payload. We distinguish between sub-addresses and access hooks.

A sub-address is a naturally defined key for a part of the payload. Examples include cell in spreadsheet; frame in a video; value in a form; etc. These do not have to be defined up-front; the enduring interface API can simply support API access to parts of the payload.

Running example (continued). Consider an enduring interface whose payload is a spreadsheet. The API of the enduring interface may implement a specific method such as:

GET https://facts.com/ae3c/cell/G8

An Access hook in an enduring network interface with a composite payload is a key-value pair (a property) of the enduring interface that is defined up-front at creation time and attaches a key (property name) to a particular element in the payload.

Running example (continued). Consider an enduring interface whose payload is a document, representing an employment contract. Access hooks can be defined for important values in the contract, such as employee name and address; salary; start date; etc. The value of the hooks may be entered manually; or alternatively, the word processor that was used to create a document may indicate keys of hooks as part of the document. Running example (continued): In this example, contract details may be accessed through a hook such as:

GET https://facts.com/ae3c/payload_hook/employee_first_name

An embodiment. Using plain text to define contracts, XML-type tags may be used to define access hooks. For example, the employment contract above, if written in plaintext, could read:

---

Contract entered to on <hook key="start_date"> 1/1/2019 </hook>
between ACME corp ("the Employer") and
<hook key="employee_first_name"> John </hook>
<hook key="employee_last_name"> Factual </hook>
[...]

---

WYSIWYG word processors may provide a similar facility for defining access hooks.

Applications running on enduring interfaces. One of the hallmarks of digital fragmentation is several applications (SaaS applications, enterprise desktop applications, or mobile apps) each using its own idiosyncratic storage, whether locally on an idiosyncratic database, as in the case of enterprise desktop applications, or idiosyncratic storage servers, as in the case of smartphone apps, and each only having user-facing user interface and no extensive software API to its data. Enduring network interfaces enable a different paradigm, where all application data storage is consolidated, uniform, and software-accessible on unique digital reality, and where all applications make their data transactions with enduring network interfaces. This separates data layer from application layer and enables data owners to own their data instead of nominally owning their data where in effect its data fragment is owned by the application provider. It also enables migration of the application layer without a change to the data layer, something that is next to impossible in the current paradigm.

Deleting an interface. Part of the core functionality of enduring network interface is that they cannot be deleted. An enduring interface may include, in its mutable meta-information, tags such as "marked for end of life." However, an interface cannot be deleted and will continue to respond to API requests indefinitely.

Permanent address aliases and namespaces. The universal identifier and associated network address of an enduring network interface are permanent. They are not human-readable, however. In an implementation, an interface authority allows stakeholders to register permanent universally allocated namespaces, as well as aliases for enduring interfaces, associated with a certain existing enduring interface, under their stakeholder-assigned namespace.

Running example (continued). The interface authority enables registration of stakeholder namespace; for example, a stakeholder may claim the namespace "hanover_institute" if it is available. An enduring interface owned by this stakeholder. For example, interface with identifier "j2pg" may then be assigned a human-readable alias under this namespace "hanover_institute/2020_annual report." Any API request to, "facts.com/hanover_institute/2020_annual report" is redirected to "facts.com/j2p9." If this enduring interface is migrated to a different authority, its alias migrates with it because the stakeholder namespace is universal. Namespaces and aliases are a service provided by an interface authority.

Tags. The metadata of an enduring interface may include tags—mutable free text fields that facilitate search, bookkeeping, and organization of a collection of enduring interfaces. Running example (continued). In our running example, the standard enduring interface API may include methods such:

PUT https://facts.com/ae3c/set_tag?value="financial_report_2024"
GET https://facts.com/ae3c/get_tag_list PUT https://facts.com/ae3c/remove_tag?value="financial_report_2024"

The interface authority or an external index service may then implement methods for searching enduring interfaces with specific tags.

Versions, chains, and branches. Enduring interfaces are permanent and immutable; hence their payload cannot be updated if newer versions of the same logical object become available. In an embodiment, the semantic relation between enduring interfaces, which indicates that one is a newer version of the other, can be included in the payload. In this embodiment, the payload includes the identifier of an existing enduring interface, which is the older version updated by the new enduring interface.

Running example (continued): Suppose that enduring interface with identifier "h7xk" was creating with the specification that it is a newer version of enduring interface with identifier "h7qq." The newer object can be queried to reveal the previous version associated with it:

GET https://facts.com/h7xk/get_previous_object

The response can be:

---

HTTP 200 OK
{"previous_object_id" = "h7qq"}

---

Two different enduring interfaces may reference the same enduring interface as their previous version, which creates a fork in the version history of the corresponding logical object. A reverse search implemented by the interface authority can be used to find newer version of a given enduring interface, reconstruct version chains and forks, etc.

For convenience, an implementation may define an alias that moves to the newest version in a chain of enduring interfaces. Suppose that the alias "2024 reports/CURRENT" is allocated to object with id "h7qq." When a newer version becomes available, namely whenever an enduring interface is created indicating as "previous_version" the one currently pointed at by the alias "CURRENT," the alias moves to point to the newer version.

Running example (continued): In this case, the following will be a valid API call:

GET https://facts.com/2024_reports/CURRENT/get_primary_format

Syntactic sugar can also enable direct access to the previous version of an enduring interface, instead of first getting its id and then invoking a second API call, e.g.:

GET https://facts.com/h7xk/access_previous_object/get_primary_format

Which in this example invokes the API method "get_primary_format" of the enduring interface indicated as previous version of "h7xk," instead of "h7xk" itself.

Importantly, this indication of version chains, forks and current version is a convenient addition and does not change the fact that enduring interfaces can never be changed—newer versions are added instead of overwriting previous versions.

Internal version chains. The above embodiment implements version updates of an enduring interface as a new enduring interface, indeed a chain of interfaces. In a different embodiment, the standard implementation of an enduring interface can allow version updates to the same enduring interface, namely, a new version of an enduring interface is created without changing the universal identifier of the enduring interface. In this embodiment, each enduring interface includes a list of payloads—not just a single payload; and its API enables a version update by the owner depositing a new version of the payload. All previous versions of the payload are stored and available over the API; there may be rules enforced about the changes allowed from one version of payload to an updated version, for example if the enduring interface instantiates a class (see "classes") the updated payload can be required to conform to the same class. In this case an API call can specify which payload version it should be invoked on, and citations of enduring interface make it possible to explicitly mention the payload version.

Tracking use of payload and payload access. One of the key advantages for using enduring network interfaces for information exchange, instead of files, is that the file—an inherently local object, whose access cannot be tracked—is replaced with a network service. With appropriate software bindings, consumers of information use the payload of an enduring network interface directly without saving it anywhere; this is analogous to music streaming vs saving a music file. As a result, the responsible interface authority's servers track every time a payload of an enduring interface is accessed and know the identity of the accessing stakeholder. This implies that ownership over an enduring network interface is like ownership over physical objects: access can be tracked, monetized, etc. Royalties can be collected for the use of payloads just like they are collected in a music streaming service. The access history to an enduring network interface can be stored by the responsible authority for various purposes; the event of payload access may even be mirrored and recorded as a new enduring interface.

Failure of responsible authority or suspended authority service. The system of enduring network interfaces is designed to support large-scale digital transformation, including creation of very large quantities of enduring network interfaces. This information cannot possibly be stored on a shared database, hence the notion of an authority responsible for the storage and continued availability of an enduring interface. To prepare for the eventuality of an authority failure, in embodiments, the header of an enduring interface, including owner identity, time of creation, and digital digest of payload, is stored on a shared database or propagates through a system of trusted witnesses. This way even when the payload itself is lost, integrity of collections of enduring interfaces citing the lost objects is maintained. When the responsible authority charges money for the storage service, in the event of non-payment that leads to suspended service, the authority can keep the headers of enduring interfaces and still serve them as stubs, namely interfaces without payload.

Migration: Changing the interface authorities responsible for an existing enduring network interface. The owner of an enduring interface can choose to move the interface between responsible authorities. This can happen for multiple possible reasons. In embodiments, there is a market for the service of responsible authority, and stakeholders can choose to migrate their entire collection of digital assets, stored as enduring interfaces, to a different authority. Another example is corporate M&A, where the merging company chooses to migrate its entire collection of digital assets to the authority handling the digital assets of the acquiring entity.

When an enduring interface migrates between responsible authorities, the storage of payload shifts to the new authority and the new authority becomes responsible for responding to API queries sent to the enduring interface. If there is a central registry service, it is notified; the old authority redirects queries to the enduring interface to the new authority.

Running example (continued): Suppose that enduring interface with universal identifier "wq87" moved from the responsible authority with domain "old_authority.com" to new responsible authority with domain "new_authority.com." The request:

GET https://old_authority.com/wq87/get_primary_format results in a "moved permanently" response:

HTTP/1.1 301 Moved Permanently
Location: https://new_authority.com/wq87/get_primary_format and any central registry redirects a request for object "wg87" to the new address.

Format negotiation during payload access; secondary format caching. Enduring interfaces expose API commands to query available payload formats and inspect the payload in a specified format. Software using information from enduring interfaces can negotiate a format—namely inspect available formats and choose the most appropriate one. The payload is stored in the primary format of the enduring interface, and when a different format is requested the interface authority is responsible for converting the payload to the requested format and responding to the API request. Storage authorities can make public the conversion code they use to convert between given formats. In an embodiment, enduring interfaces expose an API method to permanently convert the payload into one of the available formats; this results in verifiable execution of the conversion code executed on the responsible authority servers which in turn results in a new enduring interface, whose primary format is the requested new format.

Running example (continued): Suppose that enduring interface "gq8k" is an image, with JPEG as primary format. Querying available formats:
   GET https://facts.com/gq8k/list_available_formats
   can result in, e.g.:

---
HTTP 200 OK
{"available_formats" = "jpeg","gif","png"}
---

The enduring interface may expose a method to permanently convert the object into GIF format:
   GET https://facts.com/gq8k/permanently_convert?format="gif"
   and the response is:

---
HTTP 200 OK
'{"new_object_identifier" = "dd31",
   "verifiable_conversion" = "dsq9"}'
---

Specifying the universal identifier of the new enduring interface, and the universal identifier of an enduring interface mirroring the verifiable execution of the conversion computation.

The responsible authority may choose to cache secondary formats for an existing enduring interface—the converted payload may be stored on the metadata of the object, without changing its payload in primary format.

Update of primary format. Over the life of an enduring interface is it possible that a digital format used as a primary storage format will become outdated or even deprecated by popular software systems. This is a significant event for enduring network interfaces that use the format declared as outdated as their primary storage format: the payload is stored in the primary formats and converted to other formats only upon API requests to retrieve the payload in other formats. The payload in primary format is used to calculate the digital digest of an enduring interface, and the digest in turn is used to commit the enduring interface. A verification request intended to verify integrity and consistency of the enduring interface compares the digest of the payload in primary format, as calculated by a verifier that retrieved the payload for verification, with the digital digest committed for the enduring interface upon creation.

In an embodiment, the only way to update the primary format is to create a new enduring interface referring to the previous-version enduring interface as an older version (see "versions" above). To update the format, a conversion code is executed using verifiable execution, with the old object as input and the new object as output; the conversion code can be inspected and verified; and the new enduring interface is committed with its primary format being the new format.

De-referencing a citation from a key-value pair in an enduring network interface. As mentioned, in an embodiment, the payload of any enduring interface includes a struct/dictionary of key-value pairs. Some of these values may contain citation of other enduring interfaces—either using their universal identifier or, in some embodiments, their network address. In an embodiment, the API of an enduring interface may offer syntactic sugar to dereference a cited enduring interface and access its fields without having to obtain the universal identifier in a first API call and invoke the API of the cited enduring interface in a second API call.

Running example (continued): Suppose that the enduring interface represents a sales contract "ae3c" has a key-value pair with key "seller_id" and value "aqw8" (a universal identifier). The API can allow dereferencing like so:
   GET https://facts.com/ae3c/get_field/seller_id/get_field/first_name
   that retrieves in a single API call the value of the first "first_name" of interface "aqw8."

Enduring interface classes, instances, inheritance, and class-batch API updates. Enduring network interfaces expose API methods, and in some embodiments have as part of their payload a set of key-value pairs, namely, properties. This makes them like objects in the object-oriented programming paradigm. In an embodiment, it is possible to define a class for enduring interfaces, which specifies API methods and key-value properties, and store it in an enduring interface. A new enduring interface can then be created as an instance of this class, specifying the class by the universal identifier of the class object—namely of the enduring interface specifying the class, and the properties of the new instance (the new enduring interface). An enduring interface created as a class instance may hold in its payload or as a key-value pair the universal identifier of the class it instantiated.

Example: We can define a class for an enduring interface mirroring a contract; the class specifies that the primary format is a word-processing document and specify key-value pairs for the identities of the contract parties and the universal identifiers of enduring interfaces mirroring the consent (signature) events.

Class inheritance. In this possible embodiment, it is also possible to define class inheritance, whereby a class is defined as a subclass or inherited class from an existing class—making it easier to define new classes based on existing ones.

Standard classes. In this possible embodiment, it is also possible to have community-agreed standard classes for typical types of enduring interfaces—such as images, contracts, Python code execution events, and so on.

Class-wide API updates. Recall that API versions may be updated for an existing enduring interface. Manually updating interfaces may not be practical; however if each enduring interface is an instance of a class, in a possible embodiment, the API of the class may be updated, which results in API update for all enduring interfaces instantiated from it.

Class constructors. A class can define rules regarding allowable values for its key-value properties and regarding over parts of its payload; this code can be executed by the responsible authority at interface creation time to validate the new payload, rejecting the creation request if the new payload does not conform to these rules.

Verification of time-of-origin of an existing enduring network interface. Each enduring interface makes available through its API its time of origin and original owner, i.e. the identity of the owner who created the enduring interface. To verify this information, the verifier follows the steps of:
   Obtain the public key from the enduring interface of the identity mentioned as original owner;
   Verify that the digital signature available on the enduring interface has indeed been signed by this public key;
   Obtain the payload digest as committed from a trusted record (see "commitment" above)—for example from a trusted witness server or a shared ledger;
   Inspect the payload in original format and calculate its digest using the same algorithm used to calculate its digest at commit time; and Compare the two digests and compare the time noted on the trusted record to the time available on the APi of the enduring interface.

In an embodiment, the interface authority provides a service that follows these steps and reports the results, possibly through a call to an API of the responsible authority itself, e.g.:

GET https://facts.com/verify?id=ae3c could return:

```
HTTP 200 OK
'{"result"="verified",
  "committed_digest"="ae3c",
  "payload_digest"="ae3c",
  "committed_time"="1815140003",
  "disclosed_time"="1815140002"}'
```

Semantic types. In certain embodiments, enduring interfaces can be assigned semantic types. This is useful, e.g. for the purpose of automatic verification of compliance and consistency (see "SICCL" below). In these embodiments, the creator of an enduring interface can assign a semantic type at creation time. Types are typically immutable, and in this case, the type can simply be a key-value field as part of the payload. For example, the type can be "drivers_license," "property sales_contract," or "nondisclosure_agreement," etc.

Privacy Design Considerations in Enduring Network Interfaces

Stub interfaces. In a normal creation of an enduring interface the payload is fully disclosed to the responsible authority and is stored in the storage of the authority. The payload of an enduring network interface may contain sensitive information. While in any reasonable embodiment there are strong privacy guarantees regarding communication and storage encryption of the payload, in some cases a stakeholder could be interested in creating an enduring interface without disclosing the actual payload. In this case the interface creator calculates a digest of the payload, store the payload without transmitting it to the authority, and only includes the digest—not the payload—when creating the new enduing interface. We call an enduring interface lacking actual payload and only created with a digest of the payload a "Stub interface." In an embodiment, a stub interface exposes an API method that allows to upload the actual payload, turning it into a standard enduring interface. The payload can be verified to have the same digest as the one committed during original creation time. Stub enduring interfaces expose all the API of a similar standard interface—except for payload access methods.

Stringent privacy: Self-Authority Vs. Private unique digital reality Vs. Private payload authority. In some cases, an entity may be interested in creating a stream of enduring network interfaces (a standard use pattern of participants in unique digital reality) but may not want to disclose any payload to a responsible authority. This can be the case for example for a financial institution that can benefit from storing all its data on unique digital reality but is prohibited by regulation or by privacy concerns from disclosing any payload data to a third-party responsible authority. There are three possibilities open to such an entity:

1. Self-Authority: Establish the entity as a responsible authority. This means participating in the network of enduring interface authorities; however as the responsible authority for all enduring interfaces they produce, the entity will control the payload storage. In this case privacy of the payload is managed as usual by access control and access policies to each enduring interface.

2. Private unique digital reality: The entity can opt out, for the purpose of the enduring interfaces that should be kept private, of the shared digital reality, and establish its own private digital reality, which would be shared only internally. In this case an entire system of enduing interfaces is set up, isolated from the outside world. This of course goes against the paradigm of digital consolidation—when multiple entities each form their own siloed digital reality the primary benefits of digital consolidation cannot be realized; there are still significant benefits for using a private unique digital reality internally—this would consolidate the vertical flow internally within the entity, with e.g. benefits for transparency and self-audit within the entity; an external auditor can still audit the entity automatically based on its private unique digital reality.

3. Private Payload Authority is a middle way between joining a shared unique digital reality and using a private unique digital reality. In an embodiment, the entity can join the shared unique digital reality but only create stub enduring interfaces, that delegate payload storage to a private payload authority ran by the entity on the entity's servers or by a trusted provider. In this case there is a responsible interface authority responsible for each stub enduring interface, which may be a third party authority, and each stub interface specifies that the payload itself is stored with a specified private payload interface; the private payload interface can be a storage facility for payloads identified by the unique identifier of the stub interface they correspond to or may be a fully-functional responsible authority, where each stub interface stored by the external authority corresponds to a full enduring interface (with payload), with the same unique identifier, stored by the private payload authority.

Zero knowledge proofs; Verification of payloads of a stub collection by simple zero knowledge proof. In the scenario mentioned above, due to privacy concerns, an entity may create a collection of stubs enduring network interfaces with a responsible authority. In some cases the payloads are simply not submitted; in other cases they can be stored by the entity, e.g. on a private payload authority. A simple scheme allows a verifier to verify that the creating entity does indeed have the payloads. This scheme may be implemented adhoc, or e.g. in the embodiment of private payload authority, implemented as part of the enduring interface responsible authority core implementation and be available through an API.

In the scheme, a small subset of stubs is selected at random or is selected by the verifier. The entity storing the payloads that are not disclosed to the authority responsible for the stubs then responds by disclosing the specific payloads for the selected subset. The verifier can verify that the digital digests on the stubs indeed correspond to the disclosed payloads; because the subset was not selected by the entity, the verifier can become satisfied that all payloads are stored by the entity. To ensure continued integrity of a collection of stubs, in an embodiment, the authority responsible for the stubs can select one stub at random every minute or some determined time interval and challenge the private payload authority, presenting the universal identifier of the selected stub; the private payload identifier then responds by disclosing the payload. In this way only a tiny fraction of the payloads is disclosed, which may respect the privacy concerns of the creating entity, but still endure integrity of the collection of enduring interfaces by verifying that the entity does hold all the payloads.

Other zero knowledge proof schemes for payload verification. More sophisticated zero knowledge proof schemes are possible in specific cases for use by a creating entity that is interested in proving elements of a payload without disclosing the payload itself.

Embedded UDR modules; IoT. In an embodiment, enduring interfaces representing observed facts are created automatically by measurement devices. In this embodiment a measurement device, such as a sensor, an IoT unit, a smartphone, a card reader, etc., contains an embedded UDR module configured to communicate, over a network connection, with a responsible enduring interface authority. Interface creation may happen through API calls to the authority, issued by the embedded UDR module, or by the authority itself, based on preexisting registration configuration, or by a remote unit receiving raw data from the embedded module and issuing API requests to the responsible authority. In each case the embedded module sends a stream of measurements or request that create a stream of enduring interfaces that mirror the physical events measured by the device or sensor.

Example: physical geo-location. Consider a network-connected device equipped with a GPS antenna that determines a geo-location continuously over one or more fixed time intervals. An embedded UDR module in the device is pre-registered with an interface authority, so that the device does not have to issue full interface creation API requests to the authority. Instead, the module periodically transmits a digitally signed short message, consisting of the registered device identifier, which may itself be the universal identifier of an enduring identity interface for the device, measured time, and measured GPS coordinates to the authority. The authority creates an enduring interface for each message received. The stream of geo-locations enables an eventual verifier to verify location of the device by inspecting the consistency of the location trail (see "certification of geo-locations" below for more advanced techniques).

Shared authority and decentralized design. In the embodiments discussed so far, a single storage authority is responsible for each enduring interface. There are however other possibilities—because an enduring interface is committed upon creation, there is never any dispute regarding the contents and payload of an enduring interface—the only question is whether it is available for access and who is responsible for making sure it is permanently accessible. This responsibility can be shared: in another embodiment, multiple storage authorities can share responsibility for serving an enduring interface. The authorities keep a collection of enduring interfaces synchronized between them, using the commitments to verify that each is storing the authentic enduring interface, and using the same universal identifier to an interface even as it is offered by potentially several responsible authorities through several network addresses. The interface is still universally unique; however it may be accessed through different endpoints (the authorities) over different network addresses. In this case the responsibility for ensuring permanent accessibility does not lie with any one authority.

Server-side encryption and security. A responsible authority serving enduring interfaces stores in its storage payloads of enduring interfaces containing all sorts of sensitive information. In a preferred embodiment, payloads and metadata are stored in encrypted form and security protocols are in place make payload accessible to authorized access only. In some embodiments the authority may not hold the encryption key to the payload of certain enduring interfaces—which makes them effectively stubs (see above).

DISCUSSION

Single point of failure. Enduring network interfaces enable a paradigm shift in digital information technology. They make it possible to define every value once, horizontally across stakeholders, and make all other uses of the value by reference to single point of value definition. This corresponds to the principle of a single point of failure in system design: if the single point of value definition has a correct value, then there can be no typos or errors anywhere else this value is used.

Consider for example a person's name. Under digital fragmentation of identity, each stakeholder keeps their own separate (fragmented) record of the name associated with an identity. If a person changes their legal name, they must notify each of dozens or even hundreds of stakeholders about their name change.

With enduring network interfaces, and more generally under the paradigm of unique digital reality, there is only a single digital object representing a person's identity—the unique enduring interface corresponding to their identity. An enduring interface representing their current legal name can cite this unique interface representing their identity; systems using identity can use the universal identifier of the identity enduring interface for the unique identity, and the universal interface representing mutable details such as the legal name of the person (or their social security number, as they were at the time of a transaction; version chain (see above) can be used to update a person's name. In this way there is a single point of failure for identity and a single point of failure for a legal name.

In another embodiment, internal version chains can be used to include the legal name inside the enduring interface representing identity, with internal version updates to update legal name changes. Similarly, street names can change but the street stays the same; the paradigm of UDR, and its implementation using enduring network interfaces, enables a unique point of failure (a unique point of definition) for each unique entity, where all references to the entity explicitly cite the corresponding enduring interface instead of storing a local (fragmented) copy of the entity data.

Semi-decentralized design. The protocol for enduring interfaces as proposed here is not centralized—if anything it is analogous to a collection of web servers. In WWW, each website depends on a Web server but a page can be moved between servers. Similarly there is no single entity controlling a UDR implemented using enduring network interfaces; an enduring interface can be moved between authorities, or, in some embodiments, be served by more than one authority. Another analogy is the banking financial system where an account can move between banks.

Server interactions. Enduring network interfaces are an implementation of the concept of unique digital objects based on server interactions. Server interactions are used at essentially all stages of the lifecycle and use of an enduring interface:

a) creation;
b) commitment;
c) validation and verification; and
d) content access.

While other implementations of unique digital objects may be based on some technology that has not yet been developed, it may be argued that under existing information technology any large-scale implementation of unique digital objects must rely on server interactions. Indeed, a digital object can only be made permanent and immutable through commitment to a trusted record. the blockchain represents one possible solution—namely that all records of all digital objects ever created by any stakeholder are stored on a shared ledger. This can only support a very small number of digital objects; any large-scale implementation necessarily requires storage—of both payload and new object commitments—to be implemented through servers.

Large-scale feasibility of the technology taught. This design of enduring network interfaces can be implemented using Internet servers and other currently available information technology, to allow high volume of new interfaces created and committed, high volume of verification/validation, and high volume of payload access.

Merits of Enduring Interfaces
- An enduring network interface has an owner.
- An enduring network interface is a thing—can be sold or rented, and its use is monitored.
- Any access is a recorded event.
- Any validation/verification is a recorded event.
- Audit trails made explicit by citations.
- Visual rendering/presentation is permanently and unambiguously linked to underlying payload.
- Expressive power—real-world objects, events, interactions as well as document, forms, multimedia, and computations (see below) can be represented by collections of inter-citing enduring network interfaces.
- No unsubstantiated claims regarding data analysis.
- Information verification (including bureaucracy and back-office) becomes a software problem and can be fully automated by software.

Examples of enduring network interfaces. Here we illustrate some objects, states, and events in various realities that may be mirrored by enduring network interfaces and discuss possible implementation details and use cases of these types of enduring interfaces.
- Image. An enduring interface whose payload is an image is effectively a unique image object, with definite ownership, access control, access tracking, and universal address. Such an image can be embedded in a web page, a digital document, a physical document, a presentation, etc.—using a direct embedding command that does not involve copying the image file. As a result, the embedded image as shown on a user interface is explicitly linked to the enduring interface for the purpose of ownership assertion, access control, per-access monetization, etc. The enduring interface can be rented or sold. Also, the image stored and made accessible through an enduring is fundamentally not a file—it cannot be copied. It also transcends file formats, as image formats can be automatically negotiated through the API of the enduring interface.
- Data object. An enduring interface whose payload is a data object—for example, a data object in HDF5 format—makes the data object payload unique, universally accessible, and universally reusable. Bindings into data analysis platforms such as Python or R, spreadsheets, etc. allows reuse with explicit citation—maintaining an explicit audit or provenance trail. The enduring interface containing a data object can be explicitly linked to the execution event that created this data object—for example, by citing an enduring interface representing a verifiable execution event. Also, a data object stored and made accessible through an enduring is fundamentally not a file—it cannot be copied. It also transcends file formats, as data formats can be automatically negotiated through the API of the enduring interface.
- Form. An enduring interface whose payload is a filled form has a payload that essentially consists of key-value pairs. The values may reference other enduring interfaces, or key-value fields contained in the payload of an enduring interface. The form enduring interface is separate from its visual rendering or representation and may contain SICCL instructions that verify the consistency and compliance of the form's contents, or of the form in the context of a form portfolio.

Applications developed on top of unique digital reality. Third parties may develop applications that use digital objects in UDR. Here we examine a few possible applications that can be developed. To give concrete examples we consider UDR implemented by enduring network interfaces:
- Self-published content platforms.
- Copyright assertion.
- Search.
- Robotic data brokers.
- Citation counters for data, code, publications, news, social media, images, content.

Enduring network interface as an OS primitive. Operating systems have primitive interfaces to files over a mounted drive. Similarly, an operating system can be extended to include primitive (native) interfaces to enduring network interfaces, which allow creation, verification, and access to enduring network interfaces.

How is this different to storing files in the cloud? An enduring network interface is fundamentally different to a file stored on a cloud storage service. An enduring interface is unique, committed, explicitly owned, immutable and permanently accessible over a universal address. A file stored on a cloud service possesses none of these properties.

Implications of enduring network interfaces

Usage of digital information is based on server interactions, not local file access. We're already seeing this trend in music and video streaming, smartphone apps, etc. where the file is no longer part of the user interface. This has several key implications:
- Digital information can be owned, rented.
- Digital civil rights become possible.
- Usage of any digital information can be tracked.
- Complete audit trail.
- No More Files. Widespread adoption of enduring network interfaces or any other large-scale implementation of unique digital objects will create a world where digital information technology is completely based on server interactions instead of on files.

Example: Creating Enduring Network Interfaces as an Alternative to Local Files

Instead of:
>> save "matrix" in file "matrix.dat"
The Command:
>> publish "matrix"
Returns:
>> facts.com/ae3c
Then in Code, Instead of:
>> load "matrix.dat"
Use:
>> load "facts.com/ae3c"

Enduring Network Interfaces: Example Embodiments

1. A method for creating an enduring network interface, wherein information is submitted to a network server acting as an enduring interface authority, and wherein said authority allocates a new permanent universal address to the created enduring network interface, and wherein the created enduring network interface is accessible through the enduring interface authority.

2. The method of embodiment 2, wherein enduring network interface implements a unique digital object whose existence, ownership, properties and validity are verifiable by either human users or machine-executable code.

Detailed Description: Certification and Verification of Unique Identity

Embodiments of the invention teach a method, communication protocol, communication standard, and technical specifications for certification and verification of unique identity, and more specifically, of unique, consolidated, shared, and software accessible identity. Identities can pertain to natural persons, legal entities, organizations, physical items, as well as to characters, digital avatars, and items or objects in virtual reality or augmented reality. In the identity creation stage, core identifying details, for example, cryptographic keys, secret passwords, or biometric information, are deposited into Unique Digital Reality (UDR) as a unique identity digital object. In the verification stage, the core identifying details are presented in response to a challenge and verified against the identity digital object in UDR. An event of identification, authentication or identity verification can itself be deposited as a new unique digital object in UDR, mirroring that event. In some cases, embodiments of the invention ensure that no two separate identity objects in UDR are created for the same entity. Identities of legal entities or organizations are linked to individual identities of officers, signature right holders, etc.; identities of characters in virtual or augmented reality may be linked to identities of natural persons; identities of items and objects in virtual or augmented realities may be linked to identities of physical objects or devices.

Need: In the state-of-the-art, there is no unified notion of identity. Each person has several identities, fragmented across numerous computing systems. Most devices and items do not have any digital identity at all. For people, every digital system assigns identities to users and stakeholders, independently of other systems, and each maintains its own idiosyncratic identity system. Every website, every mobile app, every public utility company, every service provider, every government agency—all use their own home-grown identity system. Identities do not belong to a shared reality. Different stakeholders cannot share identity systems. This enables attacks such as identity theft, impersonation attacks, and phishing, which pose serious problems to individuals and organizations. The lack of a unique, consolidated, shared and software-accessible identity prevents ownership of digital assets, digital objects, and data. On a practical level, in the current state of the art, an individual needs to remember several passwords and is vulnerable to many kinds of identity theft attacks; when an individual's identity is compromised, there is no single address to turn to. Individuals cannot conclusively verify the identity of each other, as government-issued identity cards are easily forged. Indeed the notion of unified digital identity is inevitably tied into the notion of unique digital reality: any unified digital identity requires a system that supports immutable, unique, permanently accessible and software accessible digital objects. There seems to be consensus in the industry that the future holds a unified system of biometric identification for people.

Opportunity: A consolidated, unique, shared, and software-accessible identity is a crucial enabler of Digital Transformation. In certain embodiments of the invention, a small hand-held network-connected device with a personal biometric scanner is used to authenticate identity of human users and can record the authentication event in UDR. In other embodiments, user interfaces (screen, smartphones, etc.) have similar capability namely are equipped with a biometric authentication device. This can practically eliminate the use of passwords, two-factor authentication, government-issued identity cards and passports, software logins, website logins, keys, access cards, membership cards, credit cards, hand signatures, company stamps, and notary wax seals—all of which are simply mechanisms for proving identity or affixing identity.

Summary. An identity is a represented as a unique digital object UDR. Each entity in a UDR ecosystem, whether a person, an organization, a device, or an object in virtual reality, can have a most one associated unique digital identity object in the ecosystem. The universal identifier of the identity object serves as a unique identifier for the mirrored stakeholder (person/device/etc.). The unique digital identity object contains authentication information used to authenticate the stakeholder; for example, an identity object for a device, which has a private cryptographic key hard-coded, may contain the corresponding public key; an identity object for a person may contain a secure digest of their biometric markers.

Creating Identities. Generally, an entity's identity is captured as a fact in UDR that is permanent, immutable, and unique at least within a network of stakeholders. Accordingly, at a high level, creating an identity for an entity follows the same processes described above with respect to generating facts generally. Furthermore, because identity exists as a fact in UDR, identity and identity fact are used interchangeably throughout this application.

For a natural person, an identity can include any combination of identifying biometric information such as face, fingerprint, retinal scan, or genetic information, secret information known to the person such as a private cryptographic key, or a unique item possessed by the person such as a one-time password token, fob, or application; an identification card; or an image with a randomly distributed dot pattern.

For an organization, identity can be defined at the highest level of the organization such as an identity of a company or a department of a government, at one or more lower levels in the organization such as departments within a company or agencies within a government department, or both.

For devices, identity can include information unique to the device, such as device fingerprint or a unique, encrypted key stored on the device. In some cases, the identity of a device includes information about properties or behaviors of the device or specifies parameters defining how the device is to be used. The parameters specifying use of the device can be represented as a digital birth certificate, indicating a date the device was manufactured, registered, or added to a network. This information can be used, for example, to verify that a fact was created by a specified device. For example, a fact time stamped before the digital birth of the device could not have been created by the device, and thus a fact represented as being created by the device is likely inauthentic. The parameters can also be represented as a death certificate, specifying a lifespan for the device or an amount of time the device is to be allowed access to a particular network.

For example, if a device is temporarily added to a network, e.g. a visitor to a company adds his mobile device to the company network for the duration of his visit, the digital death certificate can specify that the device is to be disallowed access after a certain period. If the device attempts to authenticate itself to the network after the expiration of the specified time-period, the identity validation fails.

Regardless of the entity type, some implementations of the identity fact generator that creates and commits identity facts generates a hash of the identifying information. The identity fact generator can then deposit the hash, instead of the identifying information itself, into the identity fact data structure. The identifying information may therefore never be directly stored.

Using Identities. Identity may be used in a variety of manners in a UDR ecosystem, from identifying a person, organization, or device for access control purposes, to verifying other facts, to deducing new facts.

In some cases, an entity uses an identity to accomplish a task. These tasks can include, for example, gaining access to a physical space or an electronic resource, signing a contract, or voting. In general, when an identity is used to accomplish a task, an entity performing the task, e.g. granting access, verifies an identity presented by the entity against the stored identity fact. By way of example, a system that controls access to a physical space may verify a person's identity by receiving, from the person, the unique address of the person's identity fact and biometric measurements. The biometric measurements can optionally be received in an air-gapped sandbox device to preserve the person's privacy. The system generates a hash of the biometric measurements, accesses the identity fact using the address supplied by the person, and compares the hash against the hash stored in the fact. If the hashes match, the system grants access to the person.

In other cases, an entity uses an identity to create a fact or attest to its authenticity. For example, if a device is recording an event, such as a sensor measurement at a certain time, the device may create the fact for the event by signing the fact with the device's identity and thereby attesting that the device observed the event. When an entity is committing a fact using the entity's identity, the identity should be conclusively and uniquely identifiable such that future fact verifiers can verify the identity specified in the fact commitment.

One example implementation used to conclusively identify an entity is by digital signature: a public key is committed to UDR, along with any other identifying information, when the identity is established, and a private key is used to generate a secret to prove identity. When the entity is creating a fact, the entity can use its private key to sign the transaction such that future verifiers can authenticate the identity against the stored public key.

In another example, a person's identity can be established by collecting one or more biometric markers and committing a hash representing the markers into UDR. When the person causes a fact to be committed into UDR, a device collects the biometric markers from the person and deposits a hash of them into UDR with the rest of the fact being committed. When the fact is verified, the hashed features collected when identity was established are compared against the hashed features deposited with the fact.

The ability of the UDR ecosystem to establish a person's identity and prove conclusively that a person who appeared in two or more different instances, possibly at different times and locations and verified by different systems, is the same person is important in numerous interactions and transactions that may occur in society—from healthcare and finance to commerce and legal proceedings. Some embodiments herein teach a method, based on UDR, for submitting biometric information to UDR in a manner that protects and preserves privacy. Information can be stored in UDR in an encrypted form, where the person whose information is provided has exclusive access privileges to control by whom or what and when the information can be accessed. Based on the stored identity fact, a person can also prove to a third party that they are the same person whose information has been initially submitted.

Example Embodiments

1. A method for establishing the identity of an individual, comprising:
   providing individual-specific information that is unique to the individual;
   issuing a cryptographic keypair for the individual, consisting of a public key and private key;
   hashing the individual-specific information with a hash function, wherein the hashed information is digitally signed and encrypted with the private key for the individual
   creating a unique digital object containing the hashed individual-specific information and the public key issued to the individual 2. The method of 1, wherein the individual-specific information is a passphrase or a password 3. The method of 1, wherein the individual-specific information consists of biometric measurements 4. The method of 1, wherein the individual is a natural person.

5. The method of 3, wherein the biometric information includes any of facial information, ocular information, fingerprint information, or genetic information.

6. The method of 1, further comprising:
   verifying the unique digital identity for the individual, wherein the verifying comprises:
   providing an identifier and the private key that corresponds to the unique digital identity;
   acquiring a biometric measurement for the individual;
   hashing the acquired biometric measurement;
   using the private key, acquiring the hashed biometric information for the individual;
   wherein the unique digital identity for the individual is verified based on a matching of the hashed acquired biometric measurement and the hashed biometric information.

7. The method of 1, wherein authenticating the identity of the individual is achieved by obtaining response to a challenge regarding the individual-specific information and comparing the hash of the response with the hashed information stored in the unique digital object.

8. The method of 1, wherein in order to certify an interaction of the individual, a second unique digital object is created, which includes (i) the unique identifier of the identity unique digital object, and (ii) a digital signature, computed using the private key, which pertains to the interaction.

Detailed Description—Verifiable Code Execution

Embodiments of the invention teach a method, communication protocol, communication standard, and technical specifications for certification of individual events of code execution, namely, events where a computing device or a collection of computing device executes a specified computer program against specific inputs, resulting in specific outputs. When the execution of a computer program is recorded using the method taught, an inter-connected collection of unique digital objects is created in UDR; each object mirrors one aspect of the course of the code execution or computation, such as a variable, a function call, a result, an instruction to an external interface, etc., and the entire collection mirrors the entire event of code execution.

Uses for recorded executions. This inter-connected object collection can be later used for different purposes. For example, it can be used to certify and prove that the code execution did indeed take place, using certain inputs and yielding certain outputs; it can be used for manual inspection of inputs and outputs for an indefinite amount of time after the execution has completed; in some cases allow re-execution of the code—repeating the execution event; it can be used for counter-factual execution, running the same code on other inputs or running a different code on the same inputs; it can be used for citation and reverse-citation, tracking the use of certain information objects as they form the basis for vertical flows that eventually appear, e.g. in publications; it can be used for code citation, tracking the use of certain code bits; it can be used for advanced insight mining from a large set of recorded executions; it can be used for verifiable scientific research, connecting results that appear in the scientific literature to their underlying data and code used for analysis; it can be used to enforce data mandates, in which the data underlying a result must be available for inspection, e.g. for regulatory reasons; it can be used for data-blame, namely, locating the source of AI malfunctions as they arise from noisy or corrupt samples in the training set; it can be used for data refineries and data markets, which are predicated on the ability that certain cleaning standards were upheld and quality tests passed on a certain dataset; it can be used for proving that a certain software tests for a certain system have been executed and passed (or failed) at a given time in the past; it can be used as the basis for automatic contracts triggered by successful execution of a piece of code.

Re-execution based on the execution record may be possible. In some cases the environment in which the execution took place can be recorded as part of the recording process, for example by storing a Docker container, a virtual machine, or a list of package versions. However it is understood that the ability to re-execute may be lost in time.

VCR client and VCR repository. Before execution, the programmer connects to a Verifiable Computation Recorder (VCR) repository—a server that will gather the execution record. The repository may be local or, in a preferred use case, a permanent VCR repository; a VCR repository may be implemented on unique digital reality, where all objects created during the execution are unique digital objects. The machine executing code is running a VCR client, which handles all communication with the VCR repository.

Digital Objects Created During a Recorded Execution.

Main execution object. This object contains information regarding the entire execution, such as details on environment used or even the entire virtual machine state as of the beginning of execution, computational platform details, environment variables, etc.

Variable object. This object contains a variable—such as a string, a floating-point number, an integer, a matrix, a list of variables, an object, key-value dictionary (structure), etc.

Recorded function call object. This object contains information regarding a specific function call that occurred during the execution event—including the function code as executed, the input and output variables (recorded as separate variable objects), and any sub-function calls that were invoked during the function call.

Figure 17:
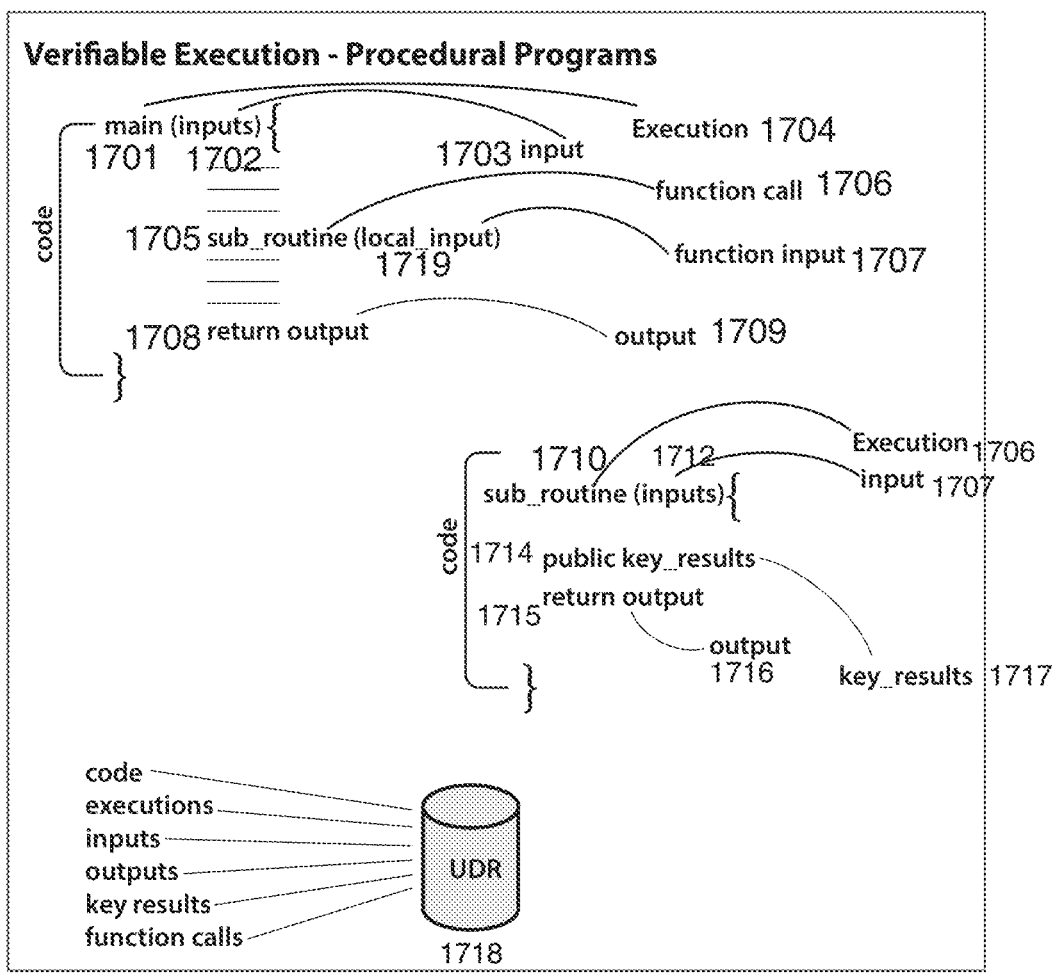
FIG. 17 shows the different unique digital objects created during a Verifiable Execution of a procedural program

Together, the collection of objects created during a computation provides a complete record of the progression of the computation process, from input variables and tuning parameters, through the order of subroutine calls and their intermediate argument values and returned values, to the outputs of the process. FIG. 17 shows the different unique digital objects created during a Verifiable Execution of a procedural program: schematic representation of program code shows main function 1701 which takes argument variable 1702, makes a subroutine call 1705 with argument variable 1719 and returns output in a return statement 1708. Execution unique digital object 1704 records the entire code execution event. Input unique digital object records 1703 records the argument 1702 passed to the main function upon execution. Unique digital object 1706 records the subroutine call 1705, with object 1707 recording the arguments 1719 passed to the subroutine call. In the code, subroutine 1710 takes input argument 1712. Object 1706 records its execution and object 1707 records the input argument it received when invoked; the statement "public key_results" (or "publish key_results") causes the local variable "key results" to be published as a unique digital object 1717, since that local variable has special importance as an output of the overall computation. The subroutine returns with "return" statement 1715, creating a unique digital object 1716 recording the value of the returned argument. After returning from the subroutine call, execution continues back in the main function. Unique digital object 1709 records the output variable 1708 returned to the operating system when the main function exists. All unique digital objects are recorded in perpetuity in unique digital reality 1718.

Data import and export. Data is imported from an existing variable object, already stored on a VCR repository. (n a preferred embodiment, data is imported from importable unique digital objects; the API of a unique digital object may implement an API method to import it into various software environments.

Running example. To import a variable stored as the payload of an enduring interface, the following command is used:

use facts.com/aqws as myvar or myvar=use ('facts.com/aqws')

The VCR clients implements this by calling an API method of the specified enduring interface by invoking the HTTP command:

GET https://facts.com/aqws/import/matlab

Which requests the object in .mat (HDF5) format, downloads it, and imports it into the variable 'myvar' matlab workspace.

In a proper use of VCR, no data is loaded from a local file.

To export a local variable with name 'myvar' in the workspace environment or the local stack) to a new enduring interface, the following command is used:

publish myvar

To which the output (returned value) can be the unique identifier or address of the new enduring interface:

\>> facts.com/aqw3

Recorded function call vs unrecorded function call.

Not all function calls need to be recorded. The programmer specifies a recorded call using a flag or decorator. For example, an unrecorded call to 'myfunc' would be, e.g.:

out=myfunc(in1, in2)

While a recorded call would be:

record out=myfunc(in1, in2)

In the latter, the input variables and output variable are created as VCR objects, as well as the function invocation itself. Note that each function invocation creates a new VCR object; for example, making two recorded function calls:

```
record myfunc (in1,in2)
record myfunc (in1,in2)
``` would result in two different VCR objects, one for each invocation.

Parallel computing executions. When a recorded computation is executed in parallel, each thread in the parallel execution can be recorded, or a few of the threads can be recorded.

Loops. When a recorded function call occurs in a loop, the VCR repository may be overwhelmed with new recorded function objects. The VCR client may choose to only record some of the iterations.

Library/standard package function calls. Sometimes, there is no point in recording function calls. This can happen when the function call is a standard library function, or a function with precompiled machine code, where no source code is locally available.

Controlling execution recording—from the programmer point of view. The language may include a keyword for recorded function call, so that the programmer may indicate which function calls should be recorded.

Running example using enduring network interfaces: Before the execution, the programmer authenticates with an interface authority. All objects are created as enduring network interfaces with this authority.

There are no files used during a recorded execution. Ideally, all data imports are done by specifying the universal identifier of previously recorded variable objects.

VCR Client implementation. The VCR client handles all VCR calls during the execution—including recording repository login, recorded function invocation, variable import from any repository, and variable export to the recording repository. In a preferred embodiment, the client can work offline—caching new VCR objects created until they can be uploaded to the recording repository over a network connection; and caching imported variables.

Example Embodiments

1. A method for verifying execution of code in a programming environment, comprising: creating a plurality of UDR objects, each uniquely corresponding to an event of machine code execution for a computer program; and subsequently verifying that the computer program was run using one or more specified inputs and produced one or more specified outputs.

2. The method of embodiment 1, wherein the creating the plurality of UDR objects includes, during execution of the computer code, depositing source code corresponding to each event or function call in UDR, including all relevant variables for each event or function call.

3. The method of embodiment 2, wherein the computer code is executed in a procedural programming language.

4. The method of embodiment 2, wherein the relevant variables comprise any of input variables, output variables, and intermediate variables.

5. The method of embodiment 2, further comprising: depositing details corresponding to the execution environment with a main UDR object that describes the program execution.

6. The method of embodiment 5, wherein the details corresponding to the execution environment comprise any of interpreter version, installed packages.

7. The method of embodiment 1, wherein the subsequent verification comprises inspecting the UDR objects with software.

8. The method of embodiment 1, wherein the inspecting the UDR objects comprises re-execution of the computer program using the one or more specified inputs, to verify that the computer program produces the one or more specified outputs.

9. The method of embodiment 1, wherein the method is performed to prove that the computer program has been tested.

10. The method of embodiment 1, wherein the method is performed to prove when a feature of the computer program has been implemented or tested.

11. The method of embodiment 1, wherein the method is performed to prove that the computer program is any of fair or non-discriminating.

12. The method of embodiment 1, wherein the method is performed to prove that a specified data analysis procedure yields claimed results.

Application of Verifiable Execution: Verifiable Computational Results in the Scientific Literature In an application of verifiable execution, the computational process that is used to analyze data and produce publishable scientific results is recorded using verifiable execution. Each publishable result created during computation (number, table, figure, image, etc.) is a unique digital object on UDR. Presentation of a result on a user interface, such as an article in PDF format, an article printed on physical paper, a website, a lecture slide deck, a poster, etc., is presented with the universal identifier of the corresponding unique digital object.

This approach offers multiple benefits:

A scientific result cannot be presented without also sharing the computation that created it; and through the computation, all underlying data sources. All underlying computation and data are unique digital objects in UDR, preserved in perpetuity.

Any scientific publication becomes an entry-point into the real resource created during research: the full collection of computations executed and underlying data. This resource is permanently software accessible. Through UDR, every computation becomes publishable, even when no result generated by it finds its way into a published article.

New scientific discoveries become possible by using software to analyze the results of all computations, as recorded on UDR.

Figure 18:
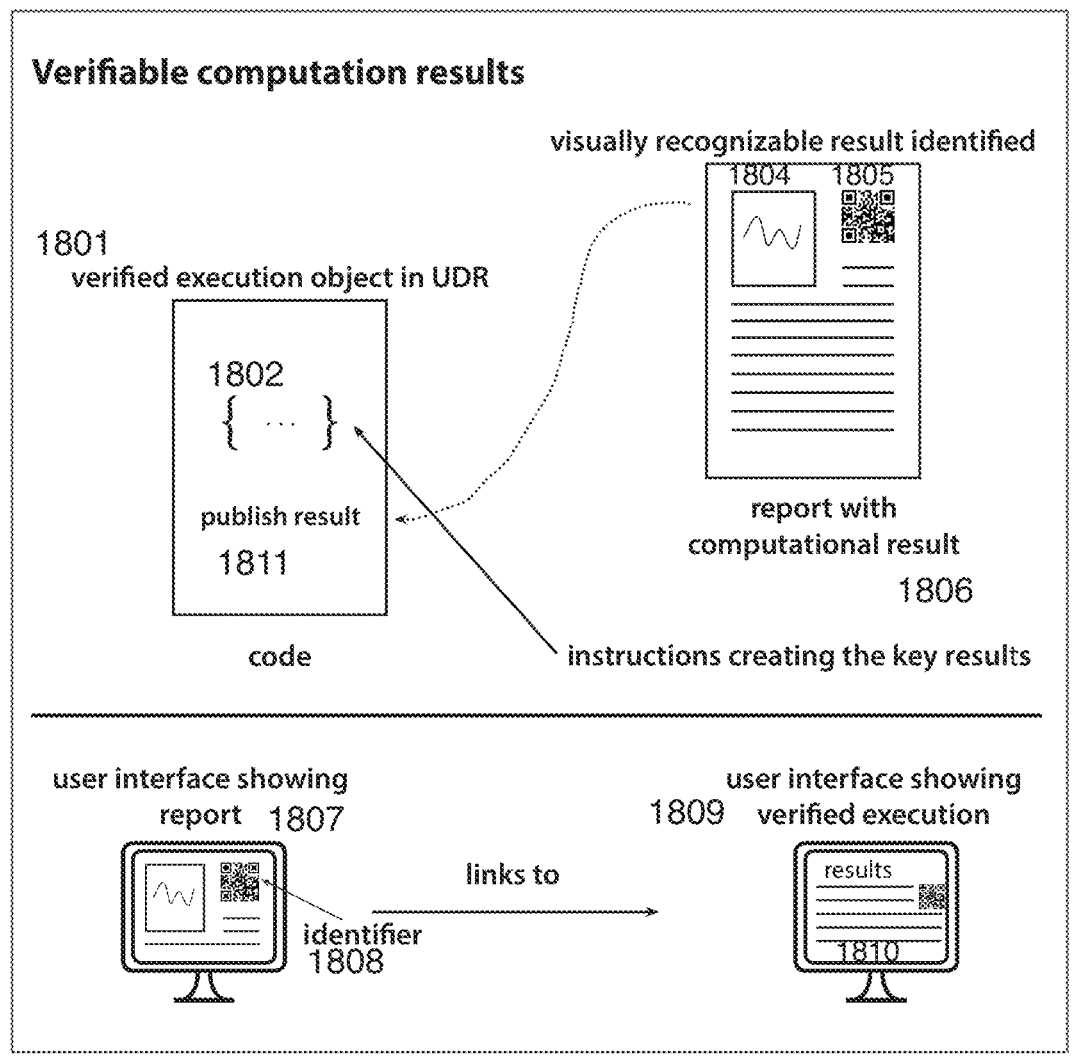
FIG. 18 is a concept illustration that shows how the method of verifiable computational results creates a permanent digital explicit unambiguous connection between machine program code used to generate important results, the execution event in which the results were created, and the publication where the results are presented, thus consolidating the vertical information flow from data through processing to presentation of results.

FIG. 18 is a concept illustration that shows how the method of verifiable computational results creates a permanent digital explicit unambiguous connection between computer program code used to generate important results, the execution event in which the results were created, and the publication where the results are presented, thus consolidating the vertical information flow from data through processing to presentation of results: report 1806 (such as a printed scientific paper, a web page, a blog post, a post on social media, or a PDF with scientific paper) presents a result 1804 (such as a plot, a chart, a table or an important number). The result 1804 is presented with a visually recognizable unique identifier 1805 that is human and/or machine readable. This identifier is the unique identifier of a unique digital object created at the "publish result" instruction 1811 in a recorded computation. The object 1811 is related to the verifiable execution object 1801 that represents the entire computation, which includes the code 1802 that performed the calculation that lead to the creation of result 1811. Using this discipline, when a user interface of any kind 1807 shows a result with unique identifier 1808, it may be used to inspect the computation 1810 that lead to the result including its program code, input and output variables as observed in execution time, and any intermediate variables and subroutine calls. User interface 1809 can be used by a user to inspect the computation or analyzed automatically in software as all unique digital objects involved are machine-readable.

Figure 19:
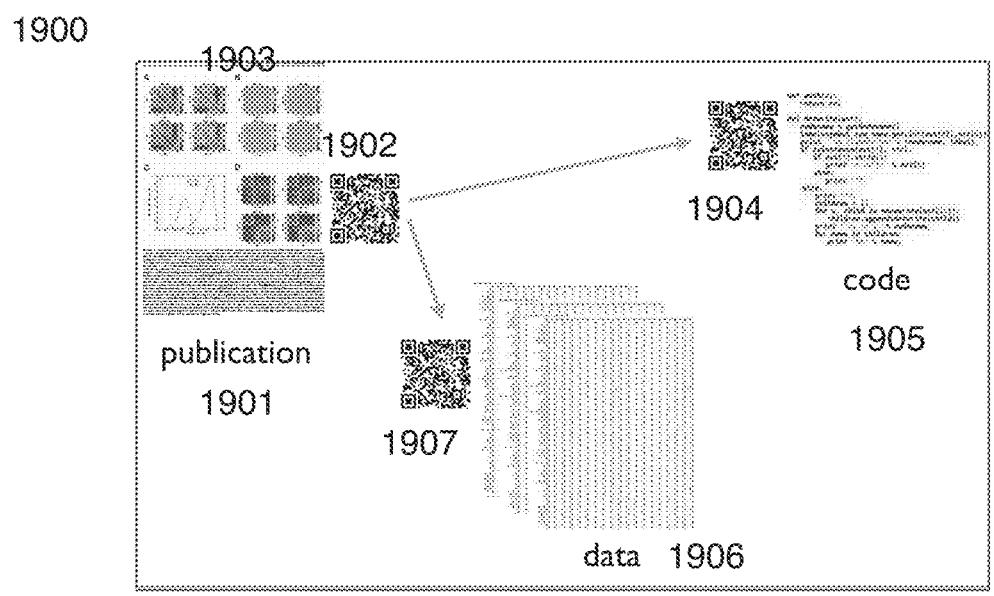
FIG. 19 shows the explicit permanent digital connection made using the method of verifiable computational results between published results, underlying data, and underlying code.

FIG. 19 shows the explicit permanent digital connection made using the method of verifiable computational results between published results, underlying data, and underlying code: publication 1901 contains a published result 1903 shown with unique identifier 1902 which may be human and/or machine readable. The identifier 1902 is the unique identifier of a unique digital object describing the result as it was created during the recorded execution. That unique digital object is connected to program code 1905 used in the recorded execution, represented by an "execution" unique digital object with unique identifier 1905, and to data 1906 used in the recorded execution represented by a unique digital object with identifier 1907.

FIG. 20 is an illustration of computational science workflow under current state of the art, where data is loaded from a local file and result is exported to a local file. This is a case of vertical digital fragmentation, as indeed the connection between the data and code used to generate the result is irretrievably lost and the result file is siloed from its provenance trail along the vertical computation flow. The document processor creating the publication loads the result from a local file, which contains no trace of the manner in which it was generated. Anyone inspecting the result file, or the result was included in a publication, and interested in reconstructing, inspecting, or verifying the vertical information flow as it lead from data and code to result, will be effectively undertaking a forensic project.

FIG. 21 shows a schematic representation of the stages of vertical information flow in the field of scientific research and publication in the state of the art.

FIG. 22 shows a schematic representation of the stages of vertical information flow in the field of scientific research and publication under the discipline of file-based reproducibility, in which the data files and code files are preserved for published results.

FIG. 23 is an illustration of computational science workflow using verifiable computational results: the "repository" command specifies a universal identifier namespace or the equivalent of an enduring interface authority where unique digital object can be accessed. Data is not loaded from a local file but by specifying the unique digital identifier of the data unique digital object; result is not exported to a local file but to a unique digital object (using a keyword such as "verifiable", "public" or "publish" as above). The verifiable execution does not create local files; rather it creates unique digital objects and returns a unique identifier to result unique digital objects and the execution unique digital object. Finally, in a document processor, the result is embedded in the text not by loading a local file but by specifying the unique identifier of the result object; the document graphics is rendered such that the result identifier is shown visually. This consolidates the vertical information flow and maintains an explicit permanent connection between visualization of published results, underlying recorded execution, underlying code and data used in the execution.

Figure 24:
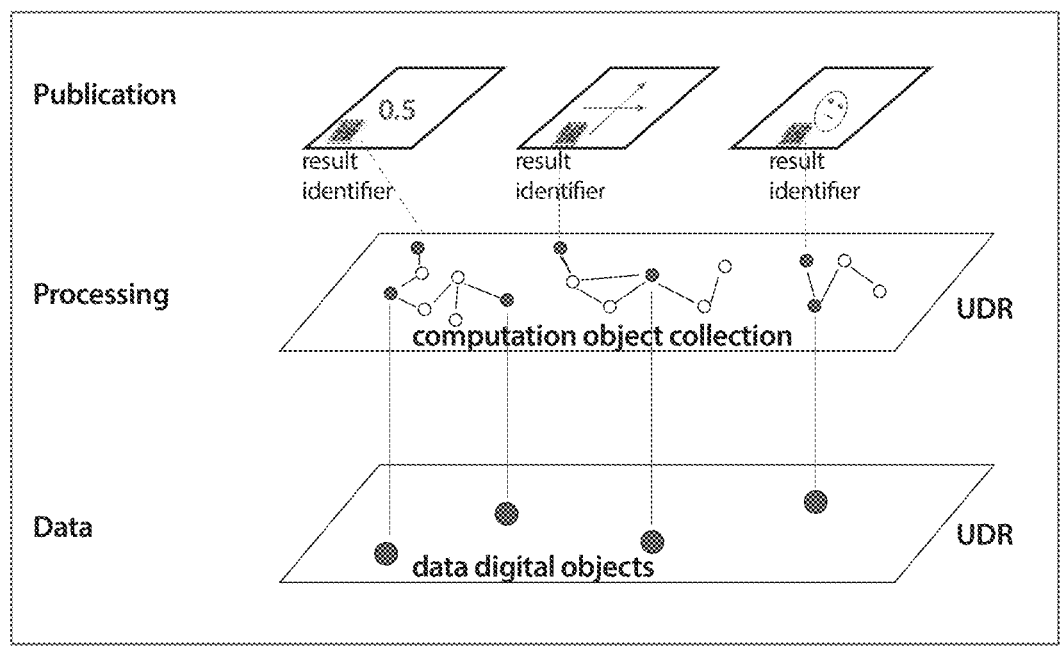
FIG. 24 shows a schematic representation of the stages of vertical information flow in the field of scientific research and publication under the verifiable computational results method.

FIG. 24 shows a schematic representation of the stages of vertical information flow in the field of scientific research and publication under the verifiable computational results method: data digital objects are represented as unique digital objects; recorded execution events are represented as unique digital objects that maintain explicit permanent digital connection (by citing unique identifiers of unique digital objects) to the data used in the computation and to results produced in the computation. Results visualized in publication present machine and/or human readable unique identifiers to result unique digital objects, which are in turn connected to the recorded execution objects representing the executions that created them.

Detailed Description—Standard Information Consistency and Compliance Language (SICCL)

Many processes in government, bureaucracy, accounting, business, law, and insurance boil down to verification of certain consistency and compliance requirements in a set of information objects. Here are a few examples:

An external auditor is required by law to verify the compliance and consistency of corporate financial records underlying its annual financial statement; this includes a large set of documents consisting of invoices, receipts, contracts, salary slips, bank statements, credit card statements, tax forms, etc.

An entity acquiring a corporation is interested in verifying that the corporation's books and records are in order.

When a loan application submitted to a bank, the bank is required to verify compliance and consistency according to some requirements and interested to verify according to possibly additional requirements.

When a tax return form is submitted to the tax authority, the latter should verify consistency and compliance of the set of documents which consists of the tax return form and any attached documents such as salary slips, previous year's tax return forms, invoices, receipts, etc.

A corporate human resources department is interested in verifying compliance with government employment regulations. This means, in part, that every employee must sign certain forms, and corporate HR management must sign certain forms with regards to the employee.

In corporate M&A, the buyer is interested in performing legal due diligence on the acquired/merged entity. This means, in part, verifying a long list of contracts, such as shareholder agreements and employment contracts; verifying consistency of financial statements; verifying consistency of equity cap tables with signed equity allocation contracts; etc.

There is a de facto industry dedicated to information consistency and compliance. This industry is not recognized as such, as it is dispersed throughout numerous sectors such as healthcare, medical billing, accounting, insurance, legal services, government corporate compliance, etc. The service provided by this de facto industry revolves around verification that requirements are satisfied in collections or documents. This industry includes, e.g. medical billing, medical insurance, insurance underwriting and claims processing, government bureaucracy, corporate back-office and accounting, external auditing, corporate legal services, etc.

Throughout this industry, requirement verification service is provided by humans: even though the requirement verification process is inherently algorithmic and linear, it has not digitized and remains entirely manual.

Automated fact verification. Every bureaucratic form, and many formal documents, are essentially a collection of key-value pairs; where the values are either information pieces or pointers or references to other forms/documents. In current state of the art, in a document (physical or digital), reference to another document is typically implicit, namely the other document is not references unambiguously using a universal permanent identifier or address, and therefore it is a manual task to dereference the pointer and find the other document referenced.

Consistency and compliance requirements revolve around key-value pairs in the set of information objects in question, and around syntactic types of these objects. A requirement may concern key-value pairs in a single object, or key-value several pairs across several information objects, e.g. several forms. For example, a consistency requirement will require that value of a pair in one object is equal to value of a pair in another object. Even when information object is not a collection of key-value pairs, such as a PDF document, compliance can concern specific information within these objects.

ICC Requirements. Information Consistency and Compliance (ICC), with respect to a specific set of information objects, is a list of requirements regarding:

Content values of the information objects in the set, for example: the field "per-diem reimbursement" in this form cannot be higher than 150 Euro.

Syntactic type of the information objects in the set, for example: this document must be an employment agreement.

Relations between the information objects in the set, for example: the field "owner" in this form must refer to an identity of a natural person, and the field "seller" in that form must refer to an identity of a natural person, and these identities must be equal, namely, must refer to the same person.

If the list of requirements is fully satisfied, then the set of information objects in question is consistent or compliant. Otherwise, there are specific requirements that are not fulfilled—namely specific violations of the requirements.

The premise underlying automatic verification of ICC requirements is this:

1. The primary reason why ICC verification has so far remained a manual, human-focused task is that the information object used to exchange information between arm's length counterparties are documents—both digital and physical. Both information content on documents is not software accessible and cross-document citation is implicit and can only be inferred by human reasoning.

2. A transition from documents to unique digital objects on UDR as primary information objects lifts this barrier: unique digital objects are permanently software-accessible and expose their key-value pairs for software access; unique digital objects explicitly reference each other using their universal identifier. It thus becomes possible to express ICC requirements in machine-readable form.

Standard Information Consistency and Compliance Language (SICCL). We describe a machine-readable language that makes it possible to specify ICC requirements in a machine-readable way. We generically call a language of this kind Standard Information Consistency and Compliance Language (SICCL). Our description is generic: in some embodiments of this invention, SICCL can be implemented using existing computer languages, such as Python, while in others it can be a new machine-readable language. It is possible to create such a language, where machine-readable instructions resemble a human-readable language, such as English. When a SICCL script is executed against a given collection of information objects, it results in either (i) confirmation that all requirements are met in the given collection of information objects, or (ii) a list of requirements that are not met (with details). In a preferred embodiment, the collection of information objects is a collection of unique digital objects on UDR; however the invention transcends any system of information objects.

Preferred embodiment with unique information objects. Automatic verification of consistency and compliance is possible with unique information objects. Indeed, to enable automatic ICC verification, the information objects used must be permanently accessible by software, and uniquely addressable. Moreover the unique information objects must have two additional properties: they must have key-value pairs accessible, as well as syntactic types, available for software access.

Figure 25:
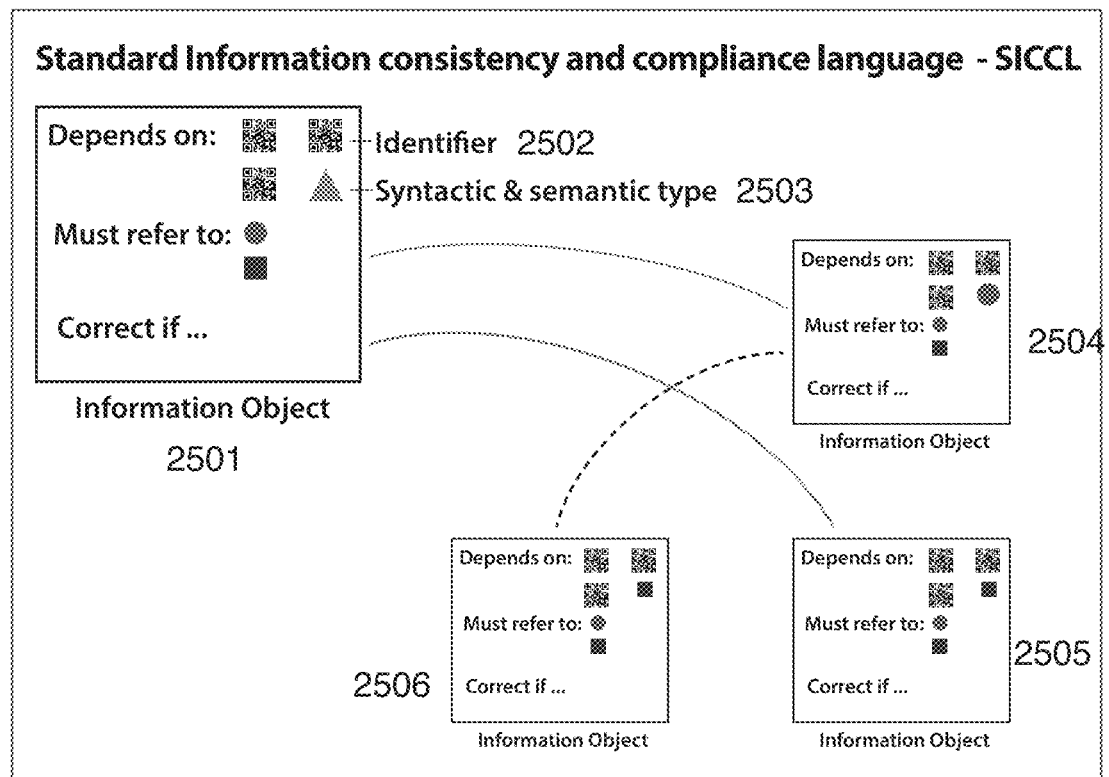
FIG. 25 is a schematic example of typed citation constrains that may be defined in SICCL.

FIG. 25 is a schematic example of typed citation constrains that may be defined in SICCL: Information object 2501 has a unique identifier 2502 and a defined semantic and/or syntactic type 2503. In this example, a SICCL specification mandates that it must contain citations to two different object types. Information object 2504 satisfies the first requirement, while information object 2505 satisfies the second requirement. Information object 2504 in turn must also refer to objects of specific types, and so on.

An embodiment with enduring network interfaces. Enduring network interfaces are an implementation of unique information objects. Two additional properties, not necessarily available in the simplest embodiment of enduring network interfaces, enable automatic ICC verification on collection of enduring network interfaces.

Syntactic types. In an embodiment of enduring network interface, the enduring interface is assigned, at the time of creation, a syntactic type from a list. The type can be queries using the enduring interface's API.

Key-value payload and API access. The enduring interface makes available over its API a list of key-value pairs. These pairs are part of the payload, namely are immutable. The values can consist of string, number (or other relevant data types), pointer (universal identifier to other enduring interfaces), pointer+field (referencing a field in another object), arrays of values or key-value lists. In the two latter cases, the allows value types are recursively defined.

An Embodiment (Running Example): Object-Oriented Standard Information Consistency and Compliance Language (SICCL) Resembling Java.

In an embodiment, an object-oriented language is used to define an enduring interface with key-value fields; create an enduring interface with key-value fields; and define consistency and compliance requirements. Other embodiments are described below. Here, for example, we use syntax resembling that of the Java programming language; however our description is general and does not depend on any implementation or choice of syntax. We choose Java since it is typed; and because class members of a non-native type (a predefined class type) are references (pointers) which fits well the notion that a unique digital object can refer to other unique digital objects.

In our running example, there are pre-defined (native) syntactic types. User-defined classes can be defined to create new syntactic types. A user-defined class inherits from either a native or a user-defined class (syntactic type). A class defines class members, i.e. key-value fields that each instantiated object has. Values are typed; they can be numbers of strings, or from a syntactic type, in which case the value is a reference, or pointer, to another object; or structs/lists of key-value pairs.

In our SICCL running example, we assume a UDR implemented using enduring interfaces, where an enduring interface can implement a user-defined class in our SICCL language. All class members are contained in the payload of the enduring interface; however the payload can contain other pieces of information beyond the class members.

Running example: Rent contract. A rent agreement specifies the identity of a property owner, the identity of the renter, the property being rented, the monthly rent, the duration of contract, the maximum delay in rent, the penalty incurred for late rent, and so on. Suppose that our SICCL Java-like language includes the following pre-defined syntactic types:

ID (unique identity of a person)
PROPERTY (unique identity of a real estate property)
CURRENCY (US Dollar amount,
ABSTRACT_CONTRACT (an abstract type defining a contract)
As well as the primitive types:
INTEGER (non-negative whole number)
DATE (a calendar date)

In the Java programming language, any value that takes a user-defined class value is known as a reference and contains the memory address of an object that instantiated that class. In our SICCL running example, however, any value that takes a user-defined class value contains the universal identifier of an enduring interface instantiating the specified class. This is an important difference: while Java objects live on the heap of a specific execution process, (in the memory of a specific machine), SICCL objects in this implementation live as permanent objects on UDR as enduring interfaces. This enables horizontal consolidation, as many different stakeholders at arm's length can each write code that interacts with these objects. A different possible embodiment will use a Python-style language or can be directly implemented in Python where class is not strongly typed and instead ICC requirements that translate to type specification for class members are enforced using assertions, e.g.:

if not (typeof (owner)==Identity) then . . . .

The declaration of a new syntactic type for a rent contract can be:

```
class RENT_CONTRACT (ABSTRACT_CONTRACT) {
  ID owner;
  ID renter;
  PROPERTY rented_property;
  CURRENCY monthly_rent;
  DATE start_date;
  DATE end_date;
  DATE date_of_ first _monthly_rent_due ;
  INTEGER max_rent_delay_in_days ;
  CURRENCY penalty_for_each_day_late_after_max_delay;
  violation_list = verify_requirements( ) {
    /* see below */
  }
}
```

This defines a class 'RENT_CONTRACT' that inherits from 'ABSTRACT_CONTRACT.' The definition itself already imposes certain ICC requirements: each field must be of the type specified. The types ID and PROPERTY are syntactic types, hence the value must be a universal identifier of enduring interfaces of the correct type. The other types (CURRENCY, DATE, INTEGER) are primitive types defined in the language.

Given this type declaration, we can create a new enduring interface of type "RENT_CONTRACT" by instantiating this class:

```
this_contract = new RENT_CONTRACT (
  owner = 'facts.com/awjs', /* universal identifier in UDR. */
  renter = 'facts.com/8q21', /* universal identifier in UDR */
  property = 'facts.com/qmas', /* universal identifier in UDR */
  monthly_rent = 900,
  start_date = "1/1/2020",
  end_date = "31/12/2020",
  max_rent_delay_in_days = 10,
  penalty_for_each_day_late_after__max_delay= 100
)
```

Note: for the sake of easily read example, here we use Python-style named parameters, which isn't really Java.

Note how different this object is to a document rent contract, for example. In a document (state of the art) rent contract.

All these are best practices in software development; what makes such a rent contract revolutionary is that it exists, as a software-accessible object.

Formal specification of fact validity. A syntactic type can include additional requirements. including constraints, consistency conditions, deductions, and dependencies.

In our running example, we show how constrains can be written in our SICCL Java-like implementation. Continuing the example from above, the class RENT_CONTRACT implements the ICC requirement verification method 'verify requirements ( ).'

Direct value constraints. SICCL constructs allow declarations such as the following, making sure that the values fields obey the stated constraints:

ASSERT end_date>start.date

If a constraint fails to be satisfied, the fact language script will either fail to complete successfully or will complete successfully and add the unsatisfied constrain to a list of violations returned (as in the above example).

Assume, for example, that a law prohibits late rent fees per day to be more than ten times the going rent per day. In this case, we have the following constraint, which derives from the regulatory requirement:

```
ASSERT penalty_for_each_day_late_after_max_delay >=0
  AND
    penalty_for_each_day_late_after_max_delay <=
  10* (self.mothly_rent / 30)
```

Consistency conditions. In a document collection, there are conditions that require consistency of fields across documents. This is a different kind of constraint, referring to fields in cross-referenced documents. For example, consider the consistency condition that the owner listed on the rent agreement is the same owner listed on the property title:

ASSERT property.owner==this.owner

This equality conditions enforces an equality of universal identifiers of unique digital objects. Note that this condition assumes that the PROPERTY type has a field with the name as 'owner' and type as 'ID.'

Dependencies. In a document collection, there are internal dependencies. The validity of a document depends on the validity of another document. In our rent example, the validity of the rental agreement depends on the validity of the identity of the owner and renter, and the validity of the property title.

Suppose that any SICCL user_defined object implements a method 'verify_requirement( )' that returns true or false, or, in more advanced implementations, returns a list of errors in which the constrains are not satisfied:

```
verify_requirements ( ) {
    ...
}
Then in our running example the full method might be:
violation_list = verify_requirements ( ) {
    ASSERT end_date > start.date
    ASSERT penalty_for_each_day_late_after_max_delay >=0
        and
        penalty_for_each_day_late_after_max_delay <=
10*(self.mothly_rent/30)
    ASSERT property.owner == this.owner
    ASSERT owner.valid ( )
        and
        renter.valid ( )
        and
        property.valid ( )
}
```

Invoking a subroutine call for the 'verify requirements' method of the fact objects in owner, renter, and property fields.

This method demonstrates direct value constrains, consistency conditions, and dependencies.

A different implementation might be to use an abstract class, listing dependencies, direct value constrains, and consistency conditions separately:

```
Abstract Class SICCL_TYPE{
    dependencies = [ ]   # an array of object of type Fact
    value_constrains = [ ] # an array of constrains
    consistency_conditions = [ ] # an array of consistencies
    def verify_requirements ( ) {
        for d in dependencies: d.valid ( )
        ...
    }
}
```

Continuous and real-time ICC verification. In a preferred embodiment, where all object and unique digital objects, ICC requirements are either satisfied or unsatisfied, and, because unique digital objects are immutable, once an ICC script passes, it always passes.

However, consider a situation where ICC requirements are applied to mutable objects, or to a unique digital object referred to by a latest-version pointer (see description of enduring interfaces above). This may be the case, for example, if an ICC requirement concerns some stock price; each tick may be published as an enduring interface with version control, and a name can be assigned to the latest version, or in this case, the enduring interface that contains the most updated tick. In this case the ICC satisfaction can change over time: a change in the state of an object from valid to invalid (in terms of SICCL constrains) can cause a dependent object to become invalid. It is often of interest to know the current validity status of a fact. When executing a valid script, we get the up-to-date status. Any change in validity of facts upon which we depend will be reflected in an update of the status of the dependent fact. For example, the rent fact object is no longer valid if the property title stops being valid or if the property changes ownership.

In our running example, consider rent payments. If each payment is deposited into UDR as a unique digital object (an enduring interface and reference the universal identifier of the rent agreement toward which it was applied, then the rent agreement object can have a status that changes in real time to reflect on-time payment status. The rent agreement object will have the array of payments made, where each entry in the array contains the universal identifier of the payment object (again, in Java style):

PAYMENT[ ] payments;

When a payment is made, the universal identifier of the last payment is appended to the end of the list.

The valid( ) code checks that payments that were made so far were made in time:

```
For p in payments:
    ASSERT p.value >= monthly_rent        /* all payments cover
agreed rent */
For i=1:length(payments).   /* all payments were made on time */
    ASSERT p.date <= this.first_rent_due_date  + (i-1) * 30
num_month_passed = months_ passed (today.date ( )  ,
this.first_rent_due_date)
    ASSERT length(payments)  >= num_month_passed
```

And so on. This script may return different results when executed in different times, so that real-time verification status is important; it can be visualized on a user interface (see 'presentation of information' below).

Actions. A fact's status implies the actions that were taken. If rent was not paid, the agreement can specify that renter's key card can now not open the door to the property. Suppose that the contract class defines the rent_payments_too_late method that checks that all payments have been made, and that the last payment is not too late. Then an action can be defined in the 'valid' method:

```
If self.rent_payments_too_late ( )
    door.renter_key.invalidate ( )
```

This is an action that depends on the fact status.

Another example is a loan agreement that can specify payments to be made:

```
make_payment (from=borrower, to=lender, amount=
self.monthly_payment.value)
```

Below are examples of algorithmic contracts:

Script Examples

```
// verify that employee was current at time of trip
assert self.employee.is_employed (self.begin_date)
assert self.begin_date < self.end_date <= today( )
// same for authorizer
assert self.authorizer.is_employed (self.date)
// can this authorizer authorize for this employee
Assert self.authorizer.can_authorize(self.employee)
for receipt in self.receipts:
    assert receipt.employee == self.employee
    assert receipt.location == self.trip_location
    assert receipt.date >= self.begin_date
    assert receipt.date <= self.end_date
```

SICCL that is Both Machine-Readable and Human-Readable

It is possible to create SICCL implementations that read just like English; more generally it is possible to create SICCL implementations that are easily human-readable in some human language. This allows individuals who are not programmers to read, understand and approve ICC requirements; with automated ICC the role of accountants is to approve SICCL scripts, not to verify ICC conditions manually. Indeed in the current state of ICC industry, some of human labor amounts to manually executing such scripts.

For example, the script specification could be:

```
real_estate_transaction_requirements (Document1, Document2 ) {
    Document1 (hereafter "sale contract") must be of type "contract"
    Document2 (hereafter "Property title") must be of type "title"
    Contents of "seller" field in "rent contract" must equal contents of "owner" field in "property title"
}
```

And script execution could be:

```
>> binder ("facts.com/swq9","facts.com/lkw3")
>> verify real_estate_transaction_requirements on binder
```

Storing SICCL class definitions in unique digital objects. Class definitions themselves can be objects in UDR (the code is the payload) so that UDR is the codebase. A SICCL interpreter gets the identifier of a class and instantiates it.

SICCL wrappers. An enduring interface whose payload includes a composite object such as a document, a spreadsheet, or a presentation, can expose key-value fields granting software access to specific values in the object. In a possible embodiment, word processors allow the user to specify a key corresponding to a value that appears as part of the document. For example, an XML document can use tags such as:

```
"The seller <field key='seller'> ID 6557676 </field> agrees to sell ..."
```

SICCL scripts can then explicitly refer to key-value fields embedded in the document or composite object.

SICCL sub-classes and type hierarchy. Type hierarchy can be included in object specification: e.g. requirement "contract" is satisfied by "rent_contract."

In our running example, the class (syntactic type) 'RENT_ CONTRACT' can be sub-typed to represent a specific type of rent contract, e.g.:

```
class OFFICE_RENT_CONTRACT (RENT_CONTRACT) {
}
```

Using SICCL with Verifiable Execution. In a preferred embodiment, a SICCL script or program may be used to define validity and/or compliance of a collection of information objects, such as a collection of machine-accessible documents (see for example "Next Generation Documents" below). SICCL scripts or programs are machine-executable; in an embodiment, SICCL interpreter, compiler or virtual machine allows execution of SICCL scripts against a specified collection of information objects, such as a specified collection of unique digital objects in UDR. The SICCL execution will then proceed to check the various conditions regarding types, typed citations, key-value fields, information consistency, value constrains, etc, defined in the SICCL script or program. The output of the SICCL execution is either an "all clear" output, meaning that all constrains and conditions are met, or otherwise a list of specified violations of constrains and conditions in the information object collection.

Figure 26:
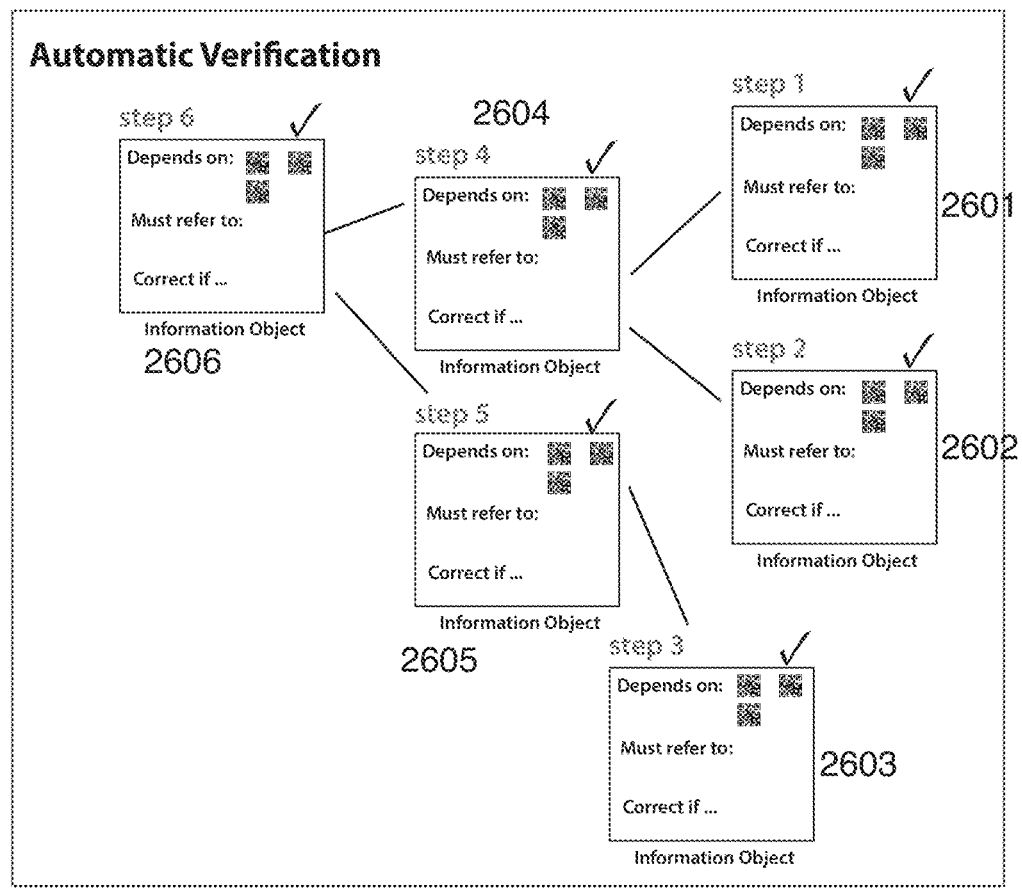
FIG. 26 provides a schematic illustration of the SICCL script execution on a collection of six information objects, for the purpose of automatic verification of certain ICC conditions by the collection.

FIG. 26 provides a schematic illustration of the SICCL script execution on a collection of six information objects, for the purpose of automatic verification of certain ICC conditions by the collection: the collection consists of information objects 2601-2606. In this example, SICCL conditions are checked using a depth-first search (DFS) algorithm, such that SICCL conditions pertaining to information objects 2601-2603 are checked first, followed by conditions pertaining to information objects 2604, 2605 and 2606.

The definite knowledge that a SICCL script has been executed on given inputs to produce given outputs can thus be of great import and value, as it replaces human verification of ICC conditions encoded in the SICCL script. Verifiable Execution (V/X) be used in conjunction with SICCL to create unique digital objects that record the execution of a SICCL script, thus enabling verification that a given set of unique information objects satisfy a given set of ICC requirements. Specifically, when the execution of a SICCL script is recorded, and produces a set of unique digital objects, these recorded execution unique digital objects act as certificates, or proof, that the ICC conditions encoded in the SICCL script were either upheld or not upheld in a specified collection of information objects.

GUI for defining objects and ICC requirements. SICCL allows definition of ICC requirements through a machine-readable language. In a possible embodiment, a graphical user interface (GUI) can be used to define ICC requirements in a user-friendly way.

ICC Requirement Verification with SICCL Vs. Prior Art: A Comparison

Government audits, corporate due diligence, corporate external audit. In current state of the art, audits, and verification of compliance with regulation is mostly verified manually. Using SICCL, it can be verified automatically.

Real-estate transactions. Real estate transactions essentially consist of a collection of documents that satisfy a long list of ICC requirements: for example, the identity of the seller, the identity of the owner, the identity of the buyer, the identity of the property, the sale price, taxes paid, regulatory requirements met, etc. If a mortgage or bank financing is involved, the list is even longer. In a digitally transformed world, every real estate parcel is mirrored by a unique digital object on UDR. In current state of the art, in developed countries real estate property records are fragmented between different city, country, state and national registrars—in different digital or paper formats; in countries with a real estate registrars, there are no records at all.

Use case of Information Consistency and Compliance and: Automated verification of receipt cycles Interaction Cycles and their verification. One common type of ICC requirements concerns interaction cycles. We discuss it here to demonstrate that the notion of ICC and SICCL, as taught here, are very flexible and can be used with great benefit in a large variety of scenarios.

A transaction cycle uses multiple facts, which often describe verifiable interactions (see Interactions above). These interactions occur between multiple parties. Most of them occur between a primary party and other secondary parties. Typically, the primary party is the fact presenter, who is interested in presenting the entire cycle, including all facts it uses, for verification by a fact receiver. Verifying the entire collection or cycle requires more than verifying each individual fact or interaction: there are consistency rules that must be fulfilled. When all of them are fulfilled, we can say that the cycle is complete and has passed verification.

Example: A purchasing (receipts) cycle. The primary party in the receipt cycle is the company purchasing an item or a service. The minor parties are the supplier (seller of the item or service), the bank or credit card company clearing the payment, and, optionally, the delivery company. The fact receiver/verifier is typically a government tax agency as the purchasing company submitted the expenses as part of their business costs.

Alternatively, the dominant party may be the supplier collecting the payment; the minor parties are the customer/buyer, the bank, and the delivery service, and the fact verifier is the government tax agency as the supplier reported revenue generated by the sale. The interactions can be placed on a time axis. See Table 7.

TABLE 7

Purchasing Interactions

| Time (progresses down) | Customer | Supplier |
|---|---|---|
| | Quote request -> | |
| | <- Quote | |
| | Purchase order -> | |
| | <- Proforma invoice | |
| | Payment (through bank) -> | |
| | <- Invoice | |
| | <- Receipt | |
| | <- Delivery (though delivery service) | |
| | Delivery confirmation -> | |

Verifying the cycle may include:
Verifying each document.
Verifying that the cycle is complete; all the required steps have been accomplished.
Verifying consistency—The price on the quote, proforma, payment, invoice, receipts, etc. all match, the item serial number on all the documents match, and so on.
Verifying constraints—The document advances in chronological order, for example the delivery date is not earlier than the purchase order date.

Often, necessarily includes information objects from different stakeholders in a multi-party process such as the receipt cycle, or real estate property transaction.

The primary party in the receipt cycle is the company purchasing an item or a service. The minor parties are the supplier (seller of the item or service), the bank or credit card company clearing the payment, and, optionally, the delivery company. The fact receiver/verifier is typically a government tax agency as the purchasing company submitted the expenses as part of their business costs.

Alternatively, the dominant party may be the supplier collecting the payment; the minor parties are the customer/buyer, the bank, and the delivery service, and the fact verifier is the government tax agency as the supplier reported revenue generated by the sale.

Example: A commercial flight cycle. The primary party on a flight is the passenger. The minor parties are the airline, the airport handling services, and the bank or credit card company used for payment. The verifying party is a company, the corporate auditor, or the government if the travel is considered a business expense.

The interactions can be placed on a time axis. See Table 8.

TABLE 8

Airline Interactions

| Time (progresses down) | Passenger | Airline/handling service |
|---|---|---|
| | Airfare quote request -> | |
| | <- Airfare quote | |
| | Payment (through bank) -> | |
| | <- Invoice | |
| | <- Receipt | |
| | <- Airline ticket | |
| | Check-in -> | |
| | <- Boarding pass | |
| | Boarding pass scan on boarding -> | |
| | <- Deliver luggage at destination airport | |

Example: Medical care cycle. The period spent in a hospital, from hospitalization to patient discharge, is a complete transaction collection. It includes an atomic unit for medical purposes and an atomic unit for medical billing purposes.

Documents/facts can include, for example, admittance documents, examinations by physicians, drugs administered, blood work and other tests, medical imaging, etc. This is a potentially large collection of interactions and handshakes between the patient (the primary party) and physicians/other medical staff/medical devices/drugs (the secondary parties).

Collecting all these documents/facts/UDR objects into a single coherent structure is very valuable for efficient tracking of medical billing. Much of auditing work of medical claims revolves around making sure that all required documents have been submitted with the claim, that all dates match, that prices for procedures match agreements, that all tests reported and that drugs reported in the claim were administered, etc. A fact language script makes it possible to assert correctness of an entire collection automatically. Consider a medical exam cycle, in which a physician refers a patient in a hospital to an X-ray examination. In this example:

```
% h is the handshake array in the cycle
% r is the request array in the cycle
% h[0] is the admittance handshake between the patient and the
office
% h[1] is the handshake between the physician and the patient
% h[2] is the handshake between the patient and the X-ray
technician
% r[1] is the request for examination
ASSERT h[0].patient.id = = h[1].patient.id   % the patient with
whom the physician met is the same who checked in and started
the cycle
h[1].time > h[0].time
q<- search (type= =login & pos = = physician & date = = h[1].date)
ASSERT length(q) ==1
ASSERT q[0].id == h[1]. physician.id     % the physician who met
with the patient has logged in the hospital the same day
ASSERT r[1].patient.id == h[1].patient.id
r[1].time > h[1].time
h[2].time > r[1].time
h[2].patient.id = = r[1].patient.id
h[2].staff.role = = 'xray tech'
```

Example: Business travel collection. A primary source of headache in business accounting is business travel. An employee (the primary party) interacts with airlines, banks, taxis and public transportation, restaurants, hotels—possibly in multiple currencies. The employee collects receipts, tickets, stubs, boarding passes, etc., and fills in and submits an expense report. The auditor at the controller's office needs to verify that the dates match, that all the required documents have been included in the report, such as boarding passes, flight tickets, hotel receipts, that the amounts match between receipts and report, and so on. This is a demanding manual inspection task. However, the business can instead execute a fact language script that automatically retrieves the verified facts that identify amounts spent whether for meals, hotels, transportation, or other purposes. The script can automatically apply business policies to the expenses, for example to determine whether the amounts were less than a specified budget, received approval from the correct supervisor, complied with designated business goals, or met other criteria defined in the script. The process of accounting for business travel expenses can therefore be accomplished nearly instantaneously, with verified data.

Current practice. In current practice, facts are submitted, usually in the form of documents, such as receipts, for verification as a collection. The connections between the documents are implicit. There are rules about consistency, which documents are required, the time order of the documents, etc., but these rules are also implicit.

Responsiveness to concerns. Embodiments of the invention enable automatic verification that a transaction cycle is complete, for example, that an invoice cycle has finished or that a patient that is being discharged has completed all necessary paperwork, tests, etc. Each cycle has an idiosyncratic protocol, and the invention enables automatic verification that the protocol has been followed.

Other Applications:
UDR lists all cycles that are not complete.
Auditors, instead of manually checking that amounts between receipts match, can check the SICCL code that defines when a transition is complete, and, if necessary, review those cycles that are reported as incomplete. This replaces manual work for company controllers or random sample checks during audits.

Verification of Transaction Cycles—Example Embodiments

1. A method for certification of interactions and transaction cycles, the method comprising:
defining a transaction cycle, including a specification of interactions or transactions that need to occur for the transaction cycle;
specifying the any of the role or identity for each participant associated with the transaction cycle; and
identifying information to be specified for each of the interactions or transactions; and
implementing the specification as a script;
wherein the transaction cycle begins upon a creation of a transaction cycle object, which notes the script that defines the transaction cycle, and a creation of a first interaction or transaction of the transaction cycle.

2. The method of embodiment 1, wherein the defined transaction cycle includes an order in which the transactions must occur within the defined transaction cycle.

3. The method of embodiment 1, wherein the defined transaction cycle is a Universal Digital Reality (UDR) transaction cycle.

4. The method of embodiment 1, further comprising:
creating a subsequent transaction cycle object.

5. The method of 4, wherein the subsequent transaction cycle object notes an identifier of a preceding transaction cycle object.

6. The method of 5, wherein the identifier is a uniform resource identifier (URI) of the preceding transaction cycle object.

7. The method of embodiment 1, further comprising:
auditing the transaction cycle.

8. The method of embodiment 7, wherein the auditing the transaction cycle comprises reviewing of the script, without directly auditing the transaction cycle.

9. The method of embodiment 1, further comprising:
verifying the transaction cycle, by executing the script associated with the transaction cycle object.

10. The method of embodiment 9, wherein if the script returns one or more errors, it is determined that the transaction cycle is incomplete.

11. The method of embodiment 9, wherein verifying the transaction cycle is performed more than once by executing the script associated with the transaction cycle object.

12. The method of embodiment 9, wherein the transaction cycle is marked as complete upon a verified execution (V/X) of the script associated with the transaction cycle object.

13. The method of embodiment 12, wherein an identifier of the verified successful execution of the script is noted with the associated transaction cycle object, wherein the transaction cycle object is marked as complete.

14. The method of embodiment 1, wherein the script is implemented as a standard function library (SICCL) script.

15. The method of embodiment 1, wherein the defined transaction cycle is associated with a purchase of any of goods or services, includes an order transaction, an invoice transaction corresponding the order transaction, and a receipt transaction corresponding a payment transaction in response to the invoice transaction.

Use Case of Information Compliance and Consistency: Digital Bureaucracy

Summary. Embodiments of the invention include a method and apparatus for digital bureaucracy, namely automated receipt and inspection of documents and document collections by an office or agency. In a bureaucratic procedure, an office or agency responds to requests made by customers. A request is submitted as a document or a document collection. Each request must conform to predefined requirements regarding the information submitted, consistency of information across documents, types of documents submitted, and so on. The office or agency is responsible for verifying that the request conforms to these requirements. If there are any mistakes or unfulfilled requirements, the request is returned to the customer for correction. The corrected request is then inspected again, and this back and forth is repeated until the request passes inspection.

It should be noted that the terms 'bureaucracy' and 'cycles' in the context of the invention are quite similar—both describe methods to assert that a collection of objects follows a protocol. The difference is that 'cycles' describe a collection of interactions and may define the order in which they should be performed and the consistency rules between the entities that participate in these interactions. In contrast, 'bureaucracy' describes a collection of Next Generation Documents, facts, and/or forms and the consistency rules between them.

Motivation. Bureaucratic inspection of a set of information objects, such as a collection of forms and documents, is a purely algorithmic process, involving checking constraints, consistency rules, and dependency requirements for a specific document or a complete set of documents. An embodiment of the invention enables automation of bureaucratic process such as request submission, request inspection, and request verification based on SICCL (see Next Generation Documents below).

Examples of Bureaucratic Procedures
  Making an insurance claim
  Applying for a passport
  Submitting a mortgage application
  Claiming social security
  Claiming disability benefits
  Applying to a school
  Opening a bank account
  Filling in a car financing application
  Requesting a construction permit
  Making a real estate transaction Technical Description. Bureaucratic procedures can be replaced by protocols, coded in SICCL, that authorize an action if specified facts exist and are verified. Each protocol can define types of facts that must exist for the protocol to be completed, as well as relationships among the facts. When a computer system executes the protocol, it searches the fact store for facts of each type that are related to one another as specified by the protocol. For each fact, the computer system can either retrieve information about a verification of the fact or cause verification to be performed as outlined elsewhere in this application. Once all specified facts are found in the fact store and are verified, the computer system can automatically output a determination approving the associated action.

Example of SICCL Script: School Application

```
[forms]
parent_id.type <- identity
child_id.type <- identity
request_form.type <- school_request_form
residence.type <- property
residence_ownership.type <- ownership
[consistency]
request_form.date <= <today>    % request must be dated before today
child_id.valid = = TRUE
request_form.child_id = = child_id.id. % child noted on form agrees with child id provided
parent_id.valid = = TRUE
request_form.parent_id = = parent_id.id % same for parent
child_id.parent.id = = parent_id.id % the adult is indeed the child's parent
request_form.school.district = = residence.district % the house noted in the requested school's district
residence_ownership.property.id = = residence, id    % ownership proofs refers to the house provided
residence_ownership.owerer.id = = parent_ id.id. % parent is owner
```

Digital Bureaucracy—Example Embodiments

1. A method for automatically performing a bureaucratic procedure over a network, the method comprising:
  receiving a request at a verifier node from a requestor node over the network, wherein the request is submitted as any of a document or a collection of documents;
  inspecting the received request at the verifier node to determine if the request conforms to one or more predetermined requirements; and
  with the verifier node, coordinating correction of any errors in the request with the requestor node until the request meets the predetermined requirements.

2. The method of embodiment 1, wherein the predetermined requirements correspond to information submitted with the document or collection of documents, consistency of the information across the collection of documents, types of documents.

3. The method of embodiment 1, wherein the documents are any of UDR documents or UDR forms.

4. The method of embodiment 1, wherein the bureaucratic procedure describes a collection of arch docs and forms, and consistency between the arch docs and forms.

5. The method of 4, wherein a standard fact language (SICCL) script defines any of required documents, document types, semantic fields of the documents, dependencies of documents, constraints that must be satisfied, or consistency rules between fields of one or more of the arch docs.

6. The method of embodiment 1, wherein the inspecting the received request is performed with an algorithmic process.

7. The method of embodiment 1, wherein the inspecting the received request includes checking any of constrains, consistency rule, or dependency requirements for the collection of documents.

8. The method of embodiment 1, wherein the method is performed by a system that is based on UDR and SICCL, which enables complete automation of the request submission, request inspection, and verification.

9. The method of embodiment 1, wherein the verifier node corresponds to an office or agency.

10. The method of embodiment 1, wherein the bureaucratic procedure is associated with an insurance.

11. The method of embodiment 1, wherein the bureaucratic procedure is associated with a passport application.

12. The method of embodiment 1, wherein the bureaucratic procedure is associated with a mortgage application.

13. The method of embodiment 1, wherein the bureaucratic procedure is associated with a social security claim.

14. The method of embodiment 1, wherein the bureaucratic procedure is associated with a disability claim.

15. The method of embodiment 1, wherein the bureaucratic procedure is associated with a school application.

16. The method of embodiment 1, wherein the bureaucratic procedure is associated with a bank account opening.

17. The method of embodiment 1, wherein the bureaucratic procedure is associated with a vehicle financing application.

18. The method of embodiment 1, wherein the bureaucratic procedure is associated with a construction permit.

19. The method of embodiment 1, wherein the bureaucratic procedure is associated with a real estate transaction.

Detailed Description—Human-Readable Presentation of Unique Digital Objects

One of the two goals of information exchange is human cooperation, which is achieved through consensus regarding information objects. The digital information exchange be as it may, to achieve cooperation, eventually the information presented to a human user, whose cooperation is requested, must be presented in a trustworthy way; the user interface presenting and rendering information must allow the user to inspect the trustworthiness of the information. Any technology for information exchange must take the user interface/human-information aspect seriously if it is to be successfully integrated into mainstream of digital transformation. In the terminology of this document, human-readable representation is the last stage of the vertical information flow. For our purpose here, a user interface is any means of communicating with a human user; this includes physical documents.

The present invention teaches two guidelines for the presentation of information objects:

1. Explicit connection: Vertical digital consolidation requires that the presentation of information objects on a user interface—both those information objects observed and those deduced by processing—will be explicitly related to the information objects whose payload is presented.

Figure 27:
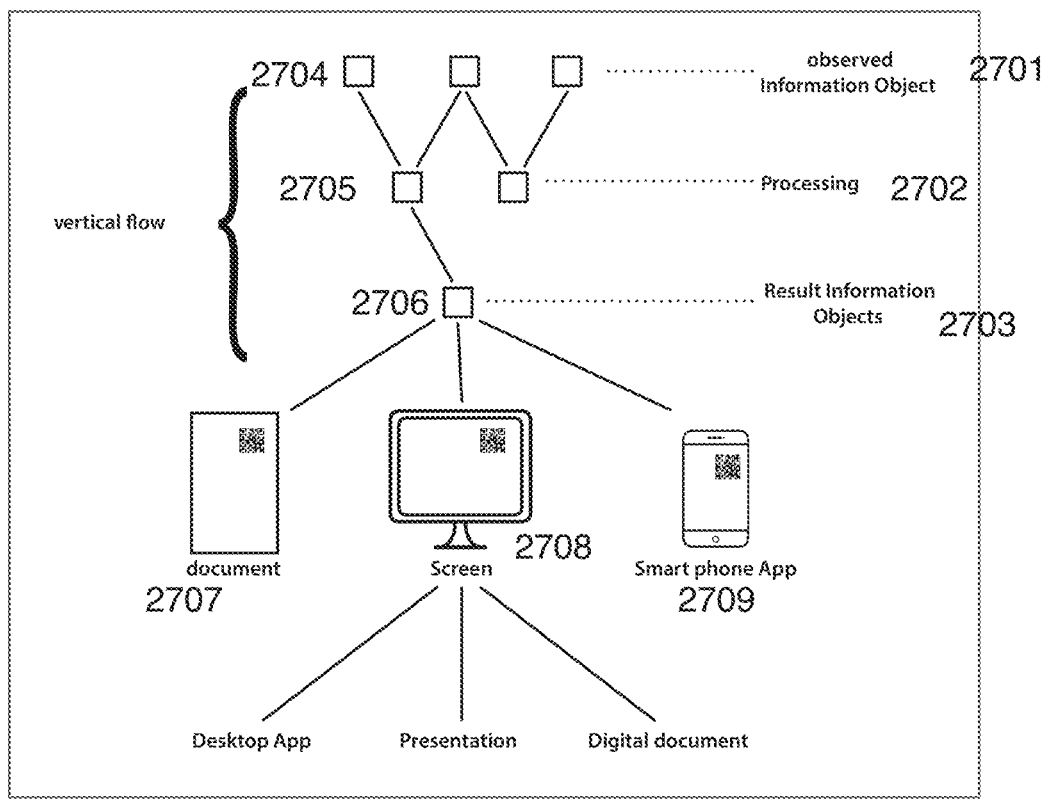
FIG. 27 describes a method for information presentation on user interfaces that is decoupled from preceding steps in the vertical information flow.

2. Decoupling: The digital information object being presented is decoupled from the various manners in which it is presented on user interfaces. Indeed separation of raw information from its mode of presentation is a popular principle in software design; however this principle is not implemented in documents, where the same information object (the document) is used to encode the raw information on the one hand, and to present it in human-readable form on the other hand. FIG. 27 describes a method for information presentation on user interfaces that is decoupled from preceding steps in the vertical information flow: information objects 2701 that act as observed data are represented in unique digital objects 2704. These data are processed a processing stage 2702, which is represented in unique digital objects 2705. The processing results in "result" information objects 2703, which are represented by unique digital objects 2706. User interfaces such as a document 2707, a computer screen 2708 or smartphone application 2709 may present the result 2706 in different ways, decoupled from the result itself, and present the unique identifier of the unique digital object 2706 representing the result.

The state of the art facilitates vertical fragmentation in this stage as well: information presented to users, whether on physical or digital documents, on websites or on user interfaces, is inherently disconnected from the rest of the vertical flow. Results are essentially presented by copying them into a user interface; this cuts off the provenance trail and mandates that any attempt to understand the source of the information presented, to tie it into the rest of the vertical flow, or to verify/audit the presented information is necessarily a detective-like human endeavor.

Here we teach a discipline that, once followed, ensures that information presented and rendered on user interfaces (where this term is taken to also mean documents, even physical documents) is always explicitly connected with the underlying information objects, and is presented with visual symbols clearly showing its verification and verifiability status.

Embodiments of the invention teach a method to present visual and textual representations of facts and collections of facts on a visual user interface such as physical paper, a screen or a smartphone in a way that preserves the connection between the representation or visualization and the facts presented, clearly showing the verification state of the presented facts, as well as their universal identifiers. Consistent with the decoupling guideline above, embodiments of the invention teach a way to detach the information stored in a fact from any of its visual representations.

Merits. The Discipline we Present Allows:

Exchange of trustworthy human-readable information at arm's length. Information is never presented at face value—it is connected to a unique digital object, which is in turn connected to its entire vertical flow of information from underlying observations to processing to the presented information. This implements the digital transformation endgame principle that trustworthiness is apparent because presentation of information may include visual symbols representing the level of verification/trustworthiness of information presented.

Easy manual and automatic audits and verification of information presented. Because information presented is connected to the underlying information object and from there to the vertical flow, information can be verified by manual audits, retracing the fully available vertical flow, or executing software verification scripts such as SICCL scripts.

Human interaction with the vertical flow underlying a presented result. User interfaces can visualize and otherwise enable presentation of elements of the vertical flow underlying presented result, such as the source of measurements underlying a deduced information object.

Automatic software amalgamation/processing at bulk of information presented on user interfaces. A collection of results presented using the discipline we present can be automatically analyzed by software: every presented result comes with the unique identifier or network address of an underlying unique information object; thus software can amalgamate or otherwise process at bulk a collection of results. For example, a large collection of digital documents, each containing results connected to their underlying information objects, can be processed by software to produce a summary.

The Discipline

Figure 28:
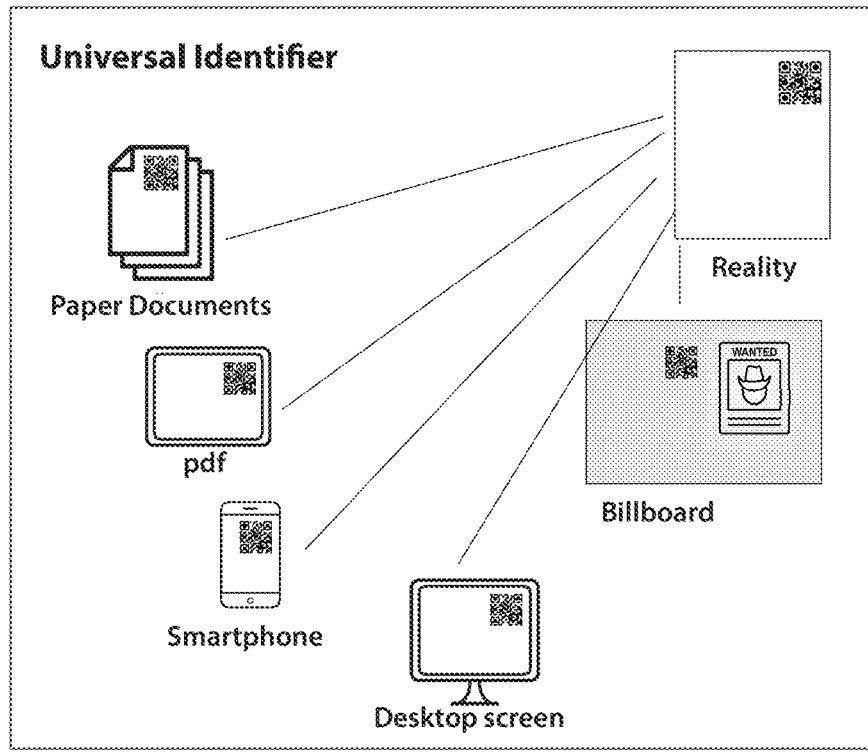
FIG. 28 shows how machine-readable and human-readable universal identifiers on various user interfaces link the presentation of a digital object to the actual digital object in Unique Digital Reality.

Use of the universal identifier. The key properties of unique digital objects—that they are permanent accessible through a universal identifier—allows presentation of the payload of a digital object while explicitly citing the underlying unique digital object in digital reality. FIG. 28 shows how machine-readable and human-readable universal identifiers on various user interfaces link the presentation of a digital object to the underlying unique digital object in Unique Digital Reality.

No files—only direct imports. A core principle guiding user access to information in unique digital objects is simple: There Are No Files. More specifically, information is never imported into a user interface (include a document or a WWW page) by copying it or storing it on a local files. Instead, information is imported directly into the user interface using a server interaction: for example, if unique digital objects are implemented using enduring network interfaces, the user interface makes a server call to access the enduring interface and renders the response directly into the user interface.

Running example: using the running example of RESTful enduring network interfaces. In the running example we used to demonstrate a possible embodiment of enduring network interfaces, consider adding a graphics object. Any user interface will invoke an API call to retrieve the content of the enduring interface in some graphical format and embed the graphics directly into the user interface. For example, in a WWW page, we will not download the image to a local file; instead we use:

<img src="registrar.com/a8qs/embed?format=JPEG&width=200px">

Optionally, a specialized HTML tag or JS script can be used to specify the address or universal identifier of the enduring interface.

In a document, the word processing document can add a plugin to allow the author to include graphics content by specifying the address or universal identifier of the enduring interface. LaTeX, for example, can be extended using a library to offer a command to include graphics objects this way, without creating a local file containing the image. The same for, e.g. WordPress, smartphone apps, etc.

Machine vs human readable citation of the imported unique digital object. Every presentation of any part of a payload of a unique digital object must explicitly cite this object. In an embodiment, it will cite in both human-readable form and machine-readable form. We first discuss the rationale behind this principle, then some considerations in implementing it. A key factor increasing vertical digital fragmentation is the disconnect between a result presented on a user interface (including a document) and the vertical information flow producing the result; this is standard practice in the state of the art and indeed there is no simple way to do anything other than disconnect the result from its underlying vertical flow; for once, because processes (computations and ICC) cannot be cited, so how can a result cite the process that created it? It can only verbally refer to it, which remains the standard practice in, e.g. the scientific literature.

However, with unique digital objects, vertical digital consolidation is possible and a unique digital object containing a result can explicitly cite its underlying process and, through it, its entire underlying vertical information flow all the way to the originally observed information objects at the first stage of the vertical flow. The unique digital object citation that appears on the user interface should be human-readable to allow human inspection of the flow leading up to the information presented; and should be machine-readable to enable advanced software processing applied to human-readable results, for example reverse citation count. In terms of implementation of this principle, there are various ways to cite a unique digital object in machine readable form, e.g. a hyperlink; a tag; etc. The question of how to add a human-readable citation in a nonintrusive way is nontrivial; in the running example of implementation of unique digital objects as RESTful web services, if hyperlinks are possible on the user interface, a hyperlink (or similar) to the network address of the enduring interface is a good option; on a document a QR code (or similar) linking to the network address of the enduring interface is a good option; a footnote; etc. This is a challenge in user interface design.

Visual symbols for verifiability and verification status; Real-time verification status. Consistent with the principle that trustworthiness is obvious, a user interface presenting information contained in a unique digital object can visually or otherwise present the status of the underlying digital object in terms of verification of verifiability. A unique digital object is verifiable if it is connected to its underlying vertical information flow, and that flow is intact; that is, the object cites the process that created it and all underlying information objects. Verification status can change in real-time: consider for example a result of an ICC verification process. If one of the requirements is violated, the result is not verified; this can be presented visually on any user interface showing the result or parts of it. As an example, consider a financial report: the report can clearly show the verifiability and verification status of each number on the report, e.g. using colors, footnotes, or icons.

Figure 29:
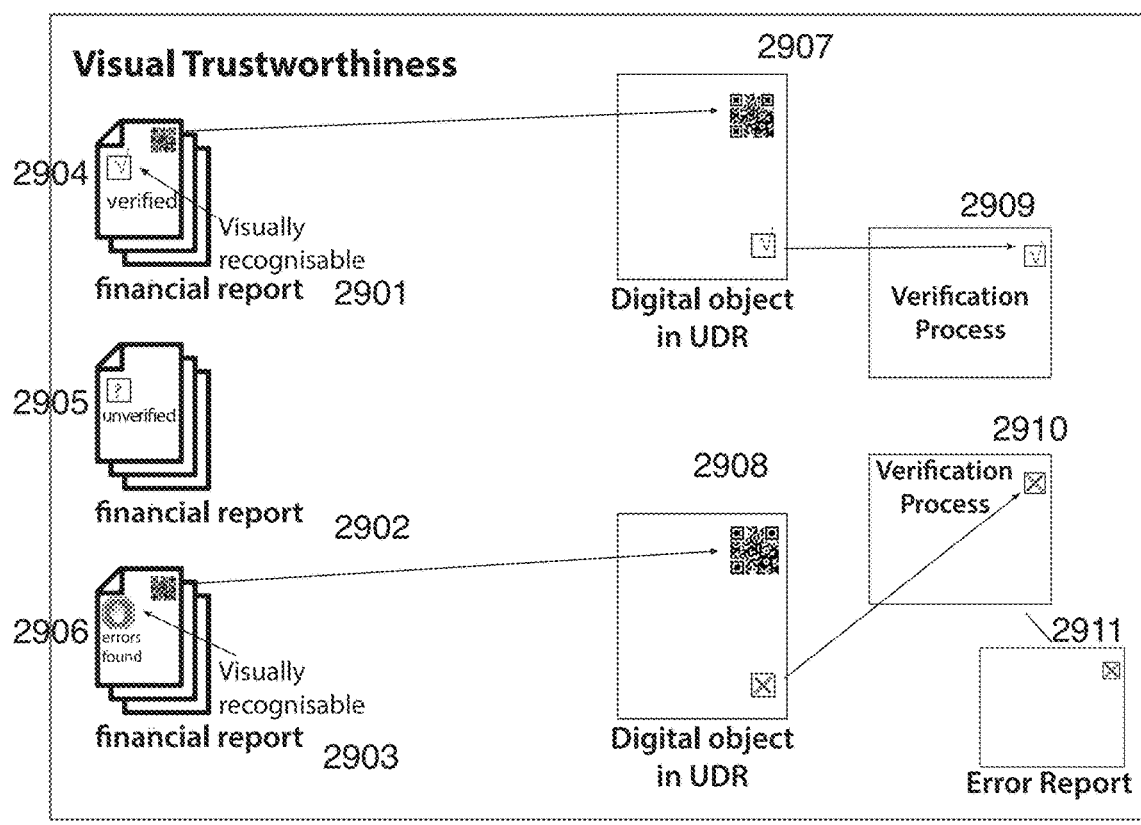
FIG. 29 is an illustration of Visual Trustworthiness and a collection of unique digital objects that create Visual Trustworthiness for a document, such as a financial report.

FIG. 29 is an illustration of Visual Trustworthiness and a collection of unique digital objects that create Visual Trustworthiness for a document, such as a financial report: financial report 2901 is an Outlet (see below) visualized on some user interface (such as a printed hardcopy or screen). It presents a visually recognizable symbol 2904 that says "verified". The unique identifier of the Outlet (for example, the unique identifier of an Outlet of a Next Generation Document—see below) links to a unique digital object 2907 representing the report. Object 2907 in turn contains a link to (or cites the unique identifier of) a unique digital object 2909 representing a recorded execution of a SICCL script. The recorded execution resulted in "verified" output, hence the visual representation of "verified" on the visualization Outlet 2904. Another financial report 2905 does not cite any verification process, so its visualization reads "unverified", making it visually conspicuous to the reader that the results on the report have not been verified automatically. A third financial report 2906 is an Outlet that shows a visually recognizable symbol that underlying errors have been detected in the results reported. It cites a unique digital object 2908 representing the underlying report, which in turn cites a recorded execution unique digital object 2910 of a SICCL verification process that resulted in "unverified" status and produced an error report unique digital object 2911 detailing conditions that were not satisfied in the SICCL verification. The "error" visualization in the Outlet 2906 may link to the error report 2911. In this manner, the verification status of information presented is made clear visually, resulting in Visual Trustworthiness and completing the vertical information flow all the way to the user or information consumer.

Running Example (Continued)

The enduring interface provides API methods to render QR codes and status badges. For example consider the following HTML snippet:

```
" ...the total quarterly income is
<a href=https://facts.com/a8qs>
81.7 million
<img
src="facts.com/a8qs/address_qr?status_badge=true&format=JPEG&
width=50px">
</a>
USD. "
```

The role of results presented in documents and on user interfaces as gateways into the vertical flow. In a consolidated vertical flow, the amount of information objects that find their way into user interfaces is tiny compared with the amount of underlying information objects, which consist of all observed information objects, all objects mirroring processes, and so on. The information objects that appear on user interfaces in human-readable form because results are the select few with special importance; In this sense showing an information object as a result is highlighting it. When every result cites a unique digital object, consistent with the discipline taught here, these results serve as entry points into UDR—they connect both a human user and a software agent following their citation into the underlying vertical information flow as preserved on UDR. For example, showing a figure in a scientific report gives an entry point into the entire computation that took place—not just the figure presented, but all other results generated in that computation, whether they were chosen to be presented in any human-readable report. Possibly, the results of a computation that were not shown could be much more interesting than the ones shown.

Figure 30:
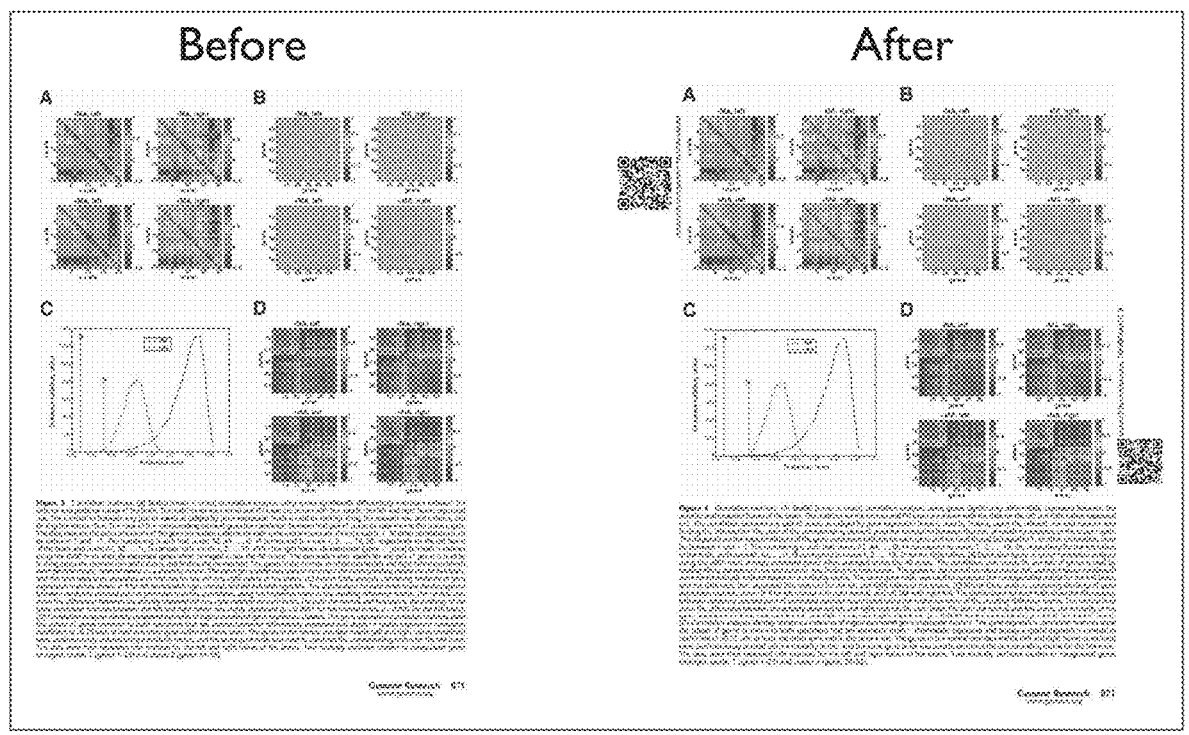
FIG. 30 compares scientific publications with and without visually recognizable "verifiable result" symbol and machine-readable code.

FIG. 30 compares scientific publications with and without visually recognizable "verifiable result" symbol and machine-readable code. The addition of a machine-readable and human readable unique result identifier next to each published result is a subtle change visually, but very far-reaching in its implications, as it provides a permanent connection between presented result and underlying data, code, and execution, which is available for human inspection and for automated processing.

Detailed Description: Visualization of Unique Digital Objects by Jackets, Outlets and Twins Embodiments of the invention teach a method to present visual and textual representations of facts and collections of facts on a visual user interface such as a screen, tablet mobile device, smartphone, hardcopy physical paper, Augmented Reality (AR), Virtual Reality (VR), or billboard, in a way that preserves the connection between the representation or visualization and the facts presented, clearly showing the verification state of the presented facts, as well as their universal identifiers. In possible embodiments of the invention, the information presented or visualized on a user interface is detached or separated from the digital information stored in the unique digital object being presented.

Unlike documents and human-accessible methods to store and communicate facts, unique digital objects on UDR are stored as machine-readable information. It is therefore crucial, when presenting, rendering or visualizing unique digital objects on a user interface, to render them in an effective way and to make visually clear the identity of the unique digital objects presented, their verification status, etc.

Detaching unique digital object content from representation creates new user interface and user interaction opportunities. The layout, graphical organization and visualization of facts can be computed ad hoc according to the needs and identity of the user to whom the information is presented.

Figure 31:
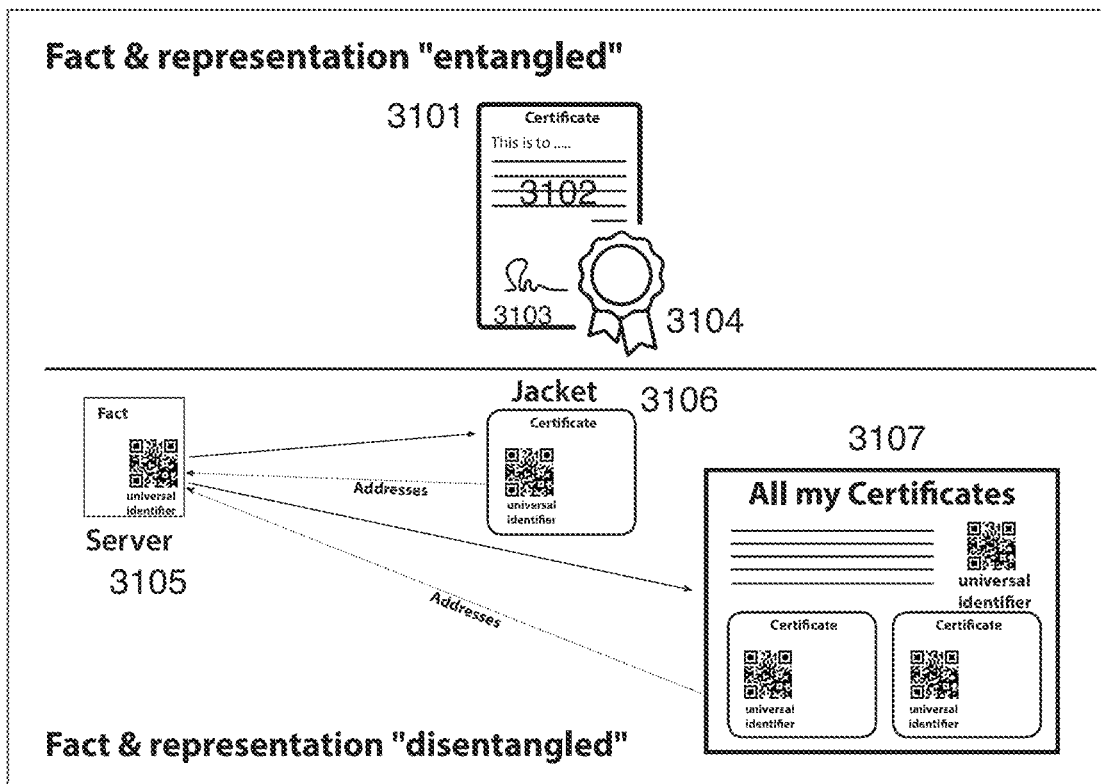
FIG. 31 compares entangled information and visualization in the current state-of-the-art with detached information and visualization in embodiments of the invention.

FIG. 31 compares entangled information and visualization in the current state-of-the-art with detached information and visualization in embodiments of the invention: in a certificate or diploma 3101, for example, in the current state-of-the-art the visualization 3101 is one and the same as its textual content 3102, authentic signature 3103 and seal of authenticity 3104. In embodiments of the invention described herein, particularly those using Jackets, Outlets and Twins as described below, the visualization Jacket 3106 may be created specifically for a presentation context and a user. The unique identifier presented on the visualization 3106 is that of a unique digital object 3105 in UDR (in a possible embodiment, a server for enduring network interfaces). A different Jacket 3107 may combine several diplomas in a single visualization, presenting a unique identifier to the jacket and possibly the unique identifier of each of the diplomas combined.

Outlets. In possible embodiments of the invention, a computer program is used to prepare a context-specific and possibly user-specific visualization of a unique digital object or a collection of unique digital objects. The specific visualization may adapt content, highlighting specific important information elements over others; it may hide content that the specific user or users, to who the Outlet is intended, are not authorized to see. As user interaction with digital information objects occurs through a user interface, an Outlet may be used to define the nature of possible or allowable user interaction, with is specific to the information object being presented on the user interface, and to the user or users to which the presentation is intended, and to particular characteristics of the specific user interface used, and to the specific time, location and/or context of the presentation itself.

Embodiments of the invention thus make it possible to control, limit and track the number, form, and security level of appearances of pieces of information in human-readable on user interfaces, as well as to control, limit and track interactions of individual users or user groups with specific information objects or groups of information objects. This kind of granular control over information presentation is impossible in the current state of the art and may indeed be considered science fiction in the current state of the art.

An Outlet is a specific visualization of a unique digital object or a collection of digital objects. It may contain specifically rendered graphics, and present the Outlet unique identifier (instead, or in addition to, the unique identifier of the information object it presents). As any unique digital object, it may exhibit an API that allows software interactions. In an embodiment of the invention, an Outlet is created by a computer program and is represented by a unique digital object that is separate from the digital object being presented and has its own unique identifier. This allows unique identification of a presentation event: a presentation of a specific digital object on a specific user interface (for example a hardcopy document, a Virtual Reality world, or a smartphone application), possibly to a specific intended user, possibly for a specific intended purpose, possibly at a specific time, possibly at a specific location.

An Outlet intended for the specific use of certain users may require user authentication to allow access to information, or to allow user interactions (such as signing a document). The access log of an Outlet therefore records access to the specific Outlet and not to the information object being presented in general.

Figure 32:
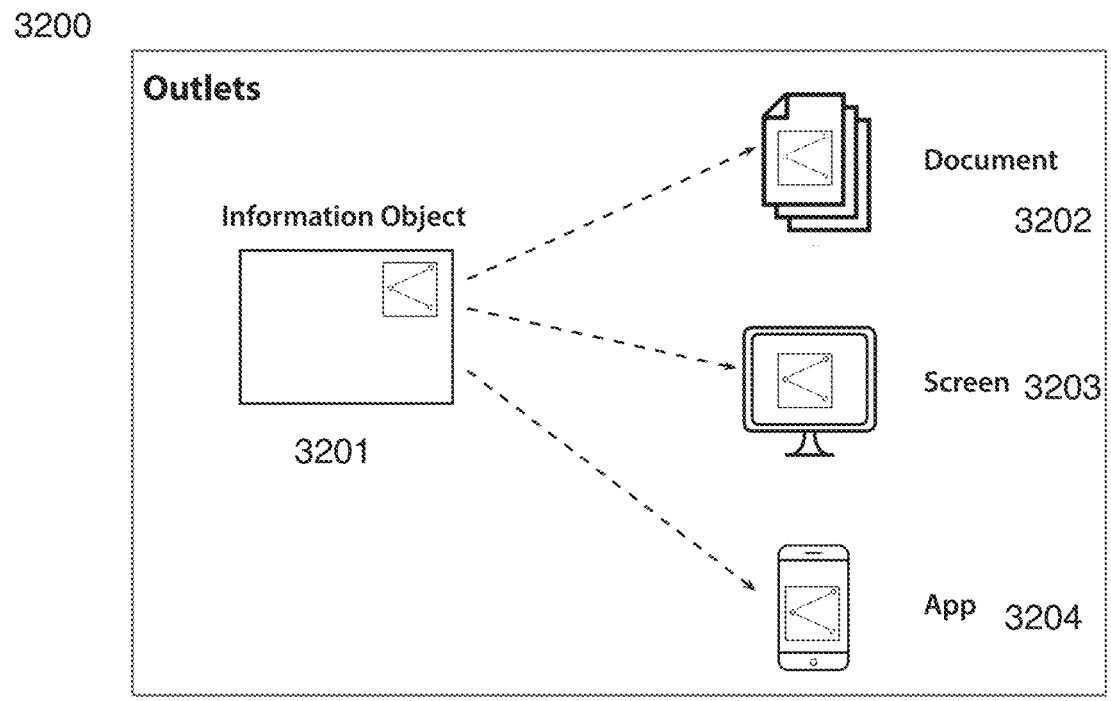
FIG. 32 provides a schematic illustration of the concept of Outlets.

FIG. 32 provides a schematic illustration of the concept of Outlets: An information object 3201 is not presented as-is on user interfaces. Instead, each user interface, and potentially even each presentation event, is based on a different specifically created Outlet. In this example, a document presentation 3202, an on-screen presentation 3203, and a mobile phone application presentation 3204, may each be based on a different Outlet.

Outlets may be used, for example, to:
Define on which user interfaces a digital object can be accessed—both allowed types of user interfaces and identities of specific user interfaces allowed (such as an allowed device);
Specify how and through what credentials a unique digital object can be accessed over each kind of user interface or each specific user interface;
Define the required identity authentication level on each user interface;
Limit number of access occasions through digital user interfaces;
Monitor access through each specific digital user interface;
Limit the number of paper hard copies created;
and so on.

This implements and extends to the decoupling guideline a unique digital object and its payload are separated from any presentation of the payload on a user interface.

In a possible embodiment of the invention, when using Outlets, a unique digital object cannot be presented on a user interface using direct API calls to the object itself. Rather, an Outlet of the object needs to be created first, and the Outlet is then presented on the interface. Each Outlet is uniquely identified and is related to the unique digital object whose payload it presents and to a specific user interface, such as a physical document, a specifically identified device, etc. In an embodiment, an Outlet of a unique digital object may be stored as mutable information attached to that object, while in a preferred embodiment, the Outlet is itself a unique digital object and its universal identifier is used to uniquely identified the outlet—namely that specific presentation of the digital object on a specific user interface.

Outlet creation rules. A unique digital object may specify which outlets can be created: which user interfaces are allowed, the required identity authentication level required to access each an outlet on each type of user interface, how many outlets are allowed of each kind, and so on.

Example

1. Specifying allowable outlets. In object creation request, an outlet field specified allowable outlets:

```
POST /create HTTP/1.1
Host: facts.com:8080/create
Content-Type: application/json
Content-Length: 69
'{
[other json fields related to object creation]
"outlets":"{
   "number_allowed":"unlimited",
   "authentication_allowed", "biometric",
   "devices_allowed", ' ["browser", "tablet"]',
   ...
   }"
}'
```

2. Creating an outlet. To create a new outlet, another POST request is used:

```
POST /create HTTP/1.1
Host: facts.com:8080/request_new_outlet
Content-Type: application/json
Content-Length: 69
'{"object_id":"z8q3",
   "access_token":"abc",
   "outlet_type":"tablet_application",
   "device_id":"rr8q",
   "payload_format":"jpeg",
   "authentication_method":"tablet_os_biometric_id"
   "access":" {
      {"w8x0":"read"}
   }"}'
```

And the response is:

```
HTTP/1.1 200 OK
Date: Mon, 27 Jul 2021 12:28:53 GMT
Server: Apache/2.2.14
Content-Length: 88
Content-Type: text/html
Connection: Closed
   '{"new_outlet_identifier":"ae3c"}'
```

The new outlet can then be used by a user interface, e.g. by using a render API method:
GET https://facts.com/ae3c/render
specifying an access token.

Indeed, Outlets enable to control the devices on which information is presented, the authentication level required to access it, the number of times it can be accessed, and the nature of allowable user interactions with the information object presented.

Figure 33:
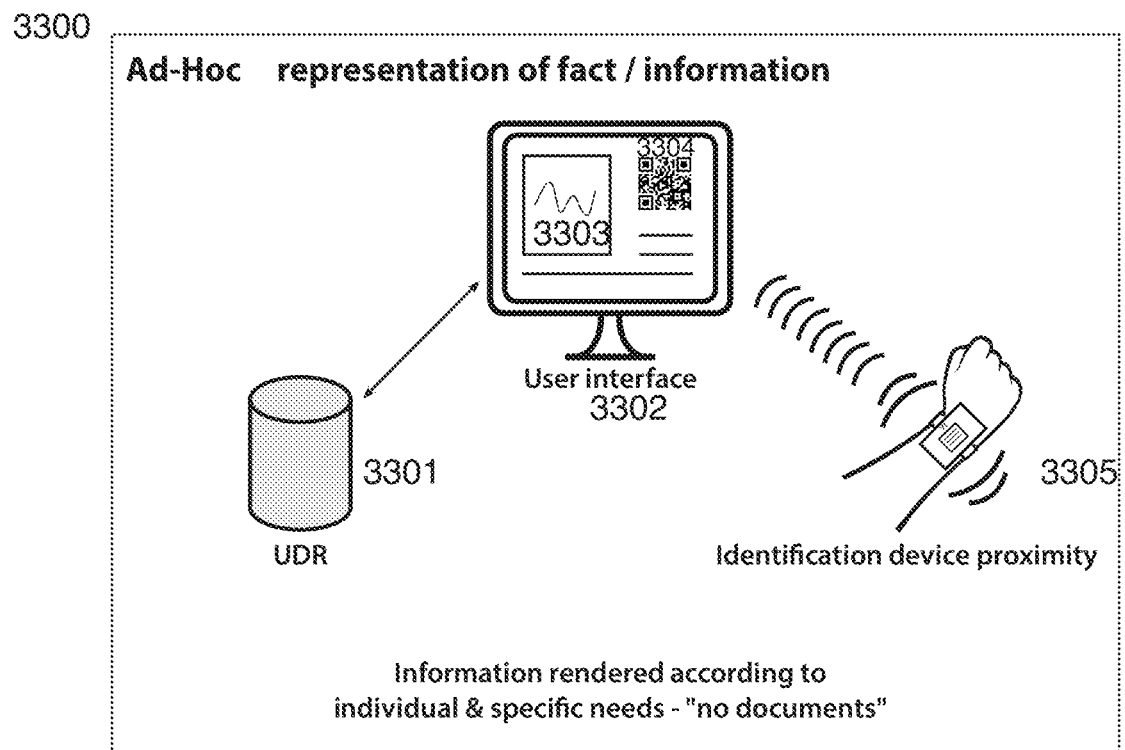
FIG. 33 describes an example of the process of ad-hoc information representation on a user interface.

Ad hoc presentation. Outlets allow creation of explicit presentations of a unique digital object on explicitly stated user interfaces, in an explicitly stated form. In an embodiment, Unique Digital Reality can also support ad hoc presentation of unique digital objects. In the ad hoc approach, a user interface uses object's API commands to request presentation in a specific form, without first creating an Outlet. For example, to present an image stored as the payload of a unique digital object, the user interface negotiates a format and image size according to its needs using the API of the unique digital object, and the API of the unique digital object returns rendered graphics ready for presentation. FIG. 33 describes an example of the process of ad-hoc information representation on a user interface: a unique digital object stored on UDR 3301 is to be presented on a user interface 3302. The user interface 3302 may present the information in a context-sensitive way: for example, when a personal identification device 3305 is detected in close proximity, the user interface 3302 may present the information ad-hoc in a manner specifically suited to the user whose identity is transmitted by device 3305. In this case the user interface device 3302 may invoke an API call to UDR 3301 asking for an ad-hoc visual representation of the unique digital object, possibly specifying the user identity in the request; UDR 3301 responds to the API call with tailor-made visualization, responsive to the access privileges of that user to the requested object, the characteristics of the user interface 3302, and potentially other considerations. A visualization of the unique digital object is then shown on the user interface 3302, including graphical rendering 3303 of the unique digital object, and unique identifier 3304 in machine and/or human readable form.

Jackets. A Jacket is an Outlet combining several unique digital objects; it may combine a number of unique digital objects together in a single representation. A Jacket—an individual representation of information from UDR—may itself create a new unique digital object, whose payload contains the unique identifier of the objects combined, the unique identifier of a recorded execution used to combine them or other render the visualization, and so on.

Figure 34:
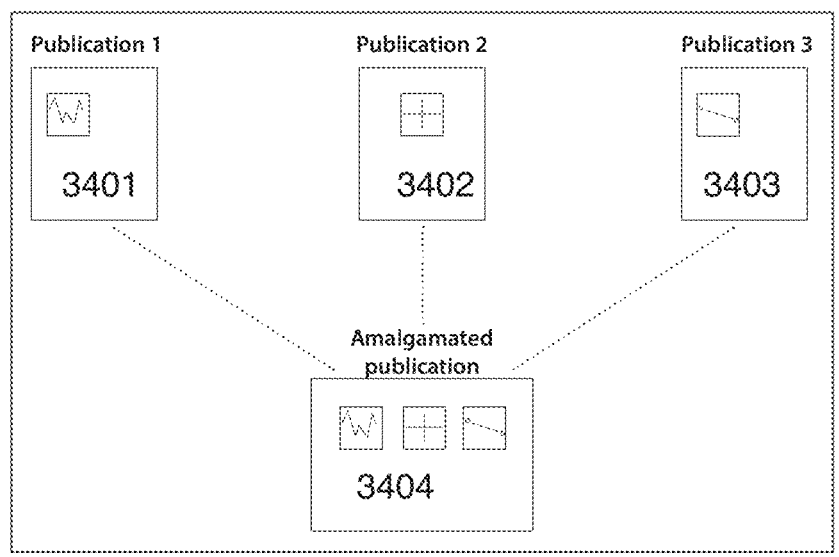
FIG. 34 shows a Jacket providing an amalgamated publication of several different information objects

FIG. 34 shows a Jacket providing an amalgamated publication of several different information objects: publication 3401, publication 3402, and publication 3403 each present different figures, where each figure is stored as a unique digital object. An amalgamated publication 3404 presents a Jacket that combined all three figures and may show the unique identifier of each figure, or a unique identifier of the Jacket unique digital object rather than of each figure separately.

Twins. Unique digital objects are permanent digital objects that do not depend on representation in legacy forms of media such as hardcopy paper, local digital file, or cloud file. To support legacy forms of information exchange, and to ensure backward-compatibility, embodiments of the invention introduce the concepts of Twins of a unique digital object. In an embodiment of the invention, a unique digital object may admit proxy information objects, which are not unique digital objects, and which contain the same information as a unique digital object in a specific medium. A Twin refers to a specific unique digital object by its unique identifier, enables information exchange in legacy forms, and allows the information in the unique digital object to be presented in alternative systems of information representation. While a unique digital object is by definition unique, it may admit any number of twins, each referencing it by its unique identifier. Twins may come in legacy forms of information media such as hardcopy documents, local digital files, cloud files, shared ledger entries, or representations in alternative information realities such as Virtual Reality (VR) objects or entities. For example, one or more computers may each store a local file in their local file system, which is a twin of a single specified unique digital object.

Access Control and Access Tracking Via Jackets, Outlets and Twins

Monetization of unique digital objects. This discipline enables simple monetization of access to digital content. Every access to a digital document is monitored, and the identity of the device through which access occurred is known. As a request, applications can be developed that track usage and monetize access to digital objects such as books, articles, music, video, images, etc. This is a digitally consolidated approach: instead of each stakeholder developing its own paywall and placing their own tollbooth, the unique digital reality tracks access in a uniform way.

Figure 35:
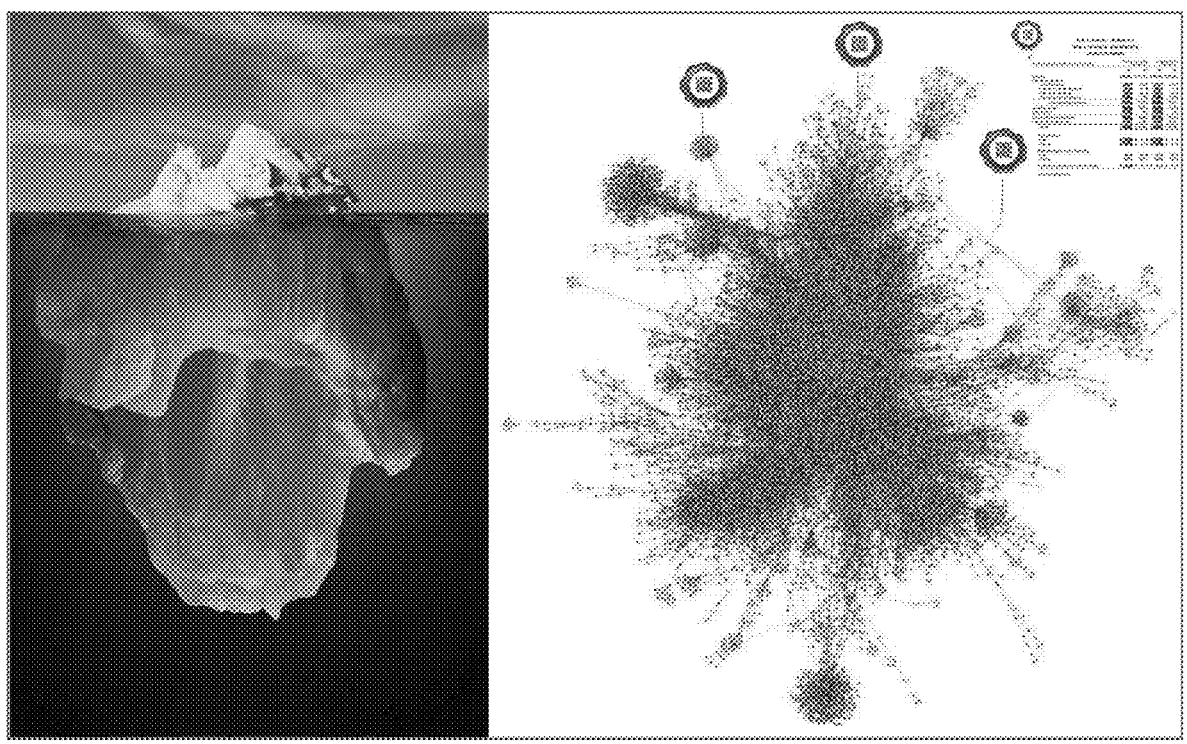
FIG. 35 is an illustration of the notion that visually recognizable machine-readable and human-readable codes in publications and user interfaces turn the publication into an entry point into a much larger body of machine-accessible information objects, namely the collection of unique digital objects—representing data, processing, and results—underlying the presented results.

Recording access events as unique digital objects. In an embodiment, the event of human access to the content of a digital object over a specified interface is itself recorded as a unique digital object. In this case the access event in computational reality is recorded and can be used for various purposes such as monetization, billing of litigation. Human-readable presentations become entry-points to the Vertical Information Flow. FIG. 35 is an illustration of the notion that visually recognizable machine-readable and human-readable codes in publications and user interfaces turn the publication into an entry point into a much larger body of machine-accessible information objects, namely the collection of unique digital objects that constitute the entire vertical information flow—data, processing, and intermediate results—underlying the presented results; as well as unpublished or elsewhere-published results that were created in the same vertical information flow.

Detailed Description—Verifiable Interactions

One of the key questions in digital transformation concerns interactions between digital or electronic devices and human users. Below, an interaction may refer to: device-device interaction, user-device interaction, or, more generally, an interaction between user and an information object. Interactions, such as the one required to authorize payment, sign a contract, give legal consent, present authentication credentials, control devices, receive an object along a supply chain, and so on, are an essential aspect of information exchange and the use of information objects. Indeed, they are fundamental in a modern economy.

Embodiments of the invention include a method, based on unique digital reality, to turn an interaction between persons, devices or information objects and other persons, devices, or information objects, into an enduring, provable fact; mirror an interaction in a unique digital object; and create a permanent, citable, machine-accessible, digital proof of interaction that ties into computational workflows and automated deduction processes.

More specifically, embodiments of the invention teach a process whereby an interaction between two individuals, two devices, or an individual and an information object (such as a document), results in creation of a new interaction UDR object certifying that interaction. The interaction object uniquely specifies the identities of the parties, as well as the medium through which the interaction occurred, the identity authentication method used to identity parties to the interaction, and the nature of the interaction.

In a possible embodiment, when an individual is a party to an interaction, they use a device with authentication capabilities, such as a smartphone or a specially designed device, to establish their identity. Such a device either records their participation in the interaction and commits the corresponding fact object to UDR or enables other stakeholders and devices to do to same.

Embodiments of the invention make it possible to mirror an interaction event in a verifiable, software-accessible observed information object, such as a unique digital object. For example, the event of granting consent, by a certain individual, whose identity has been authenticated in a certain way, using a certain mode of consent-granting interaction, to certain information contained in a certain information object, which is presented on a certain user interface in a certain form and layout—may be recorded in permanent verifiable form in an information object, and later used for different purposes.

The goals of verifiable interactions. Two parties interact using digital means. The identity of the parties sometimes is not known ahead of time, namely, an interaction is possible and must be recorded as it occurs even without prior planning of the parties' identities. Each of the parties may be interested, later, to prove to a third party whose identity may be unknown at the time of interaction that the interaction occurred. Details regarding the interaction, to become verifiable, include:

The identity of the party inviting the interaction;
The identity of the party agreeing to interact;
The medium over which the interaction occurred, for example: in physical space using camera-QR code interaction, in physical space over radio frequency ID (RFID)-reader interaction, in physical space using a user interface, in physical space over close-proximity radio frequency (RF) connection, such as Bluetooth, remotely over a computer network, in shared augmented reality, in shared virtual reality, etc.;
How device or individual identities were authenticated;
Any user interface events involved; and
Any information objects related to the interaction.

Examples for Interactions

Examples of Interactions Between Persons:
Presenting or acknowledging a professional license
Certifying that a meeting has taken place
Certifying that credentials were presented and inspected
Agreeing to pay for goods or services
Acknowledging receipt of a digital message
Acknowledging being physically present at a specific time at a specific place
Acknowledging receipt of physical letter or package Examples of Interactions Between a Person and a Legal Entity:
Agreeing to be hired
Submitting a document, petition, or request
Acknowledging that a document, petition, or request has been received
Agreeing to pay for goods and services Examples of Interactions Between a Person and a Document:
Agreeing to terms and conditions
Signing and co-signing a contract
Acknowledging document contents Examples of Interactions Between Documents:
Attaching Document A as an exhibit to Document B
Asserting that Document A is a translation of Document B
Asserting that Document A is an updated version of Document B Embodiments of the invention disclose a method and system to certify such interactions and many more. The method disclosed herein enables parties in an interaction to certify that the interaction has taken place, virtually or in physical space, to track it, and to conclusively prove it to each other or to third parties.

Practical Examples of Interactions

Agreeing to pay for goods or services
    Alice agrees to sell X to Alice for Y dollars; Alice agrees to buy X from Bob for Y dollars, either virtually or physically.

Acknowledging being physically present at a specific time at a specific place
    Alice and Bob are involved in a car accident. Each acknowledges the presence of the other at the crash scene.

Examples of interactions between persons:

Alice signs an agreement as one of the parties.

Bob acknowledges reading and understanding a document.

Alice agrees to sell X to Bob for Y dollars; Alice agrees to buy X from Bob for Y dollars.

Bob signs off on a package delivered to him by Alice.

Bob is a licensed professional doctor. Alice is a patient who comes to consult with Bob. Bob displays his valid professional license to Alice, who acknowledges that the license was displayed to her.

Bob is a night guard in a building. He signs that he is physically present as he enters the building.

Bob signs a public petition.

Bob and Alice sign a mutual no-disclosure agreement.

Alice sits in the aircraft exit row. She acknowledges having read and understood her duties as an exit row passenger in case of an emergency.

Bob signs a money transfer order.

Alice and Bob are involved in a car accident. Each acknowledges the presence of the other at the crash scene.

Alice is an employee at a rental car agency. Bob is a customer. Bob acknowledges that he has received a car without defects.

Alice is a patient at a hospital. She signs a consent form for surgery.

Alice e-meets Bob over a video conference or in person. They identify themselves to each other—online or face to face.

Bob acknowledges having read a document.

Alice and Bob execute a legal contract.

All people physically present in a meeting room sign the meeting protocol.

Alice pays Bob physically or virtually.

Examples of interactions between documents:

Two documents are linked: Legal Contract A and Legal Contract B are connected as dependents.
    Document A is added as Exhibit A to Document B.
    Document A is labeled as a version of Document B.

A document is cited in another document.

A document is appended as Appendix to a contract

A statement/claim that two documents are equivalent.

A statement/claim that one document is a version of another.

Examples of interactions between a natural person and a legal entity:
    Alice submits a document to a government agency. The agency acknowledges having received the document.

Two parties. As the identity of the parties may not be unknown upfront, there is always one party who offers the interaction (offering party) and another party accepting the interaction (accepting party). If one party is passive in the communication, e.g. offers a QR code, a passive RFID chip, etc., and the other active, e.g. camera, RFID reader, then the passive will be the offering party—as they are offering an interaction and waiting for another party to respond. This abstract process can take different forms, as in the examples below.

Figure 36:
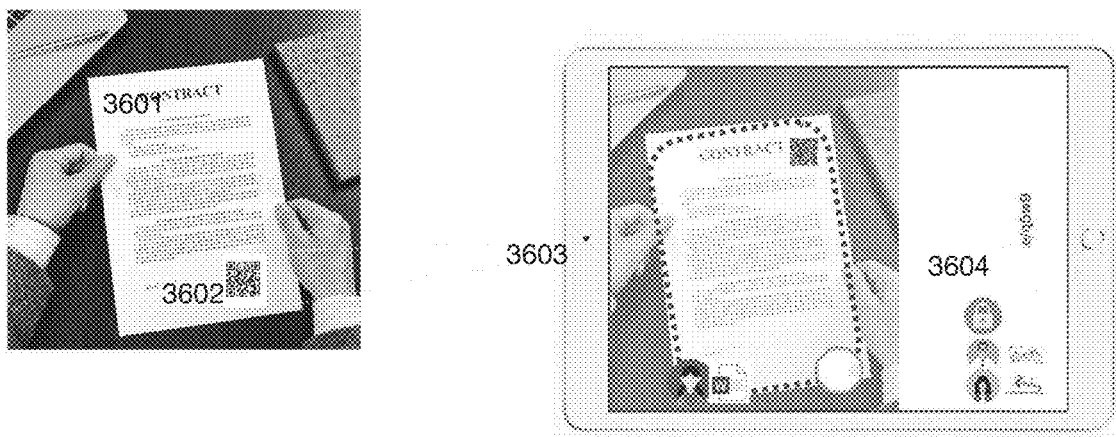
FIG. 36 shows an interaction between a user and a document using an Augmented Reality (AR) device.

Examples for Interaction Over Different Media:
    In physical space using camera-machine readable code interaction
        machine readable code on printed document: the document is created by the offering party; the device scanning the machine-readable code is the accepting party.
        machine readable code presented ad hoc over a screen: the screen showing the code is used by the offering party; the device scanning the machine-readable code is the accepting party.
    In physical space over passive RFID chip—RFID reader interaction. The passive RFID chip is used by the offering party; the reader is the accepting party.
    In physical space using a user interface. The user interface, which may be equipped with an integrated identification device, is used by the offering party; the. User of the user interface is the accepting party.
    In physical space over close-proximity RF connection, such as Bluetooth.
    Remotely over a computer network, a server-client interaction. The server is used by the offering party; the client which may be connected to a user interface is the accepting party.
    Remotely over email or direct message. The offering party sends an email or message; the recipient is the accepting party.
    In shared augmented reality
    In shared virtual reality Interaction between a user and a document. As an example for a verifiable interaction, consider the possibility of a verifiable interaction between a user and a document, where the document is presented on a hardcopy, a computer screen, or a mobile device. In an embodiment, a user may interact with an information object by scanning a unique identifier presented on the information object. A user interface such as a web browser or Augmented Reality (AR) interface then allows the user to interact with the information object. As an example, FIG. 36 shows an interaction between a user and a document using an Augmented Reality (AR) device: a hardcopy document 3601 contains a contract and presents a unique human and/or machine-readable unique identifier 3602. A device 3603 equipped with an optical sensor is able to read the unique identifier and presents a user interface 3604 that allows the user to interact with the document 3601. In an embodiment, an interaction may be recorded as a new unique digital object whose payload cites the unique identifier 3602, the unique identifier of the authenticated user, and the nature of the interaction that occurs.

Interaction using a personal identification device. In a possible embodiment, interaction between a user and digital devices such as Internet of Things (IoT) devices such as screens, Automated Teller Machines (ATMs), and so on, is enabled by a personal identification device. In some embodiments the device may be tiny, e.g. worn as a ring or other jewelry, or small, e.g. worn as a wristwatch. In other embodiments the device may be a smartphone or another existing mobile computing device. Such a device may include a network communication interface, and an identification mechanism able to positively identify the identity of the user (for example, using a biometric identification method or a passcode). An interaction between the user carrying the personal device and other devices can then occur by optic communication (such as scanning a machine-readable code) or by radio frequency communication and be recorded as a verifiable interaction and represented by a unique digital object. The unique digital object representing such an interaction may contain the unique identifier of all devices that participated in the interaction, and other details regarding the nature of the interaction. In a possible embodiment, the personal identification device is a smartphone or a smart watch; in others, it may be a low-cost simple device.

Figure 37:
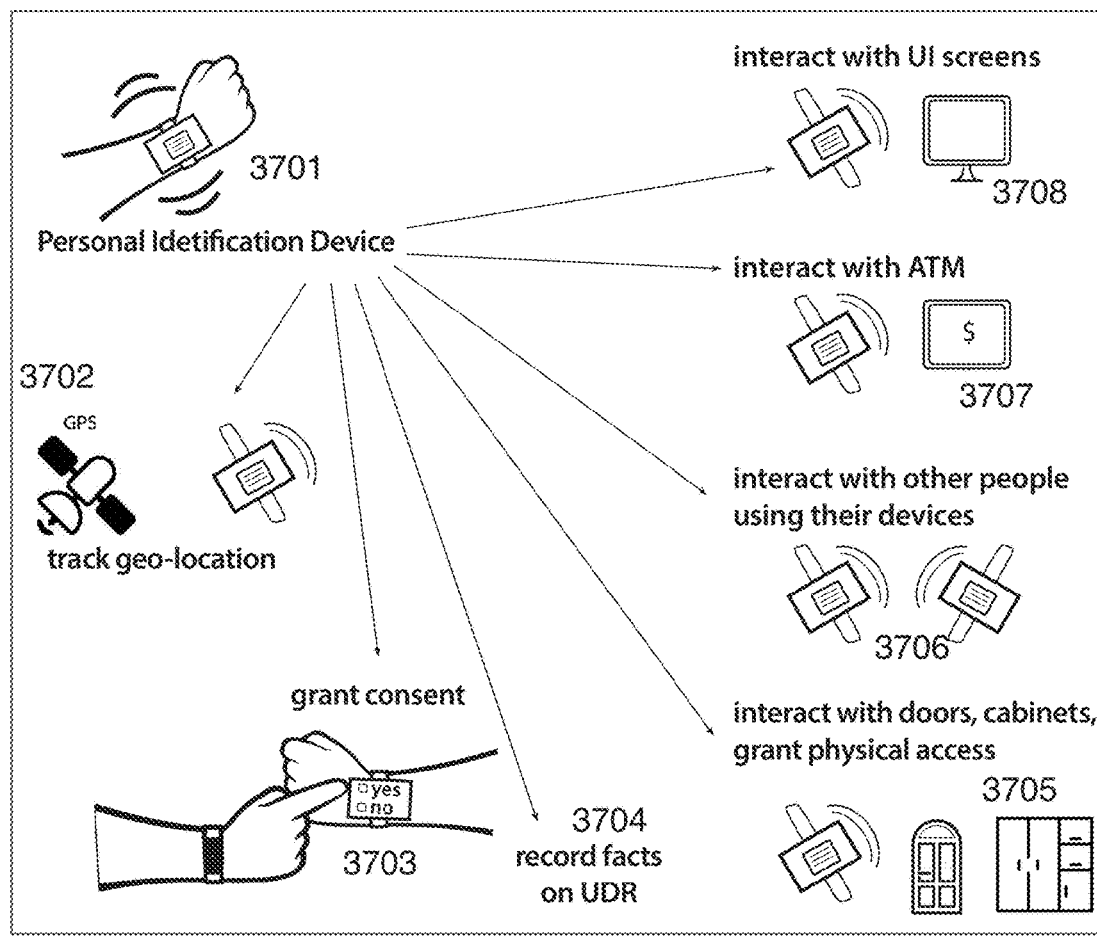
FIG. 37 shows examples of possible verifiable interactions between a personal identification device and other digital devices.

FIG. 37 shows examples of possible verifiable interactions between a personal identification device and other digital devices: personal identification device 3701 may interact with GPS satellite to create verifiable records of geo-location; it may be used to grant consent by a user interface 3703 located on the device (see below); it may interact with screens and digital user interfaces 3708; it may interact with Automated Teller Machines 3707; it may interact with other personal identification devices 3706, enabling verifiable interactions between two persons; it may interact with doors, cabinets or other Internet of Things devices, for example in order to grant physical access. In a preferred embodiment, any such interaction is communicated and becomes a unique digital "interaction" object on UDR 3704.

Figure 38:
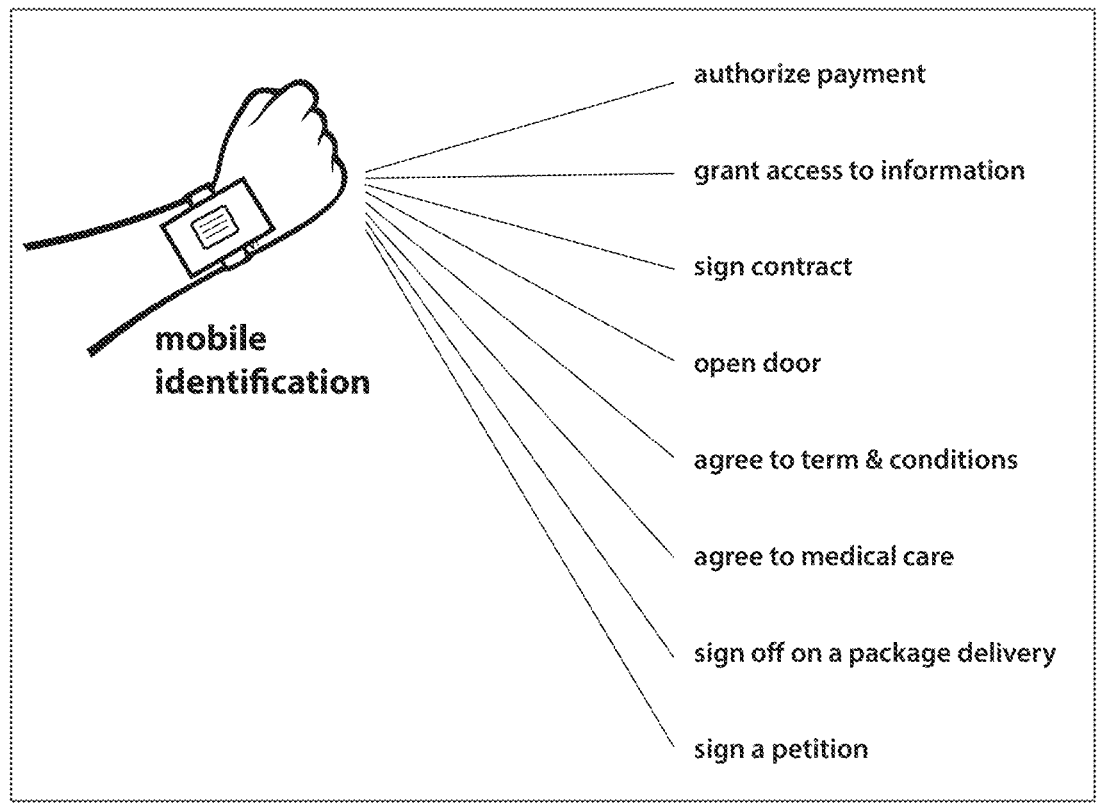
FIG. 38 describes possible uses of personal identification device in conjunction with unique digital reality.

FIG. 38 describes possible uses of personal identification device in conjunction with unique digital reality.

Consent as an example for interactions. Numerous societal and legal processes involve consent or acknowledgement. As seen in the examples above, consent can be given by an entity (a person or a legal entity) to pay for goods or services, to abide by agreed specified terms and conditions, etc. Similarly, acknowledgement can be given that a specified document has been read, that credentials have been presented and verified, that a meeting between specified individuals has taken place, that a specified item has been delivered and accepted, and more.

Consent: Prior art. There are basically two systems for consent and acknowledgement in use today. The first is the hand signature: the entity consenting or acknowledging signs a physical document. The second is a digital signature: the entity consenting or acknowledging provides a binary string. Both these systems make it inherently difficult to verify—efficiently and conclusively—the fact of consent or acknowledgement. They also make it inherently difficult to confirm the identity of the acknowledging or consenting party. Embodiments of the systems and methods described herein enable an agent, such as a natural person acting on behalf of themselves or on behalf of an entity, to give acknowledgement or consent quickly and easily, in a way that makes it easy to verify, long after the interaction has taken place, that the interaction indeed took place between the specified entities. Embodiments of the invention also teach a method to verify the fact of acknowledgement or consent along with the relevant identity.

In general, an interaction represents a new unique digital object created in UDR that incorporates identities corresponding to two or more parties and optionally referring to an object, a transaction, an event, or other relevant data. Interactions can be facilitated by storing identifying information, sufficient to prove the identity of a person or organization, on a device possessed by a person. A person interested in certifying a transaction or event may transmit his or her identifying information (for example, a personal device) to a receiving device, where a unique digital object is generated by authenticating the person's identity and committing the identity into the unique digital object.

Example: Consent using a personal interaction device. In an embodiment of the invention, a personal identification device, able (i) to identify the user, (ii) to communicate optically or wirelessly with other devices or user interfaces, and (iii) able to communicate over a computer network with UDR, may be used to obtain user consent and create verifiable consent interactions. A verifiable consent interaction may be implemented as a unique digital object in UDR, which includes (i) the identity of the user whose consent is requested (ii) the details of the consent request—such as an identity of a document signature requested, including the unique identifier of the document and the exact location of the signature within the document; or a such as an End User License Agreement (EULA) the user is asked to consent to. In possible embodiments, the "consent interaction" unique digital object will also include (iii) the identity of the personal identification device that identified the user; (iv) the method by which the user's identity has been authenticated (for example, face recognition, fingerprint recognition, passphrase entry, voice recognition, iris recognition, etc); (v) the identity of the user interface upon which the details of the request (e.g. the EULA) has been communicated to the user; (vi) the unique identifier of the Outlet presented to the user on the user interface; (vii) the method by which positive user consent interaction has occurred (for example, a touch-screen touch, a voice command, etc.).

FIG. 39 shows various possible ways to establish verifiable consent using user Interfaces and/or personal identification devices: (i) a method involving personal identification device 3901 communicating with a user interface 3902. In this example the personal identification device does not have a user interfaces; while the personal identification device is used to authenticate user identity, a nearby user interface 3902 is used to obtain the user interaction and record the interaction as a unique digital object in UDR 3903. The actual consent request (such as a EULA) is presented on a nearby user interface not shown. (ii) a method involving a personal identification device 3904 with a small user interface, able to collect user interaction and record it in UDR 3903. The actual consent request (such as a EULA) is presented on a nearby user interface not shown; (iii) a method involving two personal identification devices, for example when simultaneous consent of two different users is required. Personal identification device 3906 communicates with second device 3907 to establish consent, and then communicates the interaction to UDR 3903; (iv) a method not involving personal identification device and involving a user interface able to authenticate user identity (for example, using a passcode, facial recognition camera, or fingerprint reader). User interface 3908 presents the consent request 3909 (for example, a EULA), identifies the user and collects the user interaction, e.g. on a window 3910, then communicates the interaction to UDR 3903. Other methods not shown may use voice recognition for user authentication, and voice commands for positive user consent interaction.

Figure 40:
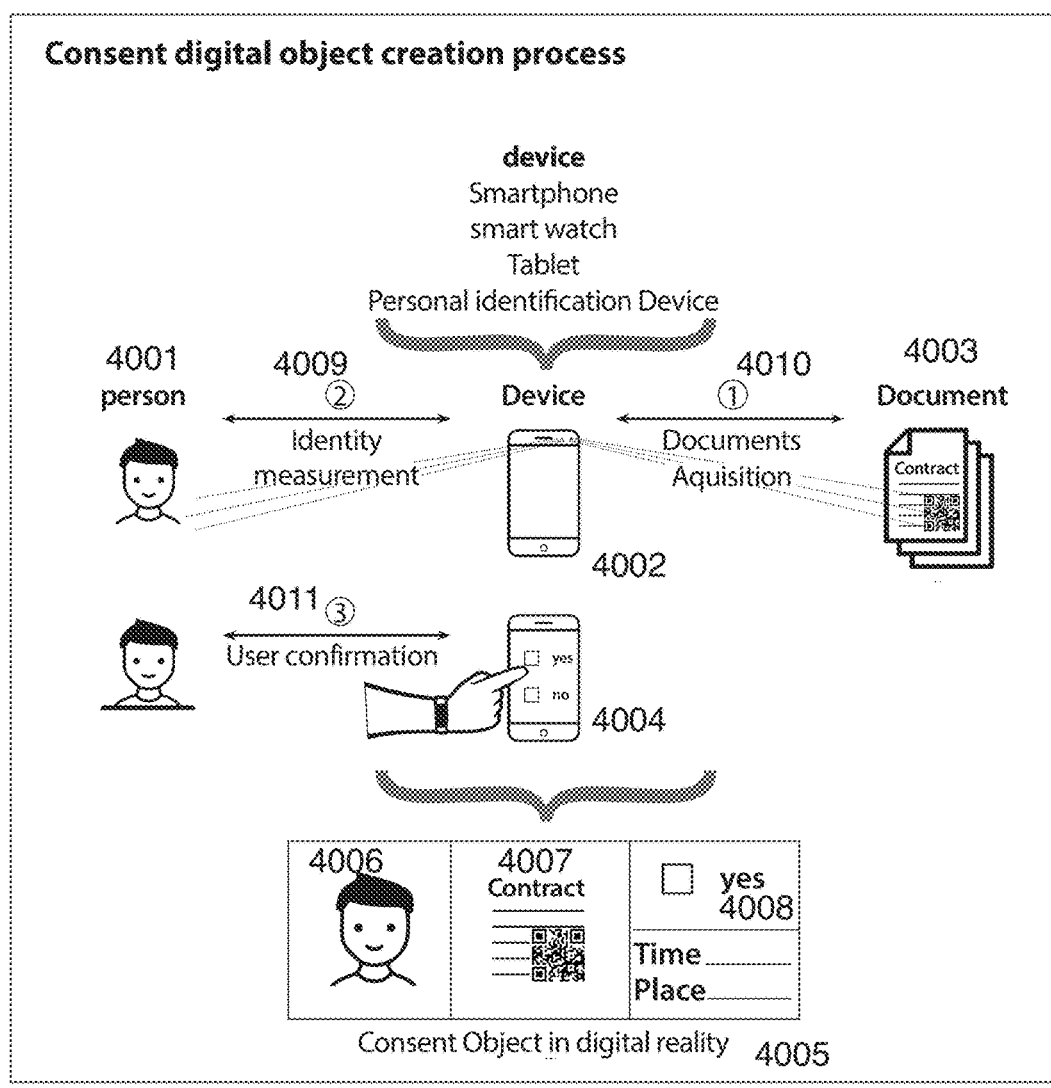
FIG. 40 shows an example of the creation process of a verifiable interaction digital object, demonstrated through the case of interaction achieving verifiable consent.

FIG. 40 shows an example of the creation process of a verifiable interaction digital object, demonstrated through the case of interaction achieving verifiable consent: user 4001 uses a device 4002 (such as a smartphone, smart watch, tablet, personal identification device, etc) to authenticate their identity in an authentication stage 4009 and, separately, identify an information object, such as a physical document or on-screen digital document 4003, in a document acquisition stage 4010. In possible embodiments, identity measurements may be performed using biometric identification or a passphrase; while document acquisition may be performed using methods such as optic barcode recognition, radio frequency detection, Bluetooth connection, or manual input of a unique identifier or access code of an information object. After the consent request is presented to the authenticated user via the information object 4003, the user is required to perform an action signifying active, positive user consent 4011 with the device 4002 or another close-by user interface, such as touching a "yes" button on a touchscreen 4004, giving an "I agree" voice command, etc. Following the positive user consent interaction, the device 4002 creates a unique digital object 4005 representing the consent interaction, which may include the authenticated user identity 4006 (for example, by specifying the unique identifier of an identity unique digital object), the consent request as shown 4007 (which may be a unique digital object corresponding to the information object 4003 or an Outlet through which the interaction has occurred; the time and location of the positive user confirmation event and the manner in which the positive interaction occurred 4008.

Figure 41:
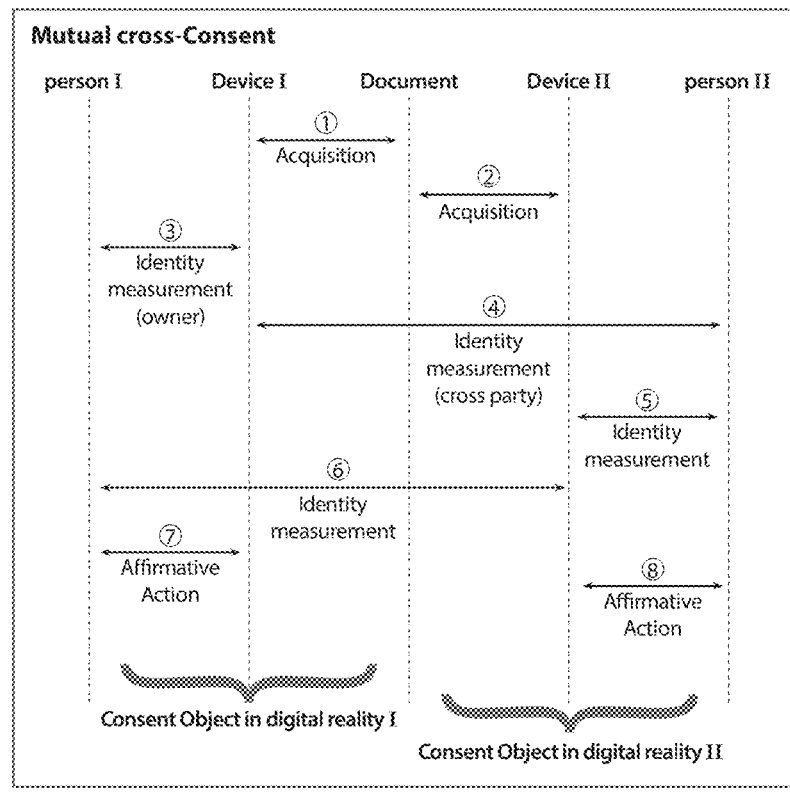
FIG. 41 describes a process whereby two individuals, each using a device (such as a smartphone, a smart watch, a screen, or a personal identification device) interact with the same information object (such as a document presented in hard copy or on-screen).

Cross-consent. An embodiment of the invention makes it possible to create verifiable consent that involve more than one individual. As an example, FIG. 41 describes a process whereby two individuals, each using a device (such as a smartphone, a smart watch, a screen, or a personal identification device) interact with the same information object (such as a document presented in hard copy or on-screen). In a possible embodiment, each party verifies their own identity with their own device, and also verifies their own identity with the other individual's device; and each device acquires the information object. Then, each individual is prompted for a positive consent action in their own device. In a possible embodiment, two "interaction" or "consent" unique digital objects in digital reality are created, one for the consent of each individual, yet each confirming that the other person's identity has been confirmed.

Technical Description

Conditions for a verifiable interaction. The offering party and the accepting party must both have a unique identity digital object in unique digital reality. Both offering and accepting parties must have the ability to create new objects on UDR.

A secret exclusively communicated over the interaction medium. How can one prove that the interaction took place over a specified medium? In the communication, the offering party discloses (offers) a secret to the accepting party, that is only communicated over the interaction medium and not in any other way. This secret is not recorded in the unique digital object mirroring the interaction; only those who were able to communicate directly with the offering party over the interaction medium can know the secret. It is in the offering party's interest to only make the secret available over the specified interaction channel. As an example, consider the passive RFID chip on a credit card; the secret—namely the credit card—number is only available over the RFID channel to a reader in sufficient proximity. It is the cardholder's interest and their financial intuition's interest to not disclose the card number publicly. A secret may specify intended recipients or may be used by any party who receives it.

Stages in a verifiable interaction:
Stage 1: Offering party creates a secret and an offer object on UDR, which includes their identity.
Stage 2: Offering party communicates the secret to the accepting party over the designated interaction medium.
Stage 3: Receiving party creates an interaction object on UDR, which includes their identity, the secret (or some derivative thereof), and the identifier of the offer object.

Verification of an interaction. An interaction is claimed to have taken place on a given time, over a given interaction medium, between two parties. The verifying party is shown the interaction object and verifies:
The identity on the interaction object belongs to one of the claimed parties;
The verified commitment time of the interaction object is identical (or within a specified margin) to the claimed interaction time;
The offer object specified in the interaction object was created by the other claimed party;
The verified commitment time of the offer object is earlier (to specified margin) than the commitment time of the interaction object.

A preferred embodiment—using public key digital signatures. In a preferred embodiment, three public-private key-pairs are used: a key-pair for the identity of the offering party, a key-pair for the identity of the accepting party, and a key-pair for the interaction itself. In this embodiment, before the interaction starts, both parties have a unique identity digital object, each of which publishes their own public key. The stages of a verified interaction are as follows:

(Offer Creation Phase)
1. Offering party (party 1) creates on offer key-pair with an offer public key (OPub) and an offer private key (Opriv).
2. Offering party (party 1) calculates the digital signature of OPub with their own private key (key-pair 1), to produce signature of OPub (1-signature-OPub).
3. Offering party creates a new offer unique digital object, with unique identifier offerID, which contains: the universal identifier of offering party (ID1), namely, the universal identifier of their unique identity digital object; OPub; 1-signature-OPub; any relevant side-information, such as universal identifiers of relevant unique digital objects related to the interaction; in some embodiments, a time limit for completion of the interaction; in some embodiments, the maximum number of interactions that can occur based on this offer object; in some embodiments, details of the interaction medium over which the interaction will be offered.

(Interaction Phase)
4. Offering party communicates Opriv and offerID, either in open-ended broadcast communication or in peer-to-peer communication directly to single or multiple intended accepting parties, over the interaction medium.
5. Accepting party receives Opriv and offerID over the communication medium
6. Accepting party creates an interaction-message and digitally signs it using Opriv to obtain Offer-signature-message. The interaction-message may derive from the side information on the offer object, obtained by the accepting party by accessing the offer object using offerID, or may include user interface activities performed on the side of the accepting party.
7. The accepting party calculates the digital signature of Offer-signature-message with their own private key (key-pair 2), to produce signature of Offer-signature-message (2-signature-Offer-signature-message).
8. Accepting party creates new interaction unique digital object, which contains: the universal identifier of accepting party (ID2), offerID, interaction-message, Offer-signature-message, and 2-signature-Offer-signature-message.

Figure 42:
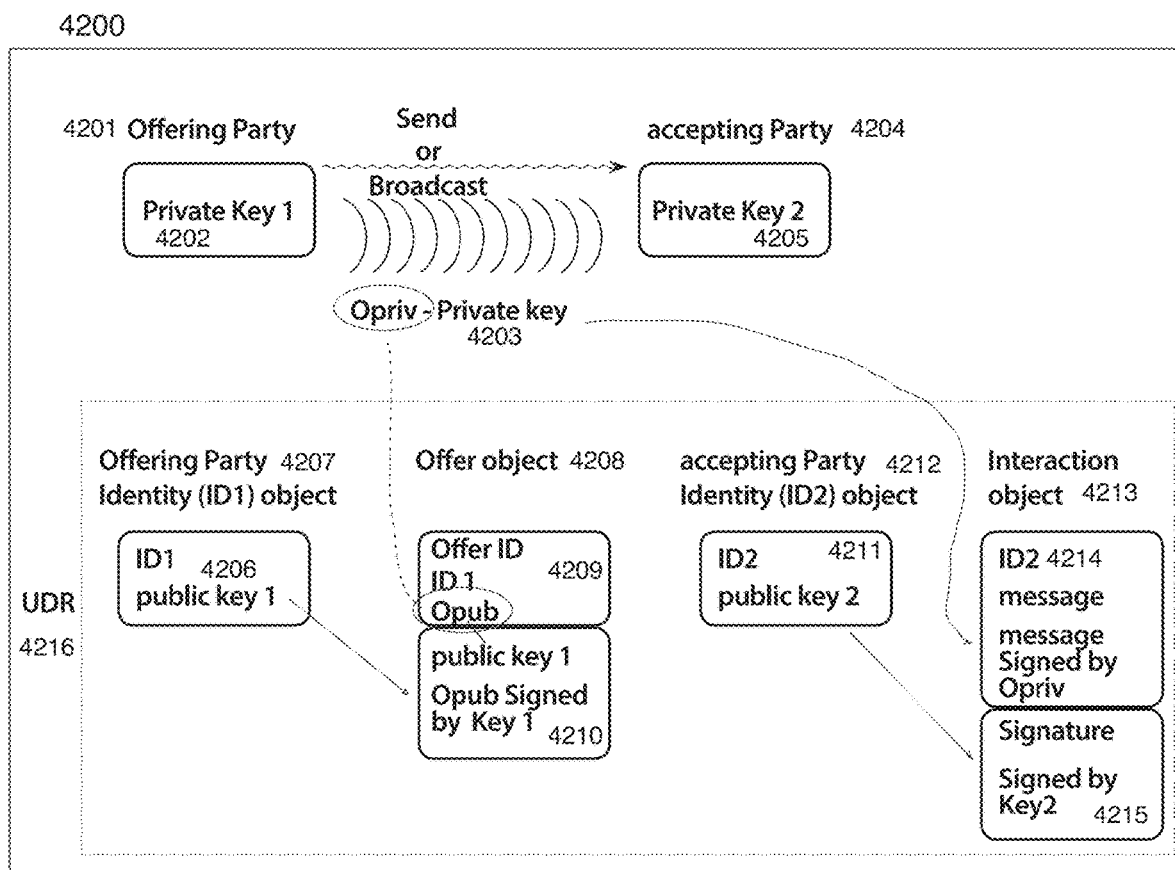
FIG. 42 shows a protocol for verifiable interaction in a preferred embodiment.

Verification of an interaction in the preferred embodiment. FIG. 42 shows a protocol for verifiable interaction in a preferred embodiment. Before the interaction, when identifies are being set up, offering party 4201 generates a cryptographic keypair (such as an RSA keypair) denoted "keypair 1", publishes the public key "public key 1" 4206 of this keypair in their UDR identity unique digital object 4207, and retains the corresponding private key "private key 1" 4202. Similarly, before the interaction, when identifies are being set up, an accepting party 4204 generates a cryptographic keypair (such as an RSA keypair) denoted "keypair 2", publishes the public key "public key 2" 4211 of this keypair in their UDR identity unique digital object 4212, and retains the corresponding private key "private key 2" 4205. During the interaction, the offering party 4201 generates a new cryptographic keypair (such as an RSA keypair), dedicated specifically to the present interaction. The private key in this keypair is denoted "Opriv" 4203 and the public key in this pair and broadcasts or sends the private key "Opriv" 4203 is denoted "Opub". During the interaction, the offering party sends or broadcasts the private key "Opriv" 4203 in a manner that only an interacting party may receive the transmission or broadcast—for example, by broadcasting it over an interaction channel such as a short-range radio frequency, Bluetooth, optical/visual presentation (so that only those present may read it), or a sound speaker (so that only those within listening range may receive it) and so on. The offering party then creates an "offer" unique digital object 4208 in UDR 4216, whose payload 4209 contains an offer unique identifier, the identity unique identifier of the offering party, and the offer public key "OPub". A second part of the payload 4210 of offer object 4208 consist of a digital signature, performed by the offering party, which is obtained by signing the offer public key "Opub" using the private key 4202. After the interaction, the accepting party is in possession of the private key "Opriv" 4203 and creates an "interaction" unique digital object 4213 in UDR 4216. A first part of the payload 4214 of the interaction object 4213 consists of the unique identity of the accepting party, any message contained in the interaction, and a digital signature performed by the accepting party 4204 and obtained by signing the interaction message using the private key "Opriv" 4203. A second part of the payload 4215 consists of another digital signature performed by the accepting party, obtained by digitally signing the message using the private key "Private key 2" 4205.

Such a verifiable interaction is claimed to have taken place on a given time, over a given interaction medium, between two parties. At any later time after completion of the interaction, in order to verify that the two parties claimed in the interaction have indeed interacted In a verification process, and to prove that they have indeed been in close proximity (for example, in visual range from each other if the broadcast in which the private key 4203 has been sent was optic, or in hearing range, or in close radio frequency range), the verifying party is shown the interaction object and performs the actions comprising:

1. Obtains the public key of key-pair-2 from object with ID2.
2. Verifies that 2-signature-Offer-signature-message is the signature of Offer-signature-message by key-pair 2 using the public key of key-pair 2.
3. Obtains the offer object using offerID and obtains OPub from the offer object.
4. Verifies that Offer-signature-message is the signature of interaction-message by using the public key OPub.
5. Obtains 1-signature-OPub from the offer object
6. Obtains ID1 from the offer object and the public key of key-pair-1 from object with ID1.
7. verifies that that 1-signature-OPub is the signature of OPub by key-pair 1 using the public key of key-pair 1.
8. In some embodiments, verifies that the claimed interaction medium is the one specified on the offer object.
9. Verifies that verified commitment time of the interaction object is identical or within a specified margin to the claimed interaction time
10. Verifies that the verified commitment time of the offer object is earlier to specified margin than the commitment time of the interaction object.

This process positively verifies that the interaction has occurred between the two specified parties over the specified interaction channel and has been authorized and signed by each of them.

This protocol covers a very wide array of possible interaction media, such as those mentioned above.

One-time interactions. In an embodiment, only one interaction is allowed based on an offer object: the first interaction object to be committed to UDR based on a single use offer object is the only legitimate interaction, while all others will not pass verification.

Identity authentication. When any of the parties is a device with identification capabilities, which acts as an interaction interface for a human user, the objects created may additionally include the method of authentication performed as part of the interaction. Specifically, the offer object may specify the method of authentication of any human user offering the interaction, and the interaction object may specify the method of authentication of any human user accepting the interaction. In addition, the offer object may specify allowable authentication methods required of any accepting party.

Interaction through an Outlet. As mentioned above, an Outlet is the identity of a specific presentation of an information object, as rendered on a specific screen at a point in time, printed on a specific sheet of physical paper, etc. While we discussed outlets in the context of information presentation (output), they also play a key role in the context of user-information object interactions (input). For example, one may be interested in verifying the exact version of a document signed, including the layout in which it was presented to the user who signed it. Whenever a user is interacting with an information object, the information object is rendered in human-readable form. When an outlet includes both information presentation and an opportunity for the user to interact with the information object presented, it shows the secret that enables verifiable interaction; for example, a printed document, as an outlet of a certain unique digital object, may include a machine-readable code that allows certain user interactions—not with that sheet of paper, but with the underlying unique digital object.

In the preferred embodiment described above, together with the Outlet, an offer object is created, which cites the outlet object or, in an embodiment the outlet object and the offer object are the same unique digital object; and the machine-readable code includes the private offer key and the universal identifier of the offer object. In another example, consider a unique information object containing terms and conditions, which is rendered on a screen with close-proximity radio frequency (RF) interaction capability. The screen broadcasts the offer secret. A user bringing their personal interaction device next to the screen is prompted by their device to agree/disagree; the user reaction causes their device to create an interaction object which uses the offer object and cites the outlet objects. This creates a fully verifiable record of the interaction—we know the identity of the information object, the identity of the outlet used to present it, the identity of the user who interacted with the information object through the specified outlet and how their identity has been authenticated, and the interaction is verifiable since the secret was used.

Example: co-signing an information object using an Outlet, verifiable interaction, and personal identification device. The method for Outlet creation, verifiable interaction and personal identification device may be combined to enable a secure and fully digitally verifiable method for co-signing an information object, such as a two-party (or multi-party) contract or agreement. The following focuses on two-party signature for simplicity, however it is clear that the method below generalizes to any number of parties.

Figure 43:
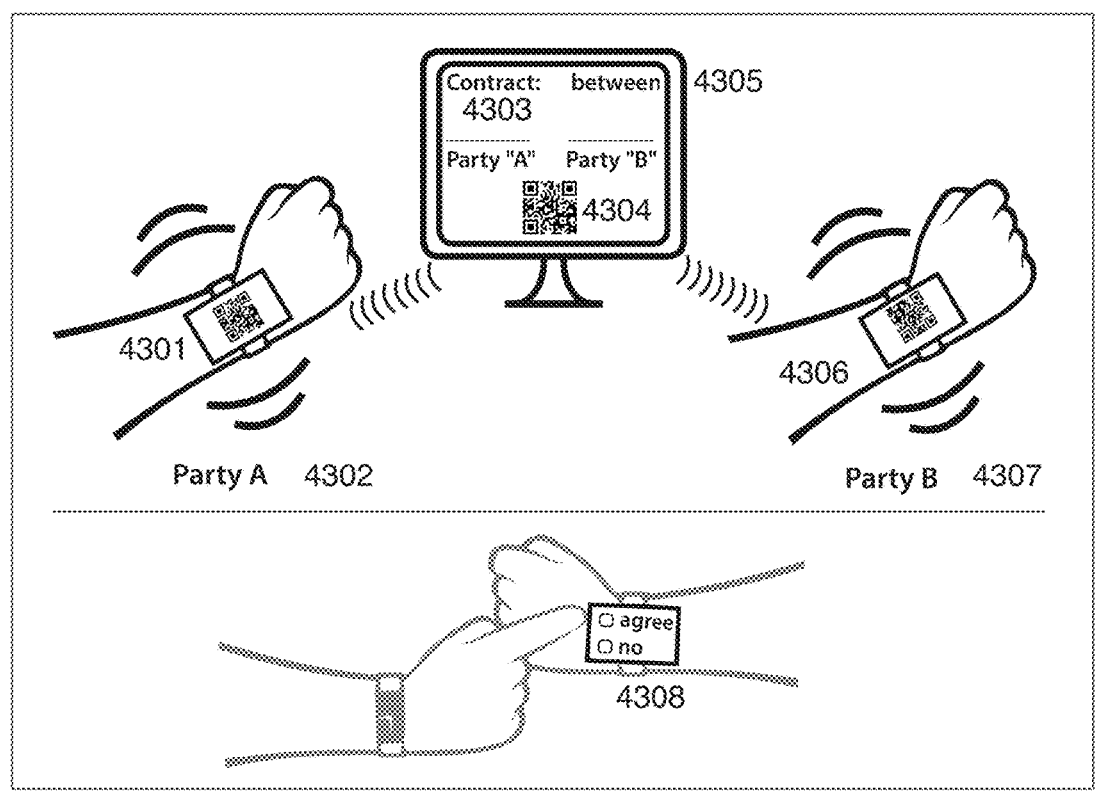
FIG. 43 describes an example for co-signing an information object using an Outlet, verifiable interaction, and personal identification device, in which a contract is signed (executed) using an on-screen Outlet and personal identification devices.

FIG. 43 describes an example for co-signing an information object using an Outlet, verifiable interaction, and personal identification device, in which a contract is signed (executed) using an on-screen Outlet and personal identification devices: first individual 4302 uses a personal device 4301 and second individual 4307 uses a personal device 4306. (The two devices 4301 and 4306 could be similar or different; for example, one could be a smartphone and the other could be a personal identification device). Each device verifies identity of its user and acquires an Outlet 4303 displaying or broadcasting its unique identifier 4304 on a user interface 4305. The Outlet and its unique identifier 4304 may be specific for the purpose of the intended interaction, namely, may only allow interaction with the pre-designated users 4302 and 4307 (identified by the unique identifier of their identity unique digital objects in UDR) or may be open to use by a pre-determined group of users, or be open for use by all users. The unique identifier 4304 used for acquisition may include a private cryptographic key "Opriv" of FIG. 42 used to prove that both parties indeed interacted directly with the Outlet over a prescribed interaction channel (for example, that they were both co-present physically with the Outlet at the same time). Following acquisition of the Outlet, each device asks its user for a positive active consent, for example by using a user interface on the device 4308.

Figure 44:
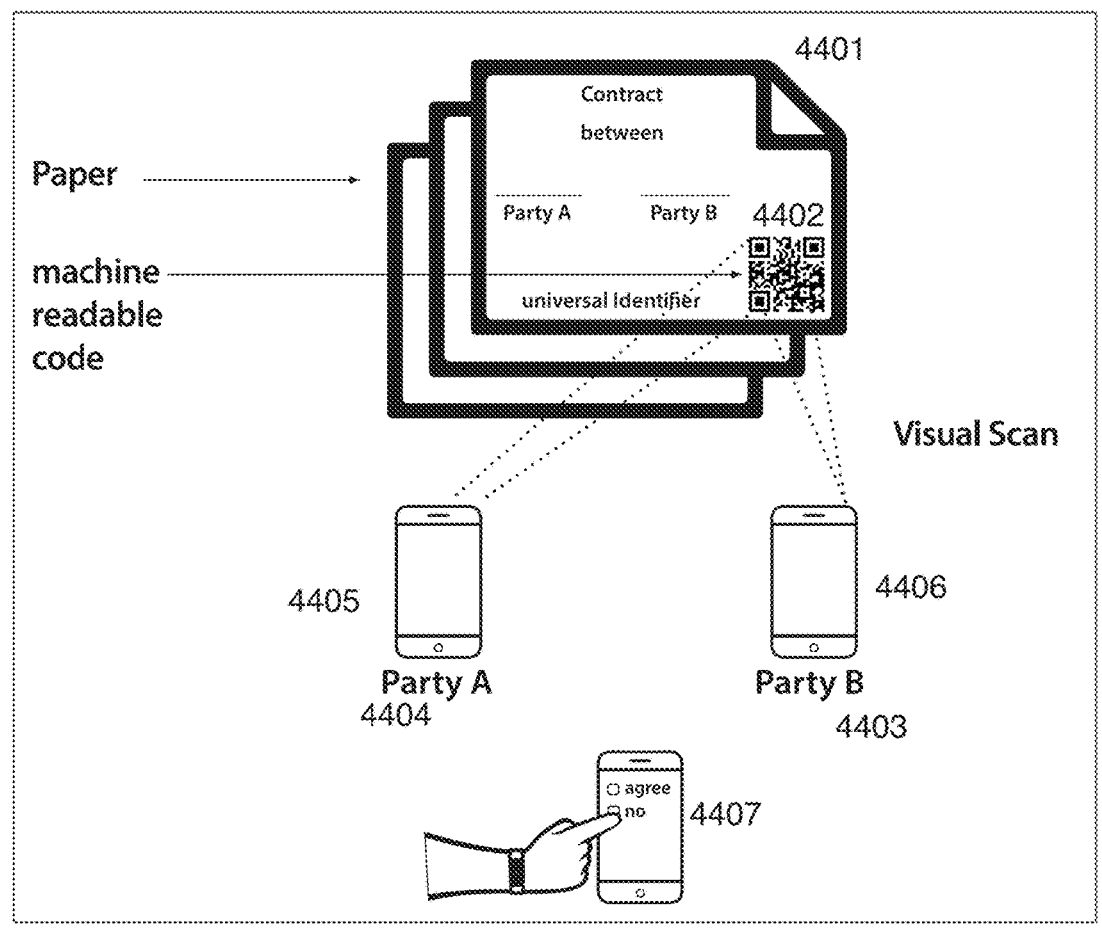
FIG. 44 describes an example for co-signing an information object using an Outlet, verifiable interaction, and personal identification device, in which a contract presented using a hard-copy (physical document) Outlet is signed (executed) using personal identification devices with user interface.

FIG. 44 describes an example for co-signing an information object using an Outlet, verifiable interaction, and personal identification device, in which a contract presented using a hard-copy (physical document) Outlet is signed (executed) using personal identification devices with user interface: A first individual 4404 uses a device 4405, and a second individual 4403 uses a (potentially different) device 4406. Each device authenticates its user and uses an optimal sensor (such as a camera) to acquire an Outlet printed on physical hardcopy 4401 using its machine-readable unique identifier 4402. The Outlet and the unique identifier 4402 may be intended for general use or may be intended for the use of a pre-determined group of people or may be specific for the individuals 4404 and 4403, specifying them through the unique identifiers of their identity unique digital objects. The unique identifier 4402 used for acquisition may include a private cryptographic key "Opriv" of FIG. 42 used to prove that both parties indeed interacted optically with the printed Outlet. Following acquisition of the Outlet, each device asks its user for a positive active consent, for example by using a user interface 4407 on their respective devices.

Concepts in the Interaction Process

To better evoke the handshake process, we introduce a few concepts. These concepts can be like those described elsewhere in this application.

Entity. Interactions occur between entities: natural persons, legal entities, and documents.

Agent. The human giving or receiving consent or acknowledgement, either on behalf of themselves or on behalf or another entity.

Authority by a Legal Entity. When signing on behalf of a legal entity (company, organization, government), the agent (natural person) signing must have valid signing authority.

Identity. The unique identifier of an entity—a natural person, a legal entity (for example), or a document.

Interaction Device. The physical device used by an agent to interact physically with other entities.

Interactable Document Identifier (IDI): A property of a document that can interact with interaction devices or be interacted with, such as QR code, an embedded watermark, and so on.

Physical Handshake. Occurs when both sides of the interaction have a physical location and are physically co-located, for example, two persons meet.

Virtual Handshake. Occurs when the sides interact over a network or when one of them does not have a physical location, for example, two persons interact virtually or a person interacts with a document.

Example Embodiment: A Handshake Device

Handshake device. At a preliminary stage, an entity (person or legal) with an existing identity on UDR pairs with a handshake device. A handshake device supports the handshake process by enabling one or more of: interaction with other devices, biometric identification, active confirmation or response from user, and an ability to create a handshake object in UDR. Embodiments include smartphones and cards with RF chips as handshake devices. Other embodiments of the invention include specially designed small devices with network connectivity and an iris reader.

Some handshake devices offer positive biometric identification of their carrier; some handshake devices collect a response, such as yes/no. A smartphone offers both; an RF chip card offers neither. When a handshake device does not offer biometric identification or positive confirmation, another device (such as a computer) may be used for either. The pairing event is submitted to UDR, such that the pairing object on UDR contains the unique identifier of the carrier identity and the secret key stored on the device Extensions Logins. Login to a website is done by a virtual handshake between an agent and the website access control system. For example, a person's smart watch can be used to unlock a laptop computer, where the identifying information stored on the smart watch is authenticated against the person's identity (stored in UDR) to prove that the person is authorized to access the laptop.

Having a secure and efficient handshake system means that passwords and cashiers can be eliminated. If you have a smartphone with a fingerprint or retina reader (a biometric ID), you do not have to remember passwords or credit card details.

Physical access control. Today, Radio Frequency Identification (RFID) and proximity cards are used for access control. The act of presenting a digital ID, e.g. a card with RFID, is in fact a handshake. Doing it with a device that has a positive biometric ID is much more secure. I just go through the door, present my device to the door, and put my finger on the device, and voila—I get full-on biometric access to that room. Furthermore, because identity is universally recognized by a set of stakeholders, the same device can be usable to access offices, gyms, apartment complexes, or any other controlled-access spaces. The entry is also recorded as a fact in UDR, incorporating at least the fact of a person's identity such that the entry can be conclusively proven later.

Payment systems. While most signature systems today still use hand signatures, handshake systems are arguably the most advanced payment systems currently available.

Below are examples of currently used interaction devices:
Credit card magnetic stripes
Credit card chips
Cards with an RFID chip
Smartphone cameras and screens Below are examples of real-world applications of the handshake process.

Voting. Voting in elections is a process in which having a positive ID is mandatory and conditional. The act of voting necessitates a handshake between the voter and the system. Having all vote handshakes on UDR eliminates the many maladies of physical (paper) voting systems and electronic voting systems. It enables proving to anyone interested in the vote count that each person voted at most once—without infringing on the privacy of individual voters.

Possible applications of embodiments of the invention taught herein. The different methods, devices and protocols for verifiable interactions enable completely new products and services based on unique digital reality, described here in the first person:

I take my device everywhere with me. My device could be a watch or a small thumb-size reader. It's the only thing I carry—no keys, no cards, no wallet.

I use it to pay: I take it out and scan my finger on my device.

I use it to open my car, my house door, my office door.

I use it to sign contracts, acknowledge agreements and authorize payments.

When I need to confirm something like a payment or my contract signature, I hold it against a screen (my phone screen or a display screen) and the screen prompts me to confirm or not.

Contracts and documents are displayed on screens around me and my device can interact with them, for example by scanning a barcode, scanning the whole document.

The handshake process—in handshake device embodiment

Setup. Below are the stages for setting up the handshake process.

Stage I: Establishing the identity of an entity in UDR

Each entity has a unique identity. Identity generation in UDR is described above.

Stage II: Connecting the UDR identity to an interaction device

Each interaction device has a universally unique identifier. A fact in the UDR factifies the association of the UDR identity with the interaction device. Upon this pairing, a secret key is generated and kept on the device. Because the device is secure and the only way to get the device to sign is by getting a positive biometric ID of the agent, the interaction device can be seen as a proxy of the agent. After pairing of the identity and the device occurs, any digital signature with the device's secret key is considered an authentic interaction by the agent. Namely, the combination of the two following facts asserts the agent interaction: the pairing of the agent's UDR identity with the interaction device and the signature by the secret key of the interaction device.

An extension. A sequence of single-use keys goes into the device. Each interaction consumes a single key. This way, the keys cannot be stolen.

Positive IDs on device. An interaction device may need a positive identification to transmit and receive, and to create a fact. Thus, an identity associated with an interaction device may be verified before the device can be used for a handshake.

The handshake process. Once the handshake process has been set up as explained above, the handshake can proceed.
Stage I: Exchanging keys In an interaction between two interaction devices, one device (the transmitting device) provides the other (the receiving device) with a public key. The receiving device creates a UDR fact with the public key that it received and its own public key.

Stage II: Factifying the Exchange

The receiving interaction device creates a fact in UDR, which includes:
The public key of the receiving device
The public key of the transmitting device (as received)
The time and location (if relevant)
Interaction details, e.g. payment details Inspecting and validating a handshake. To inspect the handshake fact, the fact verifier can assert at least the following:
The public keys of both entities match their interaction devices.
The interaction devices were paired to the UDR identities at the time of the interaction.

Network of facts created by a sequence of interactions. Numerous societal and business processes are based on a sequence of interactions. Consider the process of corporate equipment procurement. The stakeholders are buyer, seller, financial institution, and delivery company. The buyer requests a quote, then the seller sends a quote, then the buyer internally approves a purchase order, then the buyer issues and sends a purchase order, then the seller issues and sends a proforma invoice, then the buyer internally approves payment and makes payment, then seller sends equipment, then delivery company signs off of package received for delivery, then buyer receives delivery and signs off on the package, then seller issues and sends an invoice and receipt to the buyer. The order of events here may change slightly, however verification of integrity of the paper trail will verify consent at different stages along the process. With UDR, all interactions are created as unique digital objects; instead of documents the parties exchange unique digital objects; the chain of agreements exchanged, and the chain of consent given, both internally at each company and cross-counterparty agreements, are all on UDR available to be verified by software (e.g. by a SICCL script).

Figure 45:
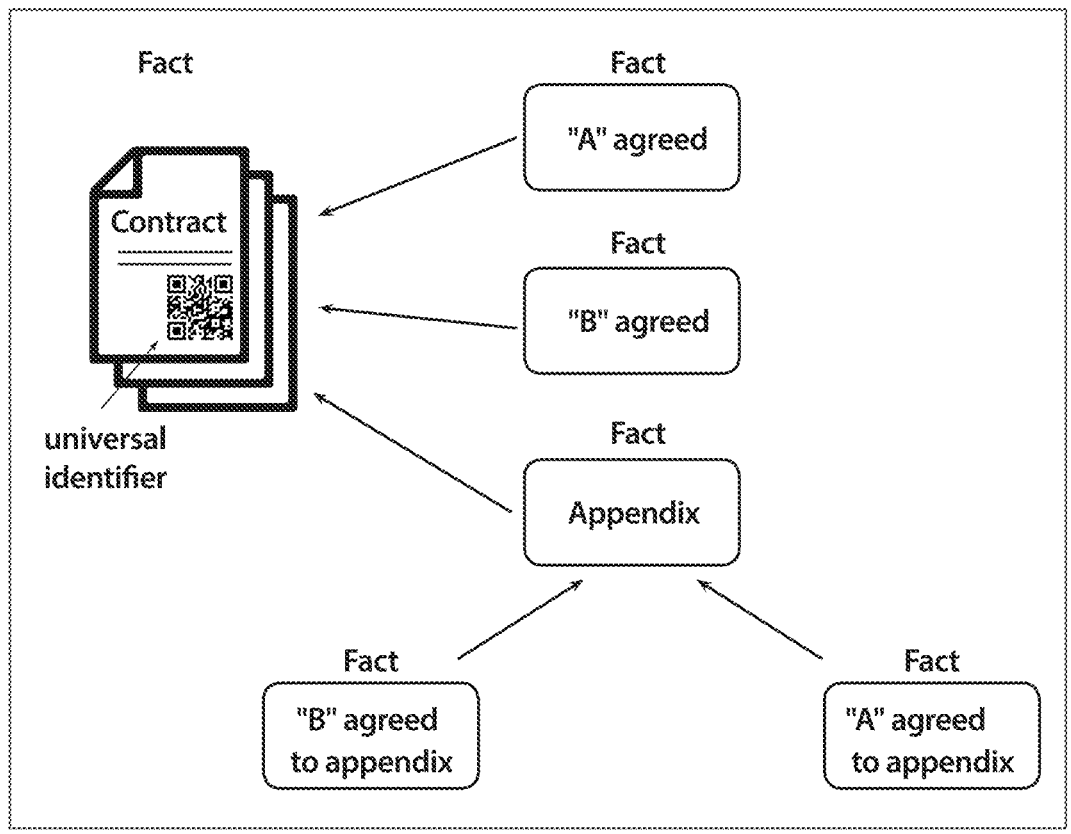
FIG. 45 shows different objects represented as documents (Contract and Appendix) and related interaction (consent) objects in UDR, which may be used to verify that both parties agreed to both the contract and the appendix.

FIG. 45 shows different objects represented as documents (Contract and Appendix) and related interaction (consent) objects in UDR, which may be used to verify that both parties agreed to both the contract and the appendix.

Additional Embodiments, Uses Cases and Applications of the Invention

Detailed Description: Full Cross-Platform Ownership of Data Assets

An individual's personal information—including their financial, health, daily routine, shopping habits, interests, etc., is presently fragmented across hundreds of stakeholders: smartphone app companies, multiple healthcare providers, multiple financial institutions, multiple government agencies, multiple social media providers and internet companies, multiple transportation authorities, multiple online service providers, multiple retailers, and so on. Explicitly enumerating the many separate stakeholders who own a single individual's personal data is an illuminating exercise and may illustrate the concept of horizontal digital fragmentation.

Embodiments of the invention assume that all pieces of digital information generated by a person are stored as unique digital objects in UDR and are owned by, or attributed to, the person generating them. This enables horizontal digital consolidation. Specifically, this means that the totality of a person's digital information is digitally consolidated and available through a uniform interface and a uniform access control system. Embodiments teach a method and apparatus for curation of personal digital information into a collection, for example, for establishing facts regarding ownership, trade, inheritance of objects, and so on. The method disclosed enables an individual to search the entire collection of their digital information, to donate or sell—anonymously or by name—specified sub-collections for various purposes, such as medical or marketing research. They can consent to running AI algorithms against their set of their personal data for the purpose of training the AI algorithms and for obtaining analytics, statistics, insights, and personal recommendations from it. They would have control over knowing explicitly who is using their personal data, for what purpose, and so on.

Figure 46:
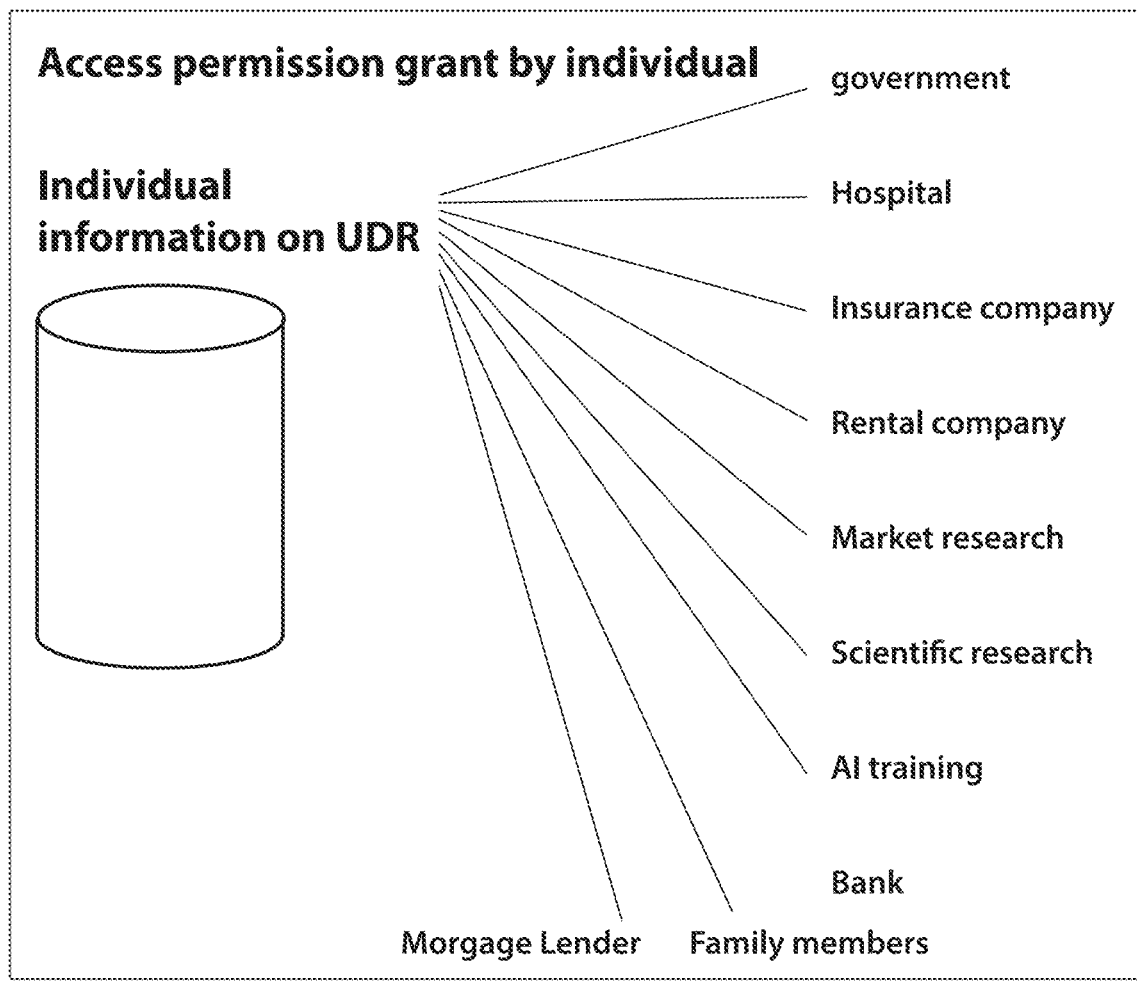
FIG. 46 shows several possible counterparties, to which an individual may elect to grant access privileges to their personal information stored as unique digital objects on UDR.

FIG. 46 shows several possible counterparties, to which an individual may elect to grant access privileges to their personal information stored as unique digital objects on UDR.

Figure 47:
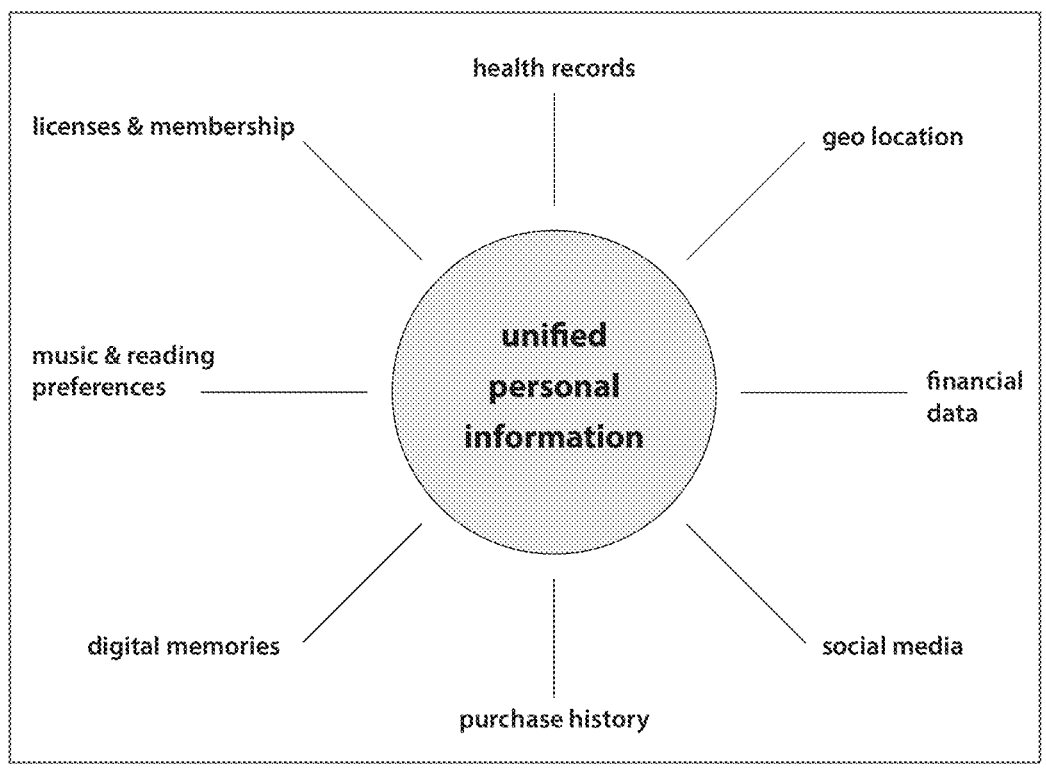
FIG. 47 shows examples of data assets created by an individual.

FIG. 47 shows examples of data assets created by an individual.

In the current data economy, data is not considered a thing or a collection of things; therefore, there is no way to establish ownership over data. Most people are not used to thinking of data that they generate as property that belongs to them or even as a concrete asset that they can or should own. This is true for pictures uploaded to social media, as well as to medical data that is collected from them during hospital visits. Personal information is stored by multiple service providers, Internet companies, government agencies, healthcare providers, etc. When a person dies, his personal information may be lost forever to his family or heirs. Because data is not a thing, it cannot be passed by inheritance.

Method. By placing all data from all sources on UDR, data becomes a 'thing'—a concrete asset that can be owned, rented, or sold. New products and services can appear that make use of the consolidated collection containing all a person's digital information—for example, by extracting insight using artificial intelligence tools, by creating search functionality, etc. Unique digital objects that contain personal information are attributed to the UDR identity of the individual who generated them or about whom they have been collected. Encryption and access control ensure that only the owner has access to their respective objects. The invention teaches software interfaces and user interfaces that specify access control filters that give or revoke access to an individual's objects according to specific criteria.

Related Technology and prior art. In the present situation, none of the individual's concerns are addressed. Data is owned by third parties. An individual has no way to know what data regarding themselves has been collected, how it is being used, who buys this data from whom and for which purpose, and so much more.

Concerns of a data-generating individual. An individual generates massive amounts of data including:
Photos and videos
Online purchases
Medical records
Geo time series (time+location over time)
Entry to monitored public places, e.g. mass transit turnstiles
Content consumed, e.g. books, films, music
Bank statements
Purchases, e.g. credit card purchases
Personal finances, e.g. pensions, savings
Browsing history and interaction with online entities
Genetic data
And so on.
An individual's concerns are:
To establish legal ownership over data they generate
To control access to their data—and know who used it and for what purpose
To utilize their data for their own benefit
To sell or donate specific parcels of their data to interested parties
To ensure proper inheritance of their data to heirs Example Embodiments 1. A method for curating digital information for a person, the method comprising:
    storing one or more pieces of digital information that are generated by the person as a collection of fact objects in a universal digital reality (UDR); and
    attributing each of the fact objects to the UDR identity of person that generated the UDR objects;
    allowing secure access to the stored fact objects by the person.

2. The method of embodiment 1, further comprising:
    performing a search initiated by the person on the collection of fact objects.

3. The method of embodiment 1, wherein the access to the stored fact objects is secured by encryption.

4. The method of embodiment 1, wherein the access is provided through an interface.

5. The method of embodiment 4, wherein the interface specifies one or more filters that give or revoke access to the person's fact objects.

6. The method of embodiment 5, wherein the filters that give or revoke access to the person's fact objects are based on one or more criteria.

7. The method of embodiment 5, further comprising:
    tracking the access to the person's fact objects.

8. The method of embodiment 1, further comprising:
    establishing legal ownership by the person for the data generated by the person.

9. The method of embodiment 1, wherein the person can control access to their data by other people or entities.

10. The method of embodiment 9, wherein the person determines what other people or entities have accessed their data, and the purpose by which their data was accessed.

11. The method of embodiment 1, wherein the person can utilize their data for their own benefit.

12. The method of embodiment 1, wherein the person is enabled to sell, license, or donate at least a portion of their data to another party.

13. The method of embodiment 1, wherein the person is control inheritance of their data to one or more heirs.

14. The method of embodiment 1, wherein the fact objects include any of photos or videos attributed by the person.

15. The method of embodiment 1, wherein the fact objects include information corresponding to online purchases by the person.

16. The method of embodiment 1, wherein the fact objects include any of medical or dental records for the person.

17. The method of embodiment 1, wherein the fact objects include location information for the person over a period.

18. The method of embodiment 1, wherein the fact objects include monitored entry information of the person at one or more places.

19. The method of embodiment 1, wherein the fact objects include content consumed by the person.

20. The method of embodiment 1, wherein the content consumed by the person includes any of books, films, music, performances, speeches, or classes.

21. The method of embodiment 1, wherein the fact objects include bank statements corresponding to the person.

22. The method of embodiment 1, wherein the fact objects include purchases made by the person.

23. The method of embodiment 1, wherein the fact objects include personal finance information associated with the person.

24. The method of embodiment 1, wherein the fact objects include any of a browsing history of the person, or interactions between the person and online entities.

25. The method of embodiment 1, wherein the fact objects include genetic data corresponding to the person.

26. The method of embodiment 1, wherein the fact objects include any of actions taken by the person, or milestones attained by the person.

Detailed Description: Certification of Geographical Location

Embodiments of the invention disclose a method and apparatus for certification determining and verifying geographical location and topography. The ability to verifiably represent that a given entity (person or machine) was located at a specified location at a specified time is crucial in numerous applications. This invention discloses a few different methods that enable an agent to decisively prove their location, at a given time in the past, to an interested verifying party. Unique digital objects which may later be used to verify location are committed to UDR with a time commitment and, optionally, with a location commitment and/or identity commitment. Embodiments of the invention teach commitment of location and verification of location as part of the UDR infrastructure.

Numerous types of facts in modern society involve determining the geographic location. In a fact exchange cycle, an assertion is made on the location where a certain property is located, the location where a certain event occurred, and so on.

Below are a few examples where a location is required for a fact:
Location where a contract was signed
Location where an event, e.g. a traffic accident happened
Location where two persons met namely, they were co-located
Location where a photograph was taken
The location trail of a vehicle
Location fix—a person, vehicle, or item was present at the given location.
Determination of tax residency Some of these facts involve both time and place, for example, an assertion that an event happened or a photograph was taken at a specific time at a specific place, while some involve only location, for example the location of a real estate property.

Related Technology and prior art. While sophisticated mechanisms for location determination exist, currently available methods for proving the location are very limited. On contracts, the location is printed and no assertion is usually made to attempt to prove to the fact receiver that the printed location was indeed where the contract was signed. Mobile devices add a geo stamp to a photograph where the location was measured but, again, no attempt is made to prove that this location was factual. Moreover, photographs are presented without proof of location, e.g. in newspapers, courts. With regards to geographical trails, numerous smartphone applications measure geo stamps continuously; however, no technology currently exists to represent to a fact receiver (a third party, that the trail as reported is, indeed, where that smartphone was located along the points at the time reported in the trail.

Technical Description. Embodiments of the invention teach multiple ways to prove to a fact receiver the claims regarding location. It allows the fact receiver who inspects a fact with a location component, to conclusively determine whether the location component of the fact is factual, namely, whether the location is accurate, specifically, whether the event indeed occurred, the photograph was indeed taken, the contract was indeed signed, and so on—at the specified location. The invention addresses both facts with a location component and facts with a time-space component, thus asserting that an event happened at the specified time at the specified location.

Methods. Verifiable Geo-location information can be recorded as unique digital objects in one of several ways:

1. Cell tower triangulation: unique digital objects contain cell tower reading obtained by the device whose location is to be verifiably recorded.

2. Global Positioning System (GPS) satellite signals: unique digital objects contain cell GPS signal readings obtained by the device whose location is to be verifiably recorded.

3. Wi-Fi network and Bluetooth signals: unique digital objects contain wi-fi and Bluetooth reading obtained by the device whose location is to be verifiably recorded.

4. Continuous geo trail—unique digital objects contain GPS reading obtained by the device whose location is to be verifiably recorded; however unique digital objects are created and committed continuously.

Method 1: Cellular Tower Triangulation

Method Summary. A mobile phone with an Internet connection records for cell tower data received from towers, uploads the data to UDR (encrypted). The mobile tower operators independently upload the cell tower authentication strings to UDR. The fact that the two match is partial proof that the agent was physically located near the claimed towers. If done against several towers, this increases confidence in the location. FIG. 23 is a schematic view of an illustrative method for determining location of a stationary or mobile user, e.g. and agent of a UDR device at one or more times, based on cell tower triangulation.

Figure 48:
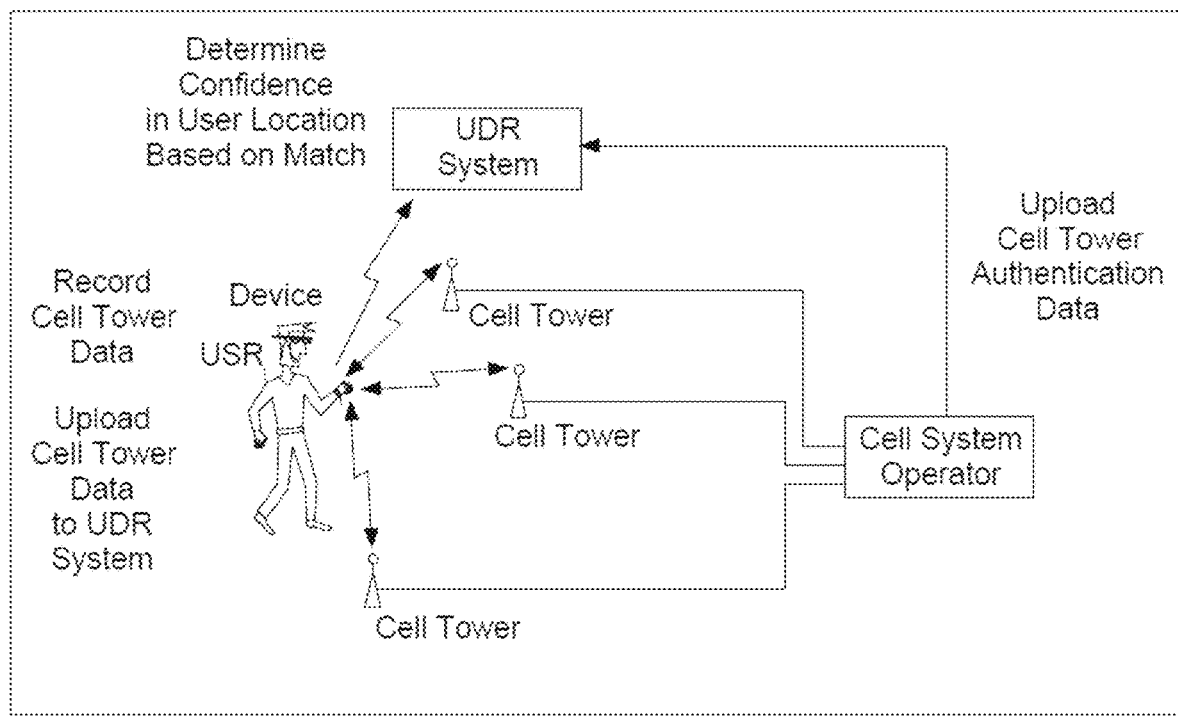
FIG. 48 shows certification of geographical location using the cellular tower triangulation method.

FIG. 48 shows certification of geographical location using the cellular tower triangulation method. Instead of triangulating from cell towers, in some embodiments a person's location can be triangulated based on other wireless communication signals, such as Wi-Fi or Bluetooth.

Method 2: GPS Satellite Signals

Figure 49:
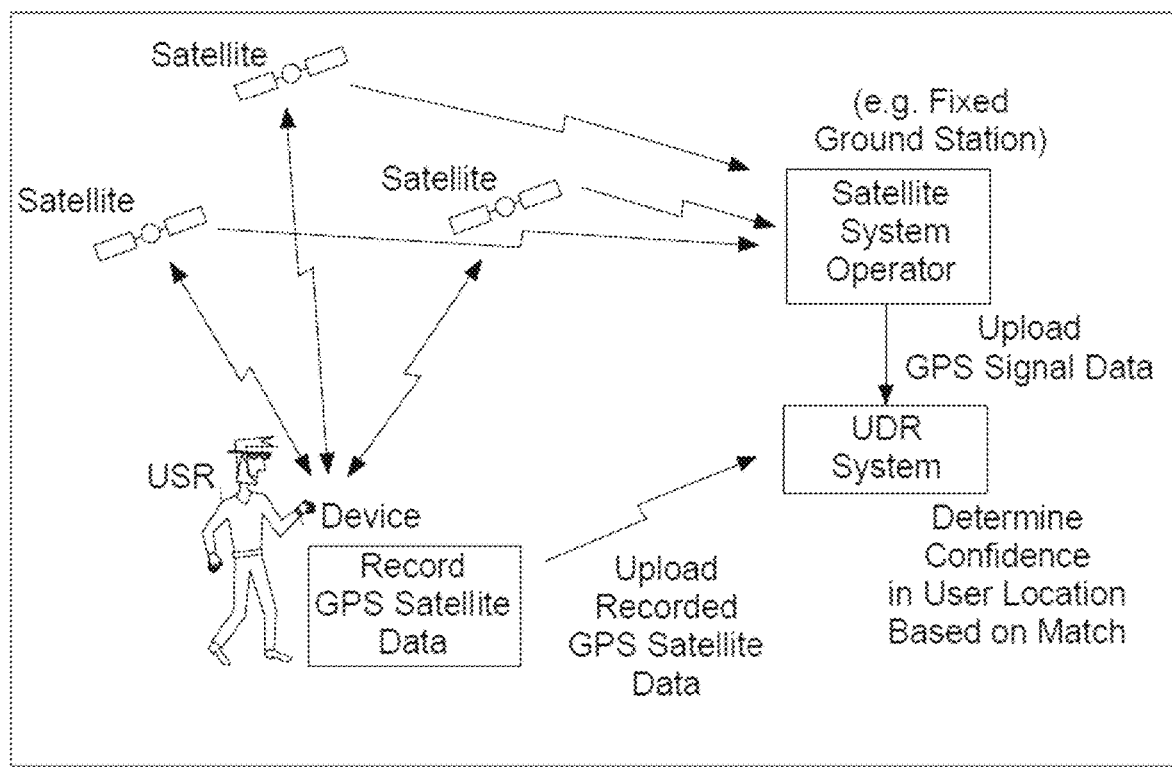
FIG. 49 is a schematic view of an illustrative method for determining location of a stationary or mobile user, e.g. and agent of a UDR device at one or more times, based on GPS satellite data.

Method Summary. A mobile device with GPS antenna and internet connections, records GPS data received from satellites, and commits it to UDR, possibly in encrypted form. Independently, fixed ground stations continuously upload GPS satellite signals they record to UDR. Due to the nature of the GPS protocol and the contents of GPS signals, the fact that the two match is partial proof that the agent was physically located as claimed at the time claimed. FIG. 49 is a schematic view of an illustrative method for determining location of a stationary or mobile user, e.g. and agent of a UDR device at one or more times, based on GPS satellite data.

Figure 50:
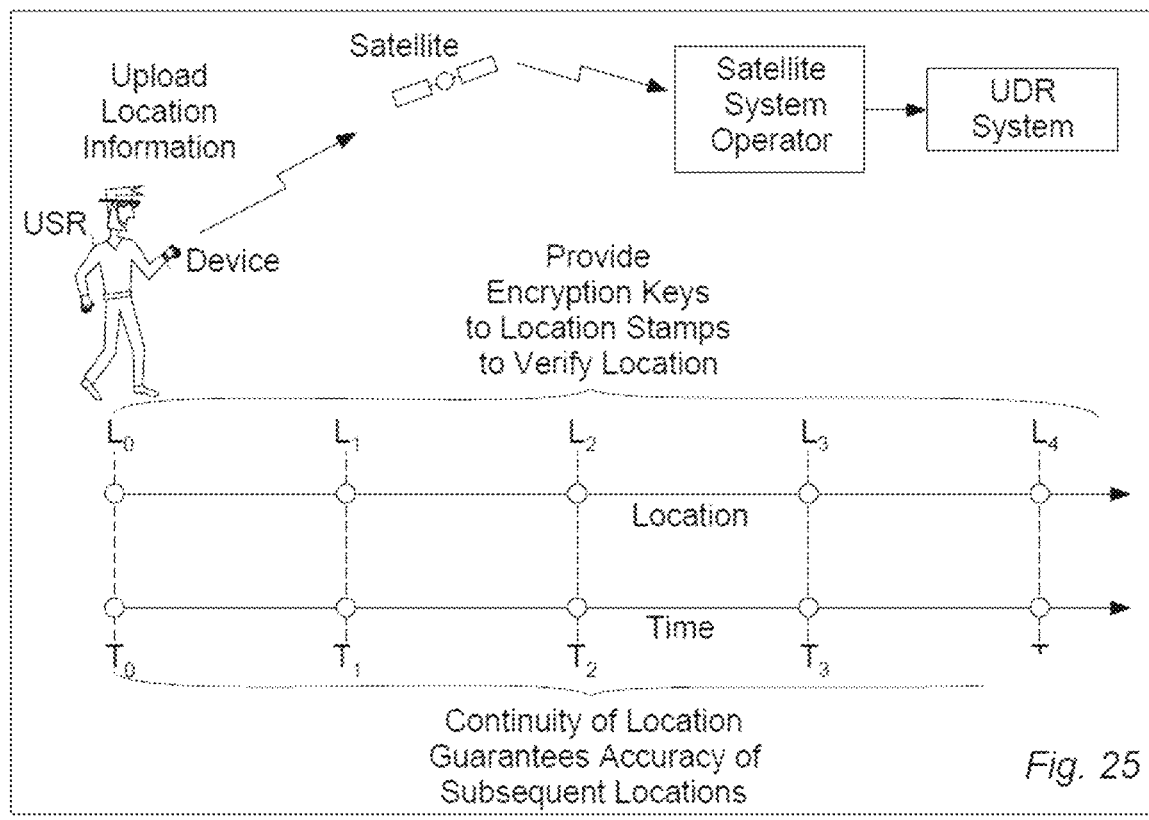
FIG. 50 is a schematic view of an illustrative method for determining location of a stationary or mobile user, e.g. and agent of a UDR device, based on continuous monitoring of location and a continuity of location at subsequent times.

Method 3: Creation of Verifiable Continuous Geo Trail with Zero-Knowledge Verification Method Summary. A device with GPS and internet connection continuously uploads the location (encrypted) to UDR. To verify the location, the fact presenter provides the encryption keys to the location stamps around the time of interest. Continuity of location guarantees that the fact was accurate. The fact presenter can generate Identity, time, and geo location at each stamp. FIG. 50 is a schematic view of an illustrative method for determining location of a stationary or mobile user, e.g. and agent of a UDR device, based on continuous monitoring of location and a continuity of location at subsequent times. For instance, for a known identity of the user of the device at subsequent times T0-T4, location stamps established for each of the subsequent locations L0-L4. FIG. 50 thus shows certification of geographical location using the verifiable continuous Geo trail method.

Zero-knowledge proof of location continuity. In an embodiment of the invention, two encrypted location stamps can be compared and proved to be no more than a prescribed distance apart, without knowledge of the actual geo-location contained in each stamp. Using this method, an entire encrypted continuously measured geotrajectory committed to UDR can be shown to be authentic (meaning that the geo-stamps are indeed accurate) without disclosing the contents of the geo-trail.

Example Embodiments

Example Embodiments for Method 1: Cell Tower Triangulation

1. A method performed in conjunction with a UDR system, comprising:
    recording cell tower data received from a plurality of cell towers at a mobile device;
    uploading the recorded cell tower data from the mobile device to the UDR system as encrypted data;
    independently uploading cell tower authentication data to the UDR system from an operator associated with the cell towers;
    determining confidence that an agent associated with the mobile device is at the location, based on a match between the recorded cell tower data and the cell tower authentication data.

2. The method of embodiment 1, wherein the determined confidence is proportional to the number of the cell towers.

3. The method of embodiment 1, wherein the determined confidence increases based on repeated matching within a time.

4. The method of embodiment 1, wherein the mobile device is a mobile phone.

5. The method of embodiment 1, wherein the location corresponds to a location where a contract was signed.

6. The method of embodiment 1, wherein the location corresponds to a location where an event occurred.

7. The method of embodiment 1, wherein the location corresponds to a location where at least two people met.

8. The method of embodiment 1, wherein the location corresponds to a location where a photograph was taken.

9. The method of embodiment 1, wherein the location corresponds to a location path of a moving object, e.g. a vehicle, a plane, a projectile, a planet, a satellite, an individual, animal, a particle.

10. The method of embodiment 1, wherein the location corresponds to a fixed location, e.g. a person, vehicle, or item.

Example Embodiments for Method 2: GPS Satellite Signals

1) A method performed in conjunction with a UDR system, the method comprising:
    recording GPS satellite data received from a plurality of satellites at a mobile device having a GPS antenna and a wireless network connection;
    uploading the recorded GPS satellite data from the mobile device to the UDR system over the wireless network connection;
    independently uploading GPS signal data to the UDR system from fixed ground stations;
    determining confidence that an agent associated with the mobile device is at the location, based on a match between the recorded GPS satellite data and the GPD signal data.

2) The method of embodiment 1, wherein the recorded GPS satellite data is uploaded as encrypted data.

Example Embodiments for Method 3: Geo-Trail Factification

1. A method performed in conjunction with a UDR system, the method comprising:
    continuously uploading location information from mobile device having a GPS antenna and a wireless network connection to the UDR system over the wireless network connection as encrypted data; and
    providing encryption keys to location stamps around a time of interest to verify the location;
    wherein continuity of location guarantees that the location fact is accurate.

Example Embodiments (Geo—all Methods)

1. A method performed in conjunction with a UDR system, comprising:
    recording cell tower data received from a plurality of cell towers at a mobile device;
    uploading the recorded cell tower data from the mobile device to the UDR system as encrypted data;
    independently uploading cell tower authentication data to the UDR system from an operator associated with the cell towers;
    determining confidence that an agent associated with the mobile device is at the location, based on a match between the recorded cell tower data and the cell tower authentication data.

2. The method of embodiment 1, wherein the determined confidence is proportional to the number of the cell towers.

3. The method of embodiment 1, wherein the determined confidence increases based on repeated matching within a time.

4. The method of embodiment 1, wherein the mobile device is a mobile phone.

5. The method of embodiment 1, wherein the location corresponds to a location where a contract was signed.

6. The method of embodiment 1, wherein the location corresponds to a location where an event occurred.

7. The method of embodiment 1, wherein the location corresponds to a location where at least two people met.

8. The method of embodiment 1, wherein the location corresponds to a location where a photograph was taken.

9. The method of embodiment 1, wherein the location corresponds to a location path of a moving object (e.g., a vehicle, a plane, a projectile, a planet, a satellite, an individual, animal, a particle).

10. The method of embodiment 1, wherein the location corresponds to a fixed location (e.g., a person, vehicle, or item).

11. A method performed in conjunction with a UDR system, the method comprising:
   recording GPS satellite data received from a plurality of satellites at a mobile device having a GPS antenna and a wireless network connection;
   uploading the recorded GPS satellite data from the mobile device to the UDR system over the wireless network connection as encrypted data;
   independently uploading GPD signal data to the UDR system from fixed ground stations;
   determining confidence that an agent associated with the mobile device is at the location, based on a match between the recorded GPS satellite data and the GPD signal data.

12. A method performed in conjunction with a UDR system, the method comprising:
   continuously uploading location information from mobile device having a GPS antenna and a wireless network connection to the UDR system over the wireless network connection as encrypted data; and
   providing encryption keys to location stamps around a time of interest to verify the location
   wherein continuity of location guarantees that the location fact is accurate.

Detailed Description: Management and Utilization of IoT Networks

With the explosion in the number of internet-connected devices comes a deluge of manufacturers, hardware, communication formats, security standards and data. Internet of Things (IoT) and internet-connected devices is one area where digital fragmentation is currently acute—and is likely to become more acute in the coming years. Cisco estimates that 75 billion devices will be connected to the internet by the year 2025 (https://www.cisco.com/c/en/us/solutions/internet-of-things/future-of-iot.html). Each connected device generates a continuous stream of digital information, which may be stored, exchanged and eventually used. The amount of new data (new digital information) generated, transmitted, and stored daily in the world now defies imagination. The prospect of very large IoT networks raises several challenges:

1. Network management: who are the devices on the network? What are the software components installed on each device, what version, and when was each component installed? What are the hardware components and when was each installed? Where is each device physically located? Has it been tampered with physically? Did any device change location, or change network address? Are there any devices on the network who are not responsive, or behaving abnormally?What security standards does each device uphold, and what security patches have been applied? What is the device digital signature?

2. Device control: how to send commands over a uniform interface when there are many interfaces and APIs?

3. Measured data management: The continuous flow of data generated by continuous measurements of IoT devices, and by interactions of these devices with other devices and with users, is staggering. In principle, IoT measurements can be used for multiple purposes including research and insight mining, e.g. regarding individual and collective habits, verification, and validation as they constitute observed facts underlying many vertical flows, and more. In practice, IoT data is horizontally fragmented due to multiple storage formats, privacy concerns regarding personal data, and data hoarding incentives.

4. Data integrity and trustworthiness management. Large IoT networks generate a huge influx of measurements. Under digital fragmentation, a measurement is immediately disconnected from the device that took it, erasing the audit trail and making verification hard. If measurements are digitally signed, management of digital signatures is a challenge.

Digital fragmentation poses challenges and threats in all these levels.

We now describe an embodiment of the invention to management and utilization of IoT networks. The core idea is simple: each device is assigned a unique identity digital object in UDR upon being manufactured. In a possible embodiment, each device contains a hardware/hard coded key, e.g. a private cryptographic key, that unambiguously links it with its corresponding unique digital object. The identity of a device is mirrored in unique digital reality; just as the physical device is a unique thing, so is its mirroring digital object. In this way, the unique identity of the device does not depend on its physical location and is persistent even when software and hardware components are updated or replaced. Events such as software updates, physical device access, hardware component replacement, and changing device location, are recorded in unique digital reality as digital objects related to the device identity object and include the identity of the authorized person/entity who performed the update or change. The current security standards upheld by the device and the security patches applied are stored as objects in unique digital reality, allowing a clear picture of the security status of the entire network. An IoT network maintains an inventory of devices on the network according to their universal identifiers and can use it to track all device on the network and query their status. The identity of a device persists even as it is moved between different IoT networks.

On the control aspect, device control occurs though its corresponding unique digital object: an API request to the digital object invokes the device control command. This enables uniform control over large IoT networks. On the measurement aspects, each device measurement (or batch of device measurements) creates observed unique digital objects on UDR; this enables consolidation of all measurements obtained over the network, and integration of these measurements in vertical information flows. In a possible embodiment, each IoT device contains a certification module that creates unique digital objects at the hardware level or system software level. In a possible embodiment, verification of measurements, including automatic verification, relies on the fact that measurements are cryptographically signed by the device in a signature that corresponds to their unique device identity object; it is therefore clear which device took the measurement, where it was and what hardware/software it was running when the measurement was taken.

There are significant advantages to moving all IoT data to unique digital reality and indeed creating UDR-enabled IoT devices, with a native capacity to write measurements directly into UDR as they are made:

1. Horizontal consolidation—consolidation of interface, interface storage and data access. Among its many other properties, a UDR is a sophisticated permanent data storage system with native format management capabilities. Storing IoT measurements provides a uniform solution to numerous problems around storage, format, and access of IoT measurement data.
2. Management of the device community. IoT networks include several devices that can range in the tens of thousands and more. Keeping track of the identity of the devices in the network and the exact conditions in which measurements were taken, for example the location of a device, can be a challenging problem. Unique digital reality presents a solution, arguably the only conceivable solution, including a permanent universal identifying digital object
3. Privacy. When many unidentified IoT devices make measurements that are then stored in a digitally fragmented manner (using many siloed and obfuscated storage services, formats, and security standards) it becomes near impossible to track data measured by these devices and to ensure that it is used in a manner strictly respecting predefined privacy standards. Conversely, when all IoT devices identified using identity objects on UDR, and when all measurements they make are digitally consolidated, it becomes possible to define and enforce privacy standards regarding use of IoT measurements taken in both private and public spaces.
4. Certification of IoT measurements. Storing IoT measurements on UDR, preferably through a dedicated module on the IoT device, is a feasible way to certify measurements (for example, a constant stream of IoT is too big to go on a the blockchain). Along with the rest of vertical digital consolidation offered by UDR, conclusions drawn from processing of IoT data (including billing, usage, insurance claims, etc.) are easily verifiable.
5. Monetization of measurements. The totality of data measured by IoT devices in some context (for example, in a residential home) is valuable. It may be used, for example, to extract insight and train artificial intelligence systems. By storing measurements on UDR in a manner that unambiguously specifies the measuring device identity and location, as well as the owner of each measurement, this huge reservoir of information can be tapped and monetized.

Management of IoT device collections. The problem of management of IoT measurements aside, the sheer size of IoT networks and the fact that devices are physically embedded, mobile, or scattered across an area pose a significant challenge in terms of software updates, device location, cyber security, and hardware updates. Assigning to each IoT device a unique identity object in UDR offers significant advantages, including:

1. Management of devices on the network and their physical location.
2. Management of software updates.
3. Management of hardware updates.
4. Management of physical tampering with a device.
5. Certification and record of IoT control commands.
6. IoT automation and process integration.

In an embodiment, every IoT device is manufactured with a new unique identity object. The identity object is the mirror, on UDR, of the physical device: it contains serial numbers, hardware digital signatures, hardware, and software configurations, etc. By operating-system level hooks on the IoT device, any software update on the device creates a unique digital object representing the software update and linked to the devices' identity object. When a device is made of different sub-parts, each part may have its own unique identity object, and the identity object of the device will link to the identity objects of its sub-parts; exchanging a sub-part of a hardware results in a new device, and so, in a possible embodiment, could create a new identity object. When a device is destroyed, the identity object of the device is either marked with a mutable flag to this effect, or a new unique digital object marks the device permanently destroyed. OS-level digital signature verification makes it possible to digitally sign hardware components and remotely verify the physical integrity of each device. There are numerous cyber-security advantages to this approach: for example, it is possible to positively enumerate the devices on a network and detect and unknown devices; it is possible to detect a device that is running a software version, or has different installed components, than the ones documented in UDR.

The processes and protocols describe above enable to use UDR to create a consolidated inventory of IoT devices in each physical space, organization, vehicle, property, or computer network. It enables to track their current location continuously and reliably, current hardware configuration and current software configuration. It enables to store IoT measurements and IoT control events (such as door access) in a consolidated way, making these measurements permanently software accessible over a uniform interface, verifiable, explicitly owned, and monetizable. It enables vertical digital consolidation in the sense that conclusions drawn, using a processing stage, from measurements made by (potentially multiple) IoT devices, can be traced back and verified by accessibly the underlying verifiable IoT measurements.

Running example. Suppose that unique digital object with universal identifier "w5kx" is a door with status sensor and open/close controller. The door status can be queried through the HTTP GET command:

GET http://facts.com/w5kx/get_door_status

And the status can be changed through the PUT command:

GET http://facts.com/w5kx/close_door

This event is then recorded on UDR as the device creates a new object mirroring this event. In contrast to IoT device access through its assigned network address, this interface addresses the device through its universally unique identity and uses the UDR identity authentication mechanism.

The full list of device components can be obtained e.g. with:

GET http://facts.com/w5kx/get_hardware_component_list

To replace a hardware component, a new unique digital object is created as a newer version; the old unique digital object stays in UDR—so that all measurements taken with the old hardware, and that are mirrored in digital objects that cite the old object, can still be verified, and understood to be taken with the old hardware.

Detailed Description: Omnicodes—Ubiquitous Machine-Readable Codes

In a digitally transformed world, the physical, financial, legal, and IT realities are mirrored in digital reality, and various operations regarding objects in these realities happens by using the digital mirror. Unique Digital Reality makes it possible to mirror an object in various layers of reality with a unique digital object, and attached a machine-readable code, which contains the universal identifier of the mirroring unique digital object. The code, which we call omnicode for the purpose of this disclosure, is intended to allow human users to interact with the mirrored objects through their mirroring digital objects.

Consider the following examples:

Connecting and signing a contract and an appendix. To connect a contract and an appendix, the user simply scans the code on both documents. To sign, the user scans the code.

Ordering service for an electrical appliance. To look for a service technician for an appliance, the user scans the code on the appliance.

Connecting digital documents to physical objects. To connect digital documents, such as service contracts, user manuals, manufacturer's guarantee, to a physical object an appliance), the user scans the code on the appliance and the code on the document.

Creating and reviewing service records for a physical item/device. Each service provider scans the code on the device and enters a new service record; the entries are stored on UDR. Service provider scans the omnicode on the device to add a new record. Service records are immutable and permanent—stored on UDR. By scanning the omnicode on a washing machine or a car, the user can access the entire service history of the item/device—including identity of the service provider, identity of any parts replaced also connected through their omnicodes, location of the service, time/date, etc.

Creating a conversation regarding a physical device. Each user around a physical device or physical location can scan a code and enter comments that will be available to anyone else scanning the code. This service record is persistent through ownership changes on the item, like car service records.

Loaning, renting, or transferring ownership over an item. To transfer ownership over an item, such as an art piece, musical instrument, a vehicle, an appliance, the owner, and buyer both scan the code on the item.

Checking in. To check into a hotel room or a physician's office, the user scans the code in the room.

Comparing two items. To understand how two items are different or similar, for example, are these two paintings by the same artist? Are these two appliances the exact same model? Etc., the user scans the two codes on the two objects.

New application layers. With a code on each object, connecting to unique digital objects in UDR, new applications can be developed.

Accessing a device through its code. The user scans the code on a light switch and obtains a software interface to that light switch; the code reveals the current network address and API of the device.

Getting rid of paper documents E.g. restaurant menus and stand-alone devices, e.g. light switch, and thermostat. There is a code in the room; the digital object mirroring the room has thermostat functionality. The user scans the code and then uses a UI on a mobile computing device to set the thermostat.

Opening a door. Instead of a button, there is a code. The code allows a user to interact with the door (open it with proper credentials.

Institution or corporate inventory tracking, service tracking, and accounting. Every item purchased has an omnicode, and thus has a unique digital identity. The omnicode is used to manage inventory (keep track of which item is where), ownership (who in the organization is responsible for which item) and accounting (match item with payment made for it).

Omnicodes vs Universal Product Codes (UPC) and QR codes. Machine-readable codes have been used in various industries for decades (for example, UPC codes in retail). Existing examples for using machine-readable codes include:

Boarding pass
Vehicle fleet management
Supply chain and delivery management
Pet microchip
UPC product barcodes
Vehicle identification number
Luggage tracking in the commercial airline industry With the rising popularity of smartphones, QR codes became the most popular example of a machine-readable code, mostly used to encode URLs. Crucially, the present embodiment of the invention teaches a machine-readable code which permanently references a unique digital object. As such, an Omnicode may be implemented using the existing standard of QR codes but is not in any way equivalent or exchangeable with the standard of a QR code. The latter is a standard for optical machine-readable codes; in contrast, Omnicodes are specifically used to connect objects in various layers of reality (such as physical objects, objects in augmented reality, objects in virtual reality, information represented on screens, etc.) with unique digital objects used to mirror these objects. While a preferred embodiment of Omnicodes uses optically readable codes, other presently available embodiments may use other methods, such as RFID and other close-proximity radio-frequency standards.

Attaching an omnicode. How are omnicodes attached to objects?

Physical omnicode: a physical object is manufactured with a universally unique omnicode containing the universal identifier of its mirroring unique digital object; a physical document is printed with the code.

Attaching a code in augmented reality. Fixed-location objects in physical reality, such as buildings, rooms, squares, statues, can be attached an omnicode without physically attaching it anywhere. The unique digital object mirroring the physical object contains an exact location and orientation in space; augmented reality applications connected to UDR can display the code when a user looks at the object through an augmented reality application.

Attaching a code to objects in virtual reality. Omnicodes enable to merge physical worlds, augmented reality worlds and virtual worlds. An object in a shared virtual reality exists in that layer of shared reality; may display an omnicode to allow users to interact with it and connect it to objects in other layers of reality, for example a door in virtual reality may be open whenever another door in physical reality is open.

Explicit reference to objects. In current state of the art, some physical objects present unique serial numbers—while most do not. As the unique digital object linked using an Omnicode to a physical object is universally unique and permanent, it becomes possible to uniquely reference the physical object (in a contract, for example) and to create digital records of transactions involving it—for example, moving an inventory item between departments.

Linking Objects Across Layers of Reality

Linking documents to physical objects

Linking objects in shared virtual reality to physical objects

Figure 51:
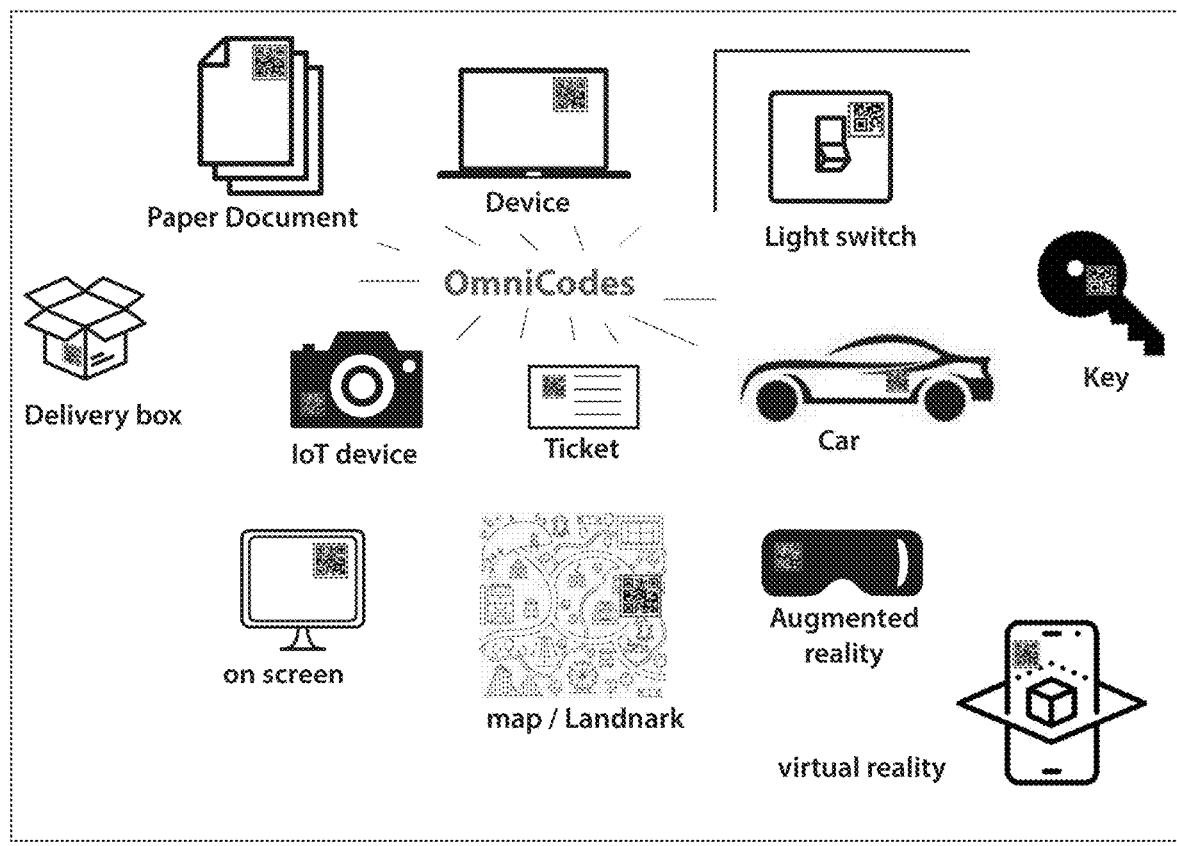
FIG. 51 shows possible uses of Omnicodes in various objects in physical, augmented, and virtual reality.

OmniCodes are evocative of the notion of UDR. An object (in physical reality, is a permanent, unique thing. This is how our perception of physical reality is formed. Assignment of a code implies the existence of a digital object that is unique and permanent and corresponds to the physical object. The digital object cannot be copied just like the physical object cannot be copied. So attaching an OmniCode is equivalent, in a conspicuous way, to creating a unique digital representation/mirror of the object. FIG. 51 shows possible uses of Omnicodes in various objects in physical, augmented, and virtual reality.

Omnicodes bring objects on physical reality, shared augmented reality, shared virtual reality, and UDR together on the same level. The same code system is used for all objects, making it possible to connect/link objects on different layers of reality.

Omnicodes enable a range of applications that herald endgame digital transformation. Indeed, the convergence of digital objects and physical objects is a hallmark of endgame digital transformation.

Controlling objects and interacting with a device through Omnicodes. An omnicode connects an object to a unique digital object in UDR. The API of the unique digital object may enable actions on the linked object.

Creating object associations through Omnicodes. Object associations, for example which books belong on this shelf; which objects belong in the same kit; etc., are implicit in human behavior. Omnicodes make it possible to define these connections explicitly, e.g. by scanning codes and defining sets or associations.

Interaction with an information object through Omnicodes. As taught elsewhere in the invention, a human user man interact with an information object, which is presented using an Outlet on a user interface, through a machine-readable code. Such an interaction may include consent to information presented, verification of information presented, and so on.

Creating and managing inventories of physical objects and devices using Omnicodes. When every physical object of a given collection of objects presents an Omnicode, the entire collection is mirrored in unique digital reality. It thus becomes possible to create and manage inventories of physical and digital objects.

Embodiments of the Invention Specifically Designed to Address Drivers of Digital Fragmentation Part of the process of digital consolidation necessarily involves addressing the drivers of digital fragmentation mentioned above.

Data Hoarding will be naturally addressed by the overwhelming benefits of horizontal digital consolidation. Horizontal digital consolidation will necessarily increase the democratization of AI because small and medium-size players who are not the great data hoarders will be able to rent huge datasets to train their AI or buy/rent AI models already trained on huge datasets.

Power checks and balances can be addressed in the primitive design principles of a unique digital reality system. For example, when implementing UDR with a large-scale system of enduring network interfaces, several large commercial entities can operate major responsible authorities, so that the physical storage of payloads is not itself consolidated—only the interface is consolidated. The system design can and should make sure that the storage authorities themselves do not have the encryption keys to sensitive payload data or to all payload data for that matter, so that it will be impossible for anyone including a cyber attacker or a government to seize control over all payload data. In this sense the design of a UDR system can be highly semi-decentralized, not unlike the world wide web (WWW).

Tendency to inject friction, and the need for obfuscation can be addressed by injection of artificial friction and artificial obfuscation (see below).

A few inventions can plug-in, in a nonintrusive manner, into existing workflows, but usher in digital consolidation. These will be essential in the period of transition into advanced digital transformation.

Next Generation Digital Documents and machine-readable document codes. In endgame digital transformation there are no documents—physical or digital. A document is purely human-readable information object; it confuses and mixes information content with user interface. Documents are horizontally consolidated in that they can be owned and transacted between arm's length human counterparties but are a source of vertical fragmentation as they cannot cite data sources, cannot connect data to processing, cannot mirror processing events and cannot connect results shown to their underlying vertical flow.

In contrast, endgame digital transformation presents the content of unique digital objects through outlets and jackets (see below), which are ad hoc presentations suited to the user interface used and the nature of the user interaction at hand. Still the transition period from current state of the art to this future vision will take time, and documents are going to be around for a while. To mitigate the vertical fragmentation inherent to documents, and make them a little more software accessible, an important transition invention is what we may call, for lack of a better term, Next Generation Documents (NGDs). These are unique digital objects whose payload is a PDF digital document augmented with additional key-value properties that exposes some of the information on the PDF in machine-readable format. For example, the properties can identify by unique identity identifier individuals mentioned in the PDF, such as contract parties or property owners; key numbers mentioned such as monthly rent, sale amount, etc.; geographic location; and cross-reference, using universal identifiers, other unique digital objects including other NGDs. Any presentation of an NGDs on a user interface (screen or paper) clearly displays a machine-readable code with the universal identifier of the underlying unique digital object, and a visually recognizable symbol that evokes the fact that underlying the presented digital document there is rich functionality and verifiability guarantee which are substantially different to those of regular digital documents. The machine-readable codes can be used for multiple purposes, including uniquely identifying a hard copy (such as identifying the printing individual and time of the printing event); connecting two documents (for example, marking document B as appendix to document A, or as a version of document A, etc.); signing/granting consent to the contents of the document; executing verification scripts; tracking copies of a sensitive document; etc.

Detailed Description: Artificial Digital Friction

Embodiments of the invention teach a method and apparatus for injection of human signature rights into an automatic system for the purpose of:
- (i) gradual adoption of UDR based paperless, and automatic systems;
- (ii) gradual adoption AI systems; and
- (iii) cyber security. Human signature rights are injected at crucial decision junctions in systems that could have otherwise performed fully automatically.

The Concept of Friction. In paper-based protocols, for example, in bureaucracy, administration, auditing, and corporate back office, manual labor is required to perform tasks that are fully algorithmic in nature. These include:
- Consistency: Asserting that numbers and other information in two different locations matches (such as in two different forms);
- Dependency: Asserting that a document collection is complete, meaning that all required documents have been attached;
- Constrains: Asserting that pre-defined rules and constrains have been satisfied;
- And so on.

In processes that used to involve human oversight and human judgment, human confirmation and simple judgment is injected artificially in critical process junctions—even when human intervention is known to add no value (or even harm) the automated process based on artificial intelligence and/or automated UDR protocols.

One of the reasons why bureaucratic processes are sometimes cumbersome and contain unnecessary steps, numerous people who must sign, etc., is that there are more safety stops along the process, and people with authority remained important and in control of the process as it developed. By artificial injection of friction, digital transformation of processes where decisions and judgment are handed over from persons to software, people who oversaw the process will support the transition; people who must support the transition to a digital automatic process will be more inclined to do so as, for instance, concerns regarding the repercussions of a fully automated system going rogue due to a cyberattack will be mitigated.

We now observe that the inefficiency of enforcing manual labor has an important hidden benefit—it injects human judgement rights, veto rights, and signature rights. These rights give the people doing the manual work a sense of importance, justify their salary, and provide safeguards by allowing human judgement.

In a UDR-based system, documents are replaced by Next Generation Documents, and facts exhibit semantic information allowing manual labor to be performed by SICCL scripts. Whole tasks of approving requests submitted to a government office, auditing financial reports and tax forms, etc., can readily be done by software. The present application teaches that fully automated systems are in fact harder to adopt as they face resistance by the people who will be replaced by the machine and raise concerns of lack of human judgement and veto rights.

Possible concerns in adoption of UDR based, "paperless", and automatic processes.
- Loss of jobs. Often the people who need to sign off on transition to an automatic system are the same people who will be replaced and displaced by that automatic system. They are concerned for their jobs. Injecting digital friction simply changes their job from manual labor to overseeing an automatic system, giving them less work but with the same authority.
- Distrust of the machine. It is hard for human experts to accept the fact that an AI algorithm outperforms their hard-earned expertise especially when they have been properly trained on massive datasets. By injecting signature rights, oversight, and judgment rights at critical junctions in the process, and by presenting the AI algorithm as a 'recommendation' for the human expert to adopt or reject, the honor of the human expert is satisfied.
- Cyber security concerns. Human signature rights are safeguards against malfunctions and cyber-attacks. A fully automated system is prone to malfunctions and cyber-attacks, and the automatic process will continue uninterrupted with potentially disastrous consequences. Human oversight and judgment acts as a safeguard that alerts a human agent if something is wrong and interrupts the automatic process.

Artificial (namely, ostensibly unnecessary) injection of artificial human intervention, confirmation, and judgement serves two different crucial needs in transition to Digital Transformation. One, it supports adoption of automated information processes. It makes people who are no longer needed for the process, but who must sign off on automation and transition to a digitally transformed process instead of the manual process over which they had control, more likely to support the transition. This is because it seems the automated process makes their job easier—supporting it—but does not make them redundant. Two, adding human judgement at critical process junctions improves cyber security by preventing a fully automated system from going rogue due to a cyberattack. Injection of human signature rights, human intervention, etc. can be implemented using airgaps and hardware that physically prevents the machine from acting without human consent at certain stages.

Artificial Friction may be injected on purpose into a system that could have been fully automated otherwise. User interfaces are created that call for human decisions at critical decision junctions. These decisions can be taken by the machine, often with performance success superior to that of human decisions; yet, injecting digital friction serves important purposes as described next.

Injection of human signature rights into an automatic system can (i) facilitate gradual adoption of an automated process, (ii) increase cyber security, and (iii) facilitate adoption of Artificial Intelligence (AI) systems. The execution of a task can be separated from its inputs by an airgap,—such that the task is physically impossible without human signature.

An embodiment of the invention injects artificial friction (in the form of human veto rights and artificially introduced human approval stages) to bureaucratic processes that could otherwise become fully automated by transitioning from document-based human-based processes to Next Generation Documents and unique digital object-based processes, which are automates by the use of SICCL and other methods taught herein. Examples for such processes are loan application verification in banks; insurance claims processing at insurance companies; financial auditing; advertisement campaign strategy; government bureaucratic processes, and so on. In each of these processes, human veto rights can be easily injected and a human confirmation may be required at different stages along the other automatic process.

FIG. 52 describes an example of injection of artificial friction into a process that has been digitally transformed and automated using UDR: for example, in a process based on documents in hybrid digital-document shared reality, an application form 5201 has to be filled and properly signed by the applicant 5202, before being reviewed by an approving manager 5203. Using embodiments of the inventions taught herein, consider a fully automated process, in which the applicant grants the form access to personal information on UDR, allowing the form to be filled automatically. The user may then sign the form in a verifiable interaction with a user interface, as taught above. As a result, a SICCL or similar script 5204 may be used to verify correctness and compliance of the form automatically—eliminating the need for intervention by the approving manager 5203. When injecting artificial friction into the process, the automated process concludes as above, however, after the automated process 5205 verifies the application, an approving manager is prompted to approve the application on a user interface 5206, while informing the manager that the automated process has successfully verified the application. This leaves the automated verification process in place while granting a human supervisor veto right in the process.

Figure 53:
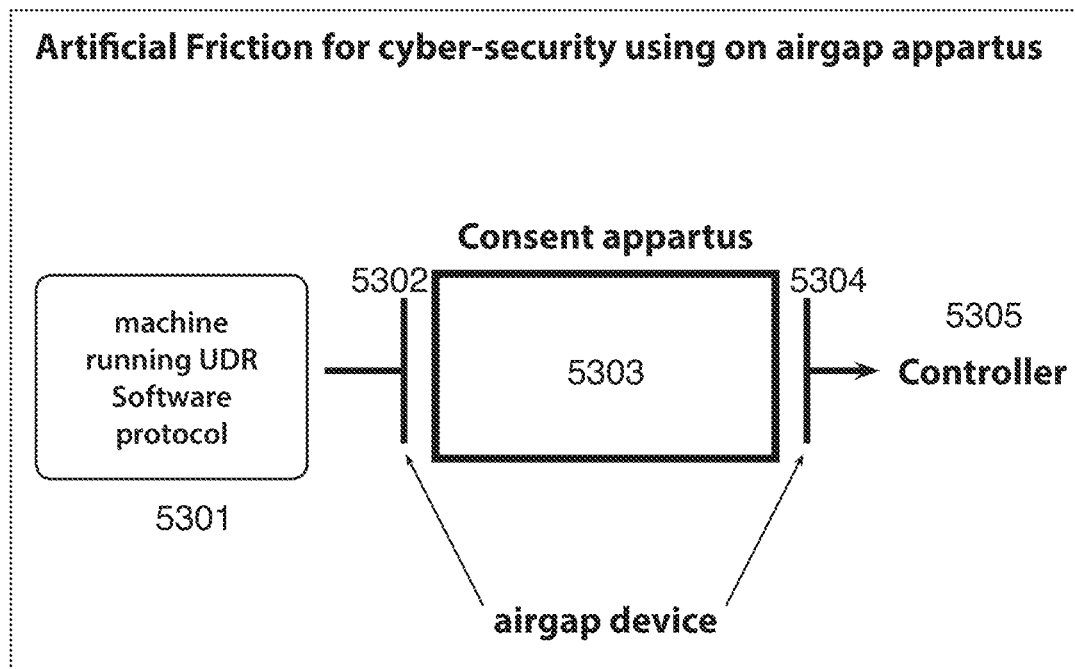
FIG. 53 shows artificial friction for cyber-security using an air-gapped apparatus.

FIG. 53 shows artificial friction for cyber-security using an air-gapped apparatus: an automated process running UDR software protocols 5301 will trigger a control decision in a controller 5305. For example, verification of a set of consistency and compliance conditions might trigger a wire transfer of funds to a third party. Such automation, if left to execute without human intervention, has the inherent risk that a cyber-attack will cause the control decision to be taken outside of the defined conditions set in the automated process definitions. To prevent this, a human veto right is artificially injected using an air-gapped apparatus 5303, which contains a user interface for human approval. Information is relayed over a one-way air gapped channel 5302 to the veto apparatus, and over a second air gapped channel 5304 to the controller 5305. This prevents hostile takeover of the veto apparatus and ensures human veto right before the automated process triggers the controller.

Example Embodiments

1. A method comprising:
creating an interface for human interaction at one or more decision junctions of an automated system;
wherein oversight of the automated system is provided through the interface for a person that is replaced or displaced by the automated system.

2. The method of embodiment 1, wherein creating the interface includes injection of human signature rights for the person, and wherein the oversight of the automated system requires receipt of an authorized signature by the person through the interface.

3. The method of embodiment 2, wherein the oversight of the automated system is provided for gradual adoption of the automated system.

4. The method of embodiment 2, wherein the oversight of the automated system is provided for gradual adoption of an artificial intelligence (AI) system.

5. The method of embodiment 2, wherein the oversight of the automated system is provided for cyber security.

6. The method of embodiment 1, wherein the automated system is a paperless UDR based system.

7. The method of embodiment 1, wherein the one or more decision junctions of the automated system are fully algorithmic in nature, and wherein the oversight of the automated system requires manual interaction by the person through the interface.

8. The method of embodiment 7, wherein the manual interaction includes any of human judgement rights, human veto rights, or human signature rights Preservation of Data Provenance Across Applications and Computing Devices (Cross-Application "Smart Copy-Paste")

In an embodiment of the invention, operating systems implement OS-level interface o UDR and enable native application-level UDR access. This enables preservation of data provenance across the vertical information flow: as different information objects are connected, UDR maintains a complete record of the connections, and new information objects that are generated by processing applied to existing information objects. However, in present operating systems this is not easily done.

An embodiment of the invention addresses one of the primary user-interface operations that disturb the vertical information flow: the popular "copy-paste" operation. A copy-paste operation marks digital information from one application and lands a copy of that information in a different location or document edited by the same application, or in a different application altogether. Just like the "file save" operation, a "copy-paste" operation interrupts the provenance trail and audit trails, as the pasted information is disconnected from its origin. In this embodiment of the invention, application extensions and plugins implement extended functionality that allows word processors, spreadsheets, presentation editors, and rich HTML email composers to embed UDR objects. The application holds an additional content layer that notes the universal identifier of the UDR objects, such as numbers, tables, photos, text, and other content, embedded in the document, presentation, or spreadsheet. The plugins extend the functionality of standard copy and paste operations such that when an embedded UDR object is copied, the clipboard notes the unique identifier of the object copied and, on performing the paste operation, it is embedded again as a UDR object. This preserves the data provenance of UDR objects across multiple documents.

As an example, consider a Next Generation Document (NGD—see below) containing a rent contract. The contract rent amount, just like all other information in the Next Generation Document, is immutable. An NGD document reader may implement the extended "copy" operation described above, so that when the rent amount is selected in the reader and "copy" is pressed, the information copied to the clipboard contains not just the rent amount devoid of any context, but also the unique identifier of the NGD (as a unique digital object) and the specific key of the field "rent" that was copied. When the value is pasted, the receiving application may note that extra information in the clipboard and retain the fact that the number pasted is the "rent" field of the specified unique digital object, preserving the provenance trail.

Verifiable HTTP Queries

Embodiments of the present invention teach a method to make verifiable Hyper Text Transfer Protocol (HTTP) queries, namely, HTTP queries that are witnessed in a way that allows the query maker to prove, later, that the server had indeed returned the response as documented.

Websites, as they appear on browsers, have become facts to be contended with. More specifically, facts that a Web server returns in response to a specific query could be inadvertently accepted as authentic and could even appear in newspaper headlines. Examples are:
  A story that appears on an online Web page
  A recommendation made to a customer on an e-commerce website
  An item that was shared in social media and then deleted A hacked Web page that returned altered content as set by the hacker And so on.

The standard way today to prove that a tweet, which has meanwhile been deleted, had indeed been published, is to take a screenshot of it.

Technical Description: To verify HTTP queries, the queries and corresponding responses can be recorded as facts in UDR. In some embodiments, a UDR-enabled web proxy can be placed in-line between an HTTP client and Web HTTP servers. When the client issues an HTTP request, the proxy intercepts the request and passes it to the corresponding server. The server returns the query response to the proxy, which passes the response to the client and generates a fact identifying the time and content of the response.

In other embodiments, a parallel HTTP witness duplicates a client's HTTP requests and records the server responses as certified facts.

Verifiable SQL Queries

This embodiment of the invention teaches a method to run verifiable Standard Query Language (SQL) queries, giving the database owner and any recipient of the query results the ability to prove, conclusively and verifiably, that the SQL database did indeed return the specified results for the specified query at the specified time.

Most production data are stored today in relational databases. Banks, hospitals, government offices, and insurance companies all hold data this way. These authorities, agencies, and entities produce paper documents with the results of Structured Query Language (SQL) queries to represent the state of the database and, more specifically, the results of a specific query. The customer is given a piece of paper with printed information, which is the result of an SQL query, thus degrading the information quality from digital to bitmap.

Technical Description: To verify SQL queries, a SQL witness (or proxy) operates in parallel to a SQL client and server. When the client sends a request to the server, the client also sends the request to the SQL witness to likewise query the server. The witness stores the server's response to the request as a UDR fact.

Figure 54:
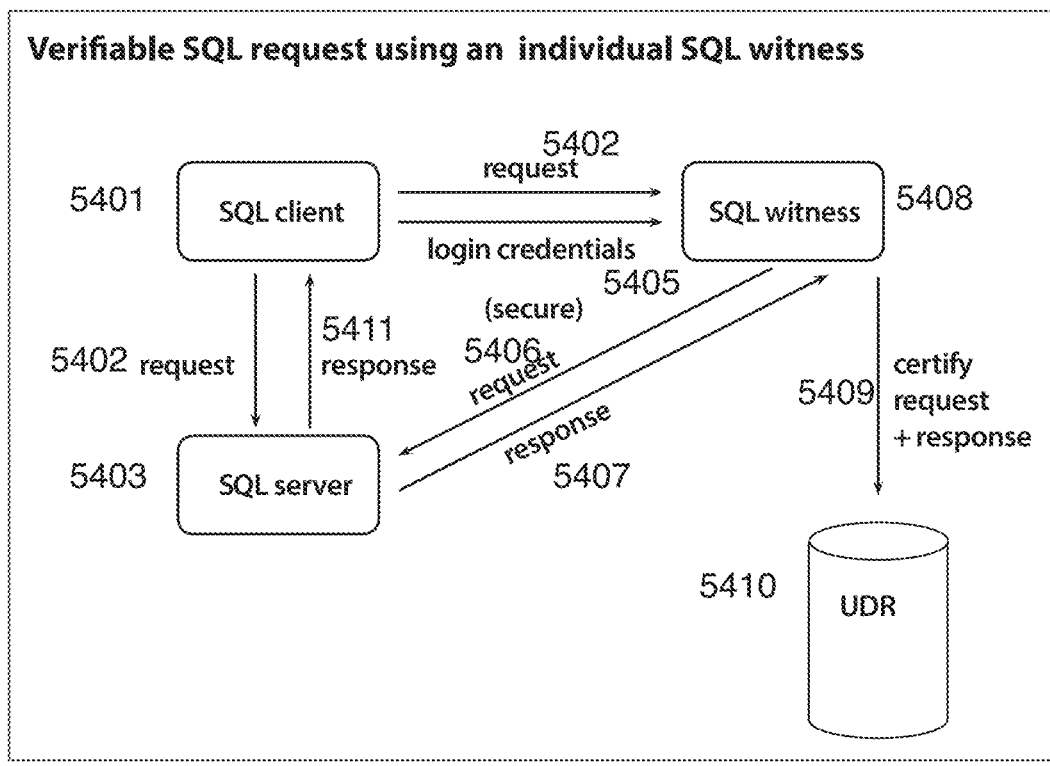
FIG. 54 shows a method for verifiable Standard Query Language (SQL) requests using an SQL witness service.

FIG. 54 shows a method for verifiable SQL requests using an SQL witness service: SQL client 5401 makes an SQL request 5402 to SQL server 5403. The client also sends an identical request 5402 along with server login credentials 5405 to an SQL witness 5408, which is a special-purpose server designed to allow verifiable SQL requests. The SQL witness 5408 uses the login credentials 5405 to send a request 5406, identical to request 5402, to the SQL server 5403. The server responds to both requests—the client 5401 receives a response 5411 and the witness receives a response 5407. The witness creates a new unique digital object in UDR 5410, whose payload consists of information 5409 sent by the witness to UDR, namely, the request 5406 it made to the server and the response 5407 it received. This allows the client to make the verifiable claim that the request 5402 received the claimed response 5411.

In another possible embodiment, the witness instead acts as an SQL proxy server: instead of communicating the request to the server directly, the client only sends it to the proxy. The proxy (which acts as a witness) relays the request to the server, records the request and the response in UDR, and returns the response to the client.

Verifiable Spreadsheets

Spreadsheet applications are a popular platform for data processing. In banking, finance, government, and more, the results of spreadsheet calculations are used pervasively However, they are also notoriously difficult to audit and verify; errors in spreadsheet are notoriously hard to root out as they propagate downstream the information flow. Spreadsheet calculations are, in fact, deductive reasoning processes, which are defined as part of the spreadsheet, deducing some 'bottom line' numbers or figures. Bottom-line numerical results from a spreadsheet, when moved by copy-paste away from the spreadsheet in which they were generated, create a gap in the vertical information flow and pose a challenge for manual audits (not to mention automated audits) down the information flow.

In an embodiment of the invention, any version of a spreadsheet can be recorded in immutable form as a unique digital object in UDR, where the API of the spreadsheet unique digital object allows read-only access to individual cells of the spreadsheet. An application extension on top of the spreadsheet editor adds an additional layer of content on top of every spreadsheet. The additional layer contains a relationship graph of dependencies between all populated cells, noting which cell is calculated from which cell.

The plugin colors the origin cells—cells that contain typed-in values and information. The plugin also allows embedding UDR objects (primarily, numbers) in the spreadsheet and enumerating the totality of the origin numbers and values that were typed in and embedded as UDR objects. For auditing the spreadsheet, the plugin marks audited cells and unaudited cells. Target cells whose source cells have all been audited are also audited.

Embodiments of the invention teach a method for efficient validation and verification of entire spreadsheets. Combining with provenance-preservation methods (see Preservation of Data Provenance Across Applications), the method allows to efficiently locate the source of the errors across multiple spreadsheets and other sources of information, and to publish the results of spreadsheet calculations (numbers, tables, and figures) as UDR objects in a manner that is verifiable and transparent.

Figure 55:
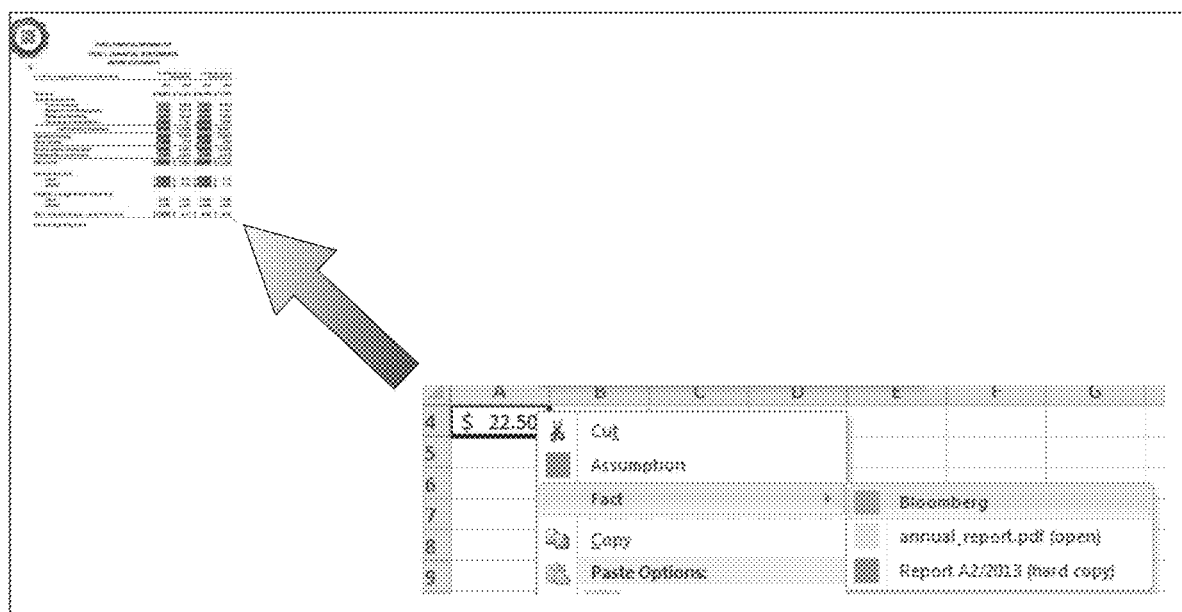
FIG. 55 is an illustration of spreadsheet software plugin turning specific cells in a spreadsheet into verifiable unique digital objects that may be embedded in other documents while maintaining audit trail.

FIG. 55 is an illustration of spreadsheet software plugin turning specific cells in a spreadsheet into verifiable unique digital objects that may be embedded in other documents while maintaining audit trail.

Figure 56:
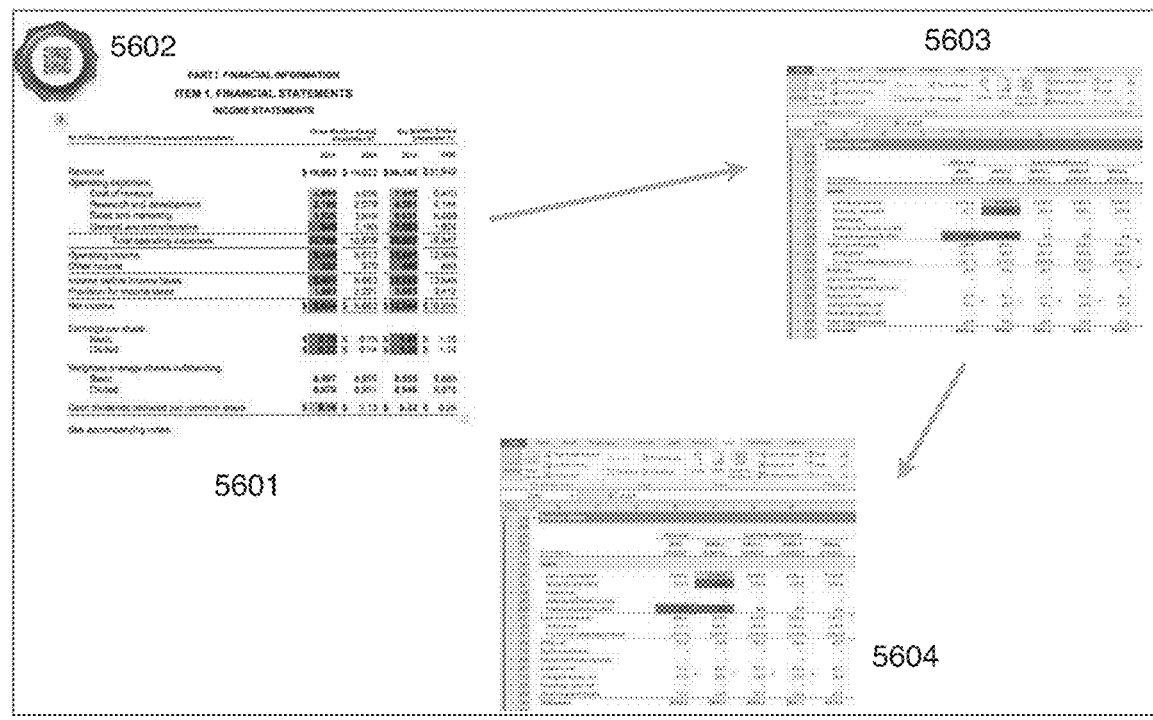
FIG. 56 shows a financial report document that contain machine-readable and human-readable unique identifiers of unique digital objects, whose payload is a verifiable spreadsheet where numbers in the report were computed.

FIG. 56 shows a financial report document that contain machine-readable and human-readable unique identifiers of unique digital objects, whose payload is a verifiable spreadsheet where numbers in the report were computed: document 5601 is a unique digital object presenting a unique identifier 5602. It is a financial report containing "bottom-line" numbers produced by spreadsheet 5603, which it turn depends on numbers produced by spreadsheet 5604. Using the methods described herein, both spreadsheets 5603 and 5604 are recorded as unique digital objects in UDR, and a hidden layer in the spreadsheet records the unique identifiers of numbers that were copy-pasted into cells in the spreadsheet. Spreadsheet 5604 contains some cells whose content is unverified; they are marked in red. In an embodiment of the invention, all cells in spreadsheet 5603, whose content depends on the "red" cells, are automatically marked red. All numbers in the report 5601, which depend on "red" cells, are also marked in red. As a result, information consumer has visual signal on the trustworthiness of specific numbers shown numbers that rely, directly or indirectly, on unverified numbers, in any spreadsheet along the computation chain, will be clearly and visibly marked.

Example Embodiments

1. A method for preserving data provenance across an application, the method comprising:
    adding a layer of content on top of a spreadsheet application that includes a plurality of cells, wherein the layer of content includes a relationship graph of dependencies between all populated cells, wherein the relationship graph notes which of the populated cells is calculated from other cells; and
    establishing a plugin for the spreadsheet;
    wherein the plugin identifies origin cells of the plurality of cells, wherein the origin cells contain any of typed-in values or information;
    wherein the plugin allows embedding UDR objects in the spreadsheet; and
    wherein the plugin allows enumerating the totality of origin numbers and values that are typed-in and embedded as UDR objects.
2. The method of embodiment 1, wherein the embedded UDR objects are numbers.
3. The method of embodiment 1, further comprising:
    auditing the spreadsheet, wherein the plugin marks audited cells and unaudited cells.
4. The method of embodiment 3, wherein the auditing includes auditing target cells whose source cells have been audited.
5. The method of embodiment 1, further comprising:
    tracking and error across any of across multiple spreadsheets or other sources of information, to locate a sourced of the error.
6. The method of embodiment 1, further comprising:
    publishing results of spreadsheet calculations as UDR objects in a manner that is verifiable and transparent.
7. The method of embodiment 6, wherein the spreadsheet calculations include any of numbers, tables, figures, or any combination thereof.
8. The method of embodiment 6, wherein the spreadsheet calculations are based on a deductive reasoning process.

Verifiable HTTP Queries

Embodiments of the invention teach a method to make verifiable HTTP queries, namely HTTP queries that are witnessed in a way that allows the query maker to prove, later, that the server had indeed returned the response as documented.

Websites, as they appear on browsers, have become facts to be contended with. More specifically, facts that a Web server returns in response to a specific query could be inadvertently accepted as authentic and could even appear in newspaper headlines.

Examples Include

A story that appears on an online Web page;
A recommendation made to a customer on an e-commerce website;
An item that was shared in social media and then deleted;
A hacked web page that returned altered content as set by the hacker;
And so on.

The standard way today to prove that a tweet, which has meanwhile been deleted, had indeed been published, is to take a screenshot of it.

Figure 57:
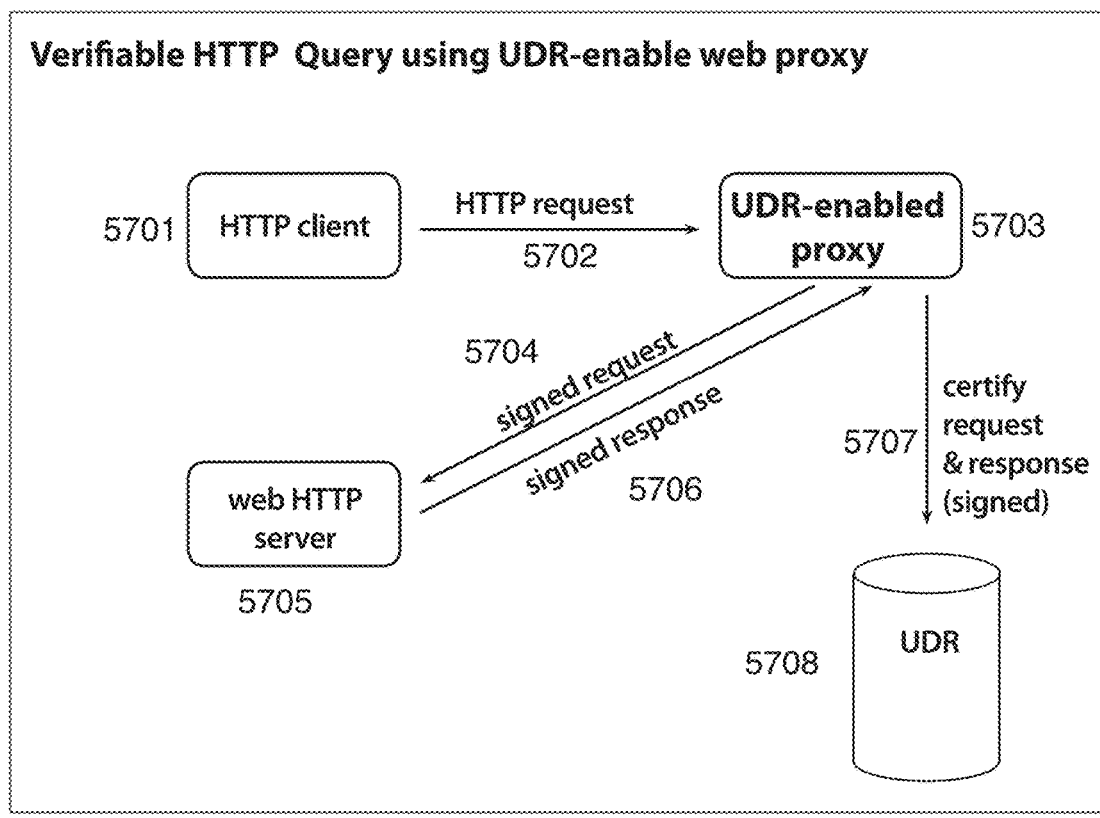
FIG. 57 shows an implementation of the method of verifiable HTTP Query using a UDR-enabled HTTP proxy.

Technical Description. To verify HTTP queries, the queries and corresponding responses can be recorded as facts in UDR. In some embodiments, a UDR-enabled Web proxy can be placed in-line between an HTTP client and Web HTTP servers. When the client issues an HTTP request, the proxy intercepts the request and passes it to the corresponding server. The server returns the query response to the proxy, which passes the response to the client and generates a fact identifying the time and content of the response. FIG. 57 shows an implementation of the method of verifiable HTTP Query using a UDR-enabled HTTP proxy: HTTP client 5701 would like to make an HTTP request 5702 to HTTP server 5705. It instead sends the request to UDR-enabled HTTP proxy 5703, which, acting as a standard HTTP proxy, forwards the request 5702 as a new request 5704 to server 5705, and obtains a response 5706 from the server. The response is then returned to the client 5701 (not shown in the figure). Acting as a UDR witness, the UDR-enabled proxy then sends the request and response to UDR 5708, creating a unique digital object whose payload includes the contents of the information 5707 sent to UDR. In a possible embodiment, the UDR-enabled proxy 5703 may cryptographically sign the request and response to ensure they are not tempered with, or otherwise uses a secure socket layer (SSL) in its communication with the HTTP server 5705.

Figure 58:
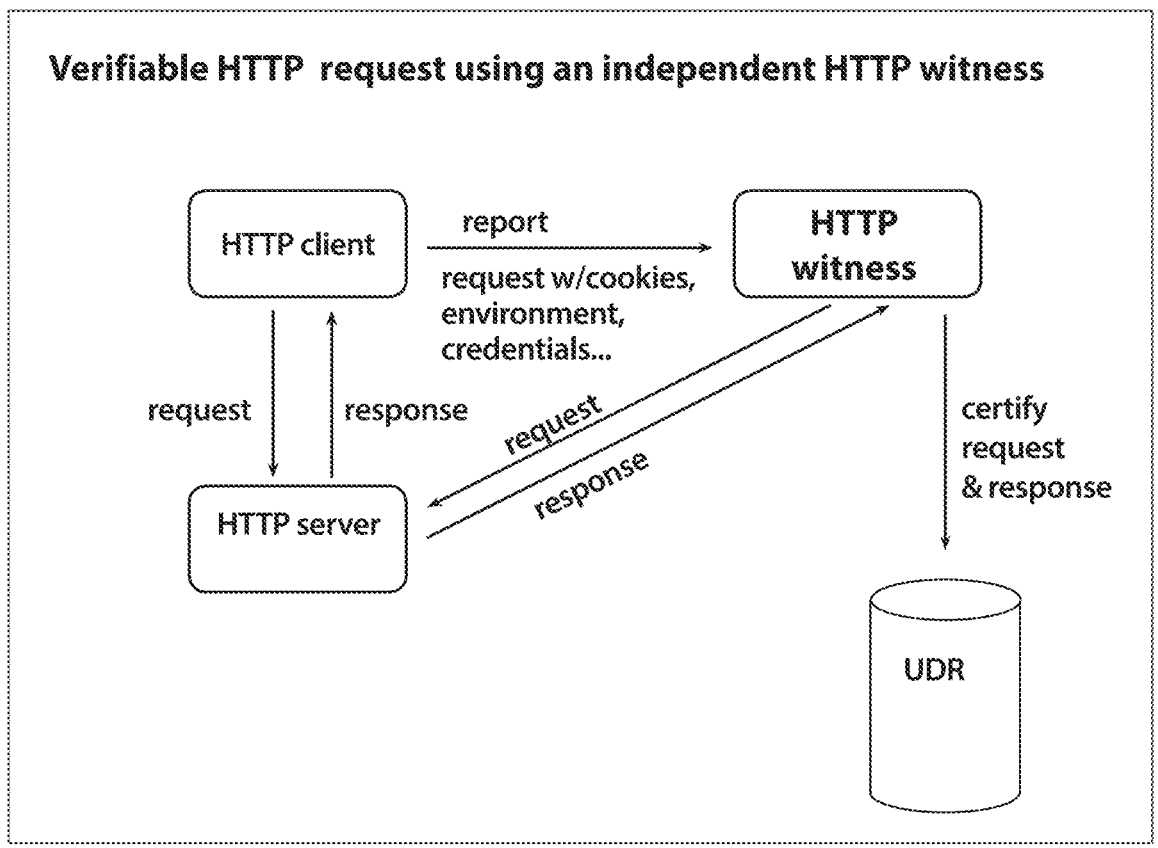
FIG. 58 shows verifiable HTTP request using an HTTP witness service.

In other embodiments, a parallel HTTP witness duplicates a client's HTTP requests and records the server responses as certified facts. FIG. 58 shows verifiable HTTP request using an HTTP witness service, which, analogous to the protocol described in FIG. 54, does not act as proxy but rather sends a request of its own to the server, in parallel with the client's direct request to the server, and records the response returned by the server.

Ownership Over Digital Media Items

Embodiments of the inventions disclosed herein, including unique digital objects, Unique Digital Reality and its embodiment using enduring network interfaces, presentation of information on user interfaces, Outlets, etc., establish the notion that a digital asset can exist as a unique, permanent digital object that is separate from any of its presentations or user-interface rendering. This enables to establish ownership over digital assets. In the case of digital media items, such as photographs, images, audio tracks, music, artwork, video, etc., as taught, in a preferred embodiment, they are imported into user interfaces using their universal identifiers, such that the user interface invokes an API call to embed the item, while presenting its universal identifier, such establishing ownership, and no local files are stored. However, it may still be possible for media items to leak and be presented without their universal identifier. To prevent this, the digital media file can contain hidden properties, which do not alter its appearance or the user experience gained from it, or alter it subtly and imperceptibly, but which can be used to assert ownership. These hidden properties can include the universal identifier of the underlying unique digital object, or the permanent address of the unique digital object; a digital signature establishing ownership; and so on. The hidden property can be inserted in into the media in an unobtrusive way. For image, audio or video, a watermark that does not have a perceptible impact can be inserted, which is machine-readable. If a file is created, the file header and further contain hidden properties. Each of these can be used to ascertain ownership. The location of the hidden property may be undisclosed, so that it is not tampered with. Consider for example the case of an image. The image owner chooses randomly location of a few pixels and changes them to contain a code. The location of the pixels and the code value is packaged in a unique digital object that is committed to digital reality. If a dispute regarding ownership arises, the owner can use the unique digital object and disclose the contents of the hidden watermark, asserting ownership.

Figure 59:
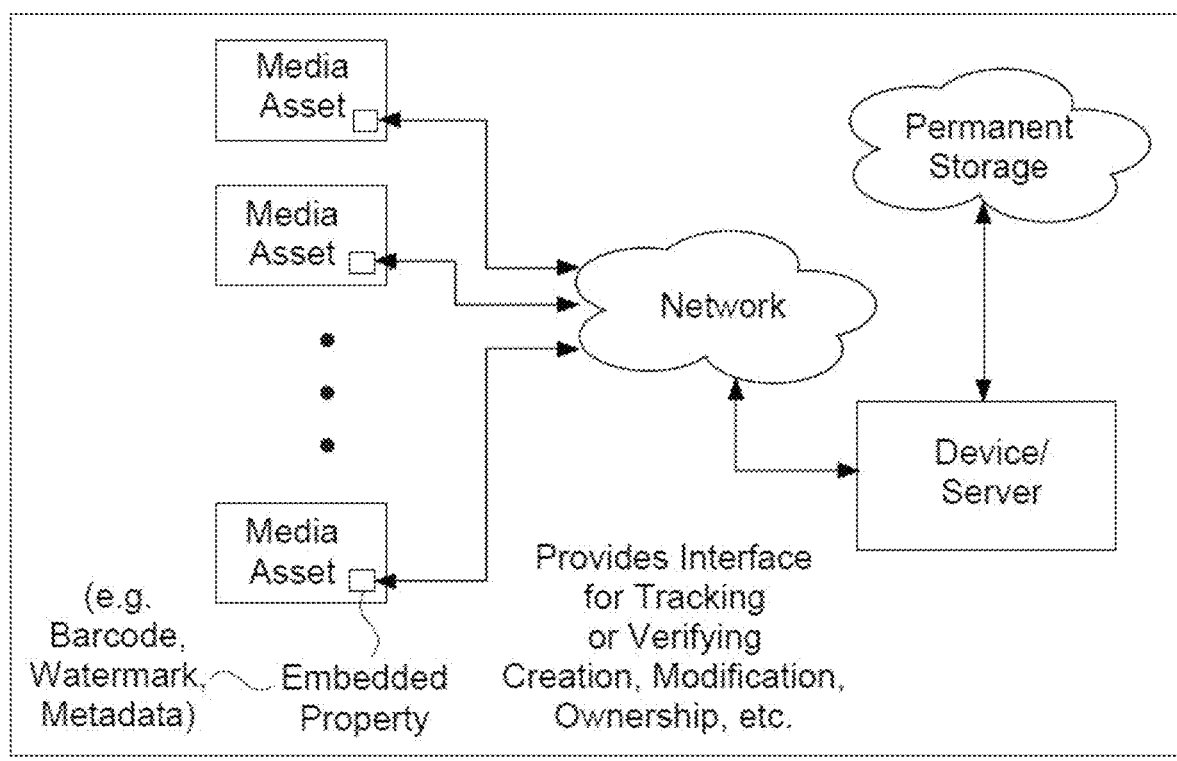
FIG. 59 describes a method for UDR-based ownership over media items.

FIG. 59 describes a method for UDR-based ownership over media items.

Figure 60:
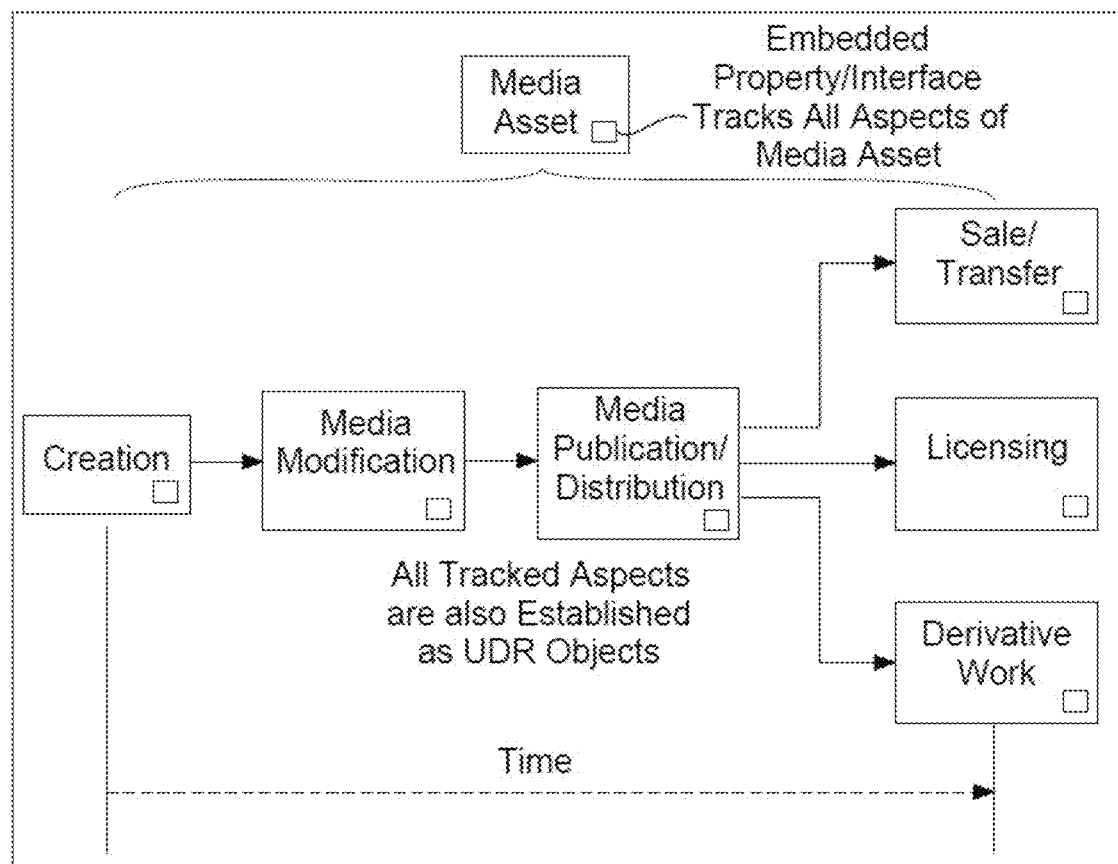
FIG. 60 shows an illustrative timeline for a UDR-enabled media asset, by which the creation, modification, ownership, sale, or transfer of the UDR-enabled media asset is readily accessed.

FIG. 60 shows an illustrative timeline for a UDR-enabled media asset, by which the creation, modification, ownership, sale, or transfer of the UDR-enabled media asset is readily accessed.

Example Embodiments

1. A method for establishing or tracking ownership of a media asset over a network, the method comprising:
embedding a property with the media asset; and
interacting with an external device over the network with the embedded property to establish one or more aspects regarding ownership of the media asset.

2. The method of embodiment 1, wherein the embedded property is an embedded matrix barcode, e.g. a QR code.

3. The method of embodiment 1, wherein the embedded property is an embedded watermark.

4. The method of embodiment 1, wherein the embedded property is a UDR property, and wherein the external device is a UDR device.

5. The method of embodiment 1, wherein the media asset is a photograph.

6. The method of embodiment 5, wherein the embedded property is embedded within the photograph.

7. The method of embodiment 1, wherein the media asset is a video asset.

8. The method of embodiment 7, wherein the embedded property is embedded within the video asset.

9. The method of embodiment 1, wherein the media asset is an audio asset.

10. The method of embodiment 9, wherein the embedded property is embedded within the audio asset.

11. The method of embodiment 1, wherein the media asset is artwork.

12. The method of embodiment 11, wherein the embedded property is embedded within the artwork.

13. The method of embodiment 1, wherein the media asset is a book.

14. The method of embodiment 1, wherein the interacting establishes the original owner of the media asset.

15. The method of embodiment 1, wherein the interacting establishes the current owner of the media asset.

16. The method of embodiment 1, further comprising:
tracking an event regarding ownership of the media asset.

17. The method of embodiment 16, wherein the event includes any of a sale, a transfer, or a licensing of the media asset.

18. The method of embodiment 16, wherein the event includes a transfer of value associated with the media asset.

19. The method of embodiment 18, wherein the transfer of value comprises a payment associated with the media asset.

20. The method of embodiment 1, wherein a change to the media asset is tracked and can be confirmed by the interacting with the external device over the network with the embedded property.

Communication of Legacy Software Systems with Unique Digital Reality

Legacy software systems are designed with a digitally fragmented mindset, namely, are not designed to expose digital information in a software accessible way over a uniform interface. As discussed, this has several serious disadvantages (see "digital fragmentation" above). To enable transition to fully digital information exchange based on UDR, databases of legacy software systems can be integrated into UDR such that data objects in the legacy system correspond to unique digital objects in UDR, and such that the legacy systems can work against data in UDR rather than against data in their fragmented database.

Certification of Facts Using Email

Today, email is an extremely common and extremely ineffective mode of communication, which imitates paper-based information exchange. Information in emails is by and large not software accessible and useless from the point of view of digital consolidation. Email however can be used as a simple tool for creating unique digital objects. In an embodiment of the invention, an email-to-UDR service can offer a service such that every attachment sent in an email to specify addresses becomes the payload of a unique digital object and is thus committed as a fact in UDR. Specifically, a UDR-enabled email server, receiving Post Office Protocol-3 (POP3) requests, or possibly other email protocol requests, creates a unique digital object out of any email it receives. Access control to the server may be achieved by requiring that emails be digitally signed in such a way that, for example, the email header specifies a unique identifier of an identity unique digital object, and the email attachment be digitally signed by a key corresponding to a public RSA key published at that identity object.

Certification of Facts Using Mobile Computing Devices

Mobile computing devices (such as smartphones and tablets) are extremely common measurement devices. Measurements that they take, such as photos, videos, location measurements and biometric measurements can be recorded as unique digital objects in UDR using a special app or a native function of the mobile device operating system. In an embodiment of the invention, certain smartphone applications submit data they measure (such as camera images) as unique digital objects in UDR. This allows the application to create verifiable data logs.

Full Digitization of Existing Document Archives

One of the hallmarks of digital fragmentation is the huge amount of separate idiosyncratic public and government archives and databases. For example, each municipality has its own real estate registrar database; there are numerous public databases for scientific data; etc. To facilitate transition to information exchange based on UDR, in an embodiment of the invention, a "legacy-to-UDR" service creates a unique digital object for each record in each public and government database, turning legacy databases into collection of unique digital objects. As a result, all these records become permanently available through a uniform software interface.

Requirement-Based Data Storage User Interfaces

The current file management user interface in personal computer operating systems—primarily Windows, MacOS and Linux systems—goes back to 1984 and the Macintosh file system user interface consisting of drag-and-drop, left and right mouse clicks, windows, folder and file icons. Current cloud systems imitate these concepts.

As mentioned above, one of the hallmarks of digital transformation is that there are no files—only unique digital objects. (As explained above in detail, files lead to horizontal and vertical digital fragmentation while unique digital objects enable horizontal and vertical digital consolidation.) In an embodiment of the invention, this legacy file management user interface is replaced by a completely different design principle for management of unique digital objects, in which data storage user interface does not files or folders.

In an embodiment of the invention, the alternative file management user interface system is based on information consistency and compliance, rather than on files and folders, and specifically, around the notion of requirement satisfaction. The user interface manages semantic requirement statements. For example, a statement may be "I need to have a valid driver's license", or "I need to have all my salary slips from the year 2020", or "we need to have all receipts from all employee business trips of 9/2020", or "we need to have a non-disclosure agreements signed by any vendor we work with"; these may be expressed in natural language or in a machine-readable language such as SICCL. The system indexes available unique digital objects of a user based on which requirements they satisfy, rather than by managing local (or cloud) files and folders. The system allows the user to define new requirements, and browse existing requirements, and from each requirement, access and browse those unique digital objects that satisfy it.

Shared Virtual Worlds and Augmented Reality Worlds Based on Unique Digital Reality A shared augmented reality world adds a new shared layer of reality on top of physical reality; a shared virtual world is a new layer of shared reality. Both depend on the existence of a layer of permanent unique digital objects. In a digitally fragmented implementation, a single entity may manage a given virtual universe and maintain the underlying collection of permanent digital objects; however a digitally consolidated shared augmented reality or shared virtual reality is not managed by a single entity—it enables arm's length counterparties to interact on the same shared reality. Such a consolidated shared augmented reality or shared virtual reality requires a UDR: objects, states, and events in the shared augmented or virtual reality are unique, enduring, and universally accessible. In other words, a UDR makes it possible to build shared augmented or virtual realities that are digitally consolidated—are available to different stakeholders at arm's length, instead of being owned and managed by a single entity.

An Augmented Reality Interface to Physical Objects Mirrored in Unique Digital Reality Augmented reality makes it possible to create new interfaces for human interaction with physical objects. We have already discussed adding an Omnicode to a physical object without physically adding the omnicode, but rather by adding the code on a layer of shared augmented reality. When a unique digital object mirrors a physical object, the unique digital object may expose a user interface on a layer of augmented reality. In other words, when a physical object, or a digital object presented on a user interface, present a machine-readable code, in an embodiment of the invention, a new layer of content associated with the physical object, and a new layer of interactions with the physical objects, become possible.

Specifically, when an augmented reality device uniquely recognizes a location or an object (for example, using GPS location or a machine-readable code on a physical or digital object) it may present, through a user interface, any of the following:

Identities of persons who have interacted with the objects—by leaving a comment, owning it, or renting it in the past
Identities of other objects associated with it
Additional information regarding the object (user manuals, repair, and service history, etc.)
Objects in legal and financial reality associated with it (for example, contracts, liens, etc.)

Examples

The restaurant menu becomes available on Augmented reality to visitors of a restaurant.
Car information (stored on UDR) becomes available to users in or around the car.
Tourist information about a landmark becomes available to users looking at the landmark.
Real estate ownership becomes available to users looking at the property.

The unique digital object may expose a user interface (in addition to its API) that specifies its behaviors, actions, and reactions on augmented reality.

Shared augmented reality and shared virtual reality require, by definition, a layer of shared digital objects—a unique digital reality. Embodiments of the invention disclosed herein are fundamental to creation of permanent, unique digital objects and therefore fundamental to creation of shared augmented reality and shared virtual reality.

Uses of Embodiments of the Invention in Shared Virtual Reality

Virtual reality consists of identities of agents, description of scenery and location of virtual objects. A shared virtual reality, which is managed by several (or many) stakeholders, instead of by a single entity, necessarily requires a purely digital consensus over a large collection of unique digital objects. Unique Digital Reality thus enables shared virtual reality. Identities of agents in the virtual world, ownership over objects and locations, identities of objects and so on—can all be stored as unique digital objects; all objects, states and events in the shared virtual reality can be stored as unique digital objects.

Certified Internationally Recognized Medical Records

Shortcomings of the hybrid digital-document shared information reality were discussed elsewhere in this text. The Covid-19 global pandemic brought to light some of these shortcomings in a visceral way. During the pandemic, individuals were required, by government mandates and local policies, to present proof of Covid-19 immunization, and/or proof of negative Covid-19 test results. These proofs of immunization and test results were communicated using documents—both physical and digital. These documents were generated by a large variety of entities and authorities—from small private test clinics to the health ministries of large governments. In the lack of standard for document validity, each entity created its own ad-hoc document format. To complicate matters, individuals who traveled from one jurisdiction to another had to present immunization records and test results that were created in a different jurisdiction. To prevent the possibility of document forgery, and in the absence of any standard for verifiable information exchange, some authorities—notable the United States federal government and the European Union—required that certified documents will bear a QR code to prevent the possibility of document forgery.

Interestingly, while the authorities could in principle have required some form of digital signature to ensure document authenticity, this requirement has not been made. This serves as a demonstration of the user-interface and user-interaction problem of digital documents: proofs of immunization and test results are presented to individuals in official role, and their trustworthiness should be visually recognizable. The existence of a digital signature does not provide such visually recognizable guarantee.

The intention of the QR code requirement is simple: the association of a physical or digital document is associated with a website serves as an added safety element to ensure document validity—in theory at least. The rationale is to provide an alternative form of digital signature of a document: in principle, if the owner of a domain provides a URL in that domain, which confirms the content of a document, then the owner has effectively blessed or signed the document.

This method has developed ad hoc as a response to an urgent need during the Covid-19 global pandemic, and is far from perfect: (i) the receiver of the document has no way of independently knowing the domain to which the QR code presented is supposed to point to, and indeed a forged document can easily display a QR code pointing to a website created by the forger of the document; (ii) digital signatures are not used in order to attach a signing identity to the document; (iii) the website in question is ephemeral and may not be maintained over time; (iv) the document itself is not committed and/or made immutable.

Embodiments of the invention taught herein allow a definitive solution to the problem of internationally recognized, cross-border medical records. A unique digital object in UDR can explicitly cite the identity of the person carrying the record, the identity of the entity which produced the record, and full details of the medical procedure or test reported. The unique digital object is not a document, rather an immutable permanently accessible piece of information. Using Outlets and Omnicodes, the record may be presented on a user interface (smartphone screen or physical paper, for example) while providing cryptographic guarantees for the authenticity of the presentation and its link to the committed, immutable unique digital object.

Example Embodiments

1. A method for creating verifiable, internationally recognized medical, comprising:
   a) recording cell tower data received from a plurality of cell towers at a mobile device;
2. uploading the recorded cell tower data from the mobile device to the UDR system as encrypted data;
3. independently uploading cell tower authentication data to the UDR system from an operator associated with the cell towers;
4. determining confidence that an agent associated with the mobile device is at the location, based on a match between the recorded cell tower data and the cell tower authentication data.

Certifiable Real Estate Ownership and Transactions

An embodiment of the invention enables certifiable, trustworthy, and automatically verifiable real-estate ownership and transactions. Five protocols are taught herein:
   A protocol for establishing initial ownership of a property, the exact dimensions and location of the property, and the identity of the current owner.
   A protocol for verifying that the exact dimensions and the location of the property as appear in UDR entry, match those.
   A protocol for verifying the identity of the current owner.
   A protocol for transacting, selling, buying, renting, and loaning against a property whose initial ownership has already been verified.
   A protocol for resolving ownership disputes.

Concerns of Stakeholders. In countries with a functioning real-estate registrar (below, 'with registrar') a property owner is interested in:
   Ensuring that there will be no disputes over the registrar entry in case of damage to the registrar records.
   Ensuring detailed proof of ownership in a way that is indisputable and independent of any local government.
   Ensuring that they can prove, in case of any modifications on the ground done by a third party, that modifications have indeed occurred over the original plot lines,
In countries without a functioning real estate registrar (below, 'no registrar'), a property owner is interested in:
   Creating a detailed plot and map of the property that establishes the existing property lines.
   Asserting ownership over the property in a manner that will prevent any disputes over ownership in the future; namely, proving beyond doubt the identity of the current residents.
In all cases, the assertions should be made in such a way that they can be defended and inspected many years after the date on which an assertion was made.

In developing countries, the lack of a functioning real estate registrar prevents real estate being used as a guarantee against loans, subsequently preventing economic development. One of the primary value propositions of embodiments of the invention lies in establishing a real-estate registrar that is permanently in UDR, and then using this new form of ownership assertion, together with a system for transferring and transacting ownership in the system, to enable mortgage loans, backed by currently owned real estate properties, in developing countries.

Technical Description

Asserting Initial Ownership: Property dimensions and location. Facts are entered into UDR to assert the exact dimensions and the location of a plot/building/apartment, for example:
   A hand-drawn or computer-drawn map of the property
   Photos taken at camera locations and directions specified on the map
   Measurement information (distances) between points on the map
   Topography information (like height above sea level, shape of terrain)
   Embodiments of the invention teach an algorithm for creating a detailed technical plot map with the above information, describing the exact dimensions (including 3D shape) of the building's interior and exterior.

All the facts mentioned above (photos, measurements, etc.) are submitted to UDR (which gives them time stamps) with location stamps (see Certification of Geographical Location). This establishes the priority time and location of the property.

Asserting initial ownership: Identity of residents. The second phase of asserting initial ownership is to establish the identity of the current residents. Embodiments of the invention teach the use of identity mechanisms (see Certification of Identity) to conclusively assert the identity of the primary owner.

In addition, facts are entered into UDR to assert the identity of the resident of the property by showing photographs of them, taken over time, in the position specified on the map, with the camera's location and direction specified on the map.

Facial recognition technology enables asserting that the same people are photographed over time in different places on the property.

Real estate transactions. Once initial ownership has been established, the property exists on UDR and has a universal identifier. Embodiments of the invention teach a method for using UDR to record real-estate transactions, in which the universal identifier of the property is specified in a sales, rent, or mortgage contract, which is itself a Next Generation Document. The system therefore allows the current owner to trace the ownership line back to the initial owner who submitted the property into the system.

An Embodiment: Smartphone Real Estate Application

In an embodiment of the invention, a smartphone application makes use of smartphone sensors like a camera to capture photographs or videos, or sensors that take measurements, discover locations, and so on, the output of which can be used to assert ownership. As an example, algorithms implemented in software by service providers implement 3D reconstruction methods for creating an exact property dimension plot from the information measured by the smartphone. The invention's algorithms can receive the measurement information and verify that the measured property plot agrees with previously claimed property.

Certifiable Execution of Software Tests and Artificial Intelligence Tests

The present embodiment of the invention teaches a method and apparatus for running verifiable software tests, namely, software tests whose successful completion can be conclusively proved to third parties at any time later after their actual execution. As software systems and AI systems become increasingly ubiquitous, and as software systems are deployed to fulfill mission-critical tasks, an increasingly larger burden of proof lies on manufacturers of software and AI systems. They need to be able to represent to customers, investors, regulators, and other stakeholders that their systems were adequately tested before deployment and were certified to conform to various required quality standards, safety metrics, and fairness metrics. The present application makes use of verifiable code execution and places on UDR the facts required to prove successful completion of the specified software tests.

Motivation. Government regulation of software systems, and particularly AI systems and other black boxes making mission critical decisions will inevitably rise in the future. This regulation pertains to fairness and safety tests.

An embodiment of the invention teaches a method and apparatus for creating UDR objects that correspond to an event of machine code execution for the purpose of verifiable software testing. As software systems become increasingly ubiquitous, the ability to conclusively factify the event of code execution becomes increasingly important, namely, enabling the party executing the code to conclusively prove, at a later point in time, that a particular computer program ran against specific inputs and produced specific outputs.

The following are instances of computer programs whose execution requires verifiable execution that should later enable verification, by a third party whose identity is unknown at time of execution of the software test.

Proving that software has been tested. Mission critical software systems undergo software testing. A software manufacturer is interested in being able to prove to a third party (such as a regulator), at any later point in time, that adequate and reasonable testing has been performed prior to the release of a mission-critical software system. This may be important to be able and ready to respond to negligence claims in the event of a software malfunction.

Proving priority of a software feature. Software manufacturers face intellectual property lawsuits claiming infringement of software patents. A software manufacturer may be interested in proving that a certain software feature existed (it was implemented and tested) before a certain date (such as the competitor's patent submission date).

Proving that an AI system is fair and non-discriminating. Government regulators will inevitably mandate that AI systems, including black-box AI systems, will be provably non-discriminating. Software manufacturers will then have to bear the burden of proving that they have adequately tested their AI systems prior to release, to ensure that they are non-discriminating. Since AI systems are continuously being updated as they are retrained on new data coming in, the tests need to run periodically and the manufacturer may need to factify each time the tests are run.

Proving that a specified data analysis procedure has led to claimed results. Data analysis and statistical procedures, executed as computer scripts, have become the cornerstone of published scientific results. Practically any empirical scientific discovery, from clinical trial results to global warming, result from a data-analysis procedure that runs against measured data. Readers of the results are interested in verifying that the analysis has been correctly specified and executed, and to inspect the raw data that went into the analysis procedure. This requires the ability to factify code execution of the data analysis script.

Concerns of Stakeholders.

1. Compliance and regulation. Stakeholders need to be confident that software and AI systems meet the following compliance and regulatory requirements:

Stress testing and VAR simulations of financial regulations

Regulation of mission critical software systems

Regulation for safety of AI systems

Regulation for fairness of AI systems

2. Representation to third parties. Third parties, as well, require AI systems to be represented to them.

Representation to investors, customers, and the public on the safety of AI systems.

Representation to investors, customers, and the public on fairness and non-discrimination of AI systems.

Examples of Software Systems and Respective Concerns

Self-driving cars (autonomous vehicles). Autonomous vehicles are based on a collection of interconnected sophisticated AI systems. These AI systems are black boxes—it's very hard or even impossible to interpret why a certain decision was made by the system.

Inevitably, governments will start regulating the AI industry and will formulate safety standards for such software, and demand that manufacturers prove to the regulator that the autonomous vehicle system conforms to standards. Because this is all a software operation, interaction with the regulator will necessarily involve verifiable code execution.

Separately, in the event of a road accident with property damage, bodily injuries, and even casualties, which results from malfunction of an autonomous vehicle system, the software manufacturer is exposed to both civil and criminal lawsuits. In such proceedings, the manufacturer will bear the burden of proof that the autonomous vehicle systems were thoroughly tested prior to deployment, and that no negligence has taken place. Practically, the only way to prove such a thing in a conclusive manner is to use verifiable code execution.

Embodiments of the invention teach a system based on UDR (see Verifiable Code Execution) that is fully responsive to these concerns.

Financial models and stress tests. Financial institutions must comply to Value At Risk (VAR) requirements. These are based on stress tests and simulations. These institutions would like to represent to regulators that stress tests have been accurately performed and that VAR requirements are satisfied.

Credit risk systems. Banks use AI systems to make credit decisions. Regulators, shareholders, customers, and members of the public would like to know that the algorithms do not discriminate based on gender or race. As the AI system is re-trained on new data, these tests need to run again.

Technical Description. Verifiable code execution is used to perform verifiable software tests and record each test execution, and its results, in UDR.

Detailed Example Embodiment: Universal User Interface and Application Programming Interface for Physical Objects and Devices Most physical objects today are not assigned a unique identity. Even those assigned a serial number at production (for example, electronic appliances and devices) do not expose any way to interact with this unique identity. This makes it difficult to maintain inventories; store user manuals and service agreements; invoke recall procedures; and more.

An embodiment of the invention makes it possible to create a unique identity, user interface (UI) and application programming interface for every physical object and device. The unique identity allows one to maintain an inventory of household, office, or vehicle items (for example, for property insurance purposes, company inventory management, etc. The UI allows, for example, inspection of object authenticity for artwork and hand made products; explicit transfer of ownership over the item; inspection of various pieces of information (such as material composition, manufacturing date, identity of manufacturer, specification of Quality Assurance procedures); and inspection of service and guarantee contracts; inspection of user manuals; and item recall procedures.

Physical items and objects that can be assigned a unique identity, UI and API using this embodiment of the invention include, for example:

Manufactured items and physical objects—such as household items, furniture pieces, mattresses, plumbing units, doors, rugs Artwork and other handmade items and objects Electronic and digital devices Electronic appliances Real estate parcels Vehicles And more.

Figure 61:
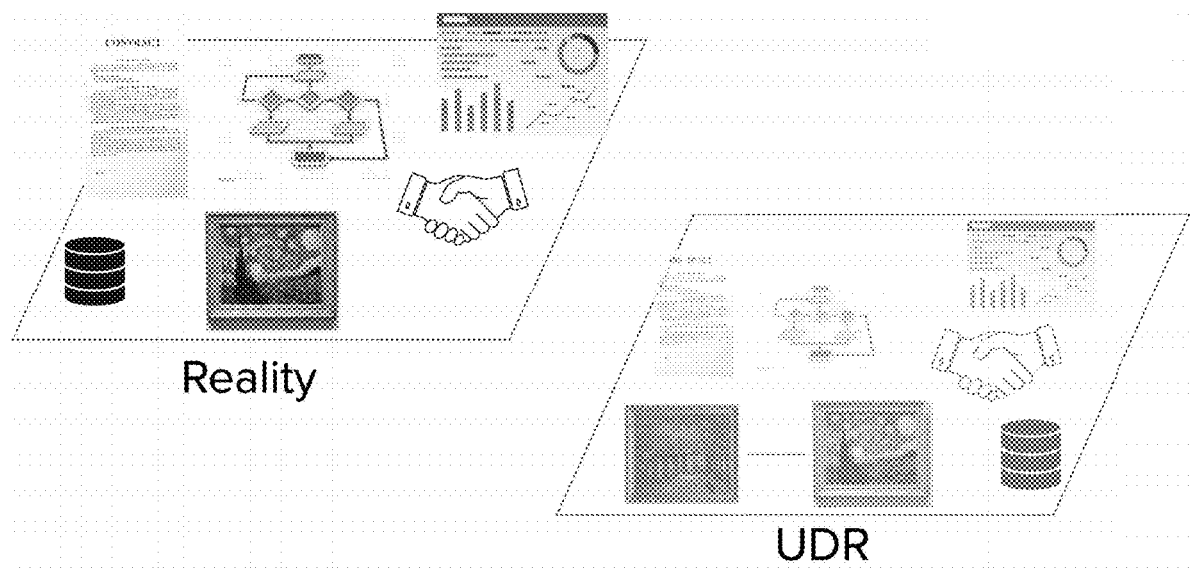
FIG. 61 shows examples of physical object and devices and their mirror unique digital objects in UDR.

Technical Description As part of production, manufacturing, or acquisition, every item or object is assigned a unique digital object in UDR, owned by the same owner as the physical object. The payload of unique digital objects includes a detailed description of the physical objects (such as: serial number printed on the object; exact 3D scanning of the object and 3D measurement of the object; catalogue number of the object; picture of the object taken during manufacturing; identifying information hidden in or on the object; CAD drawing or plan; etc.). If the object or device has a machine or human-readable unique identifier visible, the payload will note this. For devices, the payload may also include public cryptographic key installed in the object hardware; version of software installed. For objects with inner components, the unique digital object may include a list of components (including unique identifiers, if they themselves have a corresponding unique digital object). FIG. 61 shows examples of physical object and devices and their mirror unique digital objects in UDR.

Object recognition. Optical sensors, infrared sensors, cameras, Light Detection and Ranging (LiDAR) devices and Augmented Reality (AR) devices are able to detect an object that has a mirroring unique digital object in UDR, when it enters their field of view, based on the payload of the mirroring unique digital object. As a result, devices equipped with such sensors can react to the presence of physical objects with mirroring unique digital object in UDR.

Figure 62:
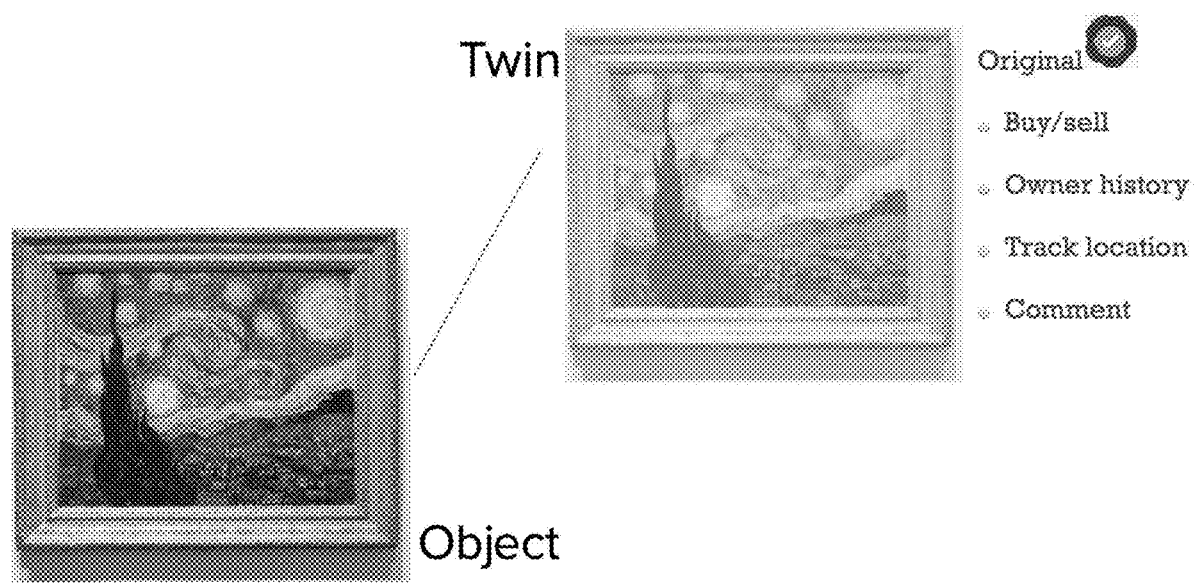
FIG. 62 shows a physical object and its user interface, available through its unique digital object twin.

Universal User Interface for all objects and devices. The unique digital object exposes an API that allows a user with access credentials to perform software operations on the digital object. It also exposes a user interface (UI) at the unique permanent URL allocated for the unique digital object. FIG. 62 shows a physical object and its user interface, available through its unique digital object twin.

Figure 63:
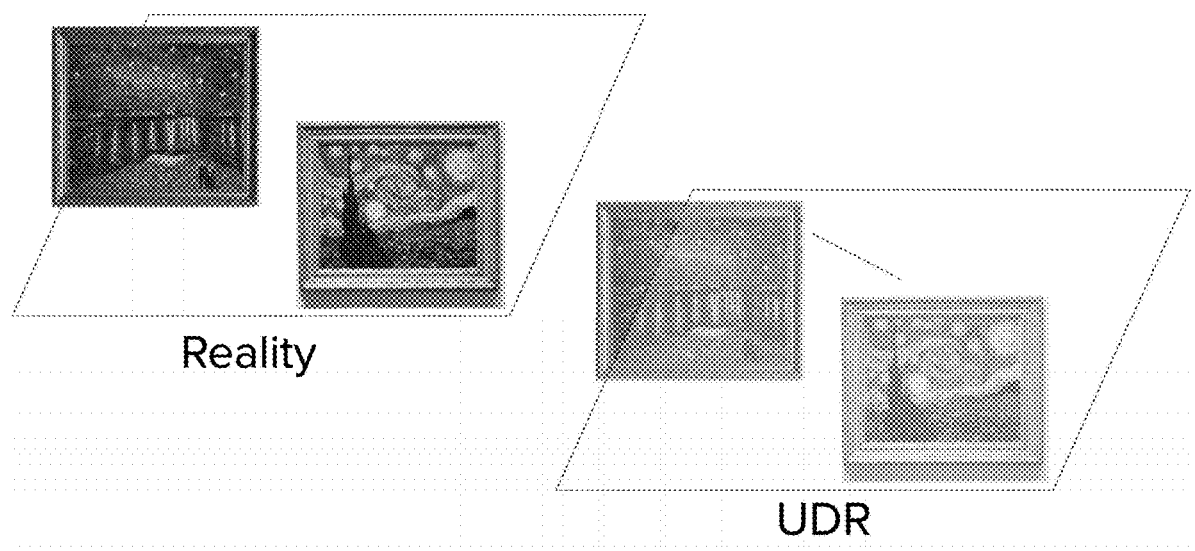
FIG. 63 shows two related physical objects, and a connection between their mirroring unique digital objects.

Connections between unique digital objects are permanent, machine readable and explicit, as one unique digital object may refer to, or cite, a second unique digital object by citing the unique identifier of the second unique digital object. In an embodiment of the invention, connections between physical objects or devices, which are of course implicit in physical reality, are made explicit as connections between the unique digital objects mirroring them. For example, the unique digital objects mirroring all artwork of a specific artist may all create an interconnected network of unique digital objects. FIG. 63 shows two related physical objects (for example, artwork by the same artist), and a connection between their mirroring unique digital objects.

Figure 64:
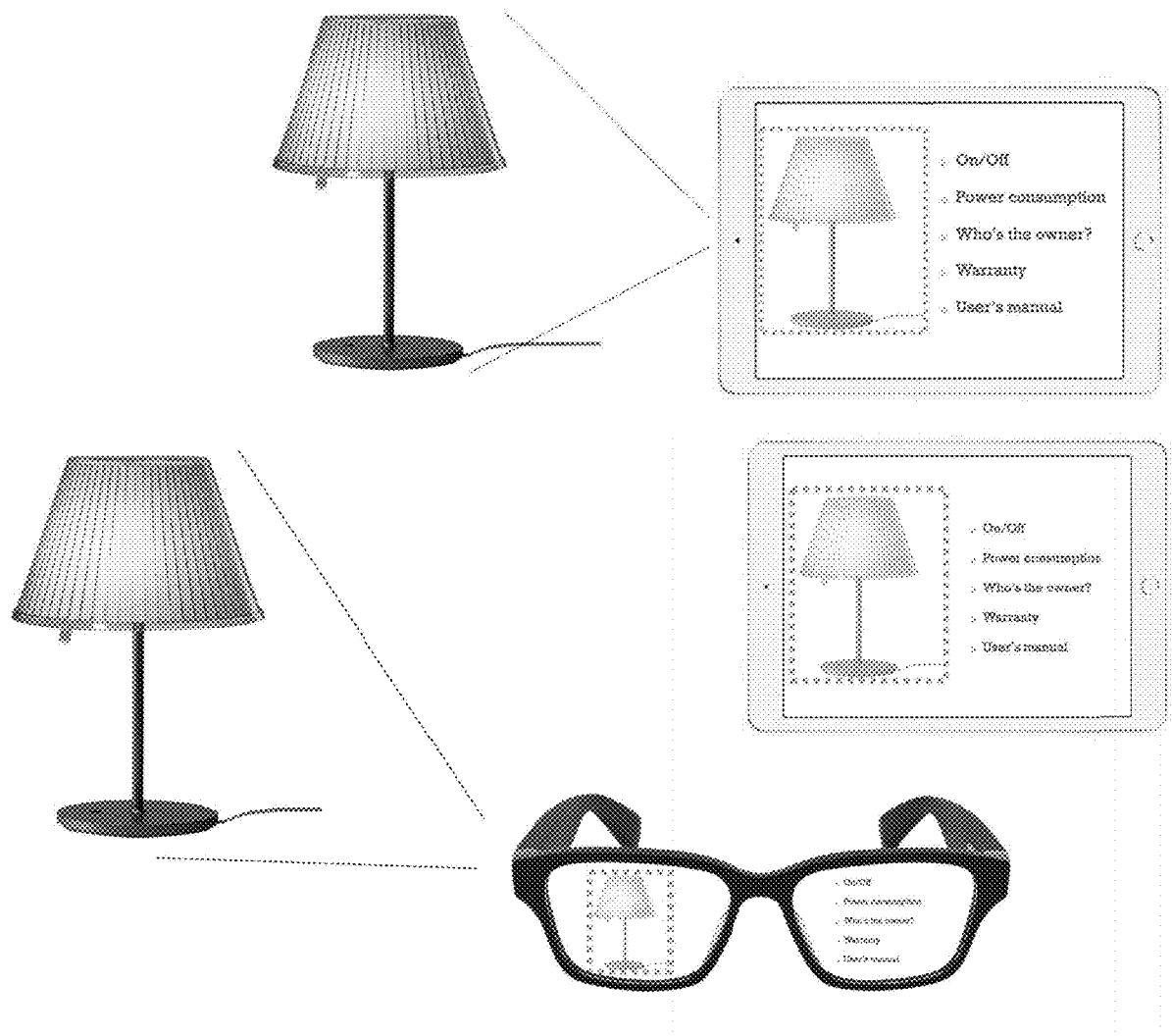
FIG. 64 shows a physical device and its user interface as it is accessed through various AR-enabled devices.

A user may direct an internet browser at the URL and access a UI for the object. The same UI may in certain embodiments be accessed also through an Augmented Reality (AR) system that identifies the object or item in the scene viewed by an AR device (such as a smartphone, AR glasses, or AR goggles) and overlays the UI in the AR viewport next to the item or object. FIG. 64 shows a physical device and its user interface as it is accessed through various AR-enabled devices. In this embodiment, the AR-enabled device will recognize the object or device when it enters its field of view and present the user interface next to the object or device in the AR field of view.

In an embodiment of the invention, the following information related to physical objects and devices may be recorded as UDR objects:

User interactions with the device physical user interface (if it has one)

User interactions with the device UI exposes by the unique digital object associated with the device device-device interactions, such as Bluetooth handshake computations involving the object or device documents associated with the object or device (such as legal transfer of ownership, sales document, user manual or service contract).

Data measured by the device (such as temperature measured by an IoT device with temperature sensor, or geo location measured by a device with GPS).

Inventory of parts. In an embodiment of the invention, a unique digital object mirroring a composite object, namely an object that consists of a multiplicity of inner parts, lists those inner parts. If inner parts also have a mirror unique digital object in UDR, they will be listed in the payload of the unique digital object mirroring the composite object.

Collection of documents and other information objects related to a physical object. Physical objects and devices are often related to a multiplicity of documents and other information objects. For example, a car is related to sales contract, insurance policies, user's manual, service agreements, certificate of guarantee, service, and maintenance history, etc. Electrical appliances are related to purchase receipt, certificate of guarantee, regulatory certificates (e.g. for wireless broadcasting devices), service agreements, service, and part replacement history, etc. Elevators must be related by law to a record of its service history. Maintaining a relation between a physical device and a binder of physical and digital documents is a never-ending challenge. In an embodiment of the invention, the unique digital object mirroring an object or device is related in UDR to the unique digital document objects (or Next Generation Documents) of e.g. its sale contract, insurance policies, user's manual, service agreements, certificate of guarantee, service, and maintenance history, and so on. This maintains an orderly collection of documents that is accessible by scanning the machine-readable identifier on the object or using an AR interface to access its user interface, which will then show all documents and other information objects related to that physical object.

Inventory of objects. An embodiment of the invention enables ownership registry of physical objects and devices. Unique digital objects have a native mechanism for ownership; and so, by transferring ownership of the mirroring unique digital objects, it is possible to keep explicit track of ownership of physical objects, items, and devices.

Supply chain monitoring, logistics, and recall procedures: tracking an item from production to customer. In an embodiment of the invention, manufacturers may choose to create unique digital objects by default to mirror each individual object they manufacture. The mirror object may act as a "digital twin" during production, relating the manufacturing process to information technology (IT) systems of the manufacturer, tracking production stages, lot numbers of materials used in the production of each individual object, quality assurance (QA) procedures and tests, external laboratory tests, and so on. After production, the same unique digital item may be used to track stock-related logistics such as warehouse storage, shipment and delivery, retail stock, up to the point of sale. After sale to a customer, the same unique digital object may be used to track user satisfaction, execute recall procedures, etc.

Digital devices and electric appliances with no control panel or factory user interface. This embodiment of the invention levels the playing field for user interface digital devices and electric appliances. Since any object or device may have a user interface, accessible using an AR-enabled device, a smartphone, etc., digital devices and appliances may be manufactured without a control panel or factory-made user interface: all their user interactions may occur through the uniform user interface disclosed herein. Bulk software processing of device sensor measurement and user interactions. Under the present state-of-the-art, sensor measurements of individual devices are fragmented and siloed, remaining inaccessible for bulk processing. Similarly, as each device has its own user interface, a user has no way to track, monitor or bulk-process his or her interactions with the dozens or hundreds of user-interfaces surrounding us at all times. An embodiment of the invention records all sensor measurements by devices with a mirroring unique digital object, as well as all user interface interactions, in unique digital objects related to the mirroring digital object. This makes it possible to mine, analyze, and bulk-process all measurements and user interactions using software processes that interact with UDR. FIG. 65 shows a schematic representation of bulk processing and data mining of all measurements and user interactions related to mirroring unique digital objects, which may later be reflected on their universal user interfaces.

Figure 66:
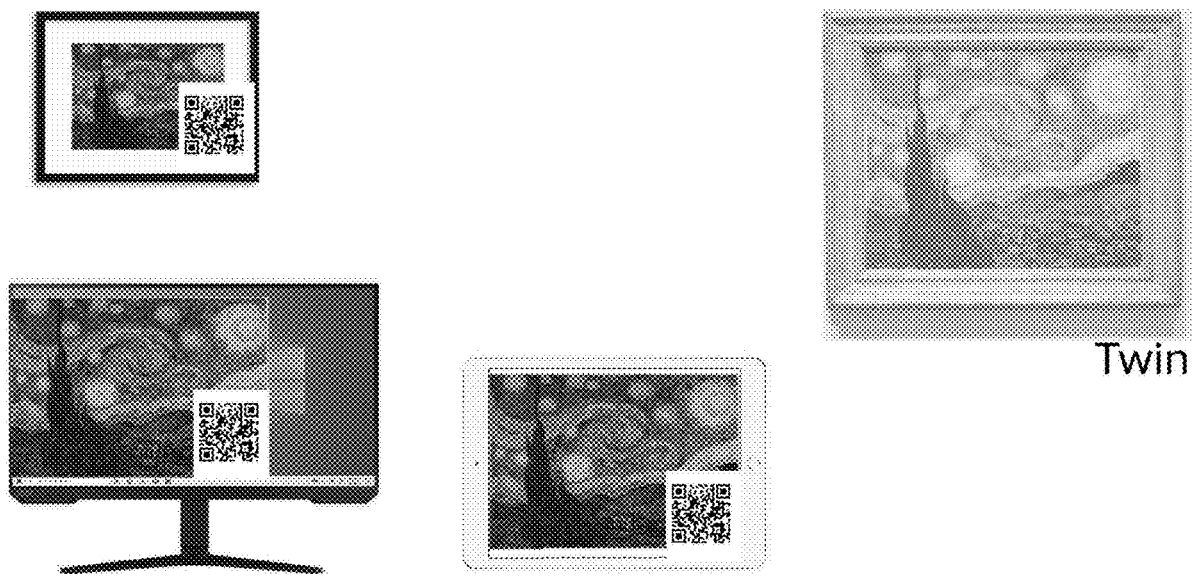
FIG. 66 shows a unique digital object mirroring a physical object, and images of the physical object presenting its unique identifier.

Unambiguous presentation of images of physical objects. In an embodiment of the invention, images of physical objects may present the unique identifier of the unique digital object mirroring the physical object, allowing for unambiguous reference to a specific physical object. FIG. 66 shows a unique digital object mirroring a physical object, and images of the physical object presenting its unique identifier.

Digital consolidation of devices, objects, measurements, interactions, computations, identities, documents, and user interfaces. The described embodiment of the invention illustrates the true potential of Unique Digital Reality for digital consolidation—even as it touches the physical world.

Figure 67:
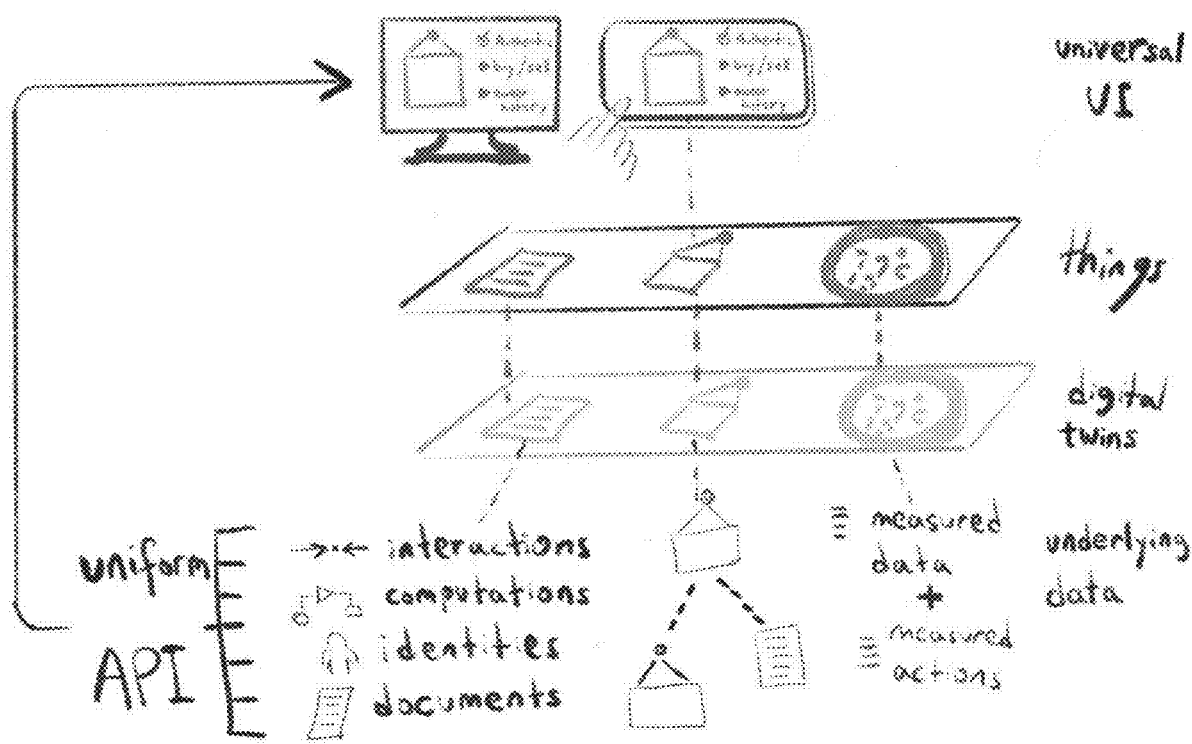
FIG. 67 shows the connections enabled by an embodiment of the invention between physical objects (documents, objects, and devices), their mirroring unique digital objects in UDR, the data measured by them, and user interactions with them.

FIG. 67 shows the connections enabled by this embodiment of the invention between physical objects (documents, objects, and devices), their mirroring unique digital objects in UDR, the data measured by them, and user interactions with them. All these are represented in unique digital objects available for software processing over the API of these unique digital objects; results of this processing may then appear in the universal user interface of these objects.

Figure 68:
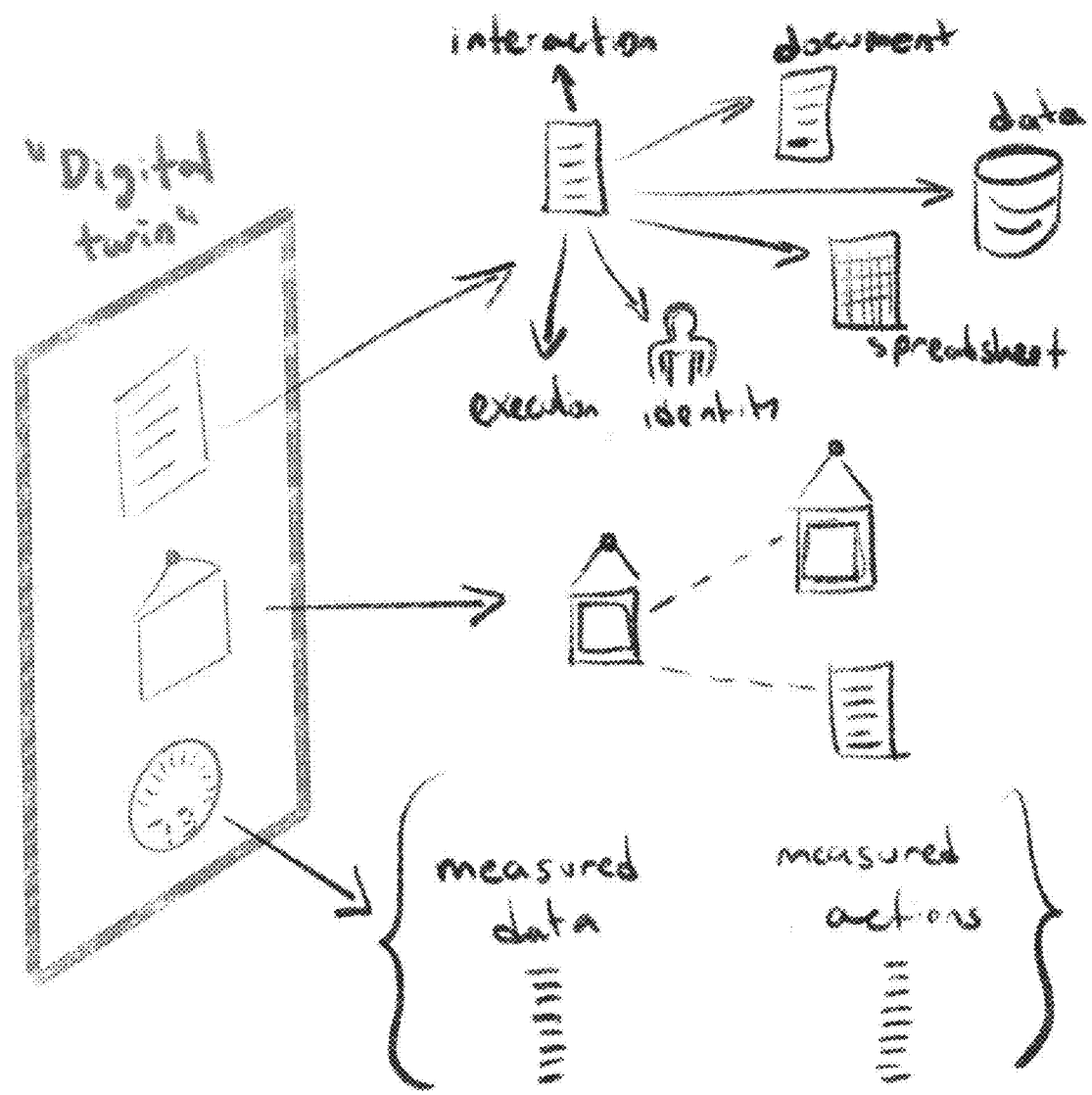
FIG. 68 illustrates the merits of the described embodiment for devices, objects and documents.

FIG. 68 illustrates the merits of the described embodiment for devices (bottom) objects (middle) and documents (top). All three categories have universal user interfaces. Devices may allow access to measurements they make; objects may allow access to related objects and related documents (such as warranty documents or sale receipts); and documents may connect to a plethora of unique digital objects as described under "Next Generation Documents" below.

Detailed Example Embodiment: Next Generation Digital Documents

To demonstrate how different elements of the invention may be used together and enable a radical improvement in a certain area of information exchange, we now consider digital documents.

Background on Digital Documents

The Portable Document Format (PDF) is the prevailing format for exchange of digital documents. It is based on PostScript, a machine-readable language that specifies appearance of document textual and graphical elements in a manner independent on the document printer used to produce a hardcopy, or on the screen used to render a graphical visualization of the document.

The PDF was designed for cross-platform uniform document appearance, namely, as a way to represent a digital replica of a document visual appearance in digital media. It was designed for printers and later adapted for on-screen document visualization—both before the Internet era.

The three main roles of a document are:
1. Medium for information transfer: A document contains information that can be deciphered by a document recipient.
2. Medium for user interaction and chain of consent: A document is an interaction surface, namely, an interface where interaction occurs between a human user and the document medium. This interface is naturally two-way: the human user reads the document on the one hand and performs document interactions on the other hands. Document interactions include, among others: signature, approval, comment, form-filling, version update, sharing/sending the document, moving the document between stakeholders participating in a procedural workflow, and inspection of document authenticity, validity, and reliability
3. Medium for trust and enduring fact verifiability. A document is a means for achieving lasting consensus between document presenter and document receiver regarding objects, states, and events in different layers of reality—including physical, financial, and legal reality. This interaction can occur across time and space. For example, the person producing a document can be long deceased when their document is exchanged between third parties to achieve a consensus between those third parties.

Indeed the hardcopy (physical) document allows human users to perform all three tasks manually: information transfer occurs through reading; user interaction and chain of consent occurs through blue-ink signature and mail transfer of documents; trust and enduring fact verifiability occurs by long-standing practices of document and signature authenticity verification (e.g. forensic procedures for verification of authenticity of a passport, a birth certificate, a bank payment order, a blue-ink signature, etc.).

It is more than reasonable to expect that a "digital document" medium, however implemented, would support digital (automated) implementation of these three key roles, rather than manual implementation. In other words, we may expect that a digital document medium, which deserves to be called "digital", would allow automated purely-digital information transfer—by digital information communication rather than by human reading; would allow purely-digital user interaction and chain of consent, as well as document workflow automation (so that, for example, a document would find its way between various required signatories instead of forcing humans to send it "by mail" or "by email"; and would allow purely-digital trust and enduring fact verifiability, both by means of machine verification and by means of human inspection of visual "trust symbols".

The PDF in fact does not have any of the three key roles:
1. A PDF is not a digital medium for information transfer. Indeed, the PDF was never designed to be machine-readable. As a result, event when a PDF is produced and communicated by digital computers alone, and human users are still required to decipher the information it contains. This makes digital automation of PDF-related processes very challenging or virtually impossible.
2. A PDF is not a digital medium for user interaction and chain of consent. As an interaction surface, a PDF is one-way, meaning, it only allows the human user to read document content. Interaction in the other direction—user interaction with the document—was never included in PDF original design, as indeed it was primarily designed to support hardcopy printing. As the PDF became ubiquitous, workarounds were created. The PDF format, and PDF readers, have been extended to allow certain kinds of user interaction, such as form-filling, adding comments and annotations, and adding digital signatures. Many kinds of document-user interactions are performed by document-external platforms: to share the document, one attaches it to an email or stores it in cloud folders; filesharing services such as Dropbox allow document versioning; services such as DocuSign and Adobe Sign allow user signature and support certain kinds of document workflow; and so on. The fact that each interaction is performed by an ad-hoc solution resulted in a striking number of document-external platforms. It is typical for a document user to have identities in DocuSign, Adobe Sign, Adobe cloud, Microsoft 365, Dropbox, Box, Google Drive, several email services, and others. As a result, it is typical for a document, in various stages of its preparation, signature and storage lifecycle, to "leave behind" a trail consisting of multiple digital and physical copies of the document in different formats and different signature stages. This is an artifact of the fact that PDF does not support user interactions: in principle, the document is a unique entity, and different stakeholders all interact with this single unique entity.
3. The PDF is not a medium for trust and enduring fact verifiability. It can be very easily forged and altered; while forging a physical document (especially one with optic security features) in such a way that it will withstand expert scrutiny requires both resources and expertise, digital documents can be forged using any personal computer. There is no accepted visually trustworthy standard for reliability and authenticity of PDF documents, or a visually trustworthy way to verify their associated digital signatures.

We may similarly conclude that the PDF is not a "truly digital" document: indeed the three key uses of a document (medium for information transfer, medium for user interaction and chain of consent, medium for trust and fact verifiability) cannot be implemented digitally or automated using a PDF and are all currently implemented manually. One could in fact argue that the digital document has not yet been invented. The present invention taught herein will be shown to perform the three key roles in a purely digital fashion.

PDF as a digital imitation to hardcopy (physical) documents. We could adopt a different perspective, and instead of evaluating the PDF along the three key roles of a document as above, evaluate the merits of the PDF simply as a replacement for the hardcopy (physical) document. A physical (original) document is a unique, permanent, permanently accessibly, verifiable medium; Hardcopy documents have several additional important properties, including privacy, security, stability, ownership, permanence, uniqueness. A hardcopy can be kept private and secure: Access control is achieved using a locked document cabinet or document safe.
1. The PDF was not designed with document security and privacy considerations in mind. It was designed to be a faithful digital representation of document appearance. PDF access control is currently achieved using PDF password—a single password that unlocks document encryption—or using access control to document storage platforms. The result could be described as nothing short of document security mayhem: a PDF document once leaked is public domain and can no longer admit any access control. (Consider for example the various WikiLeaks-related document leaking scandals, the Panama Document Scandal, etc.) This too is an artifact of PDF design: in principle, a document, as a unique digital entity, should have native identity-based access control and define, as a native security feature, identity-based access control.

2. The PDF was not designed with stability and persistence and availability considerations in mind. Indeed the concepts underlying its design predate the Internet. The PDF is inherently a local file in a local filesystem. It cannot ensure its own persistence, so that it may be deleted, overwritten, or misplaced, resulting in irretrievably document loss. This too is an artifact of PDF design: in principle, a document, as a unique digital entity, should have native persistence and availability properties.

We may conclude that the PDF is not an adequate imitation, in the digital realm, of the hardcopy (physical) document. It can be easily copied, where each copy is indistinguishable from the original (thus the notion of "unique original document" is meaningless in PDF); it can be lost, stolen, leaked, or misplaced; it cannot be uniquely addressed; it can be easily forged, with no widespread simple means to authenticate on the human user-level.

Incompatible interaction surfaces. Document exchange today occurs using a mixture of hardcopy (physical) and digital documents. Some documents spend their entire lifecycle only as PDF files sent via email, stored on local filesystems, and hosted on cloud storage services. Others are printed, signed, scanned and/or filed as hardcopies. We may focus our attention on the user experience of a human user interacting with a document, henceforth "Document Experience" (DX). The DX of a PDF on desktop, the DX of a PDF on smartphone, the DX of a printed hardcopy, and the DX of a document presented on a digital billboard (say) are all markedly different. This includes different signature and consent modalities, different means to verify validity and authenticity, and so on. As information technology moves forward in a frantic pace far exceeding the development of social norms regarding its use, it is often unclear whether a certain signature modality (e.g. scribble with a finger on a cashier tablet) is equivalent to another (e.g. blue-ink signature).

Presently untapped technological opportunity in digital documents. Clearly, Digital document may exhibit properties that lie beyond the reach of physical documents. For example, a digital document can be expected to be uniquely addressable. Indeed, documents citation and reference, and the creation of document portfolios, is a fundamental notion in bureaucratic, financial, academic, government processes. As hardcopy (physical) documents are not uniquely addressable, different workarounds have been developed. There are, for instance, unambiguous ways to cite law and case law; academic publications; and so on. However most documents (think last year's tax report, or a contract) can only be referenced ad-hoc.

The PDF is not uniquely addressable. As a stand-alone file in a local filesystem, a PDF cannot be uniquely and unambiguously addressed, cited, or referenced. In principle, a document, as a unique digital entity, should have a universal permanent address that allows other documents to cite or reference it unambiguously.

In conclusion, PDF documents are not really digital: they have neither a user interface (buttons and functionality) nor Application Programming Interface (API for machine access). The PDF is quite literally a "digital brick" that predates the Internet. This results in digital fragmentation (multiple copies, multiple document-external systems and platforms, multiple identities, multiple incompatible document experiences), Friction (documents lost, leaked, or stolen, trust issues, fraud scandals, clunky processes, IT expenditure on inter-system document migration), ad-hoc automation and, mostly, a huge amount of manual labor- to the degree that a significant part of the economy goes toward manual document handling and verification. All these challenges and inefficiencies are increasingly exasperated with transition to anywhere-work following the Covid-19 global pandemic.

Figure 69:
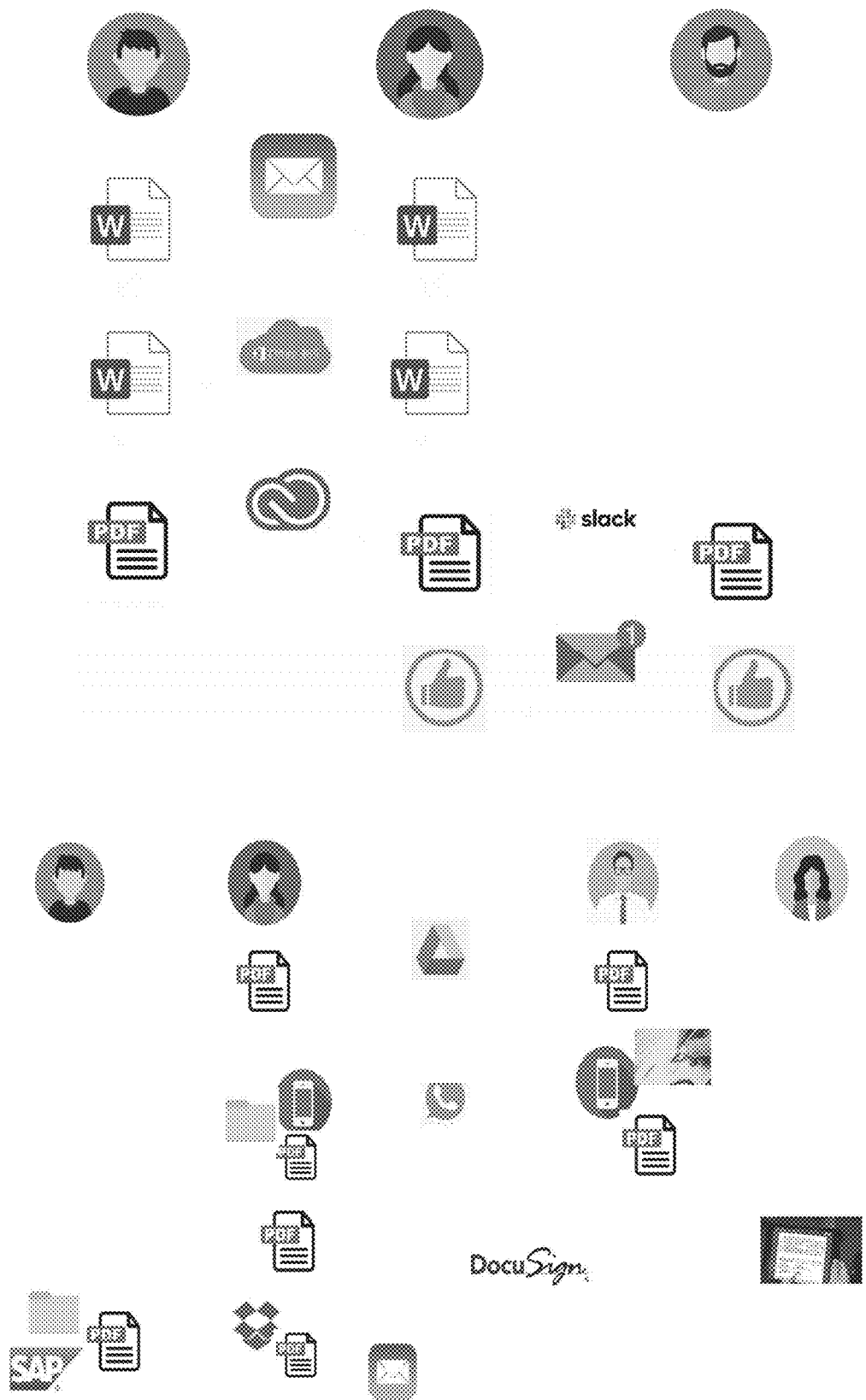
Figure 70:
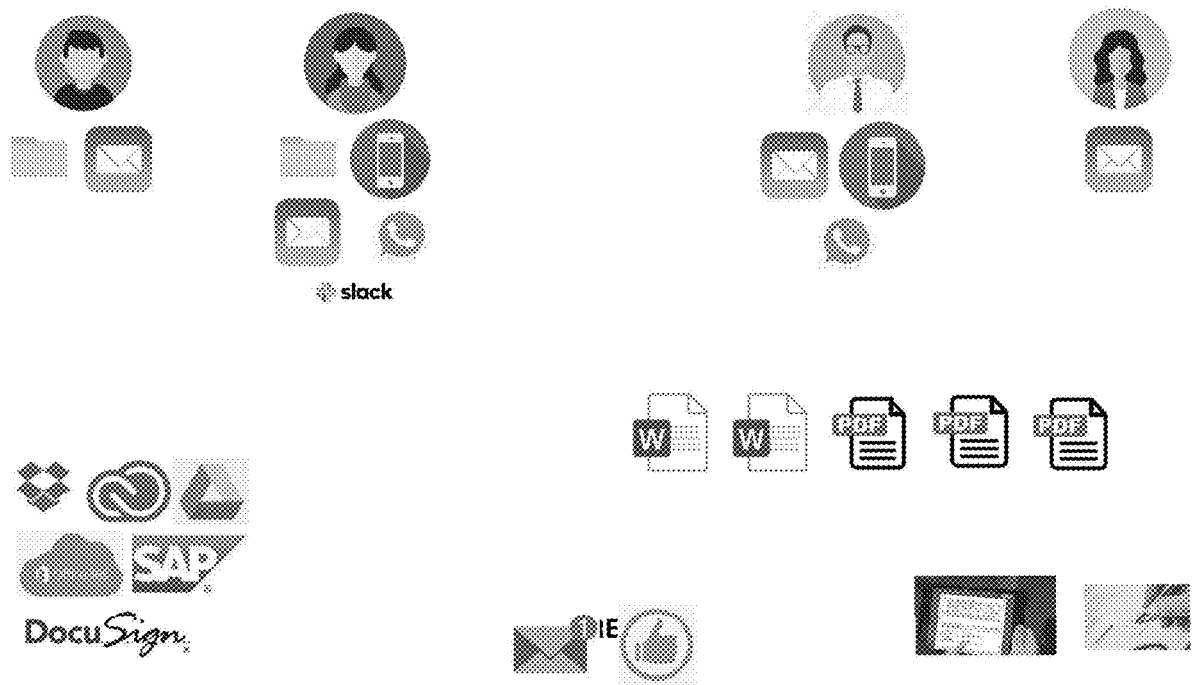
FIG. 70 shows the aftermath of the process described in the previous figure, including the applications and platforms used, and the copies left in various systems.

FIG. 69 shows a typical document exchange using current state-of-the-art: PDF documents, e-mail, instant messaging, cloud sharing services, e-signing services, and so on. Note that the process results in a large number of partially prepared or partially signed documents and involves a number of different platforms. This is an example of digital fragmentation. FIG. 70 shows the aftermath of the process described in FIG. 69: the applications and platforms used, and the copies left in various systems.

Digital Documents—Prior Art

One prevailing approach to the challenges described above has so far focused on adding more and more document-external platform and systems. For example, to support digital-only document signatures, document-external platforms such a DocuSign have been introduced; to support workflow automation, document-external platforms such as Adobe Sign have been introduced; to support document storage and sharing cloud storage systems such as Dropbox, Box and Google Drive have been introduced; and so on. These platforms and systems all revolve around the existing PDF document format. While, ideally, the document would have a user interface that would allow different user-document interactions, in the prevailing paradigm, the user "drags" the PDF file from system to system, and the user interface is part of the document-external system, rather than of the document itself. To overcome the problem of unique document address, Document Management Systems (DMS) are used in enterprise environment and allow ensured availability and unique citation of a document in the enterprise systems; For the purpose of secure and private document sharing, Data Rooms and Document Safes systems have been introduced; for the propose of machine-access to PDF files Intelligent Document Recognition (IDR) systems have been introduced. Clearly, all these systems are simply meant to overcome inherent design shortcomings of the PDF; as explained above, a "truly digital" document would offer native document functionality that would make these systems and platforms redundant.

A different popular approach to the challenges above has been an attempt to do away with the notion of human-readable documents altogether and attempt a direct leapfrog into fully digital information exchange. So-called "business blockchain" platforms used blockchain and related byzantine consensus shared databases to facilitate the idea that stakeholders can exchange business information in pure-digital form and do away with document-based business communication. The advantages were clear: communication is machine-readable, hence amenable to automation; trust is based on cryptographic protocols, not blue-ink signatures; unspoofable identity is a native design principle of the system; and so on. (The main meme was neither of these—rather the blockchain meme focused on decentralization. It became clear however that decentralization is not a strong-enough business case; the above advantages are much more real from an enterprise information exchange perspective).

This approach has failed. More than a decade and tens of billions in venture capital later, businesses simply refused to join the leapfrog. While, as the case is made elsewhere in this text, business blockchain indeed pointed at the correct direction of "endgame digital transformation" and fully digital information exchange, it is impossible for businesses to do away with documents in one fell swoop. Their document-based communication must be legally binding for a verity for reasons: compliance, tax law, corporate governance, due-diligence readiness, and so on; their employees understand documents and know how to work with them. Employees doing inefficient document work with old-fashioned PDFs is better to no work being done on digital-only futuristic blockchain interactions. In other words, if we have learned anything for the decade-long failure of business blockchain, that that (i) yes, everyone seems to agree that purely-digital communication will, one day, replace PDF and physical documents; and (ii) the next business communication medium, to replace the PDF, must be backward compatible with PDFs and physical hardcopies, and must extend—not replace—the PDF and physical hardcopy document user experience.

Embodiment of the Invention for Next-Generation Digital Documents (NGDs)

As explained above, the next evolution in digital documents will necessarily be an evolution of the document medium itself—rather than yet another document-external platform. On the one hand, this medium must be fully digital and machine-readable, and support a fully digitally transformed world; yet on the other hand, it must be backward-compatible, legally binding, and provide extension (rather than abrupt replacement) of the existing PDF and physical-hardcopy document experience.

To this end, we now disclose a method and apparatus for creation of Next Generation Documents. In this embodiment of the invention, different methods and elements taught above—such as Unique Digital Reality and unique digital objects, verifiable interactions, universal user interface, Verifiable Code Execution, Outlets and Twins, and many others—come together to enable exactly that. The embodiment of the invention we now turn to constitutes a disruptive evolution in the document medium itself. In what follows, we refer to the new document medium taught herein as Next Generation Digital Document (NGD for short).

Technical Description

Figure 71:
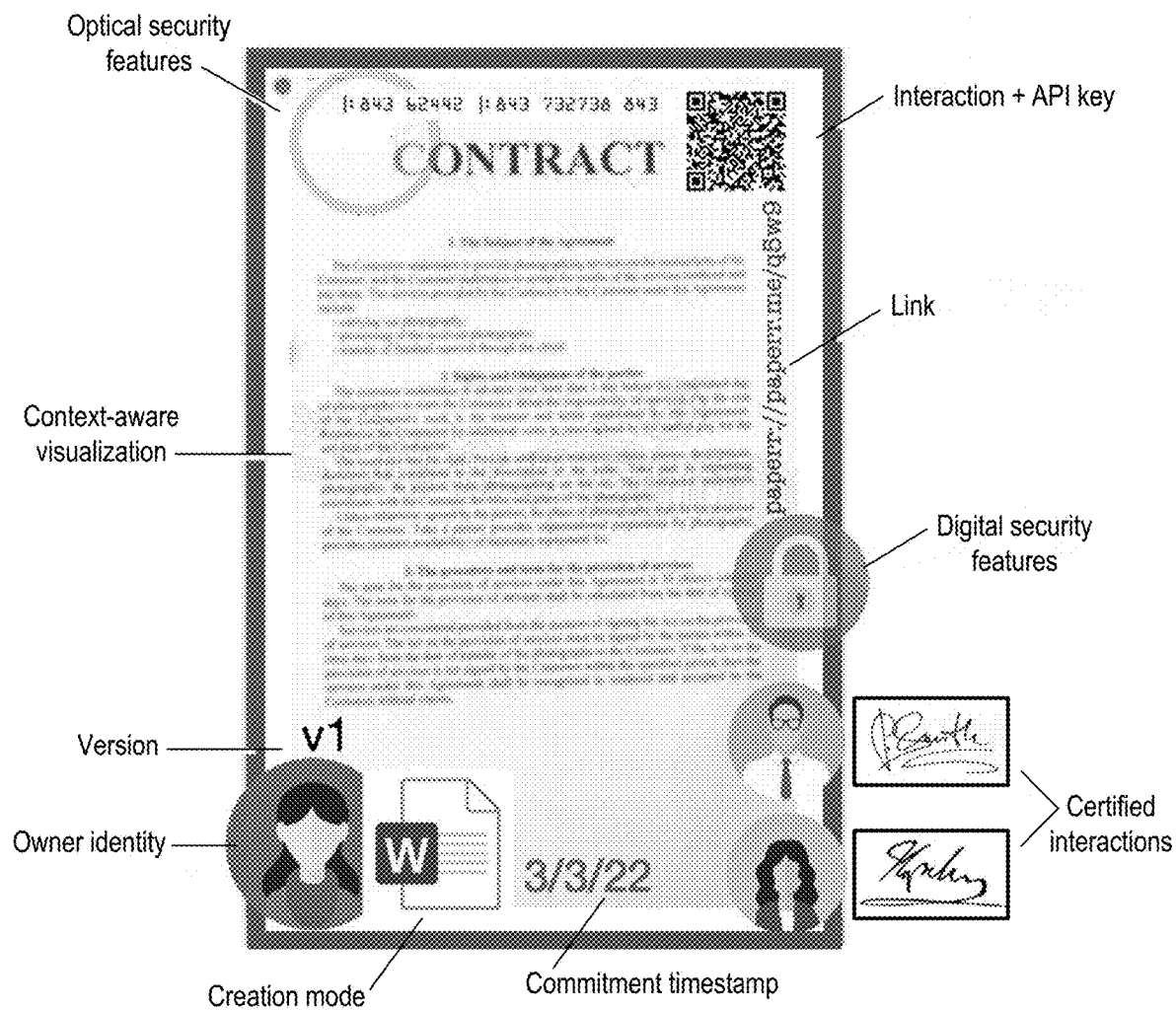
FIG. 71 shows a schematic view of a possible appearance of an NGD, with its various features and properties.

A NDG is a document medium, or a document format, that includes at least:
  A unique document identifier
  Instructions for rendering the document in human-readable format
  Key Document Information in machine-readable form FIG. 71 shows a schematic view of a possible appearance of an NGD, with its various features and properties.

In a preferred embodiment, the NGD is implemented as a unique digital object whose payload contains both the human-readable format and the Key Document Information in machine-readable form. In possible embodiments, the NGD also includes a user interface that allows document readers to interact with the document and perform actions—such as document sharing, access control, access log review, signature, signature request, and verification—from the document itself, without "dragging" the document to an exo-document system. In possible embodiments, the NGD also includes a "timeline" of all document history—for example, version updates, signature request and signature events, attachment events, access events, and so on.

Infrastructure. The method and apparatus taught herein uses a Unique Digital Reality. Specifically, each NGD is a unique digital object. In a possible embodiment, NGD unique digital objects are enduring network interfaces. The method makes additional use of software components used for creation of NGDs, user interaction with NGDs, software interaction with NGD, and NGD-based process automation, as described below.

Definition of Document Semantic Type and Document Key Information. Document Key Information is a collection of information pieces contained in a document, which have key importance. These pieces of information may be textual or numerical, or may be identity of individuals, things, or other documents. For example, in a real estate lease contract, key information may include identity of property owner, identity of the property being leased, lease amount and payment dates, lease start and end date, penalty for late lease payment, citation of a related document (such as an appendix, a property title, or a previous contract) and so on. In an invoice, key information may include invoice number, invoice date, customer identity, vendor identity, identity and quantity of goods or services sold, payment due date, taxes collected and so on. Document semantic type is a definition of the type of the document (for example, a lease contract; a personal income tax return form with specific number; or a specific type of declaration; etc.). The software producing the document (such as a word processor, an invoice generator, and so on) always has access to Document Key Information in digital form. In current practice, however, document creating software creates a PDF and loses the Document Key Information that it has in digital form. In an embodiment of the invention, the document creating software retains the Document Key Information and uses it when creating an NGD.

Embodiment: Object-oriented Document class. NGD may have a semantic type (such as "invoice", "proof of car insurance policy" etc.), and may contain machine-readable information in key-value type. They may also implement specific methods or actions such as "sign", "verify", etc. All these fit into the Object-Oriented Programming (OOP) paradigm, whereby a variable has a class type, which defines key-value data fields and methods, and which can be inherited from one type to a sub-type. In a possible embodiment, NGD classes define semantic types, key-value fields, and methods—including validation and verification methods. In this possible embodiment, NGD class types are stored as unique digital objects; when an NGD is created, it specifies the class type by the unique identifier of the corresponding unique digital document. Machine readable code can then access the document semantic type—defined by the class—as well as key-value fields defined by the class. Keys in key-value pairs defined by the class can be assigned to a specific location in the document, equating the corresponding value to a value that appears in the document.

Figure 72:
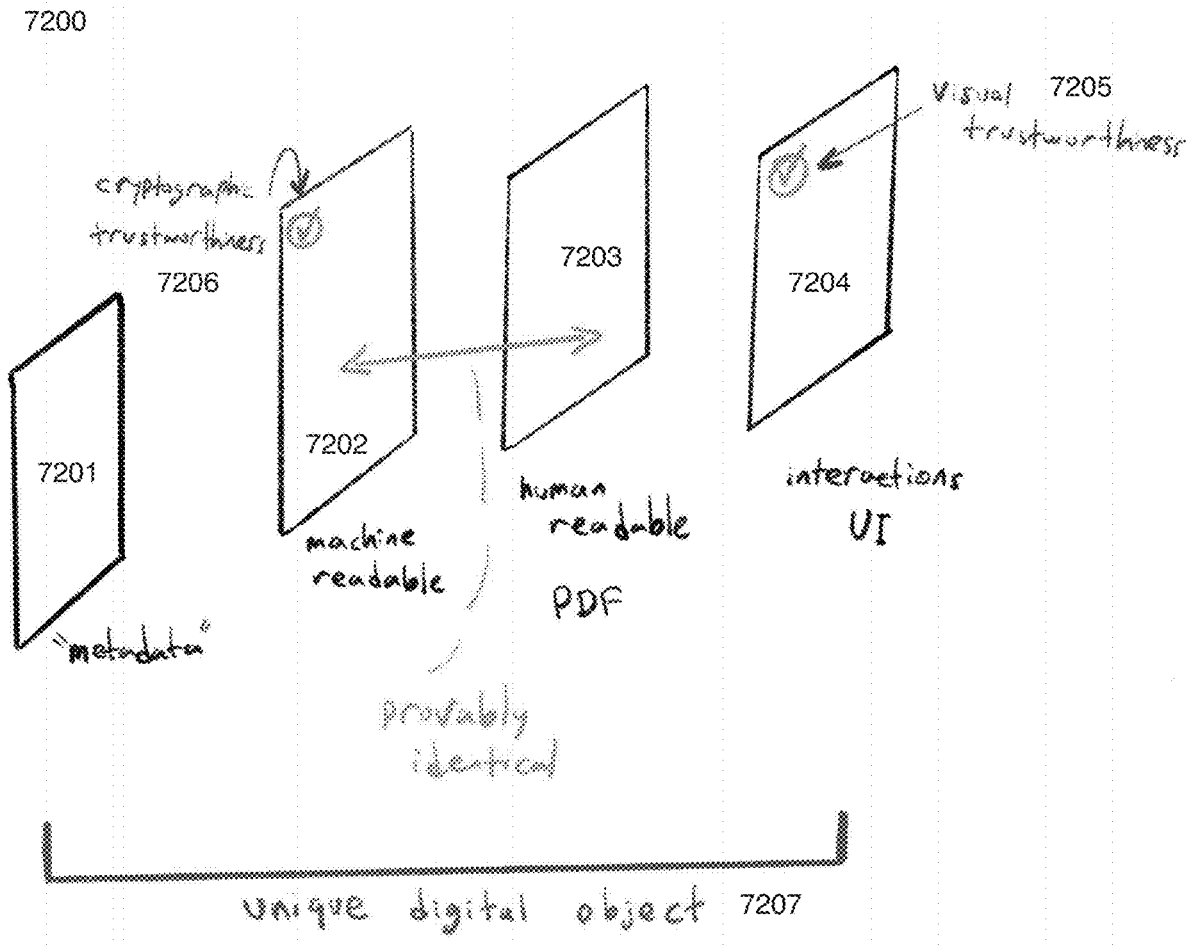
FIG. 72 shows the main elements of a Next Generation Document.

Structure of a Next Generation Document. FIG. 72 shows the main elements of an NGD: a human-readable layer 7203, which can be implemented by a PDF or other standards for uniform on-screen and printed appearance of digital documents; a machine-readable layer 7202, which in some embodiments contains key-value data as described above. In some embodiments, an NGD contains an interactive layer 7204 exposing user-interface elements to the user. In some embodiments, an NGD contains a metadata layer 7201 containing mutable information such as access log, interaction history, etc. The machine-readable layer 7202 contains cryptographic trustworthiness features 7206 such as digital signatures; the user interface feature visualizes trustworthiness status 7205 in a conspicuous way to the user. All these layers are contained in a unique digital object 7207 in UDR.

Figure 73:
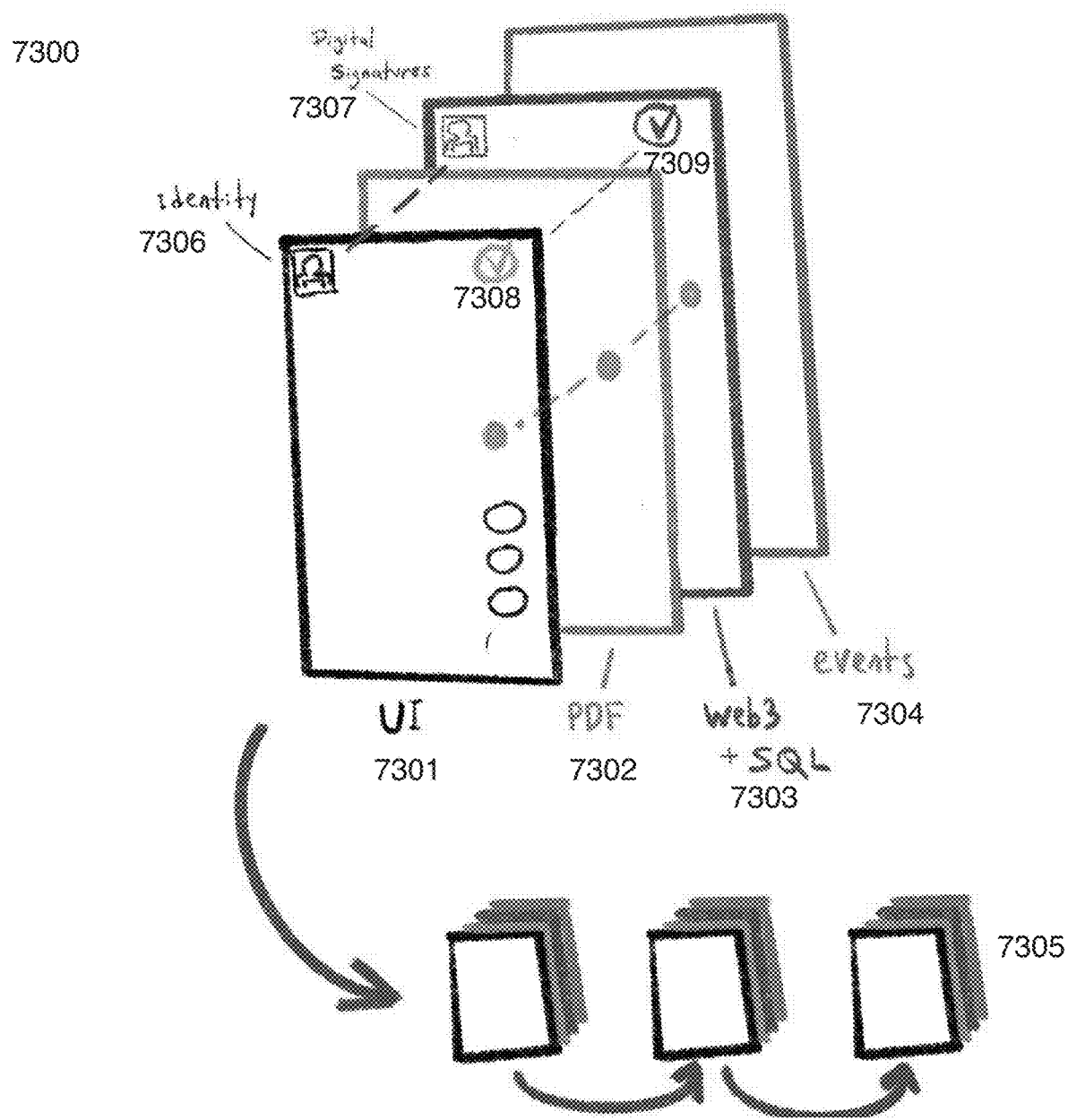
FIG. 73 provides another view of the structure of a Next Generation Document, emphasizing the notion that the different elements complement each other.

FIG. 73 provides another view of the structure of an NGD, emphasizing the notion that the different elements complement each other. In particular, information in the machine-readable layer 7303 is connected in an unspoofable way, and indeed structurally identical, to the information that appears in the human-readable layer and the user interface. In a preferred embodiment, the rendering mechanism used to visualize the human-readable layer uses the exact same information that appears in the machine-readable layer, so that an NGD cannot relay different sets of information to the human user and through its API.

Figure 74:
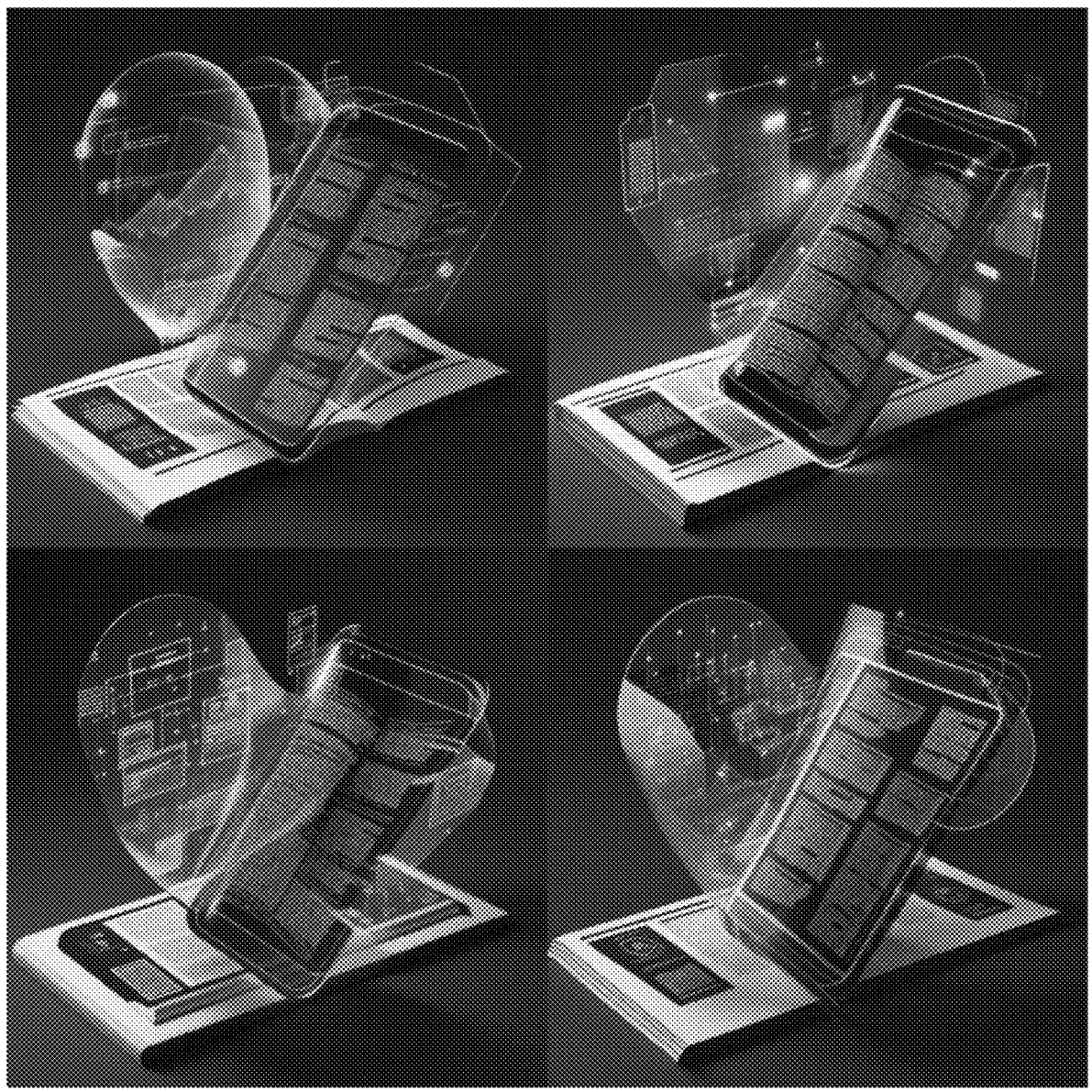
FIG. 74 is an artist's illustration of one of the fundamental merits of an NGD over state-of-the-art: the fact that NGD is new document medium that combines legacy document form with highly advanced digital capabilities.

FIG. 74 is an artist's illustration of one of the fundamental merits of an NGD over state-of-the-art: the fact that NGD is new document medium that combines legacy document form with highly advanced digital capabilities.

Creation of Next Generation Digital Document. A software application creates a NGD by collecting two ingredients: one, a human-readable form of the document; and two, machine-readable key information pertaining to the document. In a preferred embodiment, this information is collected in machine-readable key-value format, such as Extensible Markup Language (XML), JavaScript Object Notation (JSON), or Intermediate Document (IDOC). The values in a key-value pair may be textual, numerical, or contain a unique identifier (for example, of another document, an interaction object, or an identify). In a preferred embodiment, the software application creating the NGD passes this information to an NGD creation module, which in turns creates a new unique digital object whose payload contains both the human-readable form of the document, such as a document in Hypertext Transfer Markup Language (HTML) or Portable Document Format (PDF) formats, and the machine-readable key information.

Embodiment: Next Generation Digital Document Printer

Since the days Apple Macintosh and Microsoft Windows, every desktop software application implements a "File Print" option, which opens a print dialogue window and sends the document to be printed by the selected print driver. In a possible embodiment of the invention, a special software printer is installed on desktop computers or other printing enabled devices, such that when an application sends a document to be printed on that special printer, an NGD is created instead of (or in addition to) a hardcopy or a document file in the local filesystem.

Figure 75:
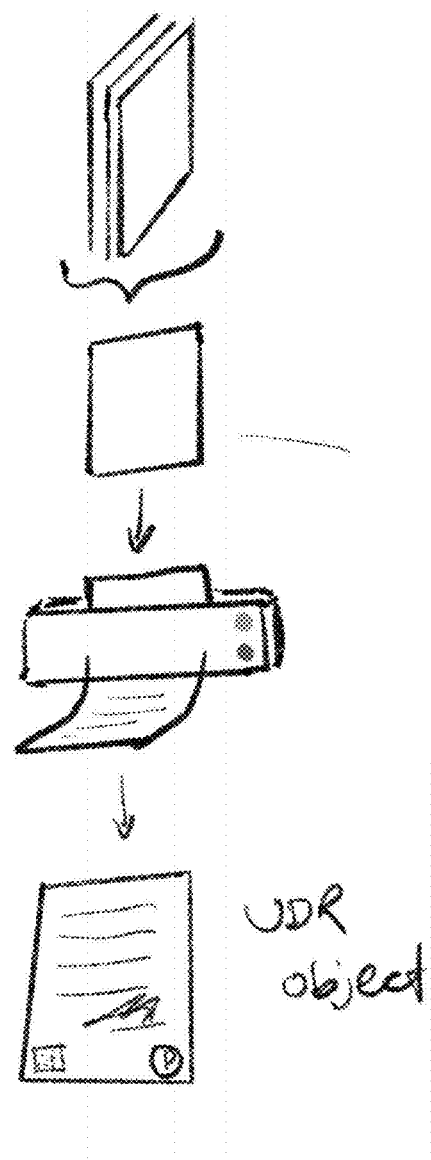
FIG. 75 shows a metaphorical description of the creation of a Next Generation Document using presently familiar notions.

FIG. 75 shows a metaphorical description of the creation of an NGD using presently familiar notions: the layers of an NGD, described in FIG. 73, come together to become a document medium upon which the document is "printed". The NGD software printer is a software device that creates the NGD as a new unique digital object in UDR.

Figure 76:
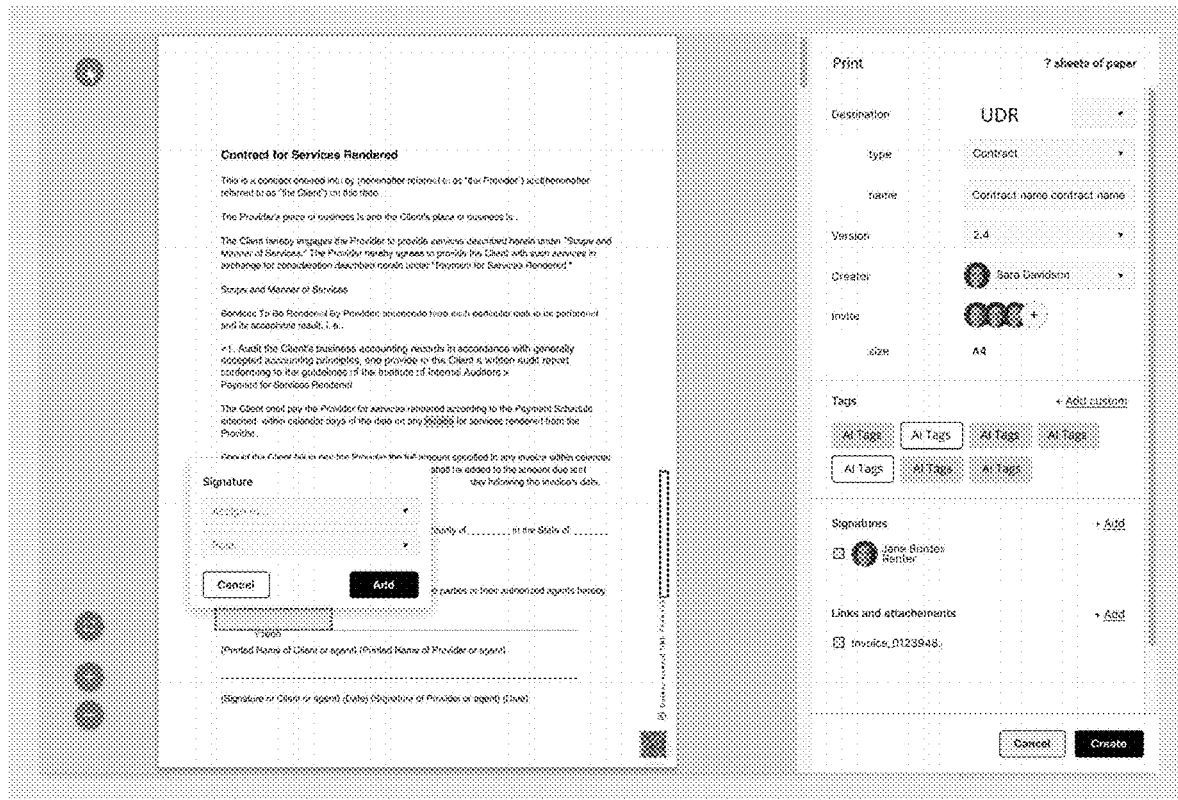
FIG. 76 shows a possible user interface for creation of a contract Next Generation Document, based on a print-dialogue user interface.

FIG. 76 shows a possible user interface for creation of a contract NGD, based on a print-dialogue user interface.

Figure 77:
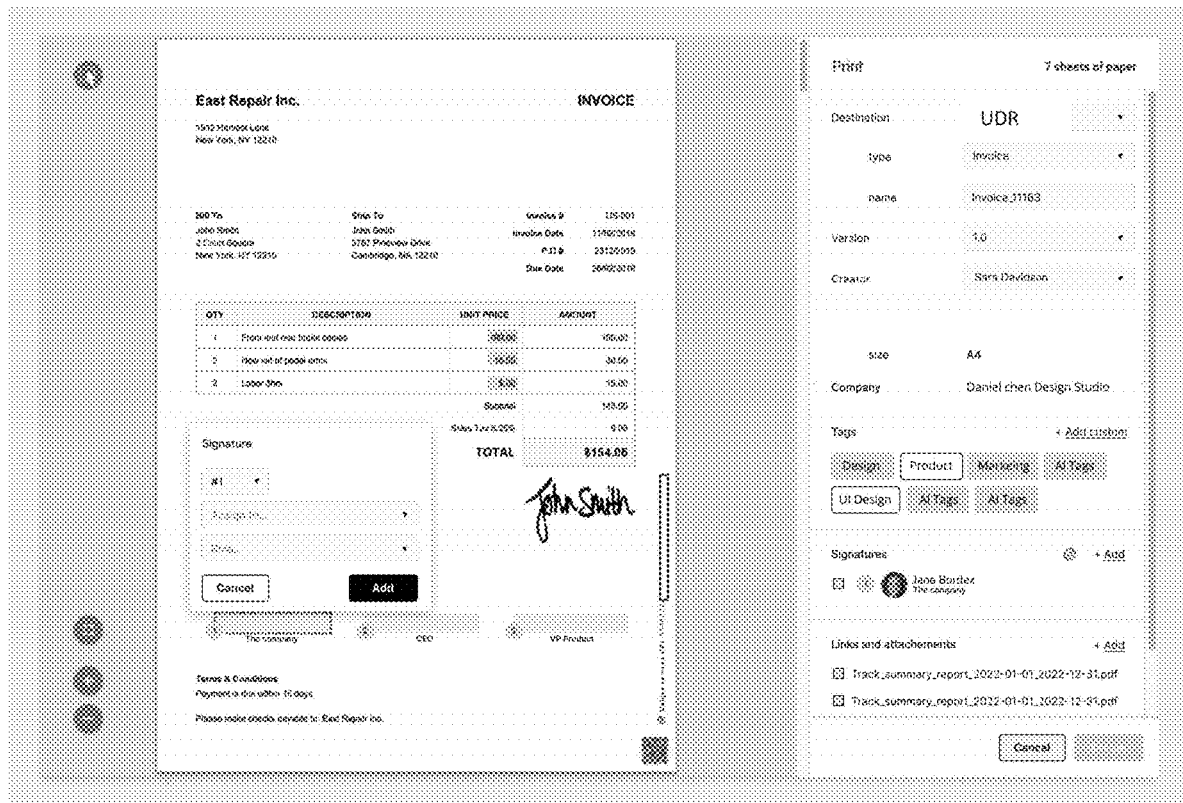
FIG. 77 shows a possible user interface for creation of an invoice Next Generation Document, based on a print-dialogue user interface.

FIG. 77 shows a possible user interface for creation of an invoice NGD, based on a print-dialogue user interface.

Embodiment: Software integration for Next Generation Digital Document Creation

In a possible embodiment, add-on software components provide NGD creation functionality to existing software systems. For example, an accounting software may be augmented with an "export report to NGD" button.

NGD Universal Identifier

A key property of Next Generation Documents is that each document has a unique identifier, which could in a preferred embodiment be the unique identifier of the corresponding unique digital object. The document presents its unique identifier in either human-readable, machine-readable form, or both, when it is presented visually.

Embodiment: NGD Permanent URL. In a possible embodiment, the NGD is represented by an enduring network interface, and the unique identifier is the permanent URL corresponding to the enduring network interface. The NGD can then present a QR code with the permanent URL, and/or the URL itself in human-readable form.

The mutable data of an NGD unique digital object. In a possible embodiment, when the NGD is represented by a unique digital object, the mutable data of the unique digital object may contain information such as: document access privileges, document access log, unique identifiers of unique digital objects corresponding to document signature events, document signature requests, attachments, and so on.

Identity Management and Access Control to Next Generation Documents

Unlike PDF documents, and like cloud assets, a NGD has native access control defined by user identity, rather than by password. An NGD defines access policies and keeps access logs.

Figure 78:
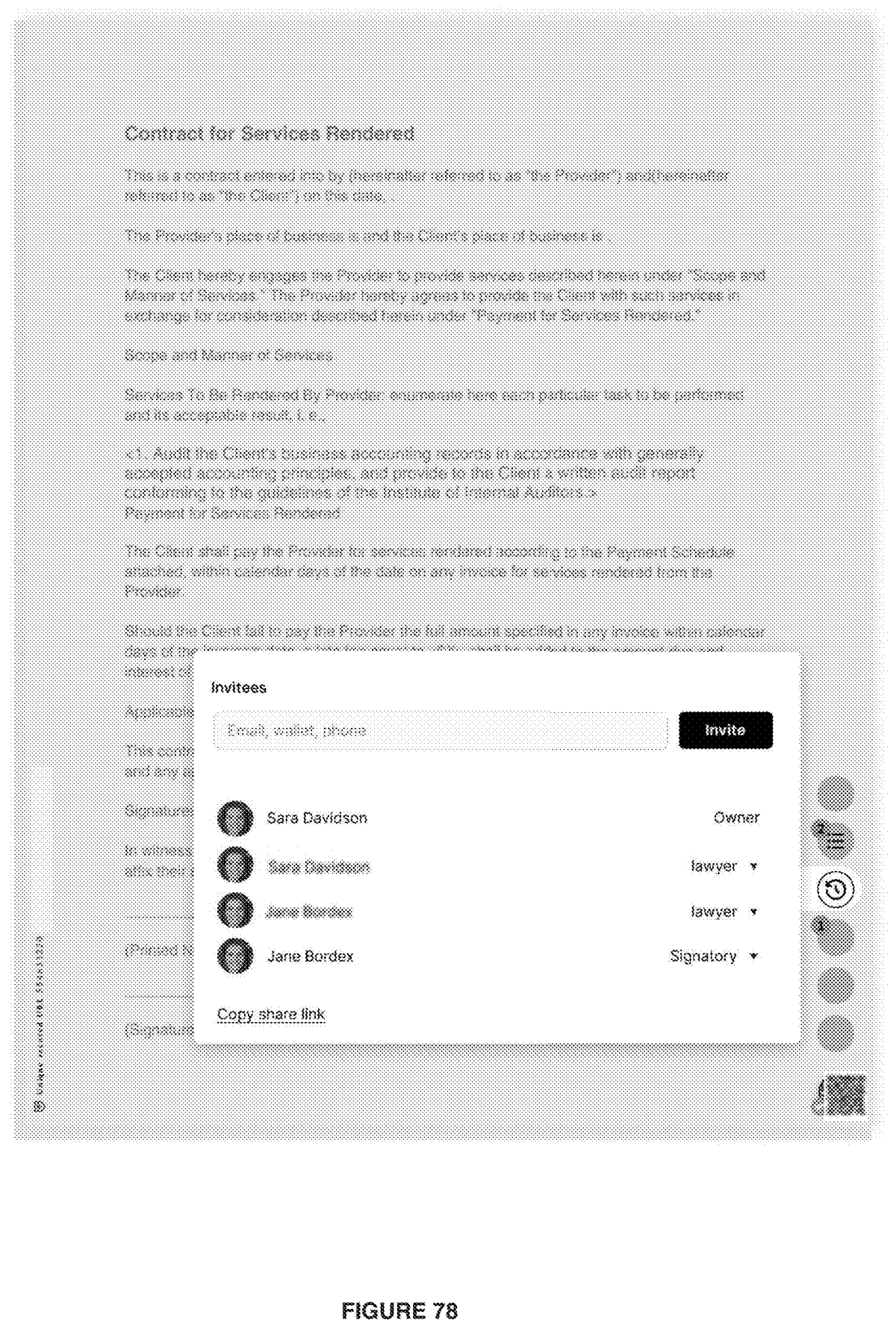

FIG. 78 shows a possible design for access control of NGD from within its user interface. An authorized user may share the NGD with specified identities.

Embodiment: Contingency for Cross-Organization Document Transparency

In a possible embodiment, an NGD may be created with a "break-glass" functionality, which defines a procedure whereby it will become available to a user without access credentials. For example, in a company board with nine seats (say) it may be defined that any seven board members (say) can elect to invoke the "break-glass" procedure and be granted limited-time access to the entirety of corporate NGD ever produced.

User Interaction with Next Generation Digital Document

An NGD is an interactive document. It exposes a user interface allowing the document reader to become a document user, performing standard actions such as: sign, request a signature, grant, or revoke access, and so on; as well as custom-implemented actions.

Visual presentation of NGD universal identifier. In a preferred embodiment, an NGD has a distinct appearance representing that fact that the document is an NGD. The distinct appearance may include: the document unique identifier in human-readable and/or machine-readable format; an indication that the document in fact has a user interface; an indication that the document is valid or invalid, etc.

Signing an NGD. The NGD user interface allows several signature modalities: including "click here to sign" button, touch screen scribble signatures, and so on. A signature request may specify not just who is required to sign where in the document, but also how they are required to authenticate and how they are required to sign. In other words, a requested signature may request that the signer be authenticated using facial recognition (say) and only sign by scribbling a signature on a touch screen. A signature obtained on one Twin will immediately appear on all other Twins of the NGD.

Importing a blue-pen signature. In a possible embodiment, a blue-pen signature on a hardcopy Outlet of an NGD may be imported as a signature on the NGD itself. In this embodiment, if an Outlet allows blue-pen signature import, the user required to sign may print a hardcopy Outlet and sign it in the appropriate box or line. The user will then use a device with a camera (such as a smartphone, a tablet or AR glasses) to authenticate his or her identity, and then look at the signed document. The camera will acquire the printed Outlet using the universal identifier on the Outlet, locate the blue-pen signature, extract the blue-pen signature from the image, and create a signature verifiable interaction unique digital object containing the signature image extracted from the camera image. As with all other signature methods, the signature will immediately appear on all other Twins of the NGD.

NGD Jackets, Outlets and Twins.

NGD Jackets. An NGD may be visually rendered in different ways. In a possible embodiment, an NGD admits only one visualization and appears the same on any platform (similar to a PDF). In another possible embodiment, an NGD may be visualized in context-dependent ways. Some visualizations may be merged with visualizations of other NGDs to create a single combined visualization for several documents. In the latter case, the combined visualization may present the unique identifiers of all documents combined for the visualization, or alternatively present a single unique identifier of a unique digital object that represents the document amalgamation and in turn contains the unique identifiers of all documents combined.

NGD Twins. In a preferred embodiment an NGD is essentially a unique digital object, which may be accessed through its unique identifier (in some embodiments, a permanent unique URL). In this embodiment, the primary storage of a NGD is in UDR rather than as a local file or a cloud file. Instead, it enables multiple proxies or local manifestations, which act as pointers to the NGD object on UDR. Such proxies or local manifestations may include local files in an operating system; cloud files; WWW pages; visualizable objects in Virtual Reality (VR); printed hardcopies; and more. For example, a printed hardcopy may be considered a "physical twin" of an NGD stored in UDR.

Figure 79:
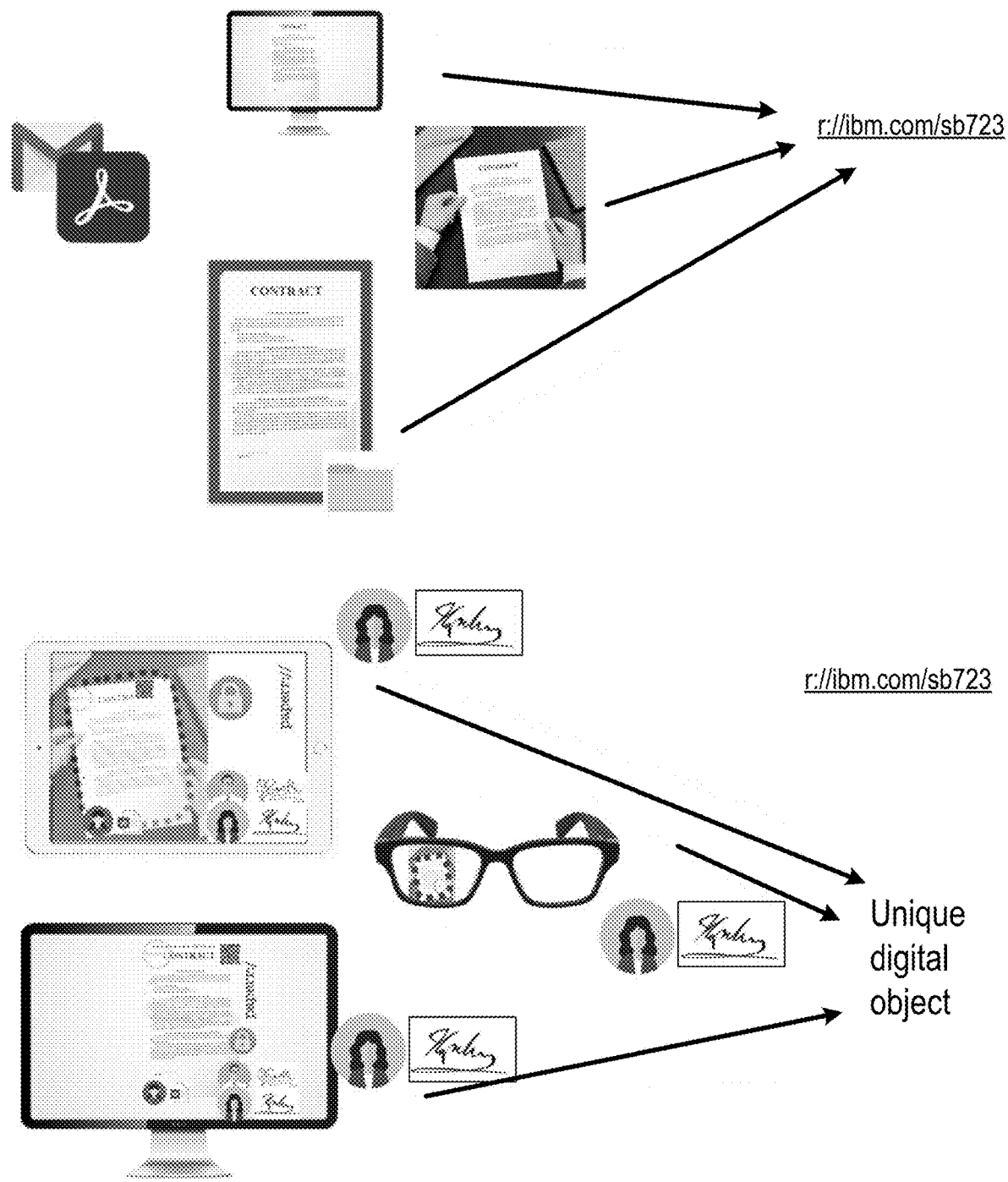
FIG. 79 shows a schematic representation of different Twins of a Next Generation Document, showing that all Twins refer to the same unique digital object in UDR.

FIG. 79 shows a schematic representation of different Twins of an NGD, showing that all Twins refer to the same unique digital object in UDR, and all Twins are essentially equivalent pointers to the unique identifier of the underlying NGD (which is, in a possible embodiment, a permanent URL).

NGD Outlets. In the specific context of NGD, an Outlet (a concept taught in generality elsewhere in the present invention disclosure) is a specific visualization of the NGD aimed for a specific purpose, a specific display medium, and sometimes a specific target user audience. For example, an Outlet may be created for the purpose of displaying an NGD printed in hard copy on a billboard for general audience, and a different Outlet can be created for displaying the same NGD on a mobile phone for use of a specific user or group of users. In this case each Outlet will display its own unique identifier, which will be different to the unique identifier of the underlying NGD; the payload of the Outlet unique digital object will contain the unique identifier of the underlying NGD, and the user interface presented by the Outlet will be specific for its purpose and its target audience. For example, an Outlet not intended for signature will not enable signatures, whereas an Outlet intended for signature of a specific user will only present signature option (or request) if accessed by that specific user.

In a preferred embodiment, an NGD enables Twins. A Twin is an instance of the NGD in any medium—including hardcopy, local file, cloud file, etc. While an NGD may in this preferred embodiment have any number of Twins (or a specified limited number of Twins), all Twins point to the unique identifier of their underlying NGD. All Twins are synchronized in the sense that when mutable NGD information is changed via one Twin (for example, a signature added, a form information field filled, a comment added, etc.) these changes will be reflected on any existing or future Twin of the NGD.

Figure 80:
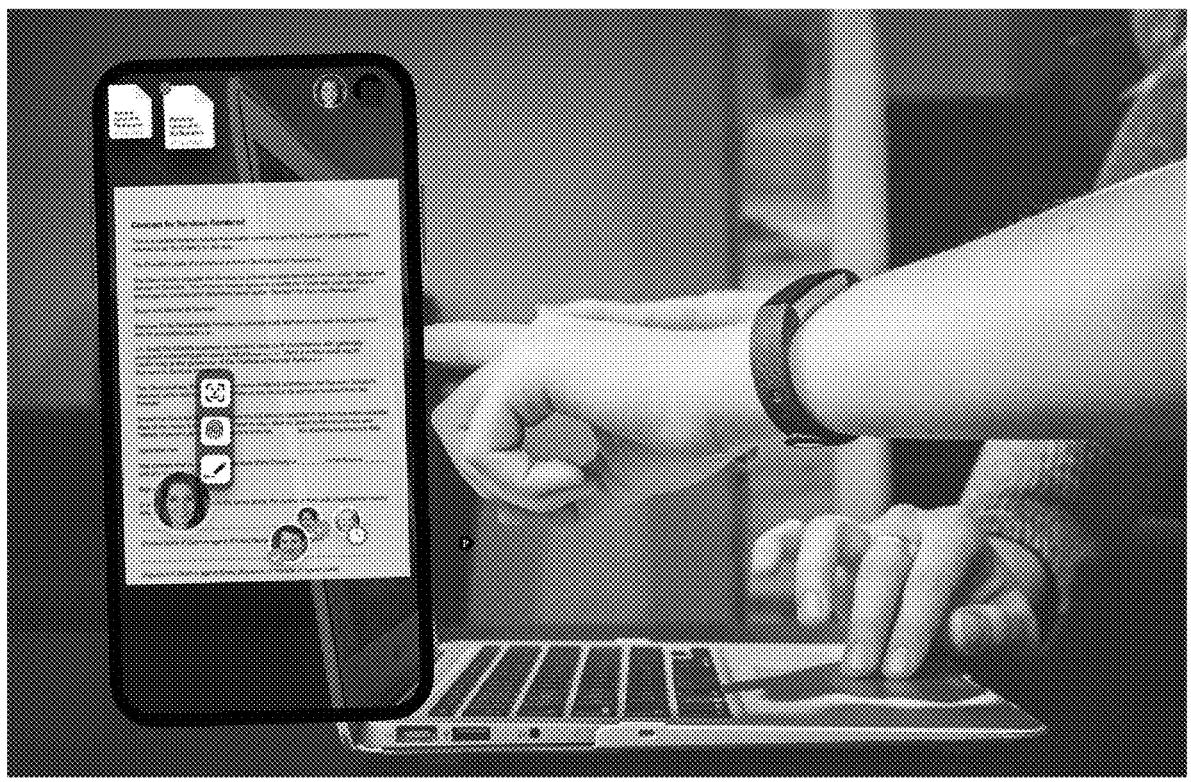
FIG. 80 shows an Outlet of a Next Generation Document presented on the screen of a laptop computer.

FIG. 80 shows an NGD Outlet presented on the screen of a laptop computer. The Outlet is accessed through a mobile device, revealing the NGD user interface determined by the Outlet.

Embodiment: NGD with privacy. In a possible embodiment, when a Twin is accessed without proper access credentials, the NGD content will not appear to the unauthorized user; instead, the user will be asked to authenticate. This makes NGD documents leak-proof, in the sense that, even if a local file is copied and leaked, the local file cannot be accessed without proper credentials—and the access attempt will be logged.

Figure 81:
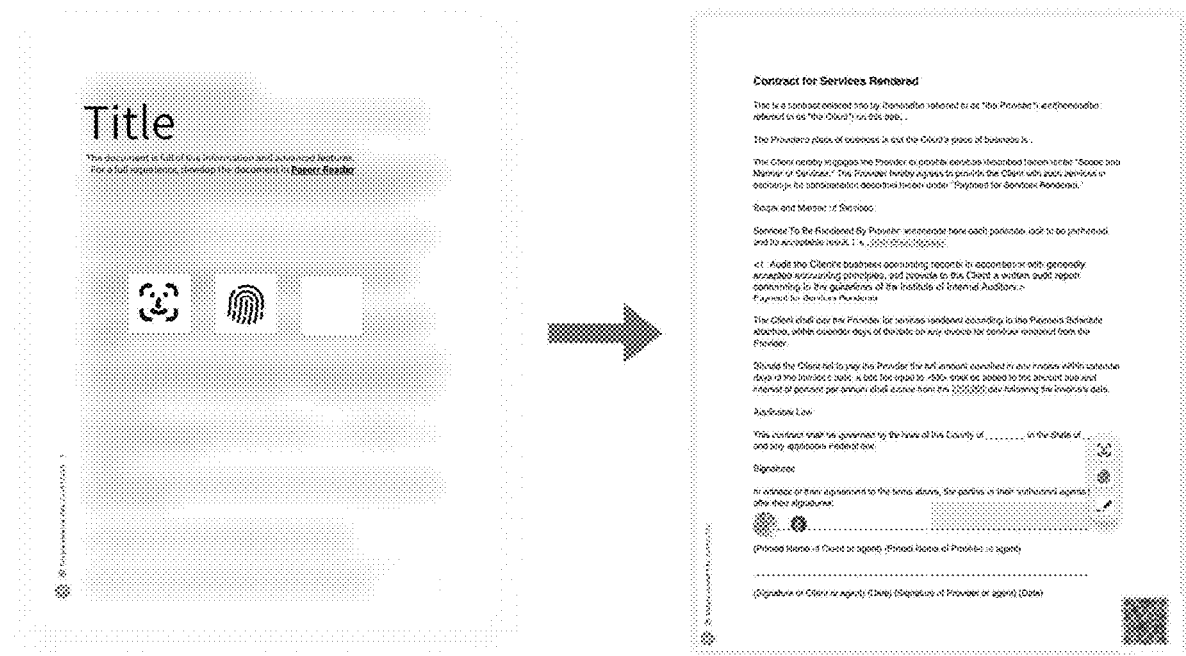
FIG. 81 shows the appearance of a Next Generation Document opened in a document-reading interface without access permissions.

FIG. 81 shows the appearance of an NGD opened in a document-reading interface (such as a document reader or a web browser) without access permissions. On left, the document is obfuscated and requires user authentication to continue. On right, the same document after user authentication determined that the user has valid access privileges to the NGD.

Embodiment: AR Interface

A NGD is a fully digital entity, in the sense that its content, creation process, citation of other NGDs and entire history of user interaction (including access and signatures) are all digitally produced, digitally recorded and digitally verifiable. In a possible embodiment, in order to enable an NGD to be printed to hard copy without losing its digital advantages, an NGD may be printed to a physical hard copy Twin. An Augmented Reality (AR) device is used to render digital details, such as a user interface, document signatures, etc., on the hardcopy as it is viewed through the AR device.

FIG. 82 shows a possible design for Augmented Reality (AR) user interface of an NGD. On top, a NGD document is presented on hardcopy or screen (note the machine-readable unique identifier on the lower right corner). On bottom the same NGD is viewed through an AR device: the user is presented with an interface that allows him or her to interact with the document—and perform such actions as sign, share, verify and so on. In a possible embodiment, the user interface is personalized and depends on the Outlet, the user identity, the device used, and so on.

Embodiment: Unified Interaction Surface

One of the difficulties in current state of the art concerns a multiplicity of user interfaces and user interaction surface. A user interaction surface (or "interaction surface" for short) is a medium through which a user interacts with the document—reads it, signs it, etc. Every interaction surface is different: even though the document appearance may be uniform across interaction surfaces (such as paper hardcopy, desktop screen, tablet, smartphone, and billboard), the user document experience itself is completely different, as determined by the different properties and capabilities of the medium. In a possible embodiment, the document experience, namely, the user experience of the document, is uniform across interaction surfaces. The document user interface—not just the document appearance—is identical whether the NGD is viewed on hardcopy (through Augmented Reality device), desktop viewing application, third-party application integration, desktop internet browser, mobile phone internet browser, mobile phone application, and so on.

Figure 83:
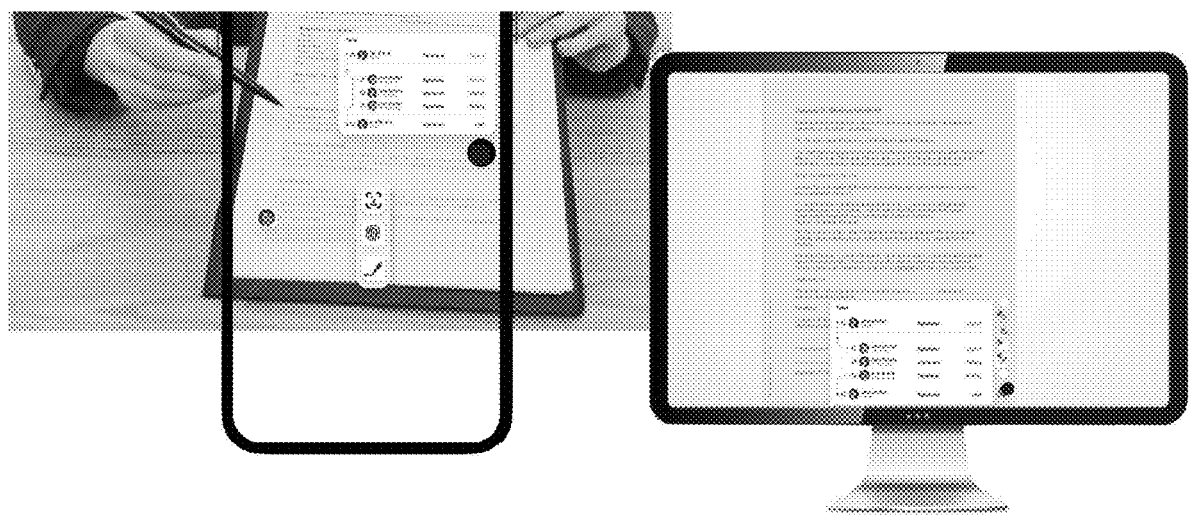
FIG. 83 demonstrates the concept of a uniform document interaction surface and a uniform document experience.

FIG. 83 demonstrates the concept of a uniform document interaction surface, and a uniform document experience: for example, the user interface of an NGD as it appears on an AR device and as it appear on a desktop screen is the same.

Figure 84:
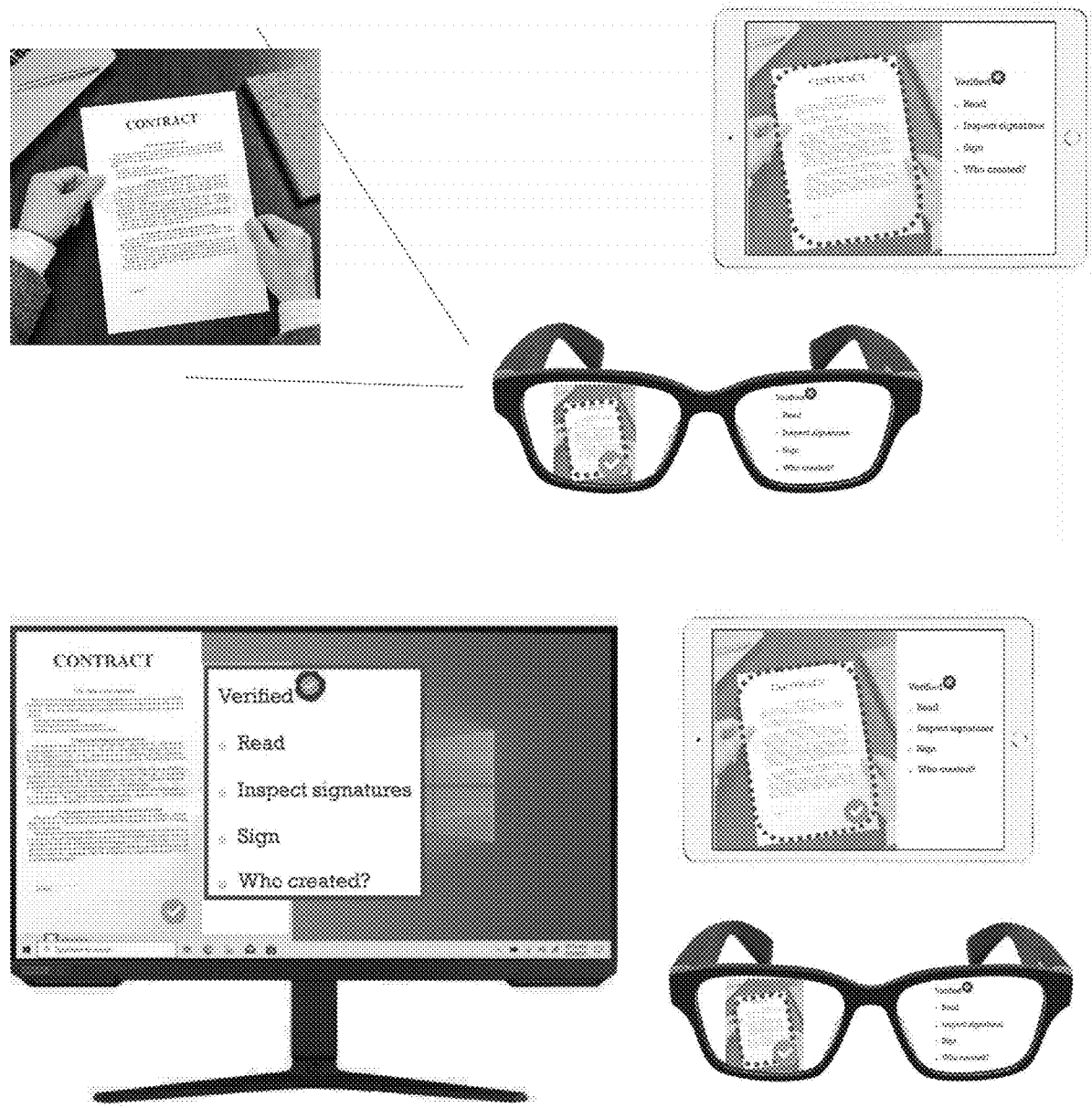
FIG. 84 provides another illustration of the concept of a uniform document interaction surface: the user interface as it appears on Augmented-Reality enabled glasses, tablet device and desktop screen is the same.

FIG. 84 provides another illustration of the concept of a uniform document interaction surface: the user interface as it appears on AR-enabled glasses, tablet device and desktop screen is the same.

FIG. 84A shows a user interface design for a Next Generation Document form, which guides a form user, authorized to fill the form, through specific fields the user is asked to fill.

Figure 84B:
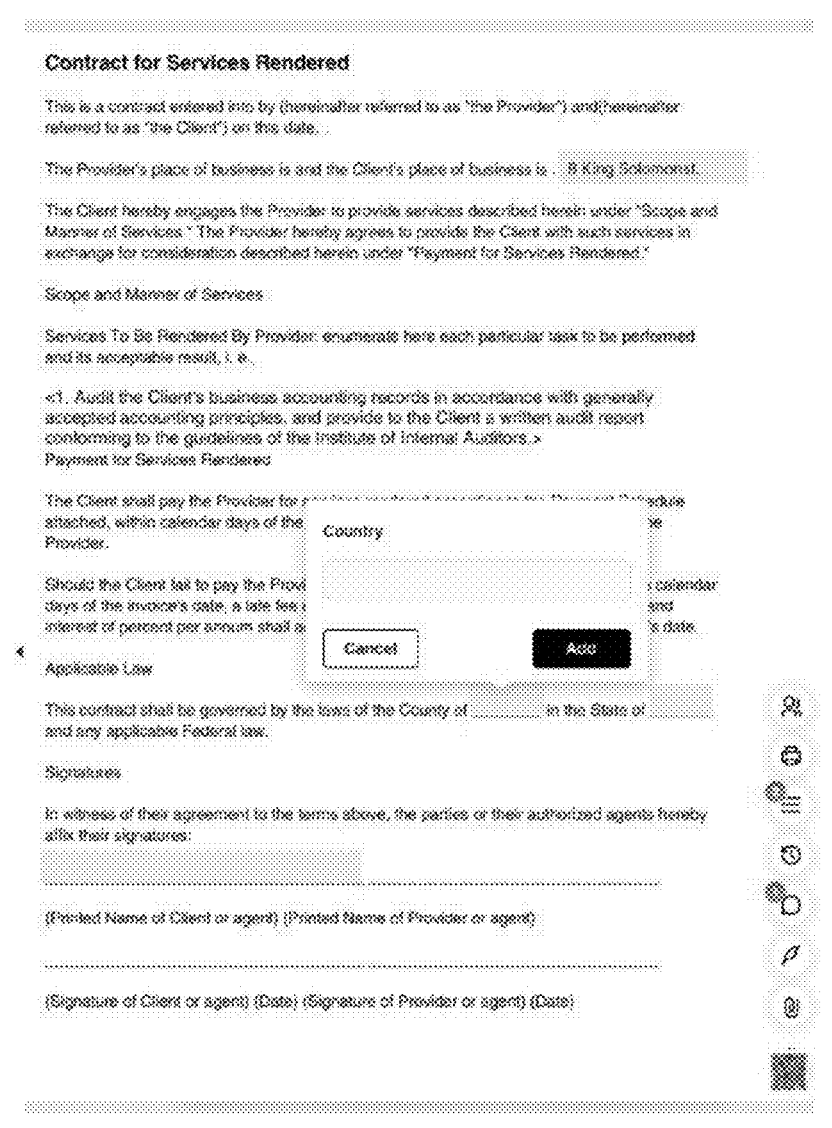

FIG. 84B shows an alterative user interface design for a Next Generation Document form, which presents a form user, authorized to fill the form, with a questionnaire collecting the necessary information required in the form. After the questionnaire is filled by the user in the next generation document user interface, the Next Generation Document form auto-fills form fields from the questionnaire.

Embodiment: VR Interface

In a possible embodiment of the invention, NGD admit Outlets or Twins in Virtual Reality (VR). In this embodiment, the VR interface may visualize entire binders of NGD, with their inter-connections and inter-citations. When an NGD cites another NGD (for example, a rent contract citing a property title, or a mortgage loan agreement citing a property sale contract) the VR interface may visualize such interconnections. The VR interface may allow the user to browse binders or portfolios of NGDs, present Outlets of selected NGDs, and so on.

Embodiment: Live Cross-Medium Document Interactions

In a possible embodiment, an interaction that a user makes with an NGD (such as signing a signature or adding an attachment) is instantly reflected in all other Outlets or Twins of the same NGD.

Embodiment: NGD Forms

Form documents are used to collect information from document users. One of the central difficulties with forms in the state of the art involves collecting form information and transferring it digitally to databases and digital information systems. A common workaround today involves HTML forms and user portals, in which a user can log in and fill in details on a web application, which in turn transfers user-entered information to a database. However, organizations without a secure-enough web presence cannot use this method; in addition, the web portal solutions does not cover regulated forms, which are forms that a company is required to have filled and retain by law. In both these cases companies often resort to old-fashioned form documents and go through the trouble of manually entering user-filled information in a form into a database. In an embodiment of the invention, an NGD can define fields to be filled by a document user. The NGD can define which users can enter which fields—so that, for example, several users have access to a form but only one of them is able to fill in information in a specific form field. The NGD can define specific workflow rules: for example, that a form may be signed by the same user who filled in the form fields, and only after all fields are filled. An NGD may define field validators—similar to field validators of HTML forms, whereby the form will not accept entered values that violate specified rules. The NGD may also prevent changes to user-entered fields once the form has been signed, turning it into a read-only document after signature. User interaction events involving form-filling may be recorded as document interactions in UDR and reported on the NGD timeline, so that the document will reflect which user filled (or changed) which form fields, and when.

Visual Trustworthiness in Next Generation Documents. In a preferred embodiment, an NGD exhibits a visually conspicuous symbol that summarizes its trustworthiness status—e.g. in terms of authenticity, information integrity, integrity of digital signatures; integrity of ownership status, and so on.

Figure 84C:
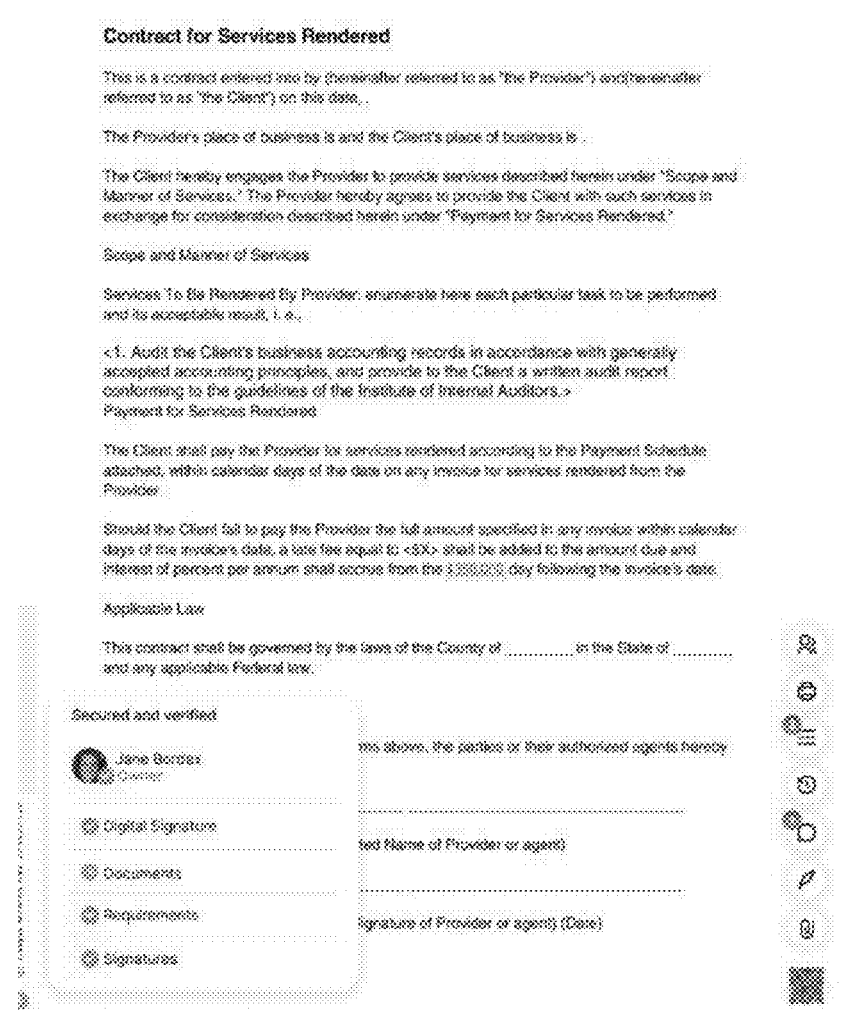

FIG. 84C shows a user interface design for Next Generation Document, which summarizes the validity and trustworthiness status of the document in a single symbol (lower left corner); and itemizes the various high-level (or overall) notions of validity, verifiability and trustworthiness implemented by the Next Generation Document. Each high-level notion is either satisfied (as demonstrated by an appropriate icon) or not satisfied. The summary status of document validity, verifiability and trustworthiness may be shown constantly on the document itself and may be updated in real-time as the status changes.

FIG. 84D shows a user interface design for Next Generation Document, which offers a detailed, itemized visual status of a specific notion of validity, verifiability or trustworthiness implemented by the Next Generation Document.

Figure 84E:
FIG. 84E shows a user interface design for Next Generation Document, which shows low-level (or maximally detailed) complete report of a specific aspect of specific notions of validity, verifiability, and trustworthiness information a detailed visual status of specific notions of validity, verifiability and trustworthiness implemented by the Next Generation Document.

FIG. 84E shows a user interface design for Next Generation Document, which shows low-level (or maximally detailed) complete report of a specific aspect of specific notions of validity, verifiability, and trustworthiness information a detailed visual status of specific notions of validity, verifiability and trustworthiness implemented by the Next Generation Document.

Software interaction with NGD and NGD integration in IT systems. In an embodiment of the invention, NGD are primitive software objects, with defined software interfaces and application programming interfaces (APIs). For comparison, other primitive software objects include local operating system files and Hypertext Transfer Protocol (HTTP) sockets, both of which may be accessed and used by software processes using software interfaces and APIs. Similarly, an NGD may be integrated in various ways into any software system. In possible embodiments, an operating system may include an API to access NGD through its unique identifier; a database client, such as Standard Query Language (SQL) client, may allow SQL queries to a collection of NGD objects sharing the same key-value class type or key-value structure, in a manner that makes an NGD seem like a row in an SQL table to the client. In other possible embodiments, software integrations make it possible to create, use, inspect NGDs directly from existing commercial software platforms such as Microsoft 365, SAP ECC, SAP S4, QuickBooks, or Salesforce.

Figure 85:
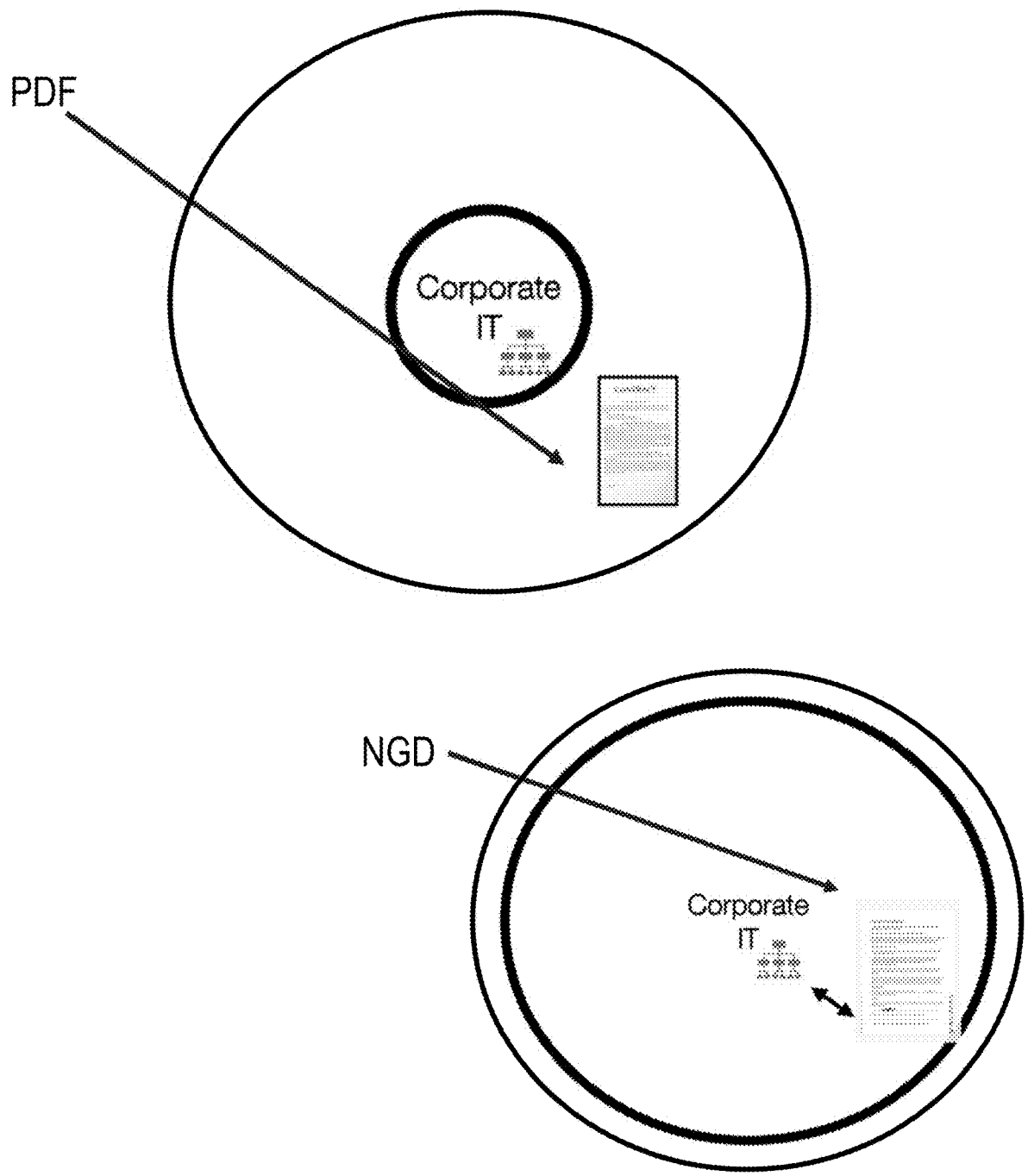
FIG. 85 illustrates the difference between state-of-the-art digital documents (e.g., PDF files) and Net Generation Documents, in terms of availability to information technology systems.

FIG. 85 illustrates the difference between state-of-the-art digital documents (e.g. PDF files) and NGD, in terms of availability to IT systems: while a PDF file is inaccessible to IT systems and is not a "digital citizen", an NGD is a "digital citizen", namely a native information object of IT systems, and may be accessed by IT software using its unique identifier and API.

NGD-based process automation. In possible embodiments of the invention, an NGD has a defined semantic type and exposes key document information in machine-readable form over an API. This makes NGDs amenable to automation. Process automation involving NGD may involve (i) automation of document workflows, and (ii) Automated verification of document binders.

Embodiment: Automation of Document Workflows.

A document workflow involve a collection of documents and forms that are exchange among a collection of individuals. Each individual is required to perform actions such as fill in form information in form fields; sign; review; approve.

Such actions are sometimes required to occur in a specified order. For example, the new employee must fill a form first, sign it second; the hiring manager is required to sign third and vice-president for human resources (VP HR) sign last. An individual may be required to participate in a workflow as an individual acting on himself or herself, or as a formal role in an organization. In the latter case, the role is named and not the individual (for example, a contract has to be signed by "VP HR" and not by any named individual). A stakeholder participating in the workflow may also be required, in addition to interactions with the primary documents of the workflow, to provide and attach additional documents (for example, a loan applicant may be asked to provide salary slip documents). A document workflow thus involves creation of a specified collection of documents and forms, exchange of these documents and forms between stakeholders, interactions of stakeholders with documents and forms in the collection, attachment of other documents to the collection in specified roles, and verification of the entire collection of filled forms and signed documents. Document workflows may involve stakeholders from different departments in an organization as well as stakeholders from different legal entities and arm's length counterparties. For example, a process to order imported goods involves a vendor and customer from different countries; both countries customs and import/export control; other government agencies from both countries; and the shipping company. In this case a large collection of documents must be signed by different stakeholders in different government and companies—in a specific order—in order to successfully complete the purchase, import/export, and shipping process. In current state-of-the-art, document workflows are often carried manually: a person responsible for the workflow might send documents to stakeholders and prompt their signature or interaction; and verify the result manually. State-of-the-art systems for workflow automation are either based on web forms and web portals (and thus unable to include legally binding documents) or based on PDFs. The latter are currently heavily restricted by the many shortcomings of the PDF document format, discussed elsewhere in the present disclosure, and as a result their functionality is extremely limited and their user experience cumbersome. In addition, once an automated workflow has been completed, the stakeholders still depend on the automation provider to verify document interactions such as signatures.

Figure 86:
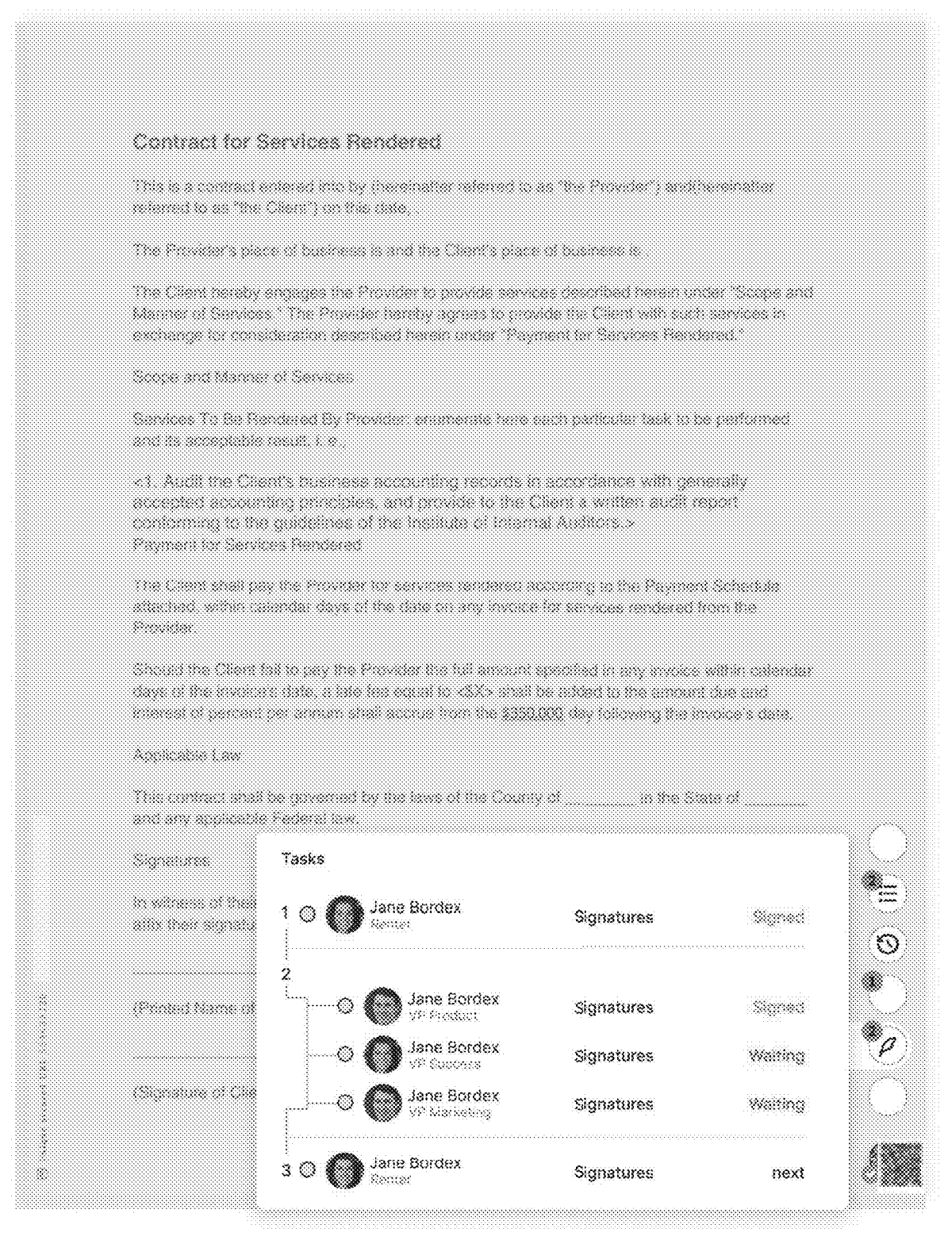

FIG. 86 shows an interface design for the setup and monitoring of a simple automated document workflow, from within the NGD user interface. As a simple example, an authorized user may request signatures at specific locations on the NGD from specific identities via specific signature methods, and track progress of as the NGD is exchanged between different stakeholders in the workflow.

In an embodiment of the invention, NGDs enable document workflow automation that is far superior to those available in the current state-of-the-art. Machine readable instructions specify stakeholders and roles; identities may refer to unique digital objects representing identities, as taught elsewhere herein; NGD are exchanged using any one of many possible media twins—for example, the same document participating in a workflow may reach one stakeholder in the form of a printed hardcopy, a second stakeholder in the form of a web page, and a third stakeholder in the form of a file attached to an email message. Document interactions performed during the workflow—on any document Twin—are reflected instantaneously in all Twins of that document and may automatically trigger software events. Document interactions are simple and natural. SICCL instructions may automate verification of different stages of the workflow, as well as validation and verification the document collection at the conclusion of the workflow. All workflow history—including document signatures, form filling events and other interactions, identities of those interacting, and the order in which interactions were performed—is recorded on the NGDs themselves. As a result, the NGD based automated workflow is facilitated by software processes rather than manually, concludes with an automatically verified document package of legally binding documents that can be saved in a variety of media and formats, easily incorporates arm's length counterparties with different appetites for document digitization, allows self-contained enduring document and process verification that does not depend on any service provider, provides a uniform and simple user experience for stakeholders, and may be integrated into existing enterprise software systems.

Figure 87:
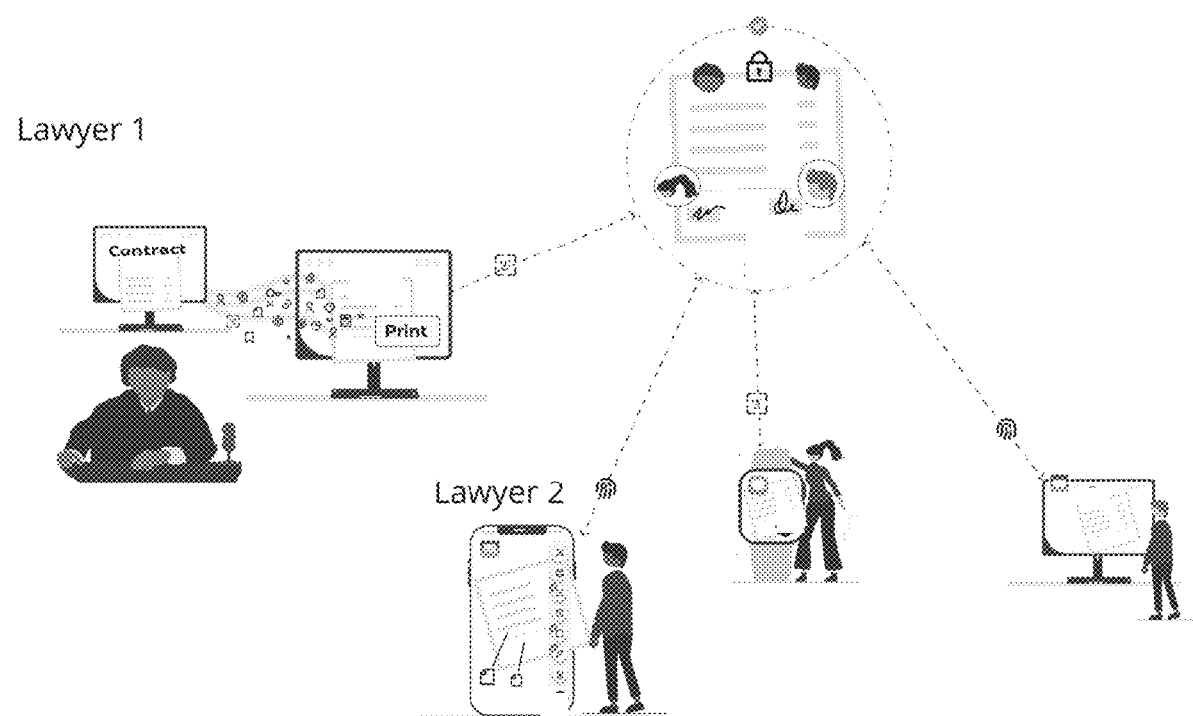
FIG. 87 provides an illustration of automated document workflows enabled by Next Generation Documents.

FIG. 87 provides an illustration of automated document workflows enabled by NGD: a contract NGD is created using an "NGD printer" and a workflow is defined. Each workflow stakeholder may receive the NGD via a different means of communications (one stakeholder may receive a file Twin over email, another stakeholder may receive a permanent URL of the NGD over an SMS message and access the NGD using a web browser, and so on. The interactions of each stakeholder are recorded in UDR, and the process is managed automatically until all stakeholders have completed the required steps.

Embodiment: Automated Verification of Document Compliance and Document Binder Compliance.

In an embodiment of the invention, SICCL or other machine-readable language is used to define validity and compliance of a document or a document binder. Instructions can refer to types of documents in the binder; consistency of information among various document or fields in forms; identity and/or role of document signers; time and/or order of document signers; type, content, signature status and date of documents attached to the binder; authenticity of digital signatures on documents in the binder; issuer of digital signatures and digital certificates for documents in the binder; method by which a document in the binder has been signed; and so on. Using methods taught in the present invention, automated verification may be implemented, which verifies the consistency and compliance of a binder of NGDs, and, based on the result of the automated validation procedure, triggers a software event, and/or provides a visual trustworthiness representation, etc.

Figure 88:
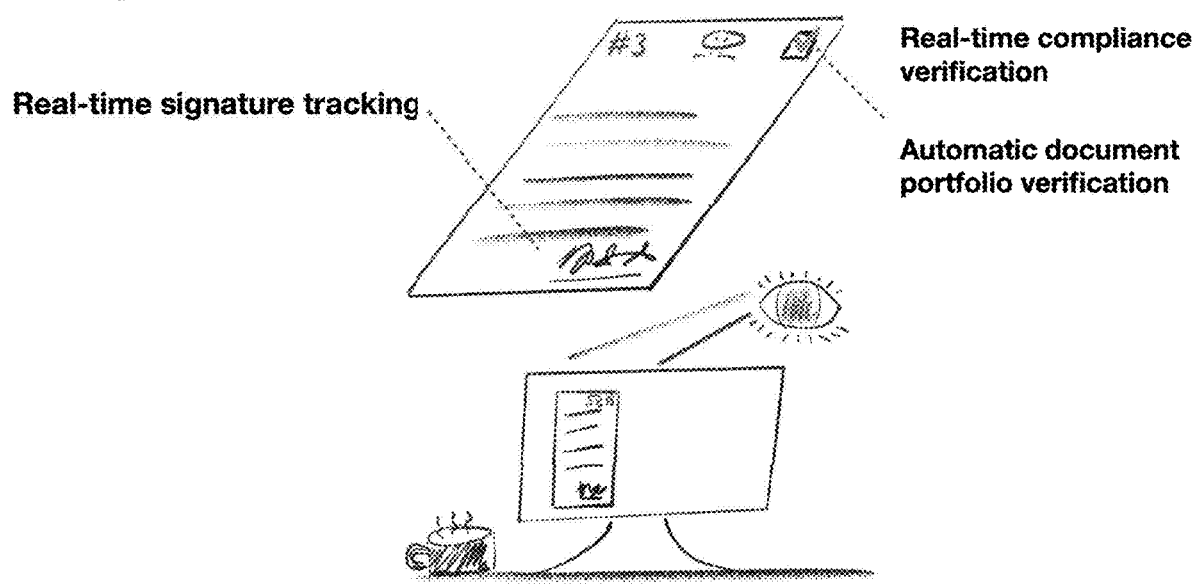
FIG. 88 illustrates the use of Next Generation Document in real-time compliance verification

FIG. 88 illustrates the use of NGD in real-time compliance verification. In a possible embodiment, an NGD may present its real-time compliance status. When the compliance of a document or document binder depends on the availability of certain documents in the binder and certain signatures obtained, an NGD document or binder is able to show real-time compliance status, as document compliance is verified by a software process rather than by manual inspection of the document binder.

Embodiment: Personalized Document Experience.

In an embodiment of the invention, NGDs may specify access control and thus require user identification before document access is allowed. In some embodiments, the NGD Outlet or viewing platform (such as a web browser, a desktop document reader application, a mobile application, an Augmented Reality interface, etc.) may present a different document experience to different document users—depending on their identifies and document or workflow definitions. For example, the document user interface may appear different to different users depending on their role; or in some situations elements of the document itself may appear different. Here are a few possible examples:
- A user is asked to sign a document. Other users will not see a highlighted signature area, but the user asked to sign will see a highlighted signature area and an instruction popup
- A user with additional interaction privileges (for example, privilege to inspect the document access log) will see additional user interface components unavailable to other users
- A document is sent to a user than does not have security clearance to view parts of it. The parts the user is not authorized to see may be hidden, blurred, blackened, or simply not appear in the document as it is rendered for that specific user.

Unique Digital Reality as a massive content layer of interconnected NGDs. The emergence of the World Wide Web (WWW) was the first example in history of a massive collection of interconnected, machine-accessible digital information. The incredible value extracted from the WWW, including search engine results etc., is an example of the potential power of massive collection of interconnected, machine-accessible digital information. Still, today there is a much larger massive collection of digital information that remains untapped—the collection of all of the world's digital documents. Since they are mostly stored in PDF files—an inherently digitally fragmented format—they are neither machine accessible nor interconnected. As an increasingly larger fraction of an individual's, an organization's, or indeed the world's documents are converted from PDF files to Next Generation Documents, a massive new layer of interconnected machine-accessible digital information will be uncovered, which dwarfs the WWW in terms of size and diversity. (In some sense, the original vision of WWW—of interconnected documents rather than web pages—is much closer to the vision described herein than to the actual use of WWW today.) Artificial Intelligence (AI) algorithms, and business intelligence (BI) processes, would be able to extract tremendous value from the totality of an individual's, an organization's, or the world's document as they are represented as unique digital objects, and cite each other explicitly and unambiguously using unique identifiers.

Figure 89:
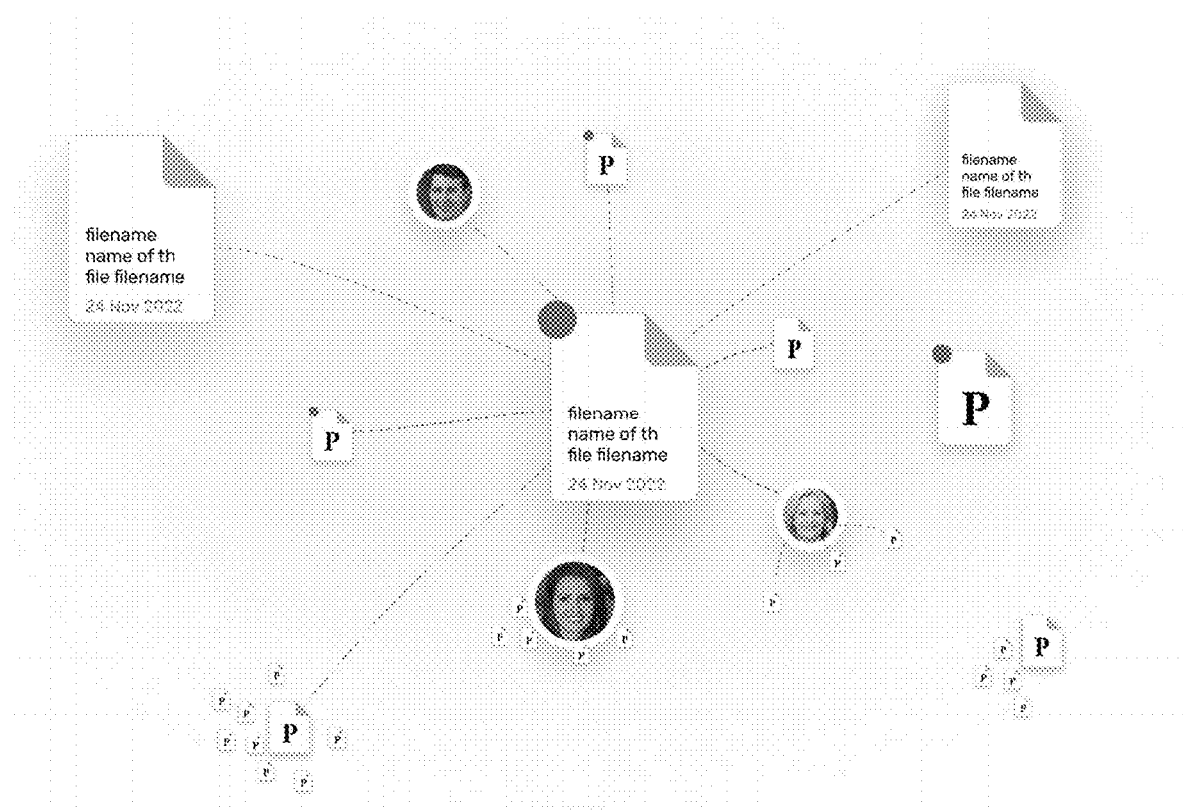
FIG. 89 shows an interconnected graph of Next Generation Documents unique digital objects citing or referencing each other.

FIG. 89 shows an interconnected graph of NGD unique digital objects citing or referencing each other.

Connecting non-NGD unique digital objects to an NGD. Unique digital objects may cite and connect to other unique digital objects of all kinds. NGDs are no different: an NGD may connect, cite, or attach non-NGD unique digital object such as an image, a video, an audio recording, a geo location, a spreadsheet and so on. In possible embodiments of the invention, the NGD user interface may allow such various unique digital objects to be connected to the document in general, or to a specific location in the document in particular. This way, an NGD may include an inline geo-location; or a binder of unique digital objects may be formed, which consists of a combination of NGDs and non-NGD unique digital objects.

Figure 90:
FIG. 90 shows a possible user interface design for Next Generation Document that refers to a geo-location unique digital object.

FIG. 90 shows a possible user interface design for Next Generation Document that refers to a geo-location unique digital object.

FIG. 91 shows a possible user interface design for Next Generation Document that refers to a voice recording unique digital object.

FIG. 92 shows a possible user interface design for Next Generation Document that refers to a spreadsheet unique digital object, and specifically, cites a cell from the spreadsheet in the document.

Example Embodiment: User-Friendly Visually Trustworthy Digital Signatures

Document signatures are a crucial and extremely common document interactions. Still, today, signing a document and verifying a signature is a surprisingly messy affair.

Different signature modalities. Documents may be signed with blue-ink pen on an original document; with a print-sign-scan procedure (wherein the signer prints the document to hardcopy, signs it with a pen and scans the signed copy back to digital document format); with a web form using a "sign here" button or signature scribble panel; or using a cryptographically secure digital signature. Different customs and legal requirements call for different signature modalities. Signed documents are stored digitally or physically, depending on the signature modality.

Ease of use. Digital signatures are not user-friendly—not for the signing party and not for the verifying party. While cryptographically secure digital signatures are the most secure and fraud-proof way to sign a document, there is no easy, simple, inexpensive way for a pedestrian user to digitally sign a document, and no easy, simple, inexpensive way to verify a digital signature.

A stable identity is a precondition for widespread digital signature use. In order to verify a digital signature, the verifier must have access to the public key of the party who supposedly created the digital signature. As there is currently no stable notion of digital identity, digital signatures have remained relatively obscure.

Document signatures are a conservative business. Different laws, regulations and custom still mandate blue-pen signatures or print-sign-scan signatures. As a result, documents signed by digital signatures live in a "parallel universe" to those signed by the legacy methods.

State of the art. The state of the art in computer-based methods to sign documents leave much to be desired. For human-readable signatures generated by a computer, there are services such as DocuSign and Adobe JSign, which provide a simple user interface for affixing a graphic element that looks like a handwritten signature to a PDF. These are exo-document systems, meaning that, while the functionality of signature could have reasonably been expected to be a functionality of the document itself, DocuSign and similar services are platforms external to the document. For machine-readable signatures (known as digital signatures or cryptographic digital signatures) PDF editors such as Adobe Acrobat allow one to generate a digital signature and digitally sign a document, however there is no convenient way to verify the digital signature signed by an arbitrary third party. Standards such as the European Union eIDAS make it possible for businesses to issue digital signatures, however nontechnical users are still unable to conveniently verify such digital signatures or sign their own. As a result, many users of information technology, who would ideally like to be able to sign documents easily and simply, in a manner that is both cryptographically secure, machine verifiable and human verifiable, are unable to do so.

Summary. An embodiment of the invention enables every user with a smartphone or other camera-equipped, network-connected device to sign documents in a manner that is at the same time cryptographically secure, machine readable, human verifiable and backward-compatible (in the sense that the signature can be verified as a traditional pen signature by a human user). An embodiment of the invention merges the all notions of a human-readable signature (including blue pen and print-sign-scan) with naïve notions of digital signatures (such as "click here to sign" web forms) and the more advanced notions of cryptographic digital signatures: they all become one and the same.

Technical Description. The signature process is based on three unique digital object: one for the document being signed; one for the signer identity; and one for the signature interaction itself. In a preliminary stage the identity is created: a unique digital object is created for the signer identity. It includes a public key (in a preferred embodiment, from an RSA keypair), universal identifier for the identity, and details of the person or entity whose identity is represented (such as a name). In a possible embodiment, it includes an image of the manual signature of that person. In another preliminary stage, the document is created: it includes the document itself (in human-readable form, machine-readable form, or both) and a universal identifier for the document. Like any unique digital objects, both the identity object and the document object are committed, permanent and immutable. In the signature stage, a new unique digital object is created. Its payload contains: (i) the universal identifier of the identity object; (ii) the universal identifier of the document object; (iii) a digital signature calculated using the private key, corresponding to the public key contained in the identity object. In a possible embodiment, the signature object also includes a graphical representation of a manual signature, and a location on the human-readable document where this signature has been placed. The signature unique digital object is committed, so that its time-of-origin is indisputable using whatever mechanism is in place to verify object commitments. This concludes the document signature process. In a visualization stage, when the signed document is presented visually to a human user, the machine rendering the document verifies that the cryptographic signature on the signature object has been signed by the keypair whose public key appears in the identity object. The machine renders a visually recognizable symbol to show human users the validity of the cryptographic signature (and, in a possible embodiment, an interactive way to inspect the signature). In a possible embodiment, if the signature object includes graphics of a manual signature, then the graphics is rendered on the document when it is visualized. In a verification stage, a document reader is interested in verifying the signature; it may verify that the cryptographic signature on the signature object has been signed by the keypair whose public key appears in the identity object.

A signature device. In a preferred embodiment, to sign a document, the signer uses a device that includes a storage unit, network connectivity, identity verification mechanism, and a camera—such as a smartphone or a smaller special-purpose device. After the device has been configured to correspond to a specific identity unique digital object, its storage unit stores (i) the private key corresponding to the public key in that identity object (ii) access credentials such as facial recognition, voice recognition, fingerprint recognition, passcode, or passphrase. To sign a document, the signer directs the device at an outlet or visual representation of the document to be signed, which includes a visualization of its unique identifier. The device recognizes the document identifier and accesses the unique digital object corresponding to the document. The device then authenticates the identity of the person holding it, by presenting a challenge (such as facial recognition, voice recognition, fingerprint recognition, passcode, or passphrase) and comparing the response received from the person using the device to the access credentials stored in the storage unit. If the person is authenticated, the device creates a new interaction unique digital object as above and the signature process is complete.

eIDAS and similar approved digital signatures. In a possible embodiment, the identity unique digital object and the digital signature it includes comply with digital signature rules and regulations, so that the signature unique digital object represents a compliant digital signature as defined in the relevant law.

Merits of this embodiment of the invention: Democratization and standardization of digital signatures. Using the described embodiment of the invention, any person using a smartphone (or other personal device), whose identity has been set up as a unique digital object, may sign any digital document that has been created as a unique digital object (for example, Next Generation Documents described above). In a possible embodiment of the invention, just as the smartphone has become a standard payment device, it now becomes a standard, secure signature, and consent device. A digital personal device finally replaces the blue pen as the go-to signature device. As discussed above, the shortcomings of the state-of-the-art stem from the fact that documents in the state-of-the-art do not have universal identifiers, so that digital signatures can only be attached to the PDF file. In contrast, the method taught herein enables standardization of signature process, of signature visualization and verification; and makes cryptographic signatures one and the same with backward-compatible, human readable signatures. Similarly, the described embodiment of the invention, any person using any user interface to access a NGD may gain simple visual confirmation of the validity of a digital signature.

In fact, the described embodiment of the invention merges all notions of signature—legacy, naïve and digital—to a single notion. As described in detail above (see "Next Generation Documents" and "Verifiable Interactions" above), in a preferred embodiment of the invention, a signature verifiable interaction necessarily results in a digital signature attached to the unique digital object representing the document. In other words, using the described embodiment of the invention, regardless of the signature modality used, the signature verifiable interaction arrives at the same result, which is, that the NGD is digitally signed in a manner that is easily verifiable, and that the interaction is represented by a unique digital object in UDR that allows to verify it. As an NGD possesses all the properties of a hardcopy (unique, immutable, with defined ownership, and permanently accessible), the described embodiment may readily replace the practice of blue-pen signature.

FIG. 93 shows a possible user interface for signature interaction, when signing a Next Generation Document on any medium, including desktop document reader, smartphone application, Augmented Reality interface overlayed on a hardcopy document, and so on.

Merits of Embodiments of the Invention

The invention disclosed herein is of a fundamental nature. Elements of embodiments of the invention may be combined to enable radical improvements in modern information exchange and indeed enable a state we refer to as the fully digitally transformed world. or the endgame of digital transformation. We now describe possible information exchange processes enabled by embodiments of the invention.

A fully digitally transformed world. In a world fully digitally transformed, information is a commodity that is collected, processed, traded, exchanged, signed, and verified exclusively using computers and digital devices. This is a far-reaching statement: for example, paper documents and pens (currently a popular means to create, exchange and sign information) will simply cease to exist—they will join the clay tablet, the parchment, the quill, the printing press, the typewriter, and the analog radio receiver as historical relics. Individual pieces of digital information will have standardized, concrete, independent, universal existence in a universally shared digital domain—regardless of the ways in which they are accessed or presented. The problem of trust and information verification—the most fundamental problem of information exchange—will be automated, delegated to computers, and, from the perspective of everyday life, solved.

Consider the electric grid. Modern societies depend on the electric grid for basic survival and yet most people know nothing about how electricity is produced, transported, or used inside electric devices. From the perspective of energy consumers, the problem of energy has been solved, so to speak. All that energy consumers need to know is how to plug sockets into outlets, and how to pay the electric bill. Similarly, in a fully digitally transformed society, information has an equivalent status to that of electricity—everything just works.

To imagine a fully digitally transformed world, one must imagine a world with absolutely no paper, documents, pens, folders, digital files, digital folders, Portable Document Format files (PDFs), and emails. A world without pockets, wallets, or plastic identity/credit cards. A world without bookshelves, binders, staplers and filing cabinets, without printers, without scanners. A world where the physical and the digital have converged to the degree that every action, physical or digital, from turning on the light to buying a house has inevitable, comprehensive digital footprint. A world where information flows freely between all devices, where identity is digital, consent is biometric, and digital civil rights are self-evident and integrated into the elements of information technology. A world where information is visibly software-verified and where information presentation is context-optimized.

Figure 94:
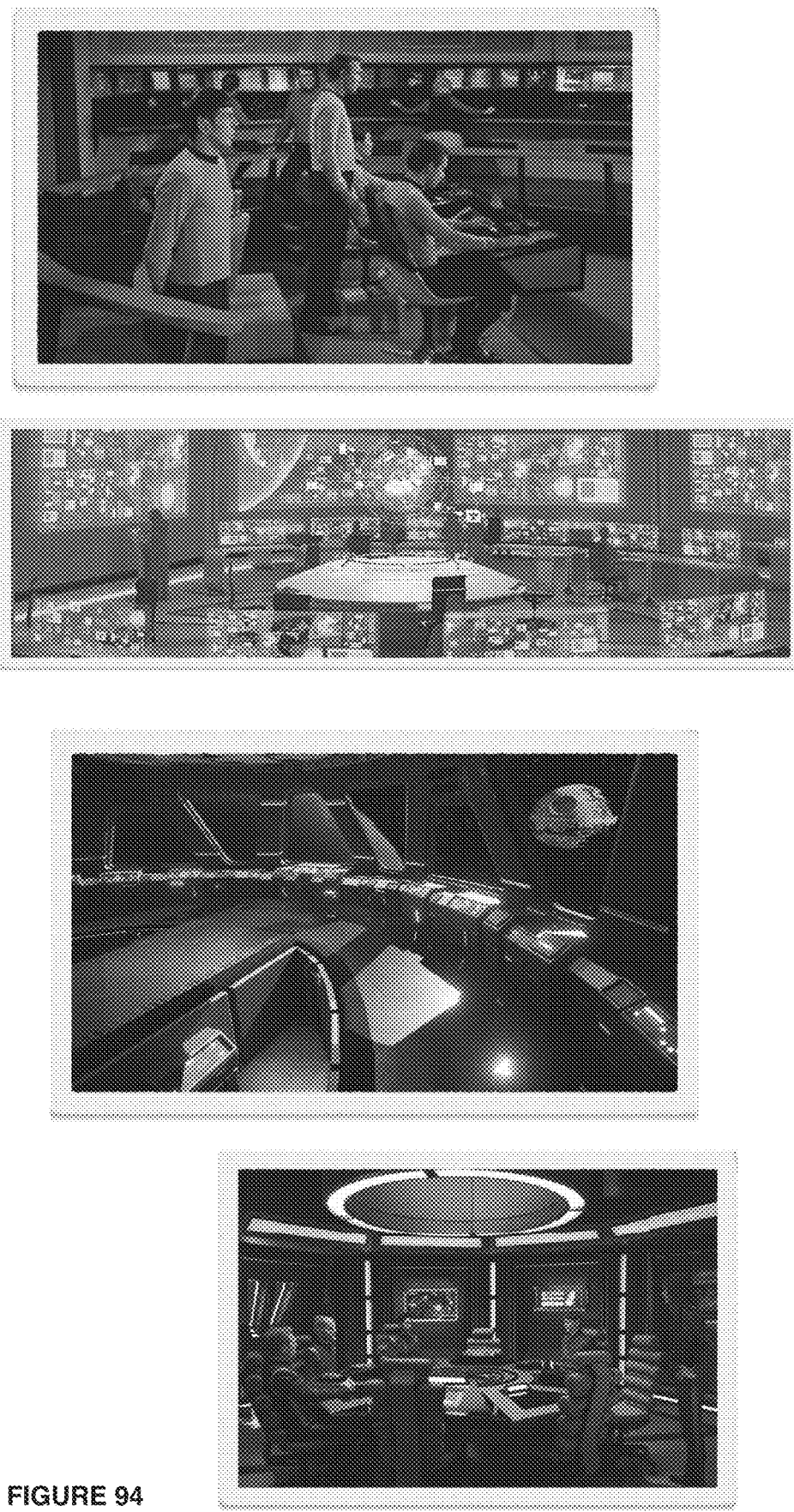
FIG. 94 shows a few futuristic movie sets, such as Star Trek, which do not show a single piece of paper, or a single pen, or even a single pocket.

The collective imagination already knows how we will be using information in the future. The best place to look for what we collectively think about the far future is in science fiction. Consider Star Trek, Star Wars, Minority Report, or your favorite cinematic representation of the far future. Notice how there is never a single piece of paper, or a single pen, or even a single pocket on these futuristic movie sets, such as those shown in FIG. 94.

Without exception, in any vision of far future technology, people do not have pockets in their pants, carry pens, use paper, or own credit cards. People in this collectively imagined future never not have to worry about lost expense receipts. Space-faring starship captains in cinematic representations of the far future never have to worry about outdated file formats or outdated digital signature formats—not to mention ink signatures. In this vision of the future, information has somehow transcended to another level of cleanness, clarity, systematic organization, and flow. Information has emerged from the current impossibly hectic jungle of mixed up A4 sheets, PDFs, paper receipts, ten thousand login passwords per person, obscure file formats, mysterious digital signatures, and legacy databases into something more pristine, natural, and streamlined. Information technology just works, cleanly and simply, with just the bare minimum of necessary human intervention. Can we imagine a Star Trek control console, for example, showing a blue screen because of an 'unfamiliar file format' or 'out of memory' error? Can we imagine the Starship captain using a drag-and-drop interface to print an official document, sign it with a ball pen, scan it, and email it back to Star Command? Indeed, in this collective vision of the future, information technology has matured to be flowing, clean, and transparent as the today's electric grid. What do we mean when we say that, in a Digitally Transformed society, information is analogous to today's electricity—that everything related to digital information just works?

In a world fully digitally transformed, information is a commodity that is collected, processed, traded, exchanged, signed, and verified exclusively using computers and digital devices. We argue that the endgame of Digital Transformation is fully captured by the following four principles:

1. Information Flows: Interoperability and uniformity of form and expression in flow of digital information
2. Verification Happens: Simplicity of information verification
3. Trustworthiness Is Obvious: Clarity and uniformity of expression and interface related to presentation of information and its trustworthiness
4. Knowledge Emerges: Higher-order insights and availability for data mining and artificial intelligence Indeed, in any proper endgame of Digital Transformation, we should not be worried about file formats, print-sign-scanning paper documents, engaging in manual bureaucracy, and wondering where we left that signed original of that property deed.

Let us elaborate on each of these fundamental principles in turn.

In a digitally transformed world, information flows. Information pours from one system to the other like water between public utility pipes, or like electricity between power lines.

Information technology enjoys a uniformity of expression and form. For example, when a company employee makes a purchase on a business trips, funds are transferred from the company's account to the seller's account; companies' books are updated automatically when the purchase is made; the government's system knows the impact on the tax liability of the company as a result of the purchase; and a permanent record of all details of the purchase including the identity of the employee and the trip to which the expense is associated become available for automatic software inspection, indefinitely.

In the digitally transformed world, information technology adapts itself to human interactions, not the other way around. A human interaction is to shake hands, or to make a hand gesture. Typing in usernames and passwords on a keyboard whose layout was designed on the days of the typewriter—that is not a comfortable human interaction. In the digitally transformed world, information flows and verification happens: the flow of information and verification transparent to most people.

In a digitally transformed world, verification happens. Information is verified automatically in a way that is completely transparent to users of information. There is no need for anyone to check any facts manually, ever. Business processes, regulatory requirements, filings, and information representations are implemented in software. Information exists on a shared level of reality, where it is consolidated and available for software access. For example, I know that the taxes I pay, calculated based on the constant flow of personal information which I generate—and which I own—are correct, because I have reviewed, just once, the system that calculates them. This is analogous to the trust one may have in their home electric network, which exists because an electric technician has reviewed it, just once. The average person does not need to know how verification works to trust information, any more than they need to understand how a gasoline engines and electric engines to drive a car.

In a digitally transformed world, trustworthiness is obvious. The human interaction with technology and the way that information is presented factors in trustworthiness—apparent, visually clear trustworthiness—as a key user-interface ingredient. Information is presented in a manner that demonstrates its level of verification and trustworthiness in a visually recognizable and clear way.

Finally, in a digitally transformed world, knowledge emerges. One of most striking features of the digitally transformed world, a feature that is already visible and apparent today, is that everything has a digital footprint. Information regarding anything and everything is collected across multiple modalities, everywhere, all the time. Because Information Flows, in the digitally transformed world this plethora of information is leveraged across modalities to create emergent knowledge. AI systems are applied broadly to information gathered everywhere and at any time, to draw broad conclusions and train beyond specific prediction tasks.

Indeed, in a Digitally Transformed society, facts are unique digital objects that have universal, permanent existence. All transactions are digital. There are no papers, pens, credit cards, license cards, purses, pockets, filing cabinets, printers, scanners, or binders. All these items are historical curiosities, just like the typewriter to us in 2020. Nobody uses a hand signature to give legal consent—not even scribbling their hand signature on a computer screen or any of the dozens of different ad-hoc ways to digitally sign a document we see today.

In the past, there was just one way to sign, namely with a pen. In the future, there is also just one way to sign. In a digitally transformed society, there are no digital files, folders, email attachments and PDFs. Trust has been digitized. Information flows correctly and seamlessly.

A Day at the Hospital, 2035. Let us describe a concrete example of the endgame of Digital Transformation in more vivid color. The reader will note that the hardware and software technology for implementing the fantastic future outlined below is available today; the reason we are not living this fantastic future lies in outdated concepts of how we use and exchange information. Indeed embodiments of the invention disclosed herein enable every element of the reality we now describe.

The year is 2035. We live in a digitally transformed society.

Figure 95:
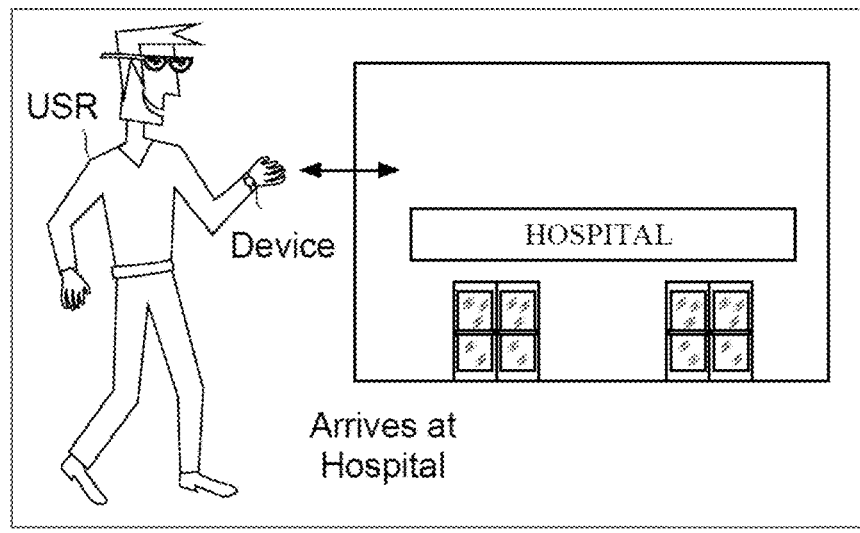
FIGS. 95 through 102 describe "A Day at the Hospital"—an illustrative story used to demonstrate the merits of embodiments of the invention, as well as possible products and services that flow from possible embodiments.

It's morning. I grab my coffee and head out to work, as seen in FIG. 95. The only item I ever need to take with me when I leave home is my watch. It's my device, that's how we call it. My pants and jacket do not have pockets and I haven't seen anyone use keys, plastic license cards, or credit cards since 2030.

Figure 96:
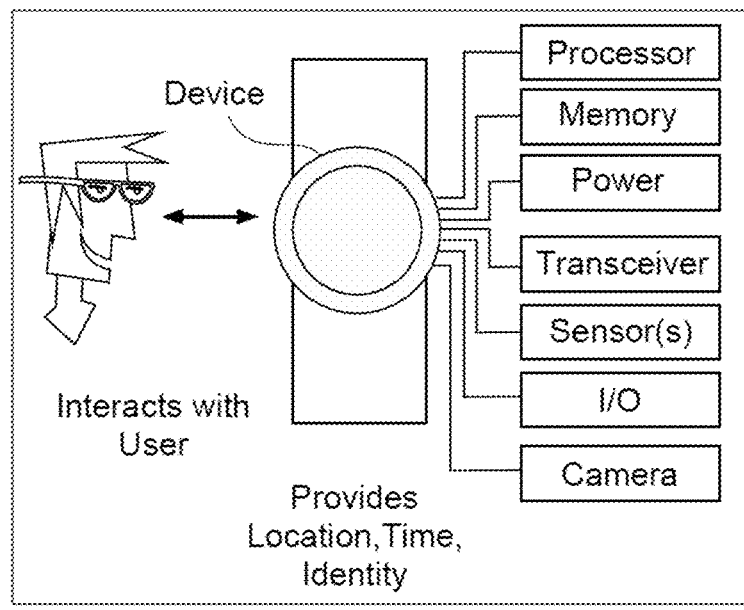

FIG. 96 shows an illustrative embodiment of the device, which can interact with the user, such as to uniquely identify the user uniquely and determine the time and location.

The illustrative device seen in FIG. 96 includes a processor, a memory, power, a transceiver, one or more sensors, an input/output (I/O) mechanism, and camera and typically includes audio input and output capabilities.

I'm a physician at Massachusetts General Hospital. As I enter the hospital, I look at my device and it recognizes my face and my iris. This is how the hospital system knows I have arrived at work. I do not carry a physician badge or a driver's license. I identity myself to other people just using my device.

Figure 97:
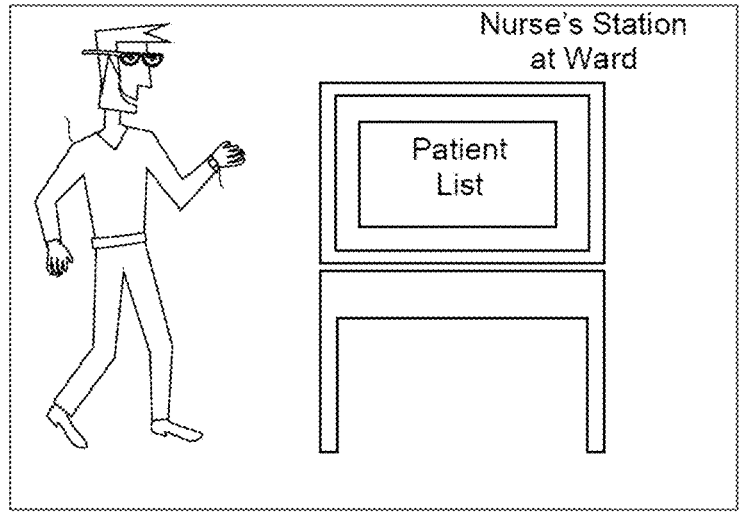

At the ward, I go over to one of the screens at the nurses' station. With no one around, the screens are blank. We don't use passwords and logins to access information on screens and user interfaces. When I come close to a screen, it lights up and shows me my patient rounds for the day (as seen in FIG. 97).

The first patient on my list is Greg. I go over to his room. I bring my device close to Greg's device to verify that he is the correct patient and that I am the right physician to take care of him. Greg's device prompts a question—does he agree to grant me access to his medical files? Greg places his thumb on his device to approve the request.

Figure 98:
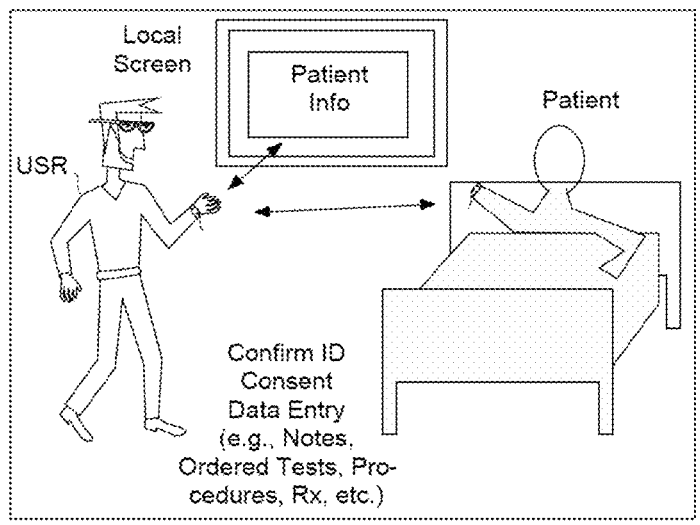

There's a screen in Greg's room, that is like the one at the nurses' station. The screen recognizes my Device, and Greg's medical information appears (as seen in FIG. 98). I talk to Greg and examine him. I decide to order a blood test and prescribe pills for Greg to take today. I give both orders by touching the screen in Greg's room. As I move away from the screen, it goes blank again.

Figure 99:
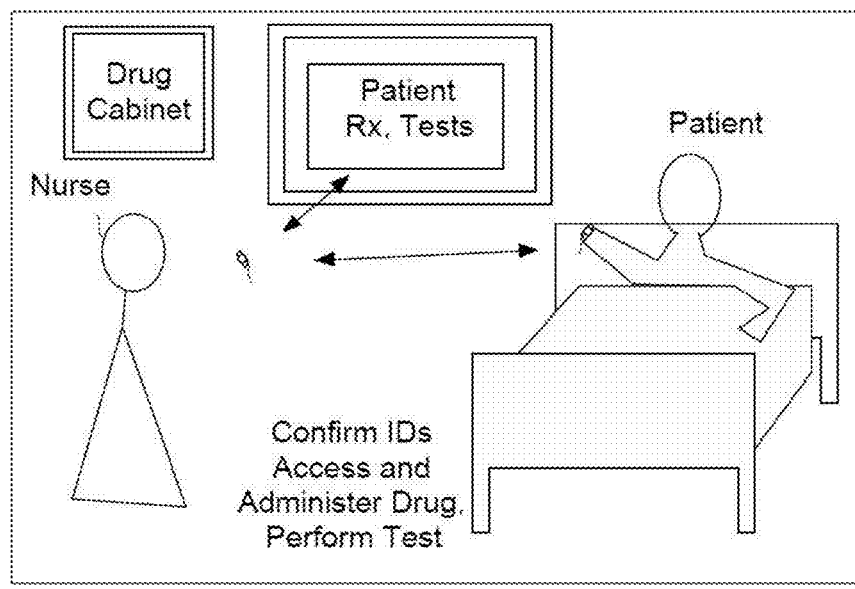

A nurse comes into Greg's room to perform his blood test and to administer the drug (as seen FIG. 99). The nurse brings his device close to Greg's, just like I did before. The nurse then goes over to the drug cabinet and touches his device to the cabinet lock. It opens. He takes out a box of pills, scans it with his device, and hands it to Greg. The nurse proceeds with the blood test: he scans the test tubes with his device and takes the blood samples.

Figure 100:
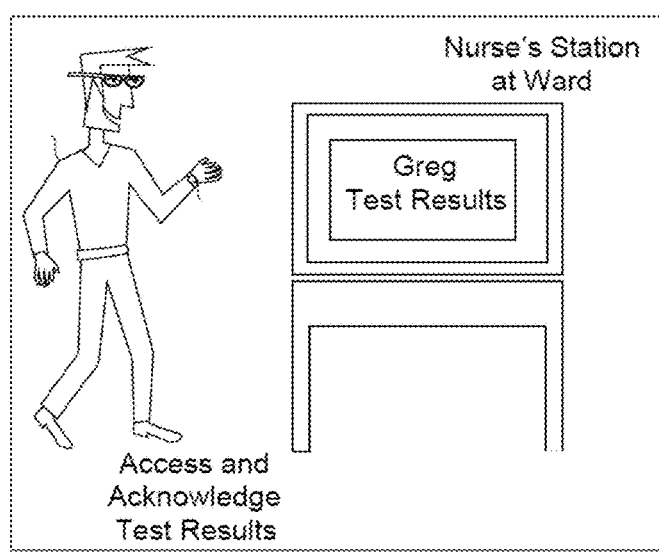
Figure 101:
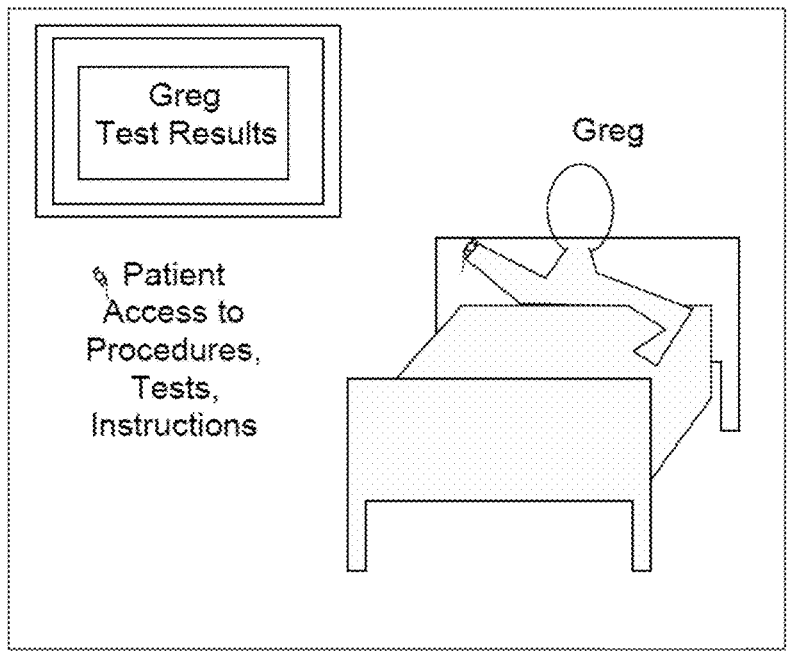

When the results of the blood test come back, I'm at the nurses' station. After recognizing my device, the results appear on the screen (as seen FIG. 100). My device asks if I acknowledge seeing the test results and I do this by touching it with my thumb. Greg can see the results too; the screen in his room recognizes his device and shows him his medical record (as seen in FIG. 101). He doesn't have to acknowledge having seen his results though because the protocol doesn't require it.

There's a delivery person looking for me at the ward—someone has sent me flowers. I try to guess if it was a patient. There's a small barcode printed at the bottom of the vase wrapping paper. When I accept the vase from the courier, we bring our devices close together and we each scan the small barcode with our device. This is how I sign to confirm I've received the delivery.

Everything that happened to Greg during the day at the hospital, including my interaction with him, tests I ordered for him, tests that were performed on him and their results, even the fact that we touched our devices when I came to examine him—everything has become a part of Digital Reality. These interactions have become facts; they exist in digital form and remain accessible to Greg forever, regardless even of whether the hospital continues to exist. At any time later, Greg can choose to share any part this information with anyone else, such as his family physician. Greg enjoys full Digital Civil Rights over his own medical data. The information is available to certain people at the hospital, but the hospital cannot grant access to anyone else—by law, only Greg can. Greg's Digital Civil Rights are implemented and unforced in the software running the Digital Reality, meaning it is not up to the goodwill of any person to uphold them.

At the end of the day, Greg is ready to be discharged from the hospital. Before he can be discharged, the Department Chief—my boss—must review Greg's medical file and give her approval. There is a curiosity here: there is no real medical reason for this requirement in the care protocol. The software has already verified that all required steps have been followed, all tests reviewed, and all of Greg's metrics are good. However, upon transition to the fully-digital care protocol, it was discovered that people just don't feel comfortable if they are not in the loop—they feel left out and unnecessary. To make the transition to the fully digital care protocol easier and smoother, human consent and approval is artificially injected at some key points, even when not needed. This way, the people feel more in control, more in charge and more necessary. In any event, when Greg is ready to be discharged, the device on Department Chief's hand blips, signaling that her confirmation is needed. When she has a free moment, she stops by the nearest screen, which comes alive when she comes close. She sees in her tasks a request to approve Greg's discharge. She briefly reviews the file and uses the screen to grant the conformation.

Figure 102:
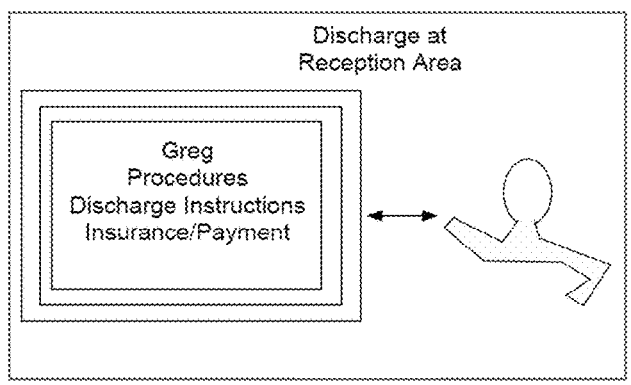

Greg can finally leave the ward. More specifically, when he uses his device to open the ward main entry door, the nurses' station gets a notice that he left to be discharged, not a warning that an admitted patient has gone out. Greg goes to the patient admission/discharge front desk and holds his device up to one of the screens (as seen in FIG. 102). He is asked if medical research at Massachusetts General Hospital can get anonymous access to his medical data collected during his stay and offers him $20 in return. Greg's device prompts him with yes or no options. He chooses yes using his thumb. His consent, too, becomes a fact in Digital Reality.

Before his discharge is complete, Greg is similarly asked to authorize that his medical information is to be sent to his medical insurance company, so that he won't have to pay out of pocket. Once Greg approves, his medical insurance company is granted access to a limited version of Greg's medical information in Digital Reality—for example, the fact that tests were performed is available to the insurance company, but not the test results. Without needing to do anything else, the insurance now has proof of everything needed to authorize payment, e.g. my identity, Greg's identity, the fact that we met at the hospital, tests performed, the serial numbers of all drugs administered, etc. The medical insurance company's system now clears payment with the hospital automatically.

At our hospital, we have no medical billing office; haven't had one in years. There are no printers in the hospital and no scanners. They are all in museums now, displayed next to rotary dial phones, facsimile machines, floppy disks, and tape recorders. Quite simply, every interaction and every medical procedure has a permanent digital footprint in Digital Reality, The insurance company's software simply examines the facts in Digital Reality regarding Greg's hospital visit, made available to it by Greg, and reimburses the hospital automatically for Greg's costs. The same digital footprint of Greg's procedures is used for various purposes in hospital information systems—not just for medical billing but also for hospital statistics, medical research, taxes, my payroll. These are all calculated based on the Digital Reality. When Greg goes home, he does not need to take any papers with him (the very notion seems absurd now) and owns no computer files. Everything is in Digital Reality.

However, Greg may need, later, to present a record of his hospital visit to someone who does not have direct access to Digital Reality. Greg can choose to send them, e.g. electronically as an anachronistic digital document, or even physically as a historic physical document, any representation that he would like of his medical records. These documents (physical or digital—no matter), once produced, present a clearly visible Fact Identifier Signature which contains a machine-readable barcode. People inspecting this signature know that the document is a rendering of fact in Digital Reality; a computer that scans the signature obtains the Universal Fact Locator—a universal permanent digital address—of the record in Digital Reality.

Thankfully, it's time for my lunch break. I go down to the hospital cafeteria to grab a bite to eat. I don't stop to pay—my device has identified me and the store's system knows which food items I've taken from the fridge. Some people configure their device to ask for (consent) on check-out—and their device asks them if they agree to pay the total amount. I don't bother with that. No one has seen a credit card—not to mention cash—in years. Due to my tax situation, my hospital meals are tax-deductible. When my accounting software settles my tax with the government, the payment that has just been automatically made for my lunch is automatically included in my tax deductions. No-one needs a receipt—we don't know what that word even means any more. There is no need for a receipt to prove my purchase—the facts regarding my purchase were all deposited permanently in Digital Reality. The fact that I was physically at the cafeteria has been recorded, as well as the items I bought and the fact that my payment cleared with the cafeteria operator. This is private information, of course, and my information belongs to me, so no one has access to it on Digital Reality but me; but I can easily prove everything if I need (to the government, simply by giving access to these facts on Digital Reality.

Near the end of my shift, my device bleeps and asks me to go to a screen. The ones at the nurses' stations are all taken, so I pick a free screen in an empty room in the ward. I hold my device close to the screen and it comes alive, with information for me. The screen calls my attention to the fact that an x-ray imaging that I ordered for another patient earlier today has been performed, but I haven't examined it yet. Patient care protocol requires that I review it in the next 30 minutes. The way our systems work, nobody must check that patient care protocols are followed; the computer takes care of that. We are just notified if the protocol has not been followed. We remember historic tales about how complicated patient care used to be, when people had to be responsible for being aware of the protocols and had to be responsible for following them strictly.

I drive home. When I take the bus, I use my device to pay when I get on board. Today I'm driving my own car. The car opens to the touch of my thumb and will not start without scanning my iris. On the way home I get pulled over by a police officer for speeding. The police officer has a mobile biometric identification device, and she uses it to identify me, and assert that I am licensed to drive. My car interacts with the police officer's identification device, and the details of my vehicle are verified, as well as the fact that I am the owner. We bring our devices together, because we both want to document that fact that we are in this interaction. I am asked to consent to fact that I was speeding. I can use my device for this—my device interacts with the hand-held screen the police officer is using. I am prompted to consent, and I touch "yes" and prefer to pay a fine. Everything else regarding the incident is handled automatically.

A Day at the Hospital—Discussion. The hospital science fiction story above illustrates some of the new products, services and markets enabled by full Digital Transformation. Importantly, it illustrates how different new products and services operate together to enable completely new ways of using information. In comparison to current best practices—even those digitized and using computers and computer network, procedures described, such as patient care and discharge; medical billing and insurance settlement for instance, become hugely more efficient, error-proof, and trustworthy. Other aspects illustrated above, such as Digital Civil Rights, have no parallel in the current state of the art and are completely new innovations.

Under the hood we observe the following. Real-world persons (physician, nurse, patient), real-world objects (a pill, a cabinet door) real-world events and interactions (patient meets physician, patient's blood pressure is taken by nurse, door opens to an authorized person) and procedural steps (physician orders a medical test) are mirrored (namely, represented) by information objects. These information objects are available over a uniform network interface, so that they can be used during a hospital process but can also be used by third parties, e.g. the insurance company, long after the process itself ended. All this information is software accessible. Procedural and bureaucratic requirements, such as those governing medical care protocols, are encoded into the information objects, and thus enforced and verified by software. User interfaces, such as a screen or personal identification device, create information objects as they operate and are used to visually present information objects together with their formal trustworthiness status. All this results in implementation of the principles of digital transformation: information flows, verification happens, and trustworthiness is obvious. The fourth principle, knowledge emerges, is made possible by the fact that a complete digital record of all real-world (and legal, and financial, and digital) events and interactions is left intact for further mining.

Compare this with a day in today's hospital—even the most computationally and digitally advanced ones.

Before turning to a more comprehensive survey of Digital Transformation and the products, services, and markets it will enable, let us briefly review some of the key concepts and communication protocols mentioned in the hospital story above, which enable this fantastic, and arguably inevitable, future.

- Shared Digital Information Reality and Total Information Interoperability. All communication happens through Digital Reality—a shared digital resource that transcends the lines dividing legal entities and is accessible by all. All hospital information technology (IT) systems—Human resources, patient management, billing, medical tests, supply and inventory, security and physical access control, physician's reports—all communicate seamlessly with Digital Reality; in fact they communicate with each other based on Digital Reality, which is a shared resource. There are no IT systems which are information-isolated from Digital Reality.
- Cross-party arm's-length reliability, accessibility, and availability of information. Instead of sending a document or copying a document, parties that transact at arm's length do so by accessing the same digital resource on Digital Reality.
- Unified Identity as a core principle: A unified system of identity management for all participants and stakeholders is a key enabler of processes and interactions. Identities are represented as special facts or objects in the Digital Reality.
- Physical identification device: A personal device with wireless communication capabilities, biometric identification capabilities, geo-location (GPS and indoor) tracking capability, and proximity communication with other devices or sensors. In the example above the device also features a simple user interface for granting consent.
- Digital footprint for everything: The fact that the physician has arrived at work; the interactions of people with other people, e.g. the patient, with physical objects, e.g. the drug cabinet, and with information, e.g. the screen, as well as consent given or received, all become facts in the Digital Reality.
- Ad-hoc, flexible representation of information: There are no physical (paper) documents, no digital documents, and no computer files. Information is presented on a screen according to who's looking at that screen (as identified by their device) and according to the task at hand. The notion of a document as a rigid form of information representation is obsolete. A single screen contains various facts from Digital Reality, arranged and presented by a computer program according to necessity.
- Interactions between individuals, and between an individual and a physical object. Using the identification device, individuals may put a personal interaction on record by proximity interactions of their identification devices. Also, individuals interact with physical objects, such as a door, a cabinet, an activation switch, a medical drug package, etc., using their device to get physical access, activate something, etc. All these interactions become facts in Digital Reality. For example, the fact that a nurse opened a drug cabinet, took out a package, and gave package to patient is recorded several times during this process, because the nurse interacted using his device with the cabinet, the package, and the patient. This allows, for example, for drug safety protocol and inventory management.
- Consent as a universal interaction. No-one signs a form to grant consent—there are no paper documents anyway—and consent depends on biometric identification by the device. Individuals are asked for consent to pay, or when offered a service, or when their consent is required for a medical procedure, or to sign a contract. Consent is given by an individual using their identity device, or by a user interface which has identified the identity device. When information needs to be given about the consent in question, it appears on a user interface (such as a screen) nearby.
- Information ownership. Facts in Digital Reality belong to the individual about whom they were collected. Individuals own facts, data, and information on Digital Reality. This is possible because facts in Digital Reality are concrete, uniquely identifiable, uniquely addressable objects.
- Granting and tracking access to information. Information privacy and ownership is cryptographically enforced by software. For various purposes, it is very useful and convenient for an individual to grant access or to sell access, as in the example of medical research above, to other individuals/entities—such as the government, an insurance company, etc.
- Digital Civil Rights. Individuals have full rights to the information they own. The law is enforced by software.
- Automatic implementation of protocols and bureaucracy. In the example above, the patient care protocol is managed by software—not by people. All physician-patient interactions, tests, procedures, and test results—and, importantly, all data access, to test results—is recorded in Digital Reality. As a result, protocols such as patient care and bureaucratic procedures, which require certain interactions to occur at a certain order, and consent by certain individuals at a certain order, are implemented by software.
- Fallback to Documents, and Universal Fact Identifiers. Although facts are rendered/represented into visual charts/language ad-hoc, in a transition period there is a need to represent facts from Digital Reality to people who still only know how to interact with documents. As in the story above, facts can be rendered as a digital/physical document. Importantly, when a document is rendered to represent facts from Digital Reality, it carries a visible Identifier, in a universal format, which is legible for humans but also machine-readable. This identifier provides the universal permanent locators, in Digital Reality, of the facts represented. This allows inspection and verification of the facts presented by the document recipient—effectively, it is impossible to render facts from Digital Reality without giving access to their source, underlying facts, etc.

Artificial Friction. To allow people to feel more in the loop, more in control, and more needed—even when a process has been so automated that human intervention or supervision is no longer required—opinions and consent are required even where they are not really needed.

Buying a New Car, 2035. Let us go over the same exercise, in much less detail, and consider buying and financing a new car in a digitally transformed world.

It's 2035. I go into a car dealership and choose a new car to buy. I need to borrow against the new car to finance the purchase. At the dealership there is blank screen. The screen identifies me by a retina scan and a user interface appears on the screen. As only I own my digital financial history, only I can allow access to this information on UDR. The screen asks for my consent to share specific financial information with the financing bank such as balances, income, assets, credit ranking, existing loans, and financing plans, etc. I touch the screen to give my consent. The assertion regarding my financial stability is shared by my own bank to the financing bank without infringing on my privacy, as a zero-knowledge proof. The details of the proposed financing plan appear. I present my thumb to agree to the overall terms. A full contract appears, which includes my identity; the terms of the loan; and details of the car that will secure the loan. The contract specifies that monthly payments will be made automatically from my bank account; and that if payments are not made in schedule, ownership of the car will be automatically changed—on digital reality—to the financing bank. I present my thumb to the screen to consent to the contract. The signed contract becomes an object in digital reality, connected with my identity and the identity of the car. The fact that the car is now owned by me is registered on digital reality; the car doors now open when I present my thumb to the car doors. The vehicle change of ownership transaction now appears in digital reality linked to the financial transaction; the financial transaction is linked to my financial and tax reports, as well as those of the car dealership and the financing institution.

A Tour of the Digitally Transformed World

Here, we present some examples of realities, products and services enabled by embodiments of the invention taught herein.

Identity. There is a unified identity system that exists on the shared digital reality. All forms used in the past for proving identity—for any purpose—have been consolidated. Personal physical devices for identity authentication—keys, identity cards, license cards, licenses, identity certificates, passports, membership cards, credit cards—are all replaced by a single personal identity authentication device. Biometric scanners are mainstream. There are biometric scanners attached to almost any user interface of any size—from biometric scanners attached to fixed displays, to biometric scanners attached to cars and mobile computing devices, to network-connected, tiny biometric scanners people carry around. Digital exchange of authenticated identity replaces the signature for, e.g. consent that an individual gave. The act of signature (using a pen, is replaced by associating—or forming a digital interaction—the digital identity object on shared digital reality with the digital object that represents the piece of information signed such as a contract or terms of service. A digital signature—an act of consent by an individual—is associated with that unique individual in a way that is irrefutable and secure. There is a unified procedure—a unified playbook—in case of suspected identity theft: digital reality shows that the identity has been compromised.

Figure 103:
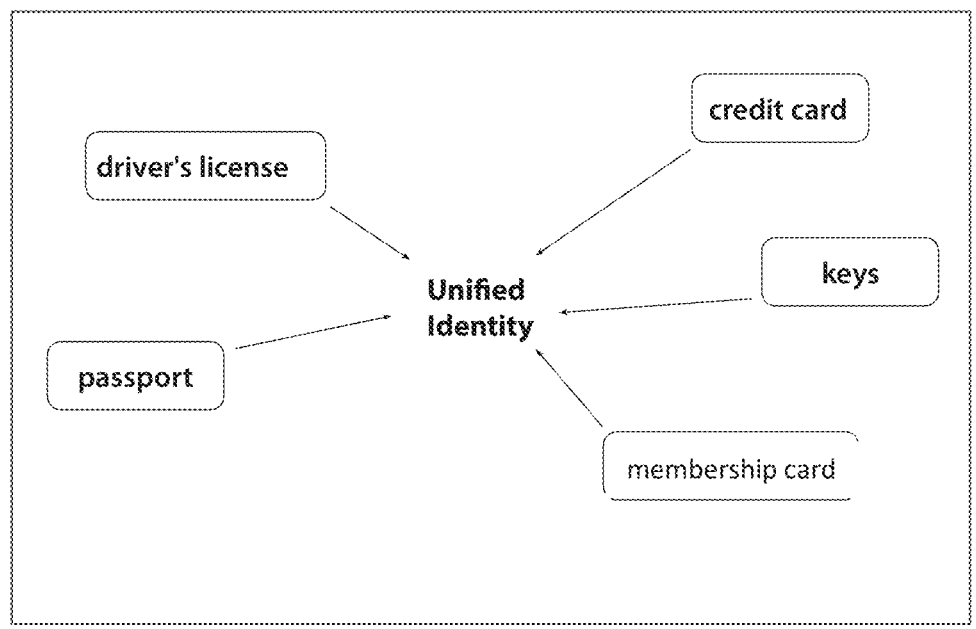
FIG. 103 shows some uses of a digitally transformed identity.

FIG. 103 shows some uses of a digitally transformed identity.

Documents and paper. There is no paper anywhere. All reading material is distributed digitally (see, for example, Journalism and Content Distribution below). Paper and paper documents have no legal or financial function—contracts are information entities and objects in the shared digital reality, signed by biometric means such as mobile network-connected tiny biometric scanners. There is no notion of an original document. All historic legal documents have been digitized and assimilated into the digital shared reality. The notion of a digital document, such the Portable Digital Format file format—PDFs, is obsolete. Information is stored as software-accessible digital facts, disentangled and independent of any human-readable visual or textual representations of it. When a user interface renders or presets information in human-readable form, the form of representation of facts has been tailored to the user interface used for the display, the functionality, and the event at hand.

Consent. Consent by an individual has been digitized. The free will act, in which an individual enters agreements such as terms and conditions, a user agreement, a contract, power of attorney, receipt of medical care, payment transfer; or affidavits in which an individual makes a declaration or signs a petition—are these digital events. Consent by an individual is granted by an interaction of the individual with a computing device which includes biometric identification. The digital object representing an event of consent is attached to the digital identity of the individual and becomes a fact in the digital shared reality. The consent fact—with the individual's identity affixed—can only be created by use of an identification mechanism such as a biometric scan.

Personal Information. All information regarding an individual, collected by any entity or stakeholder, is automatically curated, and consolidated on the shared digital reality and owned by the individual, who can grant or revoke access rights. It is securely and permanently accessible to the individual, on a single user interface, from anywhere, using any computing device. This includes all personal data, health records from any source, geo location tracking, self-monitoring (e.g. nutrition, heart rate), cell tower triangulation, music and reading, phone and message records, social media activities, digital memories (purchases, financial transactions, investments and assets, access of digital media, licenses and memberships, access to physical objects (doors, turnstiles, etc.). This information is secure and by default only available to the individual and is protected by Digital Civil Rights (see below). An individual can bequeath their data, share any part of their data permanently or temporarily with other individuals and with organizations and governments such as insurance companies, retail companies, tax authorities, court of law. Access to personal information is recorded and monitored.

Figure 104:
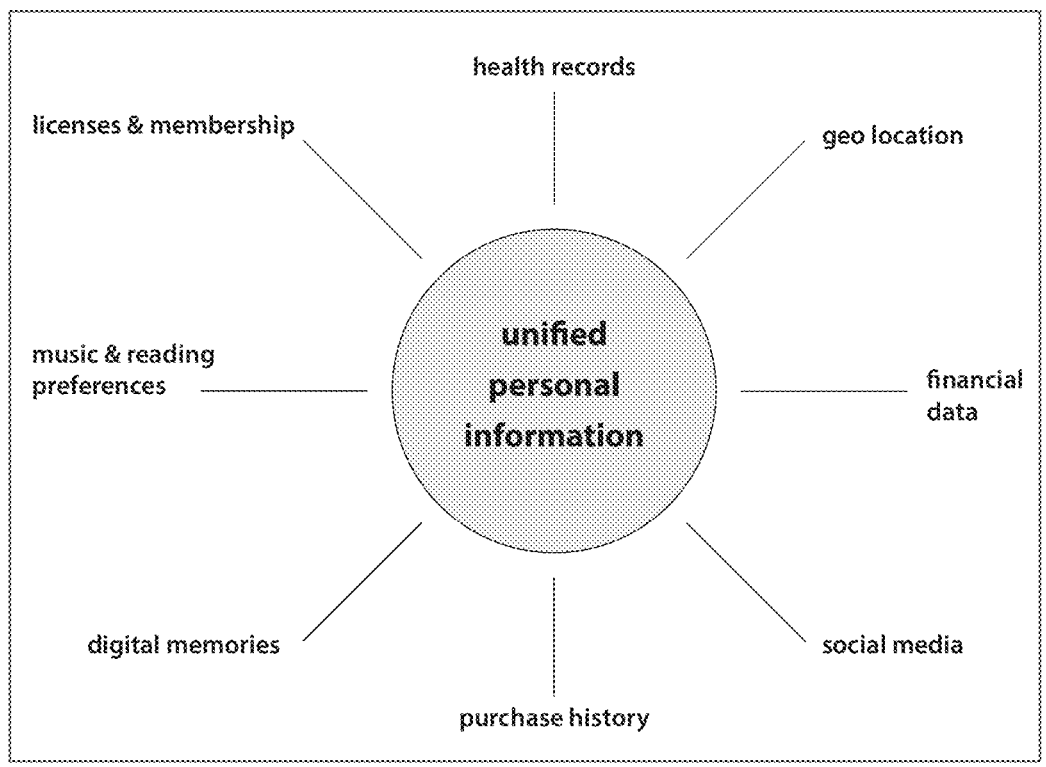
FIG. 104 shows a few types of personal information which, once digitally transformed, are controlled by the individual who generated them.

FIG. 104 shows a few types of personal information which, once digitally transformed, are controlled by the individual who generated them.

Content Distribution. The Publishing, News and Music Industries; Distribution of Art. All content exists as content objects on the digital shared reality and can be accessed by anyone from anywhere on any device, and access can be granted, tracked, and monetized. Namely, the event of an individual listening to a specific song on specific device is represented by an object on digital reality. Self-publishing of any digital content is as easy as making it open-access—because content, such as a book or a song, are just public objects in digital reality; Billing is achieved by tracking access to these objects in digital reality. Services appear which allow to consume content that is self-published in a convenient way (finding it, paying for it, accessing it). There are uniform interfaces for publishing music, for example, and paying for published music. The publishing and music industries disappear in their existing form. The service provided by online content companies such as music streaming (Spotify) and reading material distribution (Amazon Kindle) becomes decentralized—there is no need for any central provider to track access to content and everyone can monetize. Content distribution companies will focus on user interface to content, search, and indexing etc.

Banking. Retail banking in its existing form disappears and becomes a software operation. Bank accounts for government-issued currency are opened by a software process. Identification procedures for security purposes are replaced by standard biometric scanning against the identity in digital shared reality. Know-your-customer procedures in person become unnecessary—the customer is asked to share and make accessible enough of their personal information, by granting the bank access to relevant information objects with the required personal information, to verify that they eligible to open and maintain an account. Anti-money-laundering rules become unnecessary as every transaction has a complete paper trail (no longer consisting of paper) or audit trail and transaction of goods and services in exchange for payment is documented through and through. Detection of illegal activity becomes a software challenge. Loan background checks are replaced by a fully automated procedure in which the loan applicant shares personal information, and the bank's AI credit risk model assesses the application. Regulatory requirements that the bank must satisfy are implemented by software and checking regulatory requirements amounts to verified software execution. Account information is considered personal information and is owned by the account holder with permanent access to the bank. The primary function of the bank as exclusive owner and guardian of the bank's books is gone, and the bank is mostly a software outfit that develops credit risk models. Banks no longer handle data storage on behalf of their clients—all account data is on shared digital reality. As a result, the entry barrier to starting a bank is significantly reduced and the industry becomes more decentralized—but can gradually become dominated by the players with the largest computers. Many service providers become banks as a side operation—the protocol for being a bank is reduced to compliance, which is software-implemented. Businesses that make their money on giving loans start competing only based on the quality of their software models—a process comparable to the digitization of financial security exchanges, which are now fully digitally transformed.

Healthcare. The logistics and management of modern healthcare, healthcare networks, and medical billing is first and foremost an informatics problem. All medical information exists as facts on a digital shared reality. There is complete interoperability between medical informatics systems, billing, medical imaging machines, test laboratory equipment, and personnel identification devices. Medical billing and insurance become a non-issue, handled automatically by software. Insurance and Medicare fraud become a non-issue as all facts regarding medical treatment, e.g. geo location of patient and service provider, treatments, utilization of medical devices, even the fact that patient and service provider met, are facts in shared digital reality. Medical insurance Fraud prevention—making sure that billed services were indeed given to the purported patient—becomes an easy software problem. Regulatory requirements, relevant, patient care protocols, and hospital regulations are implemented in software. Medical insurance companies become software outfits—creating AI systems for detection of fraud and implementing insurance policies in software. Medical data can be bought or rented from patients for medical studies and training of AI and robotic medical care systems. Patients can agree up-front to give all data in exchange for discount or other incentives.

Figure 105:
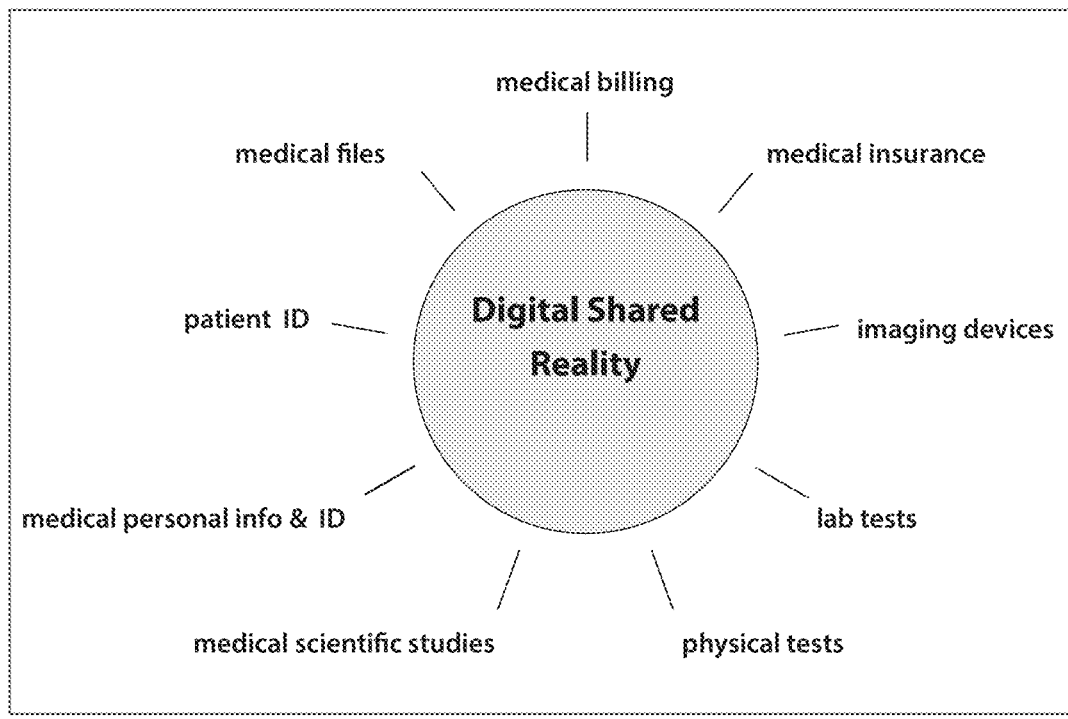
FIG. 105 shows medical information areas that, once transformed, become objects in digital shared reality.

FIG. 105 shows medical information areas that, once transformed, become objects in digital shared reality.

Insurance. Insurance at its core is an informatics operation. An insurance company receives information from a potential customer seeking to buy a policy; evaluates the information; issues a policy; receives information related to an incident and a claim; and evaluates the claim information. This entire pipeline is drastically simplified when all the information involved exists on digital reality anyway. Personal information and property information are objects in digital reality before a potential customer engages an insurance company; a potential customer simply grants the insurance company access to get a quote. Costs of existing insurance companies go toward bureaucracy and fraud prevention—a huge amount of manual document shuffling. The digitally transformed insurance company is a software outfit. Customers to the company give access to their personal information on shared digital reality and get a quote. The insurance models are sophisticated AI models using a huge amount of personal information—the more information a customer is willing to share, the low their premium can be. On the claims front, information regarding insured incidents exists on digital reality and is reviewed by the insurance company by software. Fraud prevention is a software problem. Claim settlement against service providers, e.g. medical caregivers for medical insurance, mechanics for vehicle insurance, etc., is done over the shared digital reality—quotes are reviewed and approved by software; claim settlements payments are transferred by software, etc. Regulatory requirements are implemented in software. As the entry barrier becomes lower, the industry becomes more decentralized, but can gradually become dominated by the players with the largest computers. Businesses that make their money on selling insurance start competing only based on the quality of their software models—a process comparable to the digitization of security exchange trading.

Figure 106:
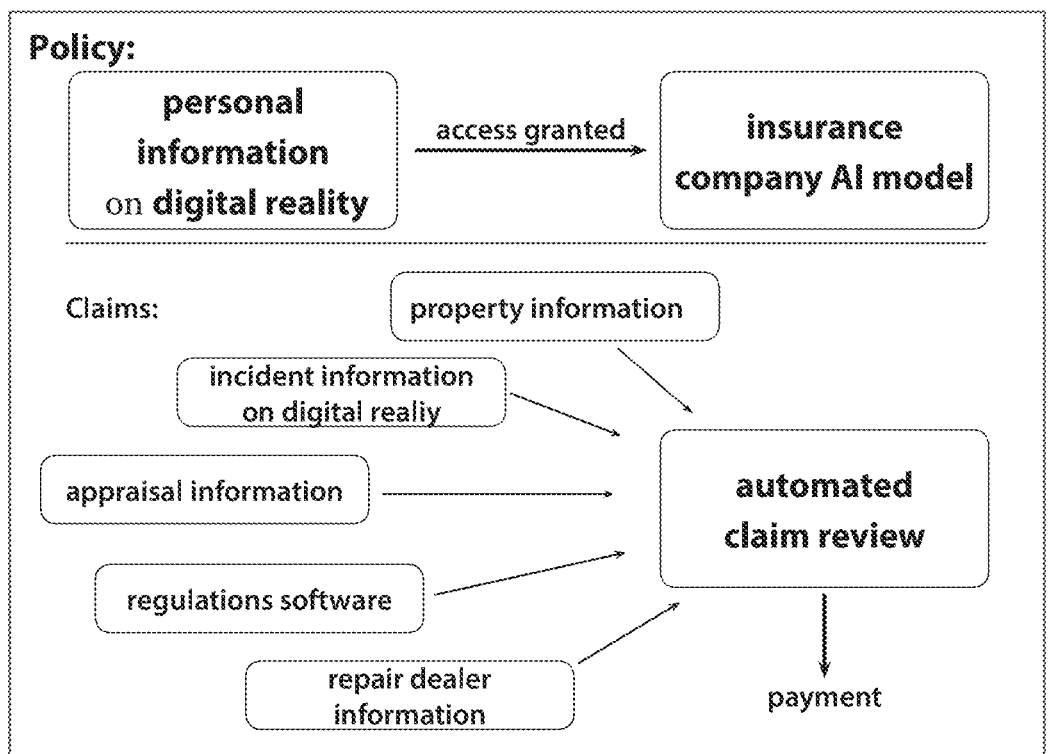
FIG. 106 describes digitally transformed insurance.

FIG. 106 describes digitally transformed insurance: top, the process of providing information as part of policy purchase; bottom, the claim submission and verification process.

Money and Payments. The global financial system continues to rely on state issued currencies, or a central global currency backed up by governments. All currencies are completely digitized. A payment is simply a fact in the digital shared reality, stating identities of payer and payee, amount, currency, mode of payment, etc. The credit card and traditional payment industry in its present form disappears, and turns into a digital payment clearing industry, as all payments are digital. This industry merges with the banking industry. Fraud prevention in digital payment is based on personal information in the digital shared reality.

Invoices and Receipts. Payment facts are digitally linked to all other facts regarding the transaction, such as facts concerning the goods or services exchanged for payment, transaction details (origin account and target account), etc. As a result, informatics problems that arise on top of payments and have to do with proving facts regarding the nature of payments—such as corporate back office, receipt processing, accounting, tax returns, etc. become software problems. There are no invoices and receipts, not as paper documents and not as digital documents—there are facts in digital reality concerning everything that happened related to the payment transaction. Verification of validity and authenticity of a payment are software processes—especially, making sure that the product of service for which it was purportedly exchanged, has indeed been delivered, based on facts in digital reality regarding that product or service. Money laundering and fake invoicing over state-issued currencies in its present form disappear as they become detectable using simple algorithms.

Sharing Economy. Shared information reality makes it possible to share basically everything. Sharing economy develops considerably. It is easier and safer to share vehicles, houses and other property using background checks (see below). All activity in a vehicle and house is recorded as facts in digital reality, making it possible to establish rules regarding property usage that are monitored or even enforced by software as a contract between the property owner and the property user.

Credit checks and background checks. Background checks become software problems as a person can choose to share large amounts of personal information with an automated background checker that is guaranteed to protect the privacy of their information. Services appear that are used by sharing economy participants, potential employers, and loan providers. In a very real sense, an individual becomes the full collection of personal information associated with their identity in the digital shared reality.

Audit trails and paper trails. The traditional notion of a paper trail disappears. Facts on digital shared reality are all connected to each other, and a single exchange, results in an entire network of interconnected facts on digital reality. There is complete data provenance of facts of different kinds—consolidated on shared reality. Facts regarding geo location, door access, identity verification, physical co-location, financial transactions, deliveries, consent, etc. all reside in the same system—the same digital reality.

Law. Because everything has a digital footprint on shared reality, much of the law becomes software. The law is implemented in software and in fact the law is software. For civil law, contracts are machine-readable and executable over the shared digital reality, namely implemented in software and execute in software. The law mandates data sharing of certain facts by individuals, legal entities, and the government. For example, individuals are required by tax law to share certain personal information with the tax authority; publicly traded companies are required by securities law to share certain information with the public and other kinds of information with registered shareholders; the government is required by freedom of information law to share certain facts with the public. These sharing laws are implemented in software, so that either the data is shared automatically, or there are warnings when data is not shared.

The legal profession changes, and a significant part of law practice is effectively software composition, either in formal programming languages or machine-readable spoken languages, and reviewing software that implements agreements or legal requirements.

Government and Regulation. A government is basically an informatics operation. Government activity—regulation, licensing, budget allocation, taxes—are all informatics. A digitally transformed government operates on top of digital shared reality, even though it does not control it. The government uses the identity system of the shared reality. Licenses are facts in shared reality. Taxes—see below. Management of budget becomes a software problem as all payments—including payment by government to suppliers and contractors—are facts in digital reality. Regulations are implemented in software as code that executes over digital reality. Freedom of information acts are implemented in software. Government access to private information depends on access being granted by the owner of the data and is documented—providing a check against government use of information.

Compliance. As government regulation is implemented in software, compliance becomes a software problem. Regulation is specified and implemented in software, namely, in a machine-readable format—not in any natural human language. A regulation specified conditions that must be met; execution of the relevant code is like a software test and results in either (i) a compliant response, or (ii) a non-compliant response with a list of issues. A regulated entity grants the regulating government agency access to relevant information objects in digital reality. The regulatory agency is simply responsible for maintaining the regulation code (according to legislation) and executing the code. An individual or company have continuous tracking regarding their compliance status—as does the government regulator. Software is checking whether all regulations are followed and issues warnings.

Tax. Tax is a major informatics operation. Tax reports by the taxpayer—as well as tax audit by the tax authority—come down to managing vast amounts of information from different sources regarding income, expenses, payments, receipts, geo location for determining tax residency, past years tax reports, etc. Digitally transformed tax collection occurs automatically and continuously. All income and expenses known to the individual are stored as private information on digital reality. Software is running against facts on payments and goods/services exchanged and collecting an exact tax on an ongoing basis. Tax is a software problem. Tax experts write and review software that implements the tax code, tax regulations, etc. Tax residency is automatically calculated upon sharing of geo data. The government tax authority is granted access to all tax-related information from an individual's or organization's personal information. The tax authority runs independent software audits.

Escrow. An escrow process as part of sale and transfer of ownership/transfer of title over an item, a vehicle, or real estate property is an informatics process. The seller transfers ownership to a third party, e.g. escrow agent, and conditions are set that result in either (i) ownership being returned to the owner if the transaction is unsuccessful, or (ii) ownership being transferred to the buyer if the transaction is successful. Conditions are specified in machine-readable language, rather than in natural human language, and specify conditions on information objects in digital reality (for example, payment transferred). The code is executed and changes the ownership to either the original owner or the buyer.

Corporate accounting. The function of the corporate back office is obsolete, and the role of corporate controller's office evolves to a software role. All company financial transactions—invoices issued to clients, invoices accepted from suppliers, receipts, salary and pension transactions, assets acquired and sold—are all events recorded as objects in shared digital reality. Accountants on the corporate (controller) side write computer-readable code that verifies compliance and consistency, and accountants on the external oversight (audit) side review that code for correctness or write their own auditing code. The decision whether the company's books (now, collection of objects in shared digital reality) is in order is determined by the code written by the controller office or by code written by the auditors. Traditional roles of corporate back office (receipt tracking and matching, for example) are performed automatically by software. Financial reports are produced automatically by code written by the controller's office or external auditors. Correctness of financial reports is factified by verifiable execution of the auditing code. The complete collection of information objects relevant for corporate accounting and audit—from expense receipts to employee hour reports and contracts—are permanently available for software inspection and verification as an inter-connected network of digital objects.

Scientific research; the scientific publishing industry. The scientific publishing industry moves away from distribution of printed content and focuses on distribution and management of scientific data gathered during research. All scientific data is stored as objects in shared digital reality, with new scientific fields and approaches that develop on the plethora of scientific data and measurements available for mining and cross-reference. Human-readable scientific reports service as gateways and entry points into the underlying research data stored on shared digital reality. Open access data mandates are enforced and implemented as access rights and policies to objects storing scientific data.

Evidence-based policy and planning. Data on all aspects of society—such as public behaviors, traffic patterns, etc.—accumulates and is available for inspection and mining. As a result, the range of data-informed decisions becomes much broader—policy suggestions can be based on verifiable and open data analysis of anonymized public records.

Automated billing systems for utilities and services. Utilities and services from water, electricity and gas utilities to network access usage data is recorded on shared digital reality. The billing industry transforms and focuses on data processing activities applied to usage data in shared digital reality.

Finance
  Portfolio stress tests and risks assessments are performed as verifiable computations, that create a permanent machine-auditable digital trace. Reports and representations of stress tests and risk assessments are machine-verifiable and contain user-interface features that represent their verifiability status, so that trustworthiness is evident.
  Investment portfolio statements and public financial reports are machine-verifiable and contain user-interface features that represent their verifiability status. All information underlying a portfolio statement or financial report (assets owned, asset prices, transactions made, etc.) are available for machine inspection in unique digital reality.

Corporate oversight. Corporate bylaws and corporate governance decisions are enforced through software. Corporate governance and external third parties (such as regulatory bodies) obtain machine-verifiable reports that link to the unique digital reality of the corporation, namely, are based on the actual information as it was originally recorded—not of a retelling or affidavit of the information.

Medical process management. Medical standard of care and medical protocols are implemented in software, and compliance with protocols is machine-verifiable since all medical records and medical care events are available in uniform digital reality. There is a machine-readable language that describes standard-of-care and care protocols.

Digital civil rights and GPDR. Each piece of digital information is attributed to and belongs to the individual or person who created. Data bequest is standard—the complete collection of personal information is an asset that can be rented, sold, and indeed passed as inheritance.

Real estate. Real estate ownership registrar is simply a part of unique digital reality. Real estate ownership records are maintained in uniform format over unique digital reality. Real estate transactions are recorded in perpetuity in unique digital reality. Due diligence in real estate transactions is automated and performed by executing machine code against all relevant information in unique digital reality.

Monetization of personal information. All personal information (as discussed above) is stored on unique digital reality and is legally owned by the person. It can be monetized by granting temporary or permanent access to an interested third party. Access to personal information on digital reality is tracked and recorded.

Bureaucracy. Processing of information collections and requirement verification is automatic No documents are involved in a bureaucratic process (not physical and not digital documents). All bureaucratic processes are fully automated.

Online searching and indexing. The totality of digital information is stored and made accessible through unique digital reality. It is much wider and deeper than the world wide web—it contains everything, not just web pages. It contains the digital footprint of most of objects, states, and events in physical, legal, financial and information technology realities. Correspondingly, Software engineering. Software testing is provable: it is possible to prove to an interested third party that a certain given software test was executed and passed/failed on a given point in time in the past. Code execution tracking. Code lives on digital reality. Therefore it is possible to track the identity of parties executing certain code segments.

HIPPA and ISO Compliance. Compliance is machine-enforced. All information relevant to compliance requirements is stored in digital reality. Compliance requirements are encoded in a machine-readable requirements language and executed automatically to assess compliance status.

VAT collection. Vat collection is automatic. There are no paper invoices or invoices in digital document format—all financial transactions, and in particular all payment transactions, are recorded in digital reality. VAT calculation is automatic and VAT reports are machine verifiable.

Large-scale shared virtual reality and shared augmented reality. Objects, states and events in large-scale shared virtual reality or large-scale shared augmented reality are stored as digital objects in digital reality. Ownership over virtual items, virtual real estate and other ownable assets in shared virtual reality is recorded in unique digital reality. Virtual reality or augmented reality can be used to mirror—or otherwise represent—objects, states, and events in physical reality as they are recorded in digital reality.

Internet of Things. Devices and sensors store their measurements and event logs as digital objects in unique digital reality. As a result, these measurements and logs are machine-accessible and large-scale integration of information from IoT devices, across stakeholders who own the devices, locations where they are installed, and device manufacturer, is possible.

Copyright. All digital content is distribution without the use of digital files. Access to each digital content object is tracked so that copyright is easy to enforce and content easy to monetize. Computers can become terminals for accessing information in digital reality ecosystem, rather than storing the information themselves or copying information. Content is watermarked with a universal identifier pointing to its location in digital reality.

Liability law regarding mission-critical software systems and autonomous systems. The law requires certain software testing of mission-critical software systems. Liability law reflects these requirements. Proof of testing is achieved using digital reality.

A data amalgamation and reconciliation industry. As digital information is stored on unique digital reality, an array of new products and services appear that provide the function of data amalgamation and data reconciliation. Services include joining separate datasets on digital reality into a single dataset on digital reality and reconciliation of differences and mismatches between different datasets on digital reality.

Data-based decisions. Leadership and management basing their decisions on summaries and analyses of data do so based on data recorded in digital reality and based on analyses recorded in digital reality. These decisions can rely on counter-factual code execution of an analysis, namely, on knowledge of how a certain analysis result would change if some of its conditions (data or tuning parameters) are changed.

Evidence-based medicine. Measurements performed for prospective medical studies are stored in digital reality. For retrospective studies, all medical records and medical information are stored in digital reality, and with proper permissions can be used for retrospective statistical analysis. Statistical analysis can be submitted, and committed to, on mock data, by storing it on digital reality. Execution of statistical analysis is verifiable as it creates a lasting record on digital reality. Publication of results of medical studies is inextricably linked to the statistical analysis as it was executed, and to the underlying measurements analyzed.

Processing System

Figure 107:
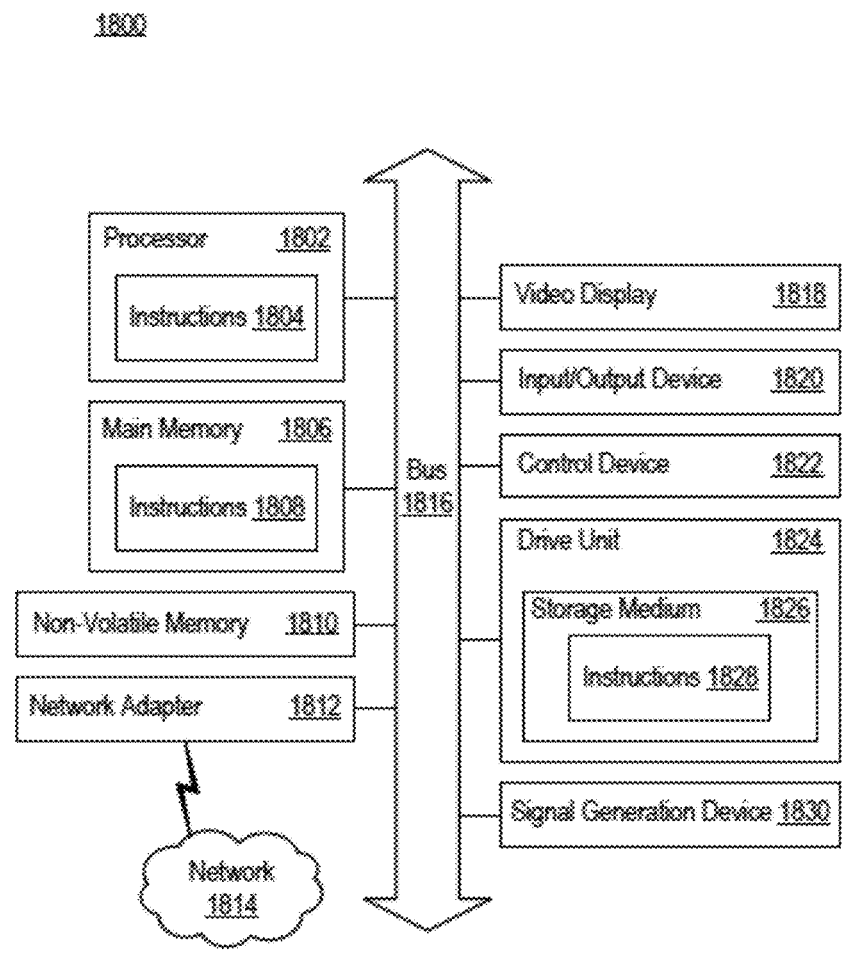
FIG. 107 is a block diagram illustrating an example of a processing system in which at least some operations described herein can be implemented.

FIG. 107 is a block diagram illustrating an example of a processing system 1800 in which at least some operations described herein can be implemented. For example, components of the processing system 1800 may be hosted on a computing device that includes a threat detection platform. As another example, components of the processing system 1800 may be hosted on a computing device that is queried by a threat detection platform to acquire emails, data, etc.

The processing system 1800 may include a central processing unit (also referred to as a "processor") 1802, main memory 1806, non-volatile memory 1810, network adapter 1812 (e.g., a network interface), video display 1818, input/output device 1820, control device 1822 (e.g., a keyboard or pointing device), drive unit 1824 including a storage medium 1826, and signal generation device 1830 that are communicatively connected to a bus 1816. The bus 1816 is illustrated as an abstraction that represents one or more physical buses or point-to-point connections that are connected by appropriate bridges, adapters, or controllers. The bus 1816, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), inter-integrated circuit (I2C) bus, or an Institute of Electrical and Electronics Engineers (IEEE) standard 1394 bus (also referred to as "Firewire").

The processing system 1800 may share a similar processor architecture as that of a desktop computer, tablet computer, mobile phone, game console, music player, wearable electronic device (e.g., a watch or fitness tracker), network-connected ("smart") device, e.g. a television or home assistant device, virtual/augmented reality systems, e.g. a head-mounted display, or another electronic device capable of executing a set of instructions (sequential or otherwise) that specify action(s) to be taken by the processing system 1800.

While the main memory 1806, non-volatile memory 1810, and storage medium 1826 are shown to be a single medium, the terms "machine-readable medium" and "storage medium" should be taken to include a single medium or multiple media, e.g. a centralized/distributed database and/or associated caches and servers, that store one or more sets of instructions 1828. The terms "machine-readable medium" and "storage medium" shall also be taken to include any medium that is capable of storing, encoding, or carrying a set of instructions for execution by the processing system 1800.

In general, the routines executed to implement the embodiments of the disclosure may be implemented as part of an operating system or a specific application, component, program, object, module, or sequence of instructions (collectively referred to as "computer programs"). The computer programs typically comprise one or more instructions, e.g. instructions 1804, 1808, 1828, set at various times in various memory and storage devices in an electronic device. When read and executed by the processors 1802, the instructions cause the processing system 1800 to perform operations to execute elements involving the various aspects of the present disclosure.

Moreover, while embodiments have been described in the context of fully functioning electronic devices, those skilled in the art will appreciate that some aspects of the technology are capable of being distributed as a program product in a variety of forms. The present disclosure applies regardless of the particular type of machine- or computer-readable media used to effect distribution.

Further examples of machine- and computer-readable media include recordable-type media, such as volatile and non-volatile memory devices 1810, removable disks, hard disk drives, and optical disks (e.g., Compact Disk Read-Only Memory (CD-ROMS) and Digital Versatile Disks (DVDs)), and transmission-type media, such as digital and analog communication links.

The network adapter 1812 enables the processing system 1800 to mediate data in a network 1814 with an entity that is external to the processing system 1800 through any communication protocol supported by the processing system 1800 and the external entity. The network adapter 1812 can include a network adaptor card, a wireless network interface card, a router, an access point, a wireless router, a switch, a multilayer switch, a protocol converter, a gateway, a bridge, a bridge router, a hub, a digital media receiver, a repeater, or any combination thereof.

The network adapter 1812 may include a firewall that governs and/or manages permission to access/proxy data in a network. The firewall may also track varying levels of trust between different machines and/or applications. The firewall can be any number of modules having any combination of hardware, firmware, or software components able to enforce a predetermined set of access rights between a set of machines and applications, machines and machines, or applications and applications, e.g. to regulate the flow of traffic and resource sharing between these entities. The firewall may additionally manage and/or have access to an access control list that details permissions including the access and operation rights of an object by an individual, a machine, or an application, and the circumstances under which the permission rights stand.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A method for digital consolidation, comprising:
capturing objects, states, and events into a plurality of unique digital objects, each unique digital object comprising a universally unique, permanently accessible, immutable, committed, universally uniquely addressable, and machine-readable digital object stored permanently on a server, a network of servers, or a distributed database;
providing a cryptographic key pair, wherein a digital signature created using a private key is verifiable using a public key, and wherein the private key is issued to an individual, and wherein the corresponding public key is made publicly available through a unique digital object intended to establish identity of the individual;
providing authentication information that may be used to authenticate the identity of an individual; and
protecting access to said private key by an authentication process, wherein the authentication process compares information collected from the individual on an authentication attempt with said authentication information;
wherein said unique digital objects comprise any of observed assertions regarding one or more objects, states, or events in reality (physical or other), and deduced assertions in which a deductive reasoning or compliance verification process has been applied to previous information objects to obtain an asserted result;
wherein said unique digital objects are accessible through an enduring network interface, comprising an Internet service that is permanently available over a network using a universally unique identifier and offering an application programming interface (API);
wherein said enduring network interface responds to queries at a network address indefinitely associated with its unique identifier;
wherein said enduring network interface exposes an API that is accessible through its universal address as a unique digital object;
wherein said enduring network interface comprises a network service comprising a permanent unique universal identifier, a permanently available API, an immutable, digitally signed, and committed information payload, an owner identity, a time-of-origin, access privileges, and optional mutable metadata; and
wherein said payload comprises core immutable data made permanently available, pending access privileges, through said enduring network interface.

2. The method of claim 1, further comprising:
providing verifiable code execution, by mirroring code execution events as collections of unique digital objects, wherein unique information objects, created by the same machine, virtual machine, or interpreter executing the code, record a progression of computation including code executed, input and output data structures, interim variables, and key results intended for consequent presentation or processing.

3. The method of claim 1, wherein the individual is a natural person.

4. The method of claim 3, wherein:
authentication information comprises biometric identification information comprising any of facial information, ocular information, fingerprint information, heartbeat information, or genetic information.

5. The method of claim 1, further comprising:
verifying the unique digital identity for the individual, wherein said verifying comprises:
providing an identifier and a private key that corresponds to the unique digital identity;
acquiring a biometric measurement for the individual;
hashing the acquired biometric measurement;
using the private key to acquire the hashed biometric information for the individual; and
verifying the unique digital identity for the individual based on a matching of the hashed acquired biometric measurement and the hashed biometric information.

6. The method of claim 1, further comprising:
verifying execution of code in a programming environment by:
creating a plurality of digital objects in Unique Digital Reality (UDR), each of said digital objects uniquely corresponding to an event of execution of a specific block, subroutine, or function in a computer program; and
subsequently verifying that the computer program was executed using one or more specified inputs and that the computer program produced one or more specified outputs.

7. The method of claim 6, wherein the creating the plurality of UDR objects comprises:
during execution of the computer code, depositing source code corresponding to each event or function call in UDR, including all relevant variables for each event or function call.

8. The method of claim 7, wherein the computer code is executed in a procedural programming language.

9. The method of 7, further comprising:
depositing details corresponding to the execution environment with a main UDR object that describes the program execution.

10. The method of claim 6, wherein the subsequent verification comprises an automatic verification process, whereby the UDR objects created during the program execution are accessed using a computational device.

11. The method of claim 6, wherein the inspecting the UDR objects comprises re-execution of the computer program using the one or more specified inputs, to verify that the computer program produces the one or more specified outputs.

12. The method of claim 6, wherein said subsequent verifying proves that a feature of the computer program has been implemented or tested.

13. The method of claim 6, wherein said subsequent verifying proves that the computer program is any of fair or non-discriminating.

14. The method of claim 6, wherein said subsequent verifying proves that a specified data analysis procedure yields claimed results.

15. The method of claim 1, further comprising:
- representing a document, a form, or a collection of documents or forms using a collection of unique digital objects;
- wherein the information required to verify the consistency and compliance of each document or form is contained in a corresponding unique digital object; and
- wherein the information required to verify the consistency and compliance of the collection as a whole is contained in one or more digital objects in the corresponding collection of unique digital objects;
- representing, in a machine-readable language or computer code instructions, conditions for consistency and compliance of the document, the form, or the collection of documents or forms;
- verifying consistency and compliance of the form, or the collection of documents or forms, by executing said machine-readable language or computer code instructions using a device comprising a processor and a communication interface;
- wherein, during said execution, said device accesses at least one of the unique digital objects corresponding to the document, the form, or the collection of documents or forms whose verifying consistency and compliance is verified.

16. The method of claim 1, further comprising a module for visualization or human-readable representation of documents or forms, the module implementing the method comprising:
- accessing a unique digital object representing the document or form to be presented, wherein the payload of the unique digital object includes any of instructions for human-readable presentation of the document or form, and machine-readable key information contained in the document or form;
- accessing any unique digital objects representing associated documents, associated forms, human signature events, or other document interactions related to the document or form presented; and
- rendering human-readable presentations or visualization of the document or form using any of the unique digital object, its payload, and any related unique digital objects;
- wherein the presentation or visualization includes at least one of human-readable or machine-readable form of the unique identifier of the unique digital object; and
- wherein any presentation or visualization presents visually conspicuous symbols asserting the validity and verifiability status of the unique digital object.

17. The method of claim 16, wherein the representation or visualization generated by the module allows user interactions on a user interface displayed on top or alongside the representation or visualization; and
- wherein the module creates new unique digital objects recording user interactions with the representation or visualization.

\* \* \* \* \*